Oct. 27, 1959  S. VAN MIERLO ET AL  2,910,540
TELECOMMUNICATION SYSTEM
Filed Nov. 17, 1953  47 Sheets-Sheet 11
FIG. 11.
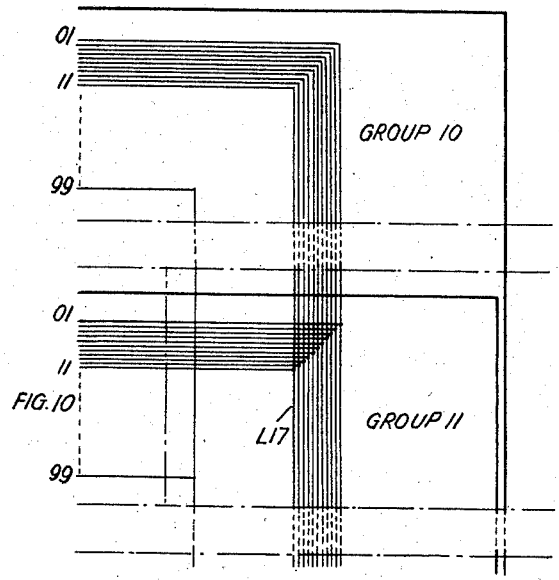
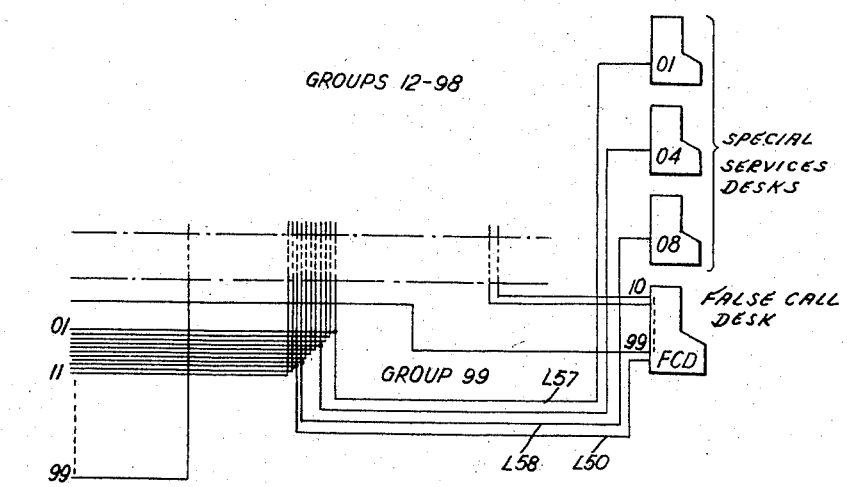
Inventor
S. VAN MIERLO-
H. ADELAAR
By Robert T. Harding Jr.
Attorney Oct. 27, 1959  S. VAN MIERLO ET AL  2,910,540
TELECOMMUNICATION SYSTEM
Filed Nov. 17, 1953  47 Sheets-Sheet 15

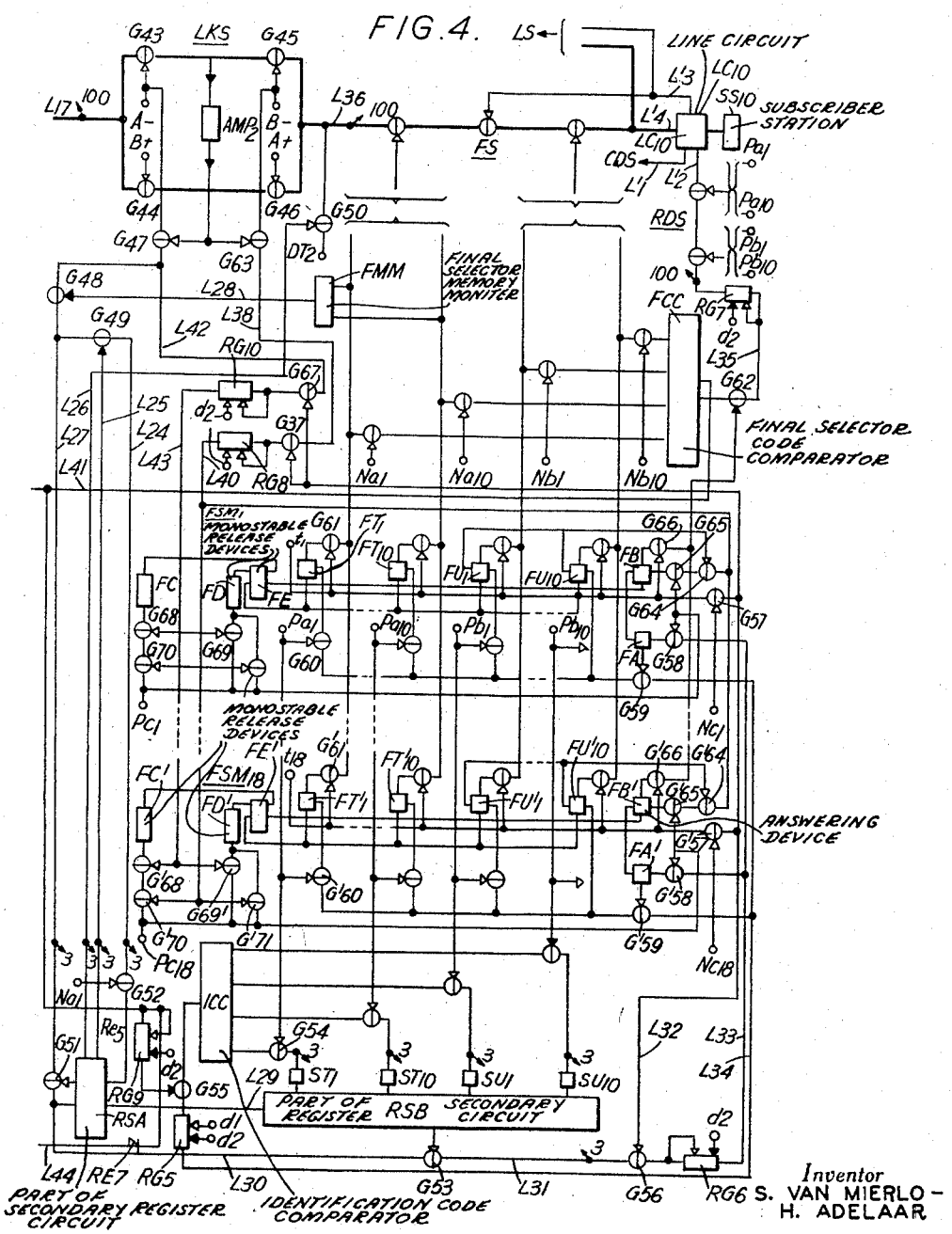

Inventor
S. VAN MIERLO —
H. ADELAAR
By
Attorney

Inventor
S. VAN MIERLO —
H. ADELAAR
Attorney

S. VAN MIERLO ET AL 2,910,540

TELECOMMUNICATION SYSTEM

Filed Nov. 17, 1953

*Inventor*
S. VAN MIERLO—
H. ADELAAR

By *Robert Harding Jr.*
*Attorney*

FIG.37

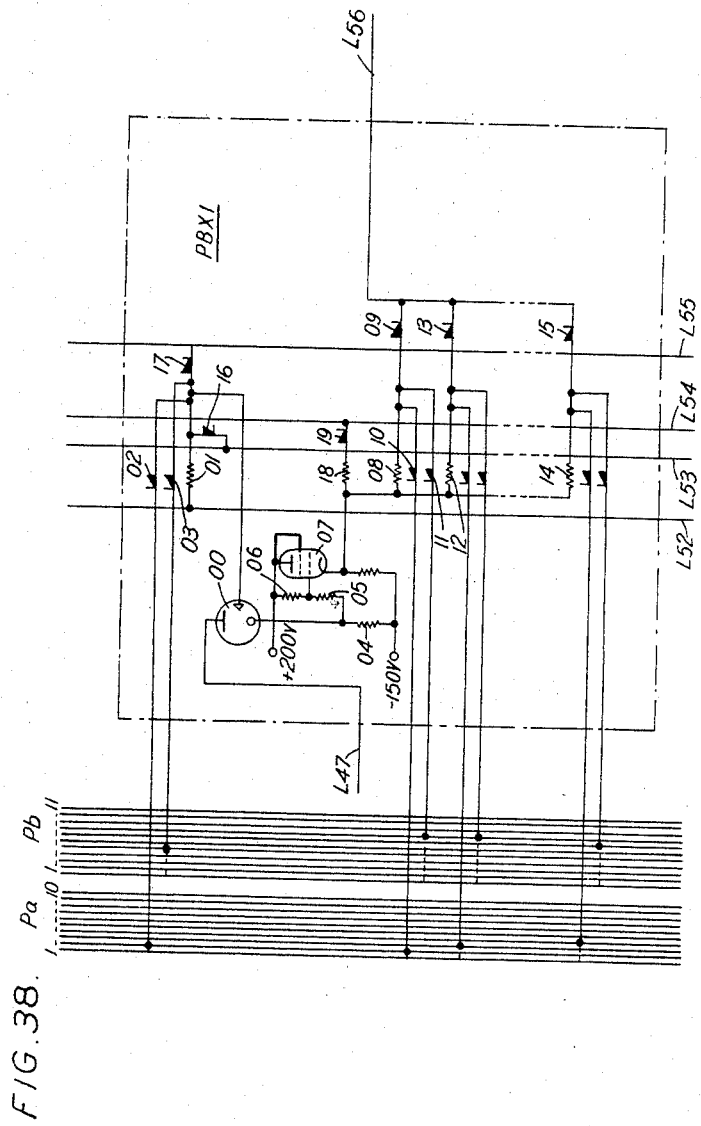

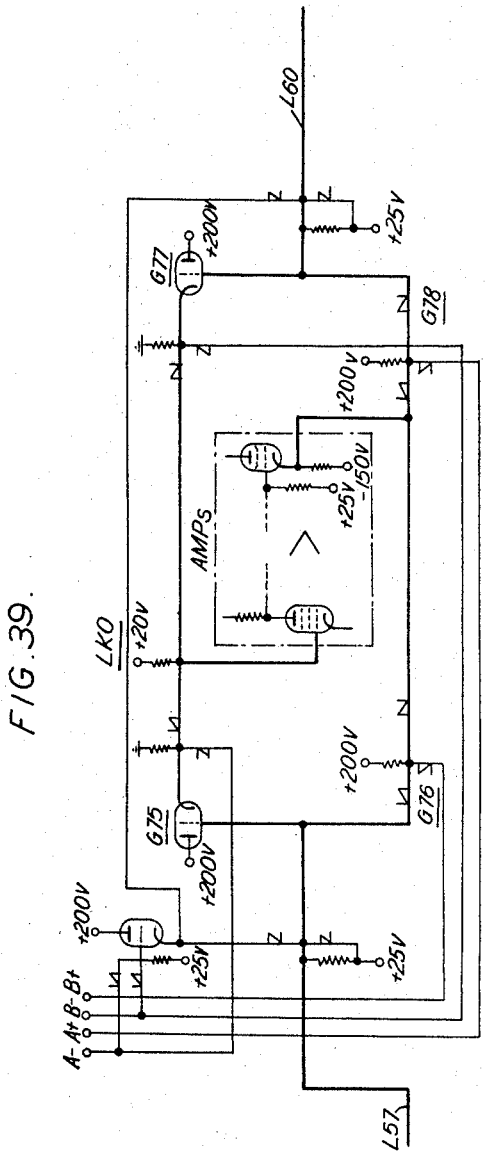

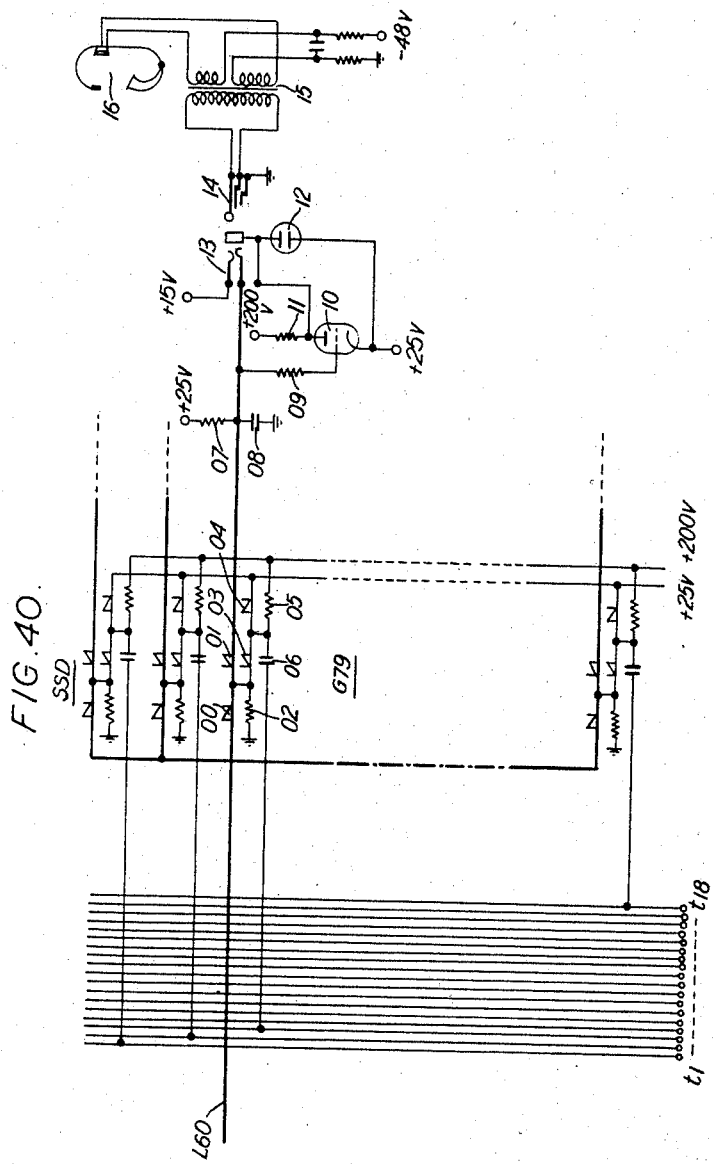

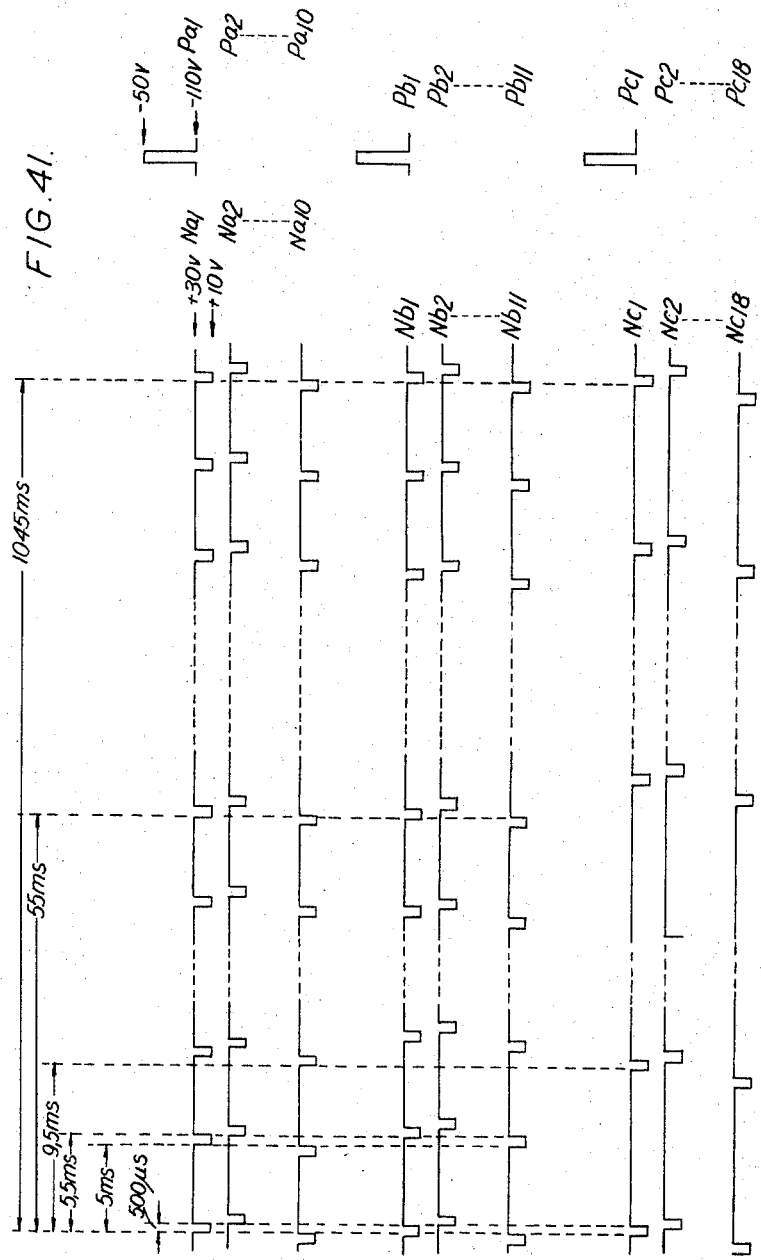

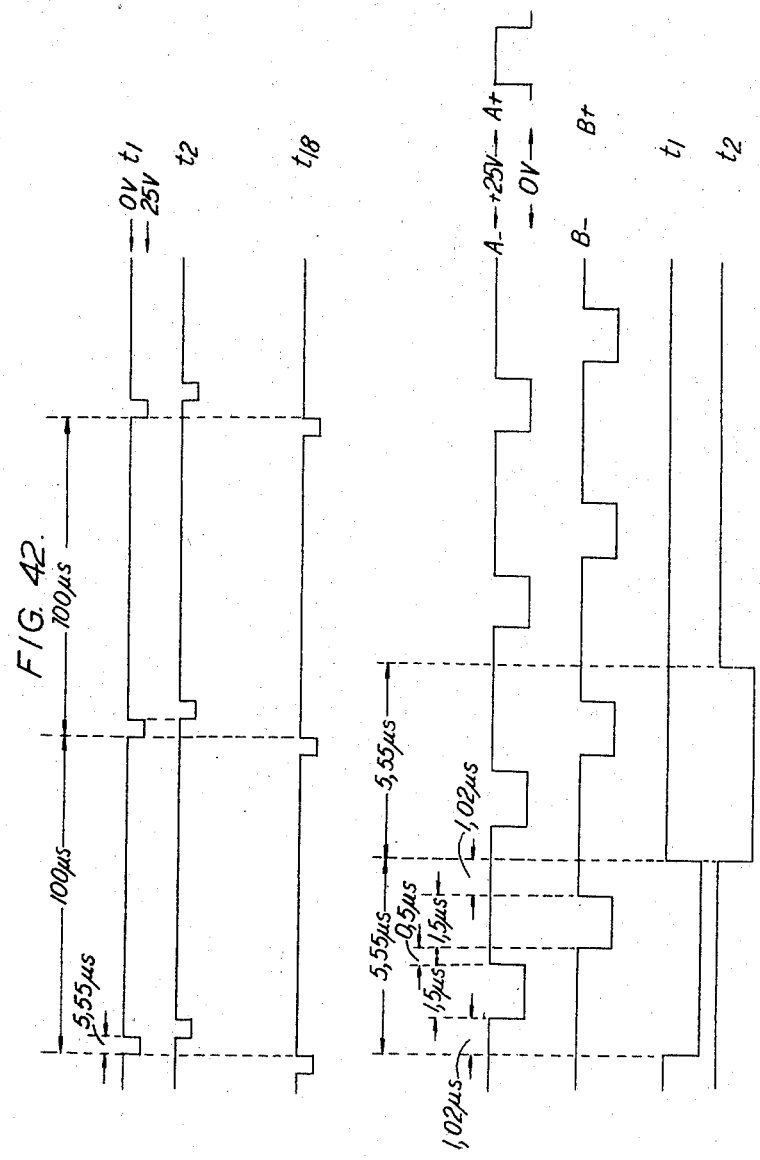

FIG. 46.

|    | 1   | 2   | 3  | 4  | 5  | 6  | 7  | 8  | 9  | 10 | 11 | 12 | 13 | 14 | 15 | 16 | 17  | 18  |
|----|-----|-----|----|----|----|----|----|----|----|----|----|----|----|----|----|----|-----|-----|
| 1  | 1   | 7   | 13 | 19 | 25 | 31 | 37 | 43 | 49 | 55 | 61 | 67 | 73 | 79 | 85 | 91 | 97  | 103 |
| 2  | 2   | 8   | 14 | 20 | 26 | 32 | 38 | 44 | 50 | 56 | 62 | 68 | 74 | 80 | 86 | 92 | 98  | 104 |
| 3  | 3   | 9   |    |    | 27 |    |    |    |    |    |    |    |    |    |    |    |     | 105 |
| 4  | 4   | 10  |    |    | 28 |    |    |    |    |    |    |    |    |    |    |    |     | 106 |
| 5  | 5   | 11  |    |    | 29 |    |    |    |    |    |    |    |    |    |    |    |     | 107 |
| 6  | 6   | 12  |    |    | 30 |    |    |    |    |    |    |    |    |    |    |    |     | 108 |
| 7  | 7   | 13  |    |    | 31 |    |    |    |    |    |    |    |    |    |    |    |     | 109 |
| 8  | 8   | 14  |    |    | 32 |    |    |    |    |    |    |    |    |    |    |    |     | 110 |
| 9  | 9   | 15  |    |    | 33 |    |    |    |    |    |    |    |    |    |    |    |     | 1   |
| 10 | 10  | 16  |    |    | 34 |    |    |    |    |    |    |    |    |    |    |    |     | 2   |
| 11 | 11  | 17  | 23 | 29 | 35 | 41 | 47 | 53 | 59 | 65 | 71 | 77 | 83 | 89 | 95 | 101| 107 | 3   |
| 12 | 12  | 18  |    |    | 36 |    |    |    |    |    |    |    |    |    |    |    |     | 4   |
| 13 | 13  | 19  |    |    | 37 |    |    |    |    |    |    |    |    |    |    |    |     | 5   |
| 14 | 14  | 20  |    |    | 38 |    |    |    |    |    |    |    |    |    |    |    |     | 6   |
| 95 | 95  | 101 |    |    | 9  |    |    |    |    |    |    |    |    |    |    |    |     | 87  |
| 96 | 96  | 102 |    |    | 10 |    |    |    |    |    |    |    |    |    |    |    |     | 88  |
| 97 | 97  | 103 |    |    | 11 |    |    |    |    |    |    |    |    |    |    |    |     | 89  |
| 98 | 98  | 104 |    |    | 12 |    |    |    |    |    |    |    |    |    |    |    |     | 90  |
| 99 | 99  | 105 |    |    | 13 |    |    |    |    |    |    |    |    |    |    |    |     | 91  |
| 100| 100 | 106 | 2  | 8  | 14 | 20 | 26 | 32 | 38 | 44 | 50 | 56 | 62 | 68 | 74 | 80 | 86  | 92  |

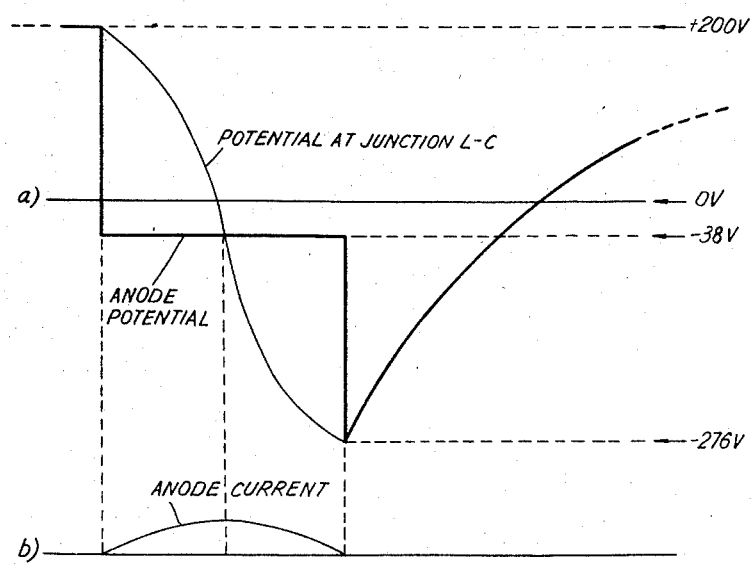

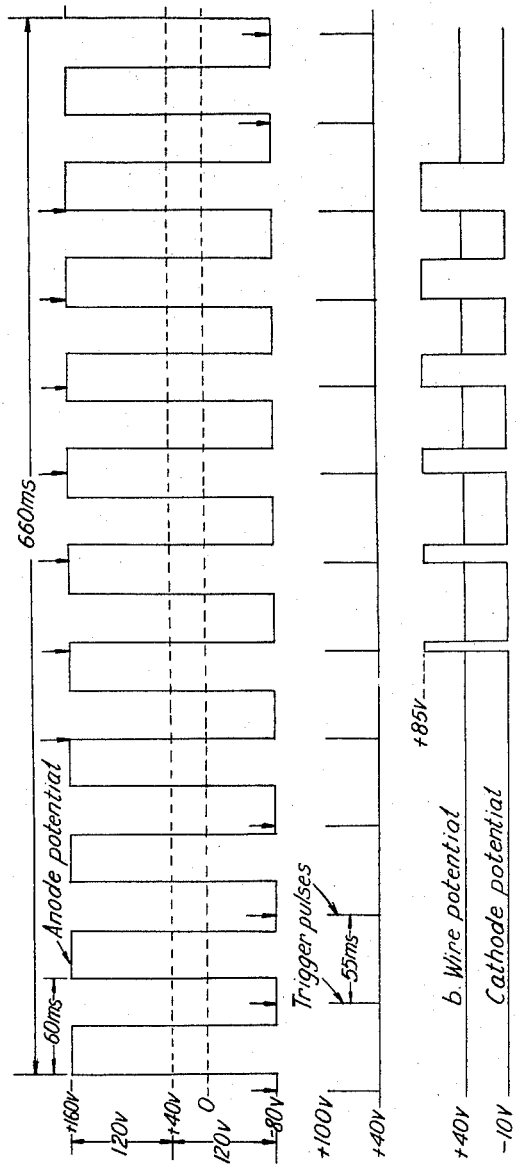

2,910,540

TELECOMMUNICATION SYSTEM

Stanislas Van Mierlo and Hans H. Adelaar, Antwerp, Belgium, assignors to International Standard Electric Corporation Application November 17, 1953, Serial No. 392,662

Claims priority, application Belgium November 18, 1952

38 Claims. (Cl. 179—15)

The invention relates to a telecommunication system. More particularly, it relates to an automatic telephone system suitable for telephone exchanges and especially large exchanges.

The general object of the invention is the provision of a telecommunication system of a novel kind whereby communications can be established between any two substations part of the network.

Another object of the invention is the provision of novel means for suppressing said dial tone upon the initiation of dial impulses.

Another object of the invention is the provision of novel means for allotting suitable circuits to a calling substation and apply dial tone thereto.

Another object of the invention is the provision of novel means for finding free channels leading to the called subscriber station.

An object of the invention resides in the provision of novel means to signal to any calling subscriber station that no free channels leading to any called subscriber station are available.

Another object of the invention resides in the use of novel means to determine and signal to the calling subscriber station, the busy condition of the called subscriber station.

Another object of the invention resides in the provision of novel means for ringing the called subscriber station when the latter is free.

Another object of the invention resides in the use of novel means for permanently interrupting said ringing when the called subscriber station answers.

Another object of the invention resides in the provision of novel means for protecting a calling substation from calls directed to that calling substation.

Another object of the invention resides in novel means for determining and causing the release of a connection at the initiation of either the calling or the called subscriber station or both.

Another object of the invention resides in the provision of novel means for obtaining access to any free substation out of a P.B.X group.

Yet another object of the invention resides in the provision of novel means permitting access to special services.

Telephone systems as they are now in use employ electro-mechanical means such as electromagnetic relays and electro-mechanical switches, both for the establishment of a speech circuit between two substations and for the means necessary to obtain and control the establishment of said speech circuit.

While some of these systems have been developed to a high degree of reliability, it is, however, true that the use of moving mechanical elements imposes limitations on the speed of operation and introduces other problems, such as weight and volume, and especially those due to wear of the moving parts.

Proposals have already been made where the above conventional electromechanical means are replaced, either for the speed circuits or for the control circuits, by novel means involving the use of time division multiplex arrangements and electronic apparatus.

It has also been proposed to replace both the speech circuit and the control circuits by these novel means. Concerning these last proposals, and among recent work, reference may for example be made to the Belgian Patents Nos. 500,226, 485,525, and 497,529, and U.S. Patents Nos. 2,584,987, and 2,766,324.

The systems described in the above references, disclose the use of a link providing a plurality of conversation channels which can thus be used for simultaneous communications between substations served by said link. The latter is generally provided at both ends with selective means to obtain access to the substations. If this link is used in a time division multiplex fashion, there will be a practical limit to the length of time allocated to a channel provided thereon, said length being inversely proportional to the number of channels. Hence, it is necessary to limit the number of said channels, which means that the traffic carrying capacity is also limited and that consequently the number of substations co-operating with the link is also limited. This will be felt more acutely if a particular time channel, or time position, is allotted to each substation, as in the aforementioned U.S. Patent No. 2,584,987, but the number of substations co-operating with the help of a multiplex link, will also be limited even if a time channel is allotted per conversation as in the aforementioned U.S. Patent No. 2,766,327.

Also, although the selective means may be such that they afford selective access from a link to an appreciable number of substations, particularly if they are electronic switches, there is nevertheless also a practical limit to the maximum number of substations which can be accommodated by one switch.

Hence, these considerations lead to the conclusion that the above mentioned multiplex and electronic means are primarily applicable to groups of a small number of substantions, e.g. Belgian Patent No. 500,226.

In the Belgian Patents No. 485,525 and No. 497,529, it has, however, been envisaged to use selective means in several stages which, of course, forms the basic principle of most large size telephone exchanges of the electro-mechanical type. In these two patents, two or more stages of channels have been considered, each stage being provided by a time division multiplex link. Any channel in one stage can be interconnected with any channel in a preceding stage, but the information present on one channel is not fit to be directly delivered to a channel in a subsequent stage and demodulation at each selecting stage is necessary. Thus, the amplitude modulated pulses appearing on the multiplex link of one stage, cannot be directly transferred to the multiplex link of the subsequent stage and additional demodulating equipment is necessary between succeeding stages.

A feature of the invention resides in a telecommunication system comprising a plurality of substations and means for interconnecting any two of said substations via a plurality of channels in series and wherein said channels are arranged in groups, each channel in any group co-operating exclusively with one or more channels in each of the remaining groups and communication between any two substations being established over at least two of said corresponding channels in series.

Another feature of the invention resides in a system wherein any set of corresponding channels in the different groups used for communication between two substations may be chosen among all the free sets available from said groups.

Another feature of the invention resides in a system wherein any free channel in a group may be used temporarily for the establishment of a communication.

Another feature of the invention resides in a system wherein only selective means are required to interconnect any channel in one group with a corresponding channel in a preceding group, information being directly passed from the channel in said one group to said corresponding channel without any modulation or demodulation.

Another feature of the invention resides in a system wherein the channels in each of said groups are arranged to form one multiplex link or several in parallel.

Another feature of the invention resides in a system wherein said channels are provided on said multiplex links on a time division basis.

Another feature of the invention relates to a system comprising a plurality of primary multiplex links each providing a plurality of primary channels and a plurality of secondary multiplex links, each providing a plurality of secondary channels, wherein said substations are arranged in groups served by one or more particular primary and secondary links and in which each primary link gives selective access to the substations of its group via a line selector while each secondary link gives access to said substations via a final selector.

Another feature of the invention relates to a system wherein any primary multiplex link gives selective access to all the secondary multiplex links via a group selector.

Another feature of the invention relates to a system wherein each group of substations makes use of only one primary and one secondary link.

Another feature of the invention relates to a system wherein the identity code of a calling substation within its group is stored in one out of a plurality of line selector memory cases, each of said cases being able to direct said line selector onto said calling station.

Another feature of the invention relates to a system wherein the identity code of the group to which a called substation belongs, is stored in one out of a plurality of group selector memory cases, each of said cases being able to direct said group selector onto a final selector of the wanted group.

Another feature of the invention relates to a system wherein the identity code of the called substation within its group is stored in one out of a plurality of final selector memory cases, each of said cases being able to direct said final selector onto the said called substation.

Another feature of the invention relates to a system wherein the number of line selector and group selector memory cases within one group are equal to the number of channels provided by the primary multiplex link(s) in said group, each primary channel corresponding to one particular line selector memory case and to one particular group selector memory case.

Another feature of the invention relates to a system wherein the number of final selector memory cases within one group is equal to the number of channels provided by the secondary multiplex link(s) of said group, each secondary channel corresponding to one particular final selector memory case as well as to one particular group selector memory case and to one particular line selector memory case.

Another feature of the invention relates to a system wherein each group of substations has access to any out of a number of primary registers into which the group number of the called substation may be registered.

Another feature of the invention relates to a system wherein the identity code of the calling substation within its group is stored in any one of the line selector memory cases provided it is free.

Another feature of the invention relates to a system wherein any line selector memory case corresponding to a group selector memory case wherein the group number of a called substation has been stored, is made artificially busy to prevent storage therein of any number other than that, within its group, of the calling substation responsible for storing a group number in the engaged group selector memory case.

Another feature of the invention relates to a system wherein the channel corresponding to an engaged line selector memory case wherein an identity code is stored, is used to transmit the group number of the called substation from the calling substation and via a corresponding line selector controlled by said engaged line selector memory case to a free primary register.

Another feature of the invention relates to a system wherein the identity of said group number is stored into any one of the free group selector memory cases in the group of the calling substation, provided it corresponds to a primary channel free in the group of the calling substation and to a secondary channel free in the group of the called substation.

Another feature of the invention relates to a system wherein the identity of said group number is stored in any one of the free group selector memory cases in the group of the calling substation provided it corresponds to the primary channel engaged and used for transmitting the group number of the called substation to said primary register, and to a secondary channel free in the group of the called substation.

Another feature of the invention relates to a system wherein the secondary multiplex link(s) of each group have access to any out of a number of secondary registers in which the number of the called substation within its group can be registered.

Another feature of the invention relates to a system wherein the channels both on the primary link(s) of the calling substation, and on the secondary link(s) of the called substation, corresponding to the group selector memory case in which the group number of the called substation has been stored, are used in series to transmit the identity of the number of the called substation within its group through the corresponding group selector to a free secondary register.

Another feature of the invention relates to a system wherein the identity of the number of said called substation within its group is stored in the final selector memory case corresponding to said channel used both on the primary link(s) of the calling substation and on the secondary link(s) of the called substation.

It should be understood that the above mentioned objects and characteristics of the invention as stated, are not the only ones and that many other objects and features of the invention will become apparent and be discussed in the following description which is made in connection with the appended drawings which represent:

Fig. 1, a general schematic of a junction diagram of the system;

Figs. 2, 3, 4 and 5, a block diagram of the system showing in schematic form, the essential means of the system permitting the establishment of a connection between any two substations. More particularly, Fig. 2 represents the line selector stage of the system;

Fig. 4 represents the final selector stage of the system;

Figs. 6 to 15 represent a general schematic of the system. More particularly,

Fig. 6 represents the various substations and associated substation circuits;

Fig. 7 represents the line selector stage of the system;

Fig. 8 represents the primary link circuit between said line selector stage and the group selector stage;

Fig. 9 represents the primary registers;

Fig. 10 represents the group selector stage;

Fig. 11 represents the multiplying of the various group selector stages;

Fig. 12 represents the secondary link circuit joining the group selector stage to the final selector stage;

Fig. 13 represents the secondary registers;

Fig. 14 represents the final selector stage;

Fig. 15 represents the manner in which Figs. 6 to 14 should be assembled.

Figs. 6 to 15 thus represent the general lay-out of the arrangement and show all the equipment which is necessary for a group of 100 subscriber stations having an average traffic carrying capacity.

Figure 16:
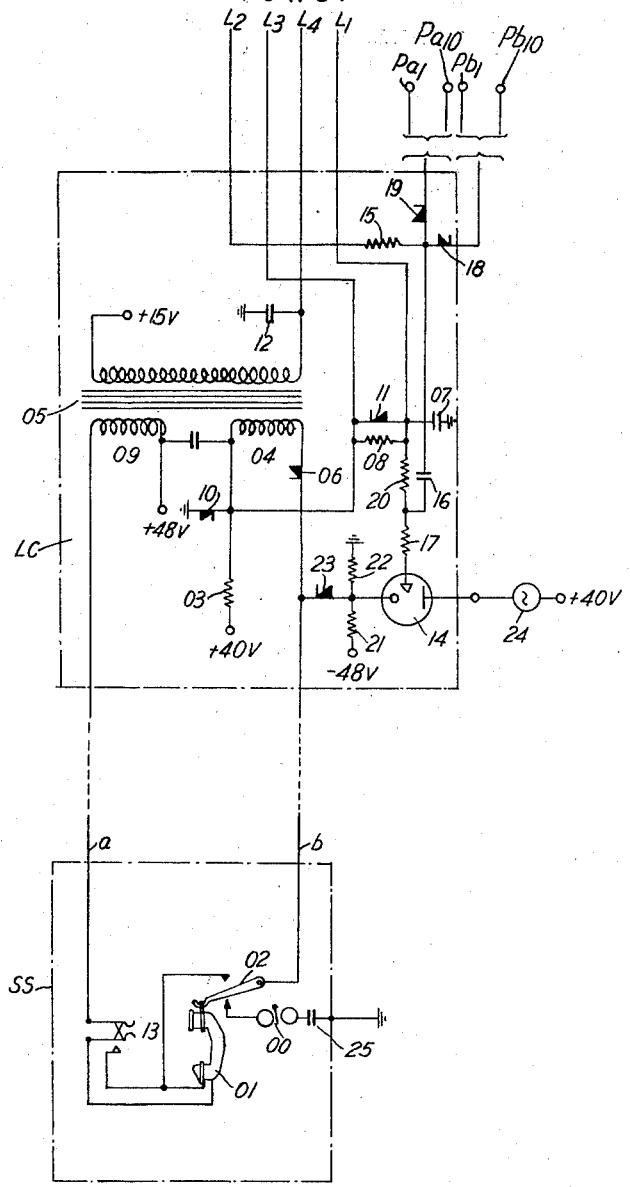
Figure 17:
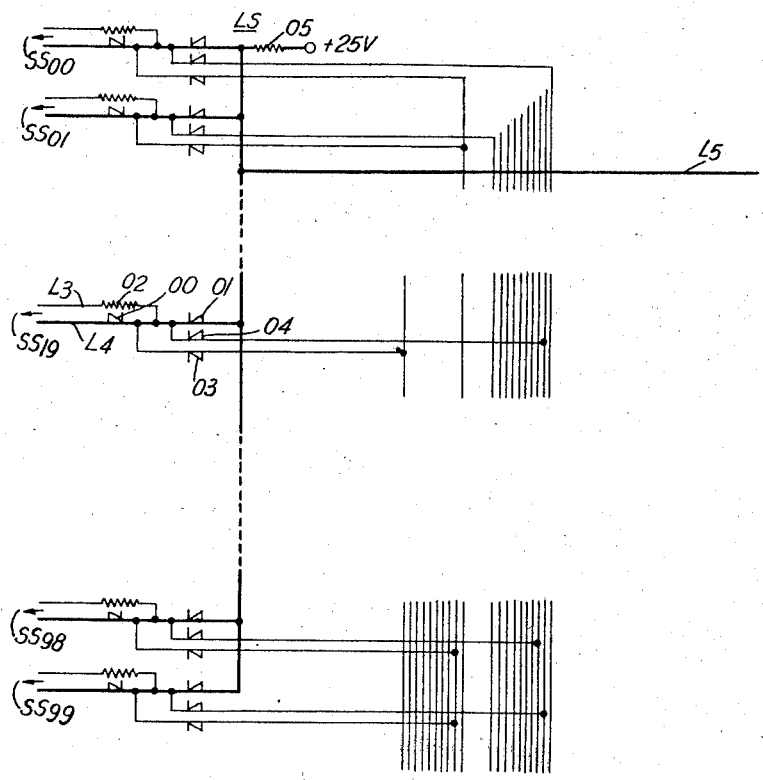
Figure 18:
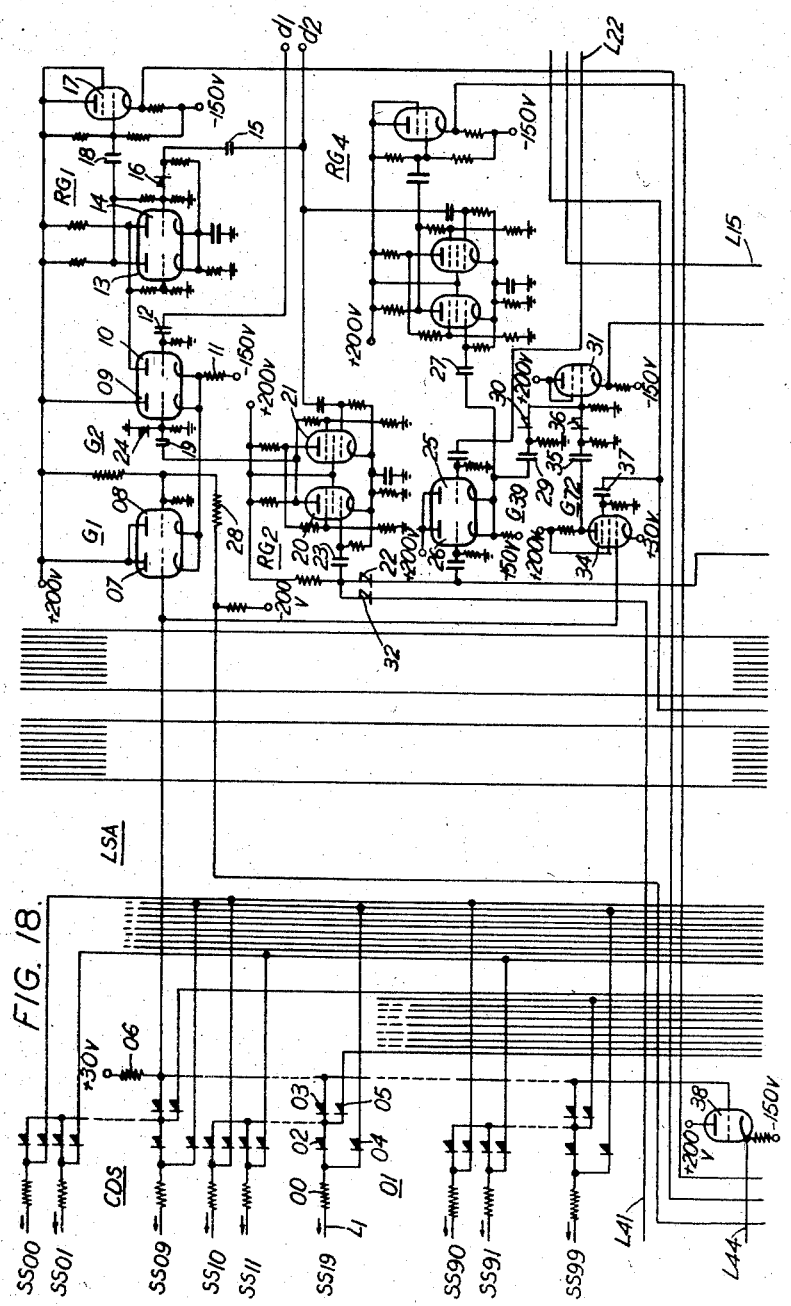
Figure 19:
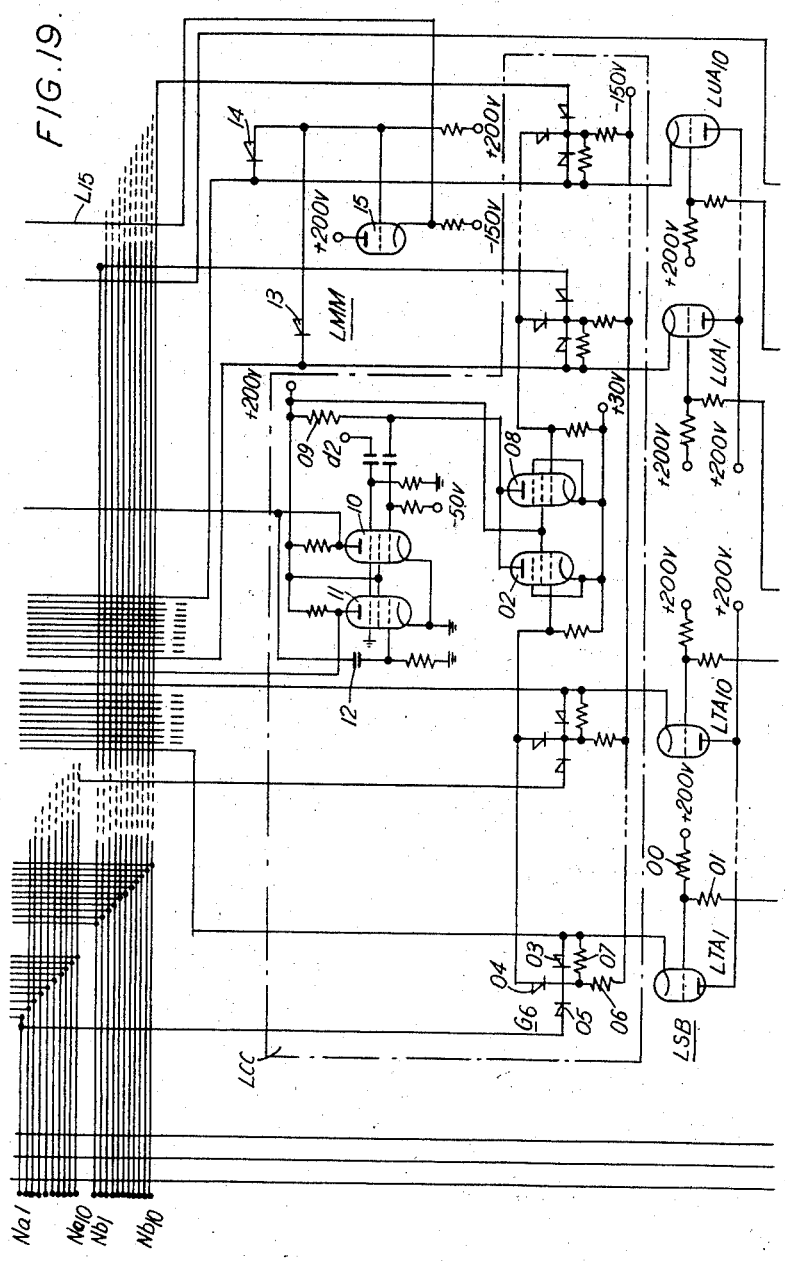
Figure 20:
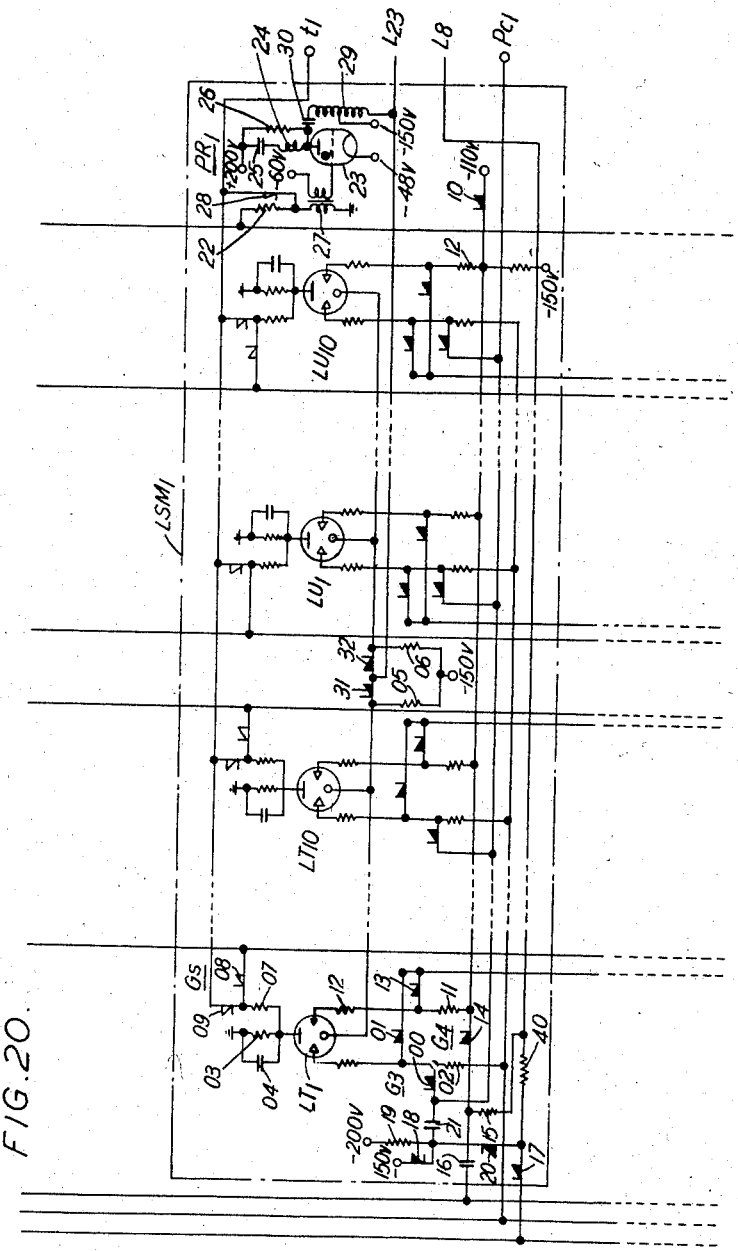
Figure 21:
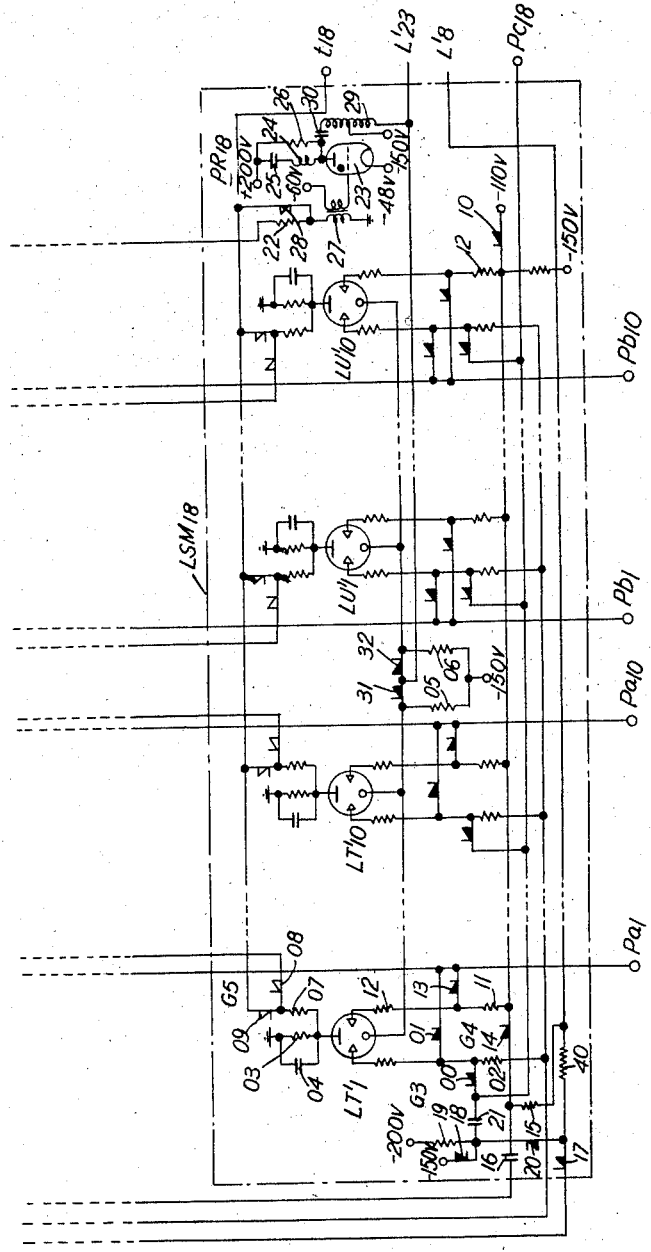
Figure 22:
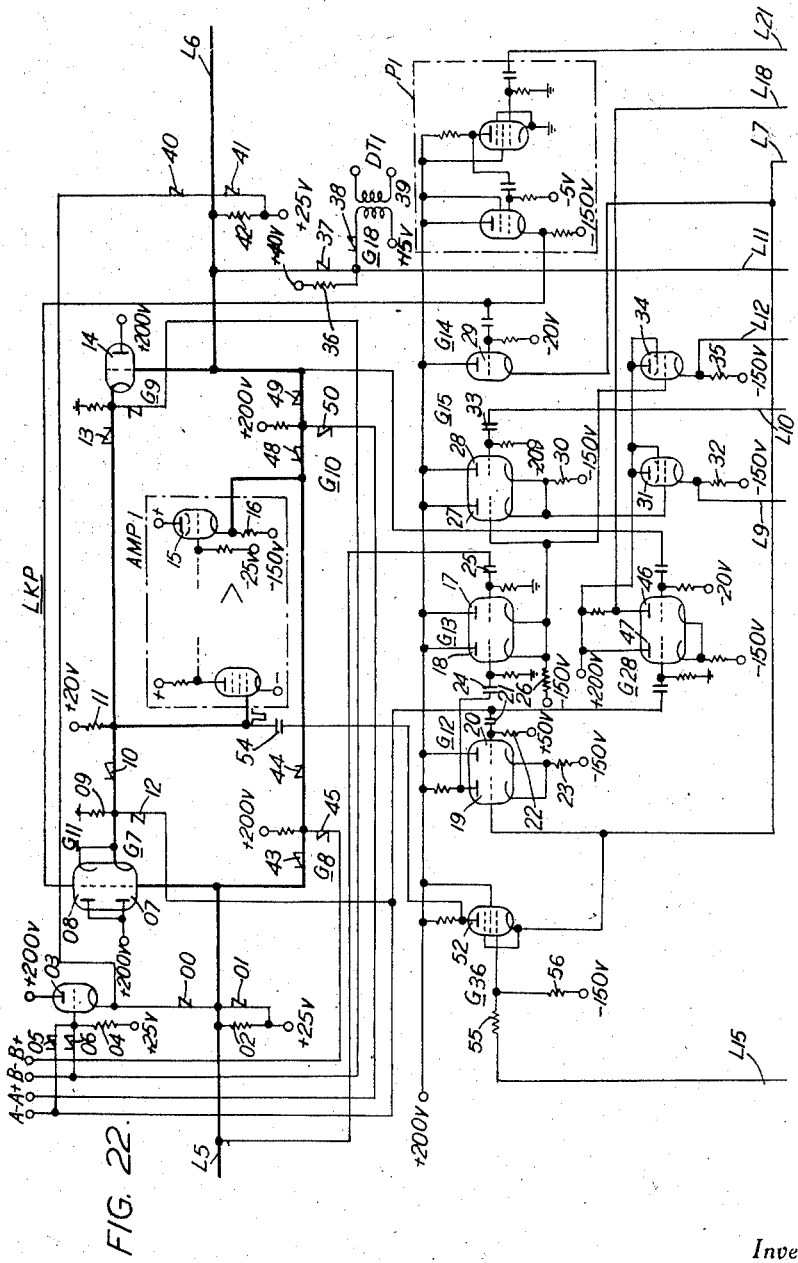
Figure 23:
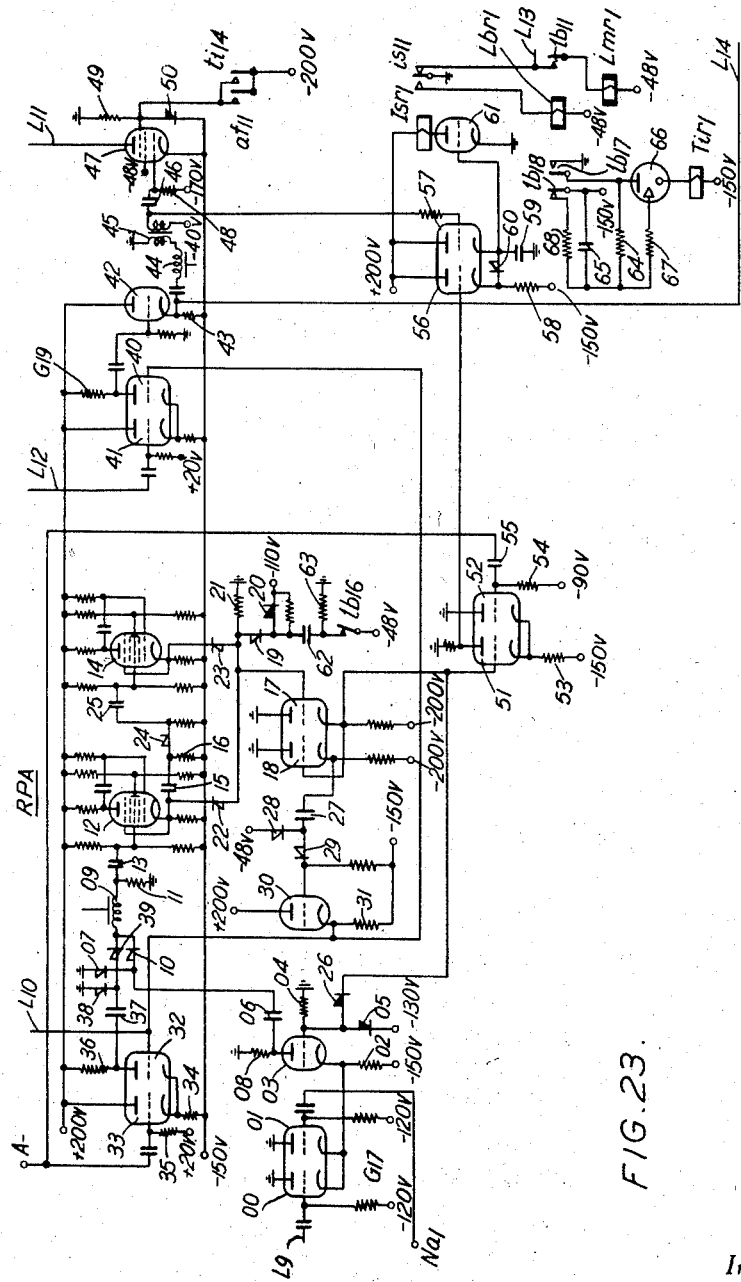
Figure 24:
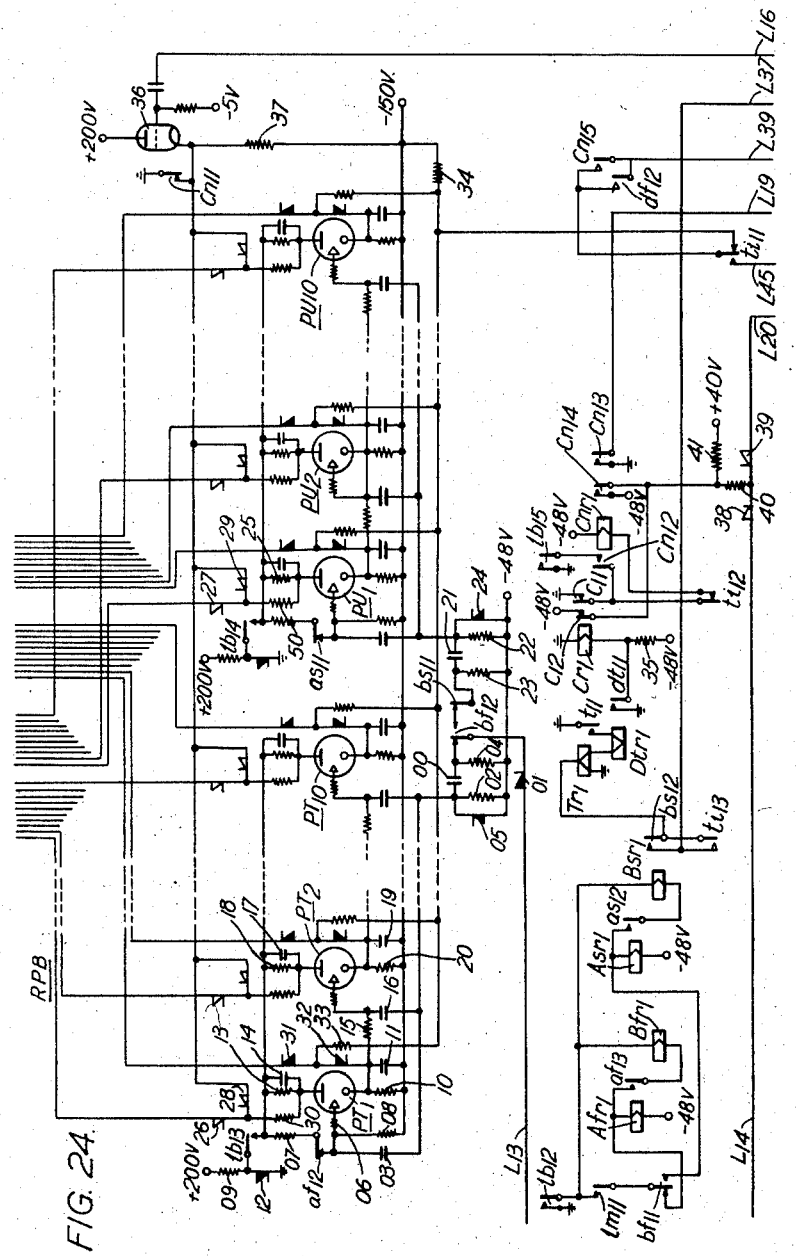
Figure 25:
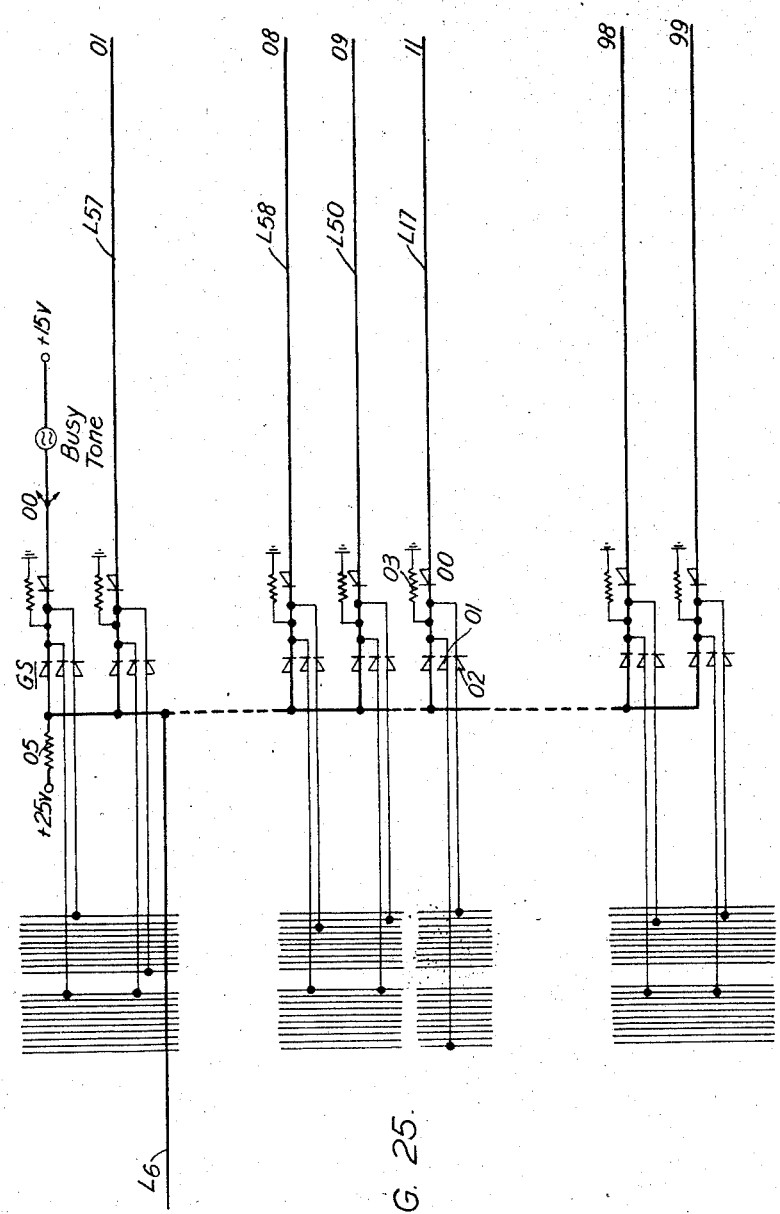
Figure 26:
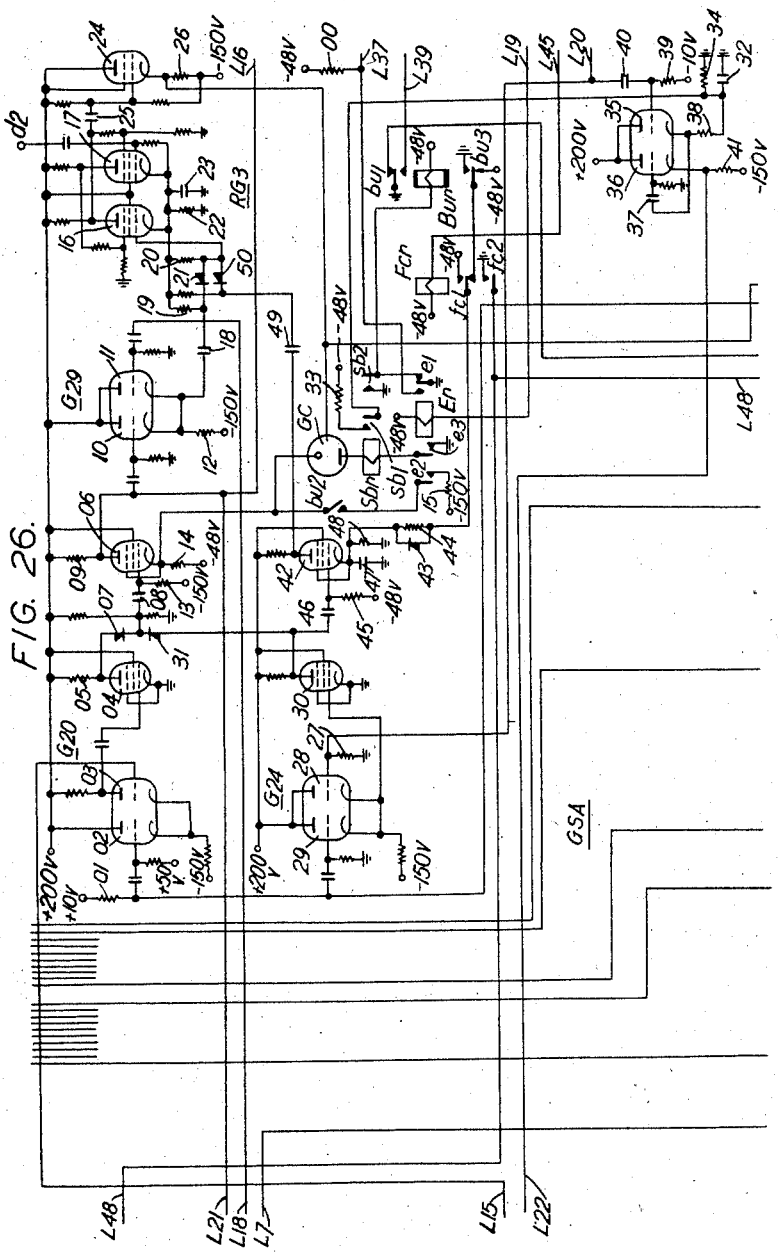
Figure 27:
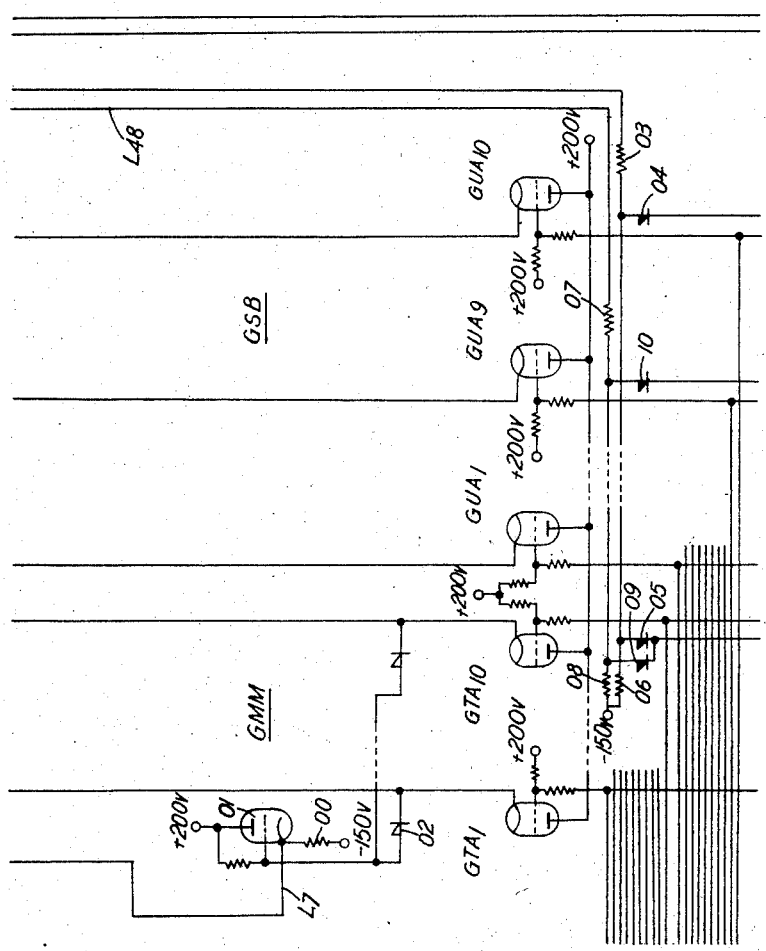
Figure 28:
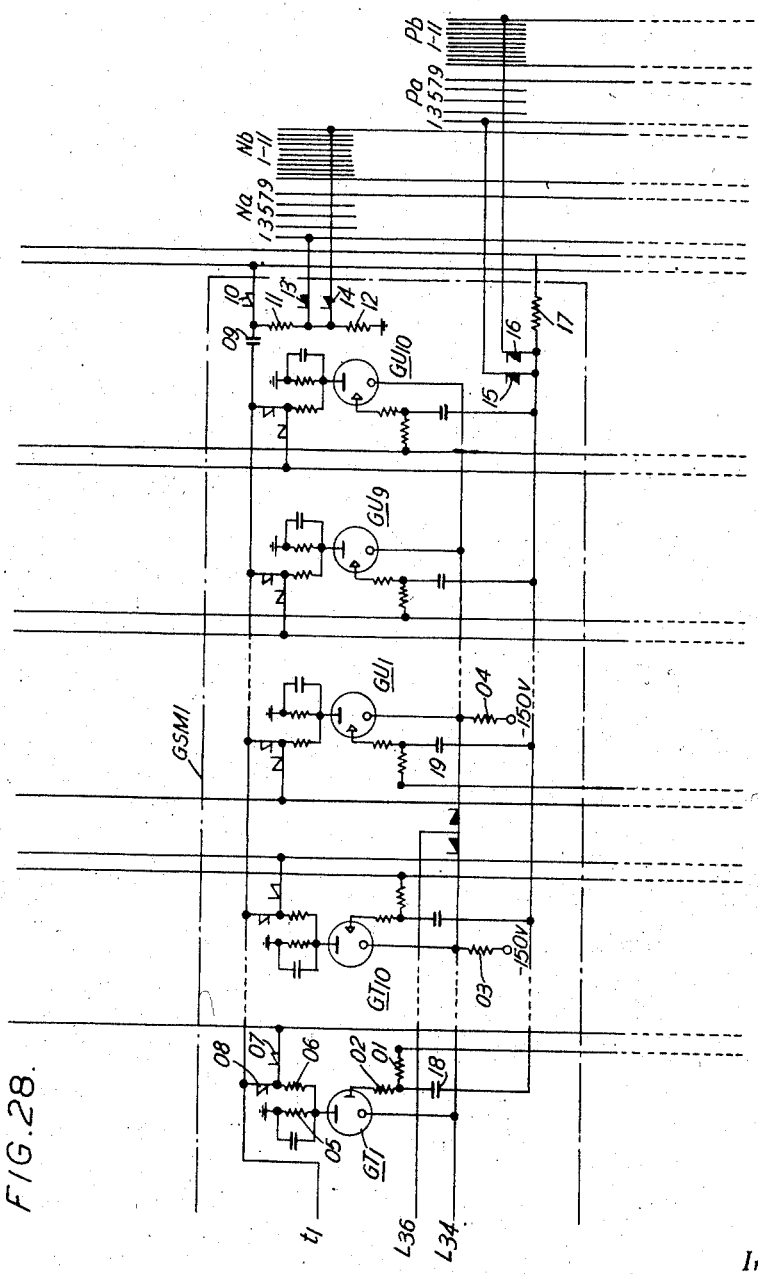
Figure 29:
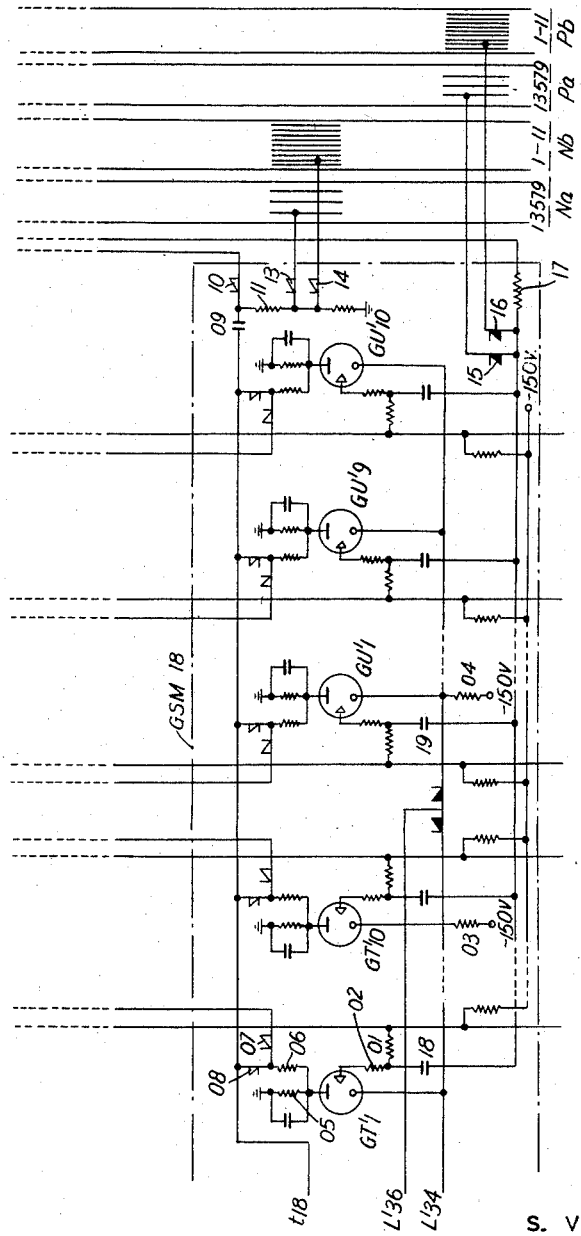
Figure 30:
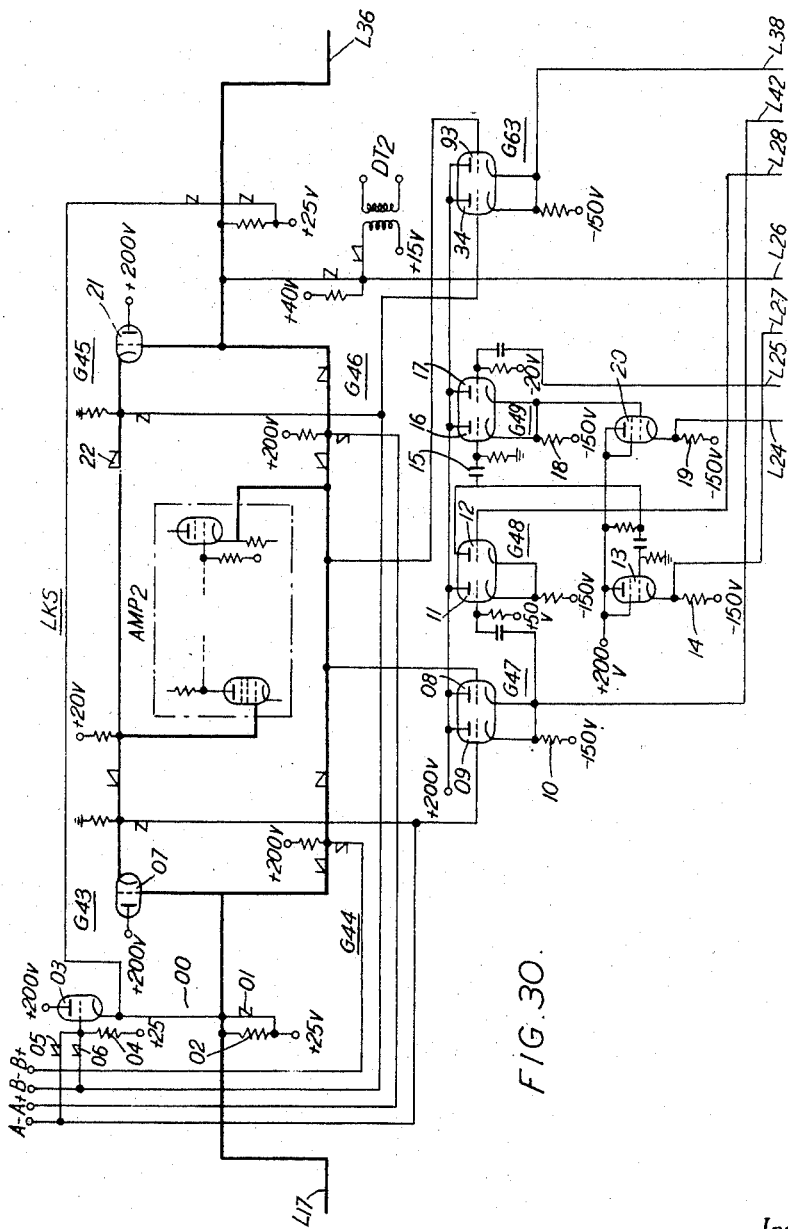
Figure 31:
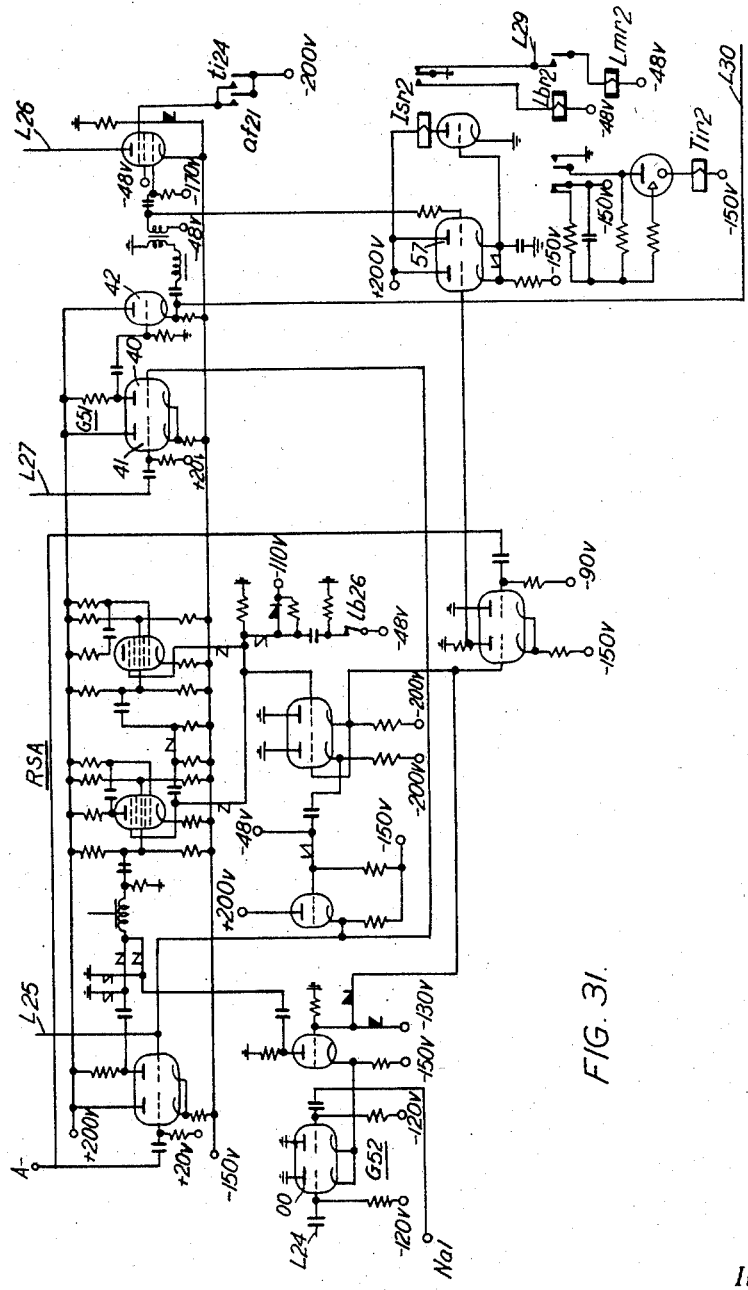
Figure 33:
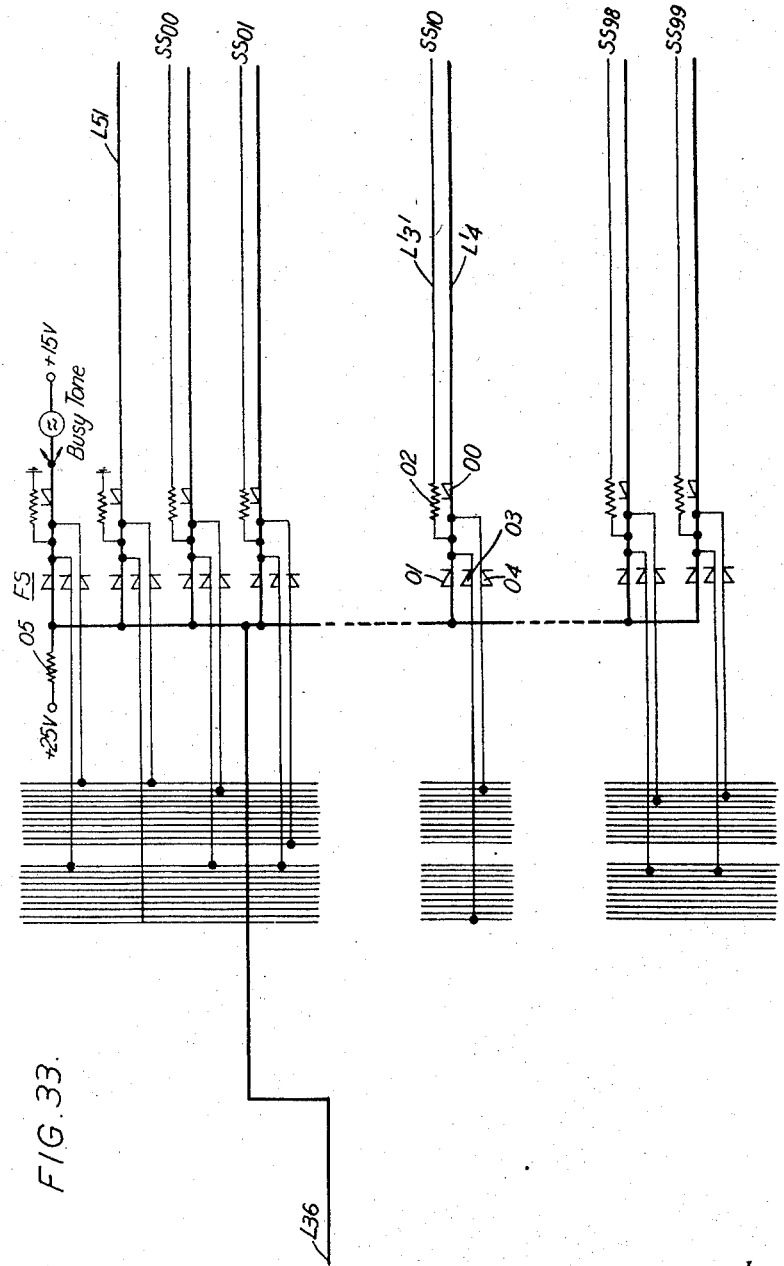
Figure 34:
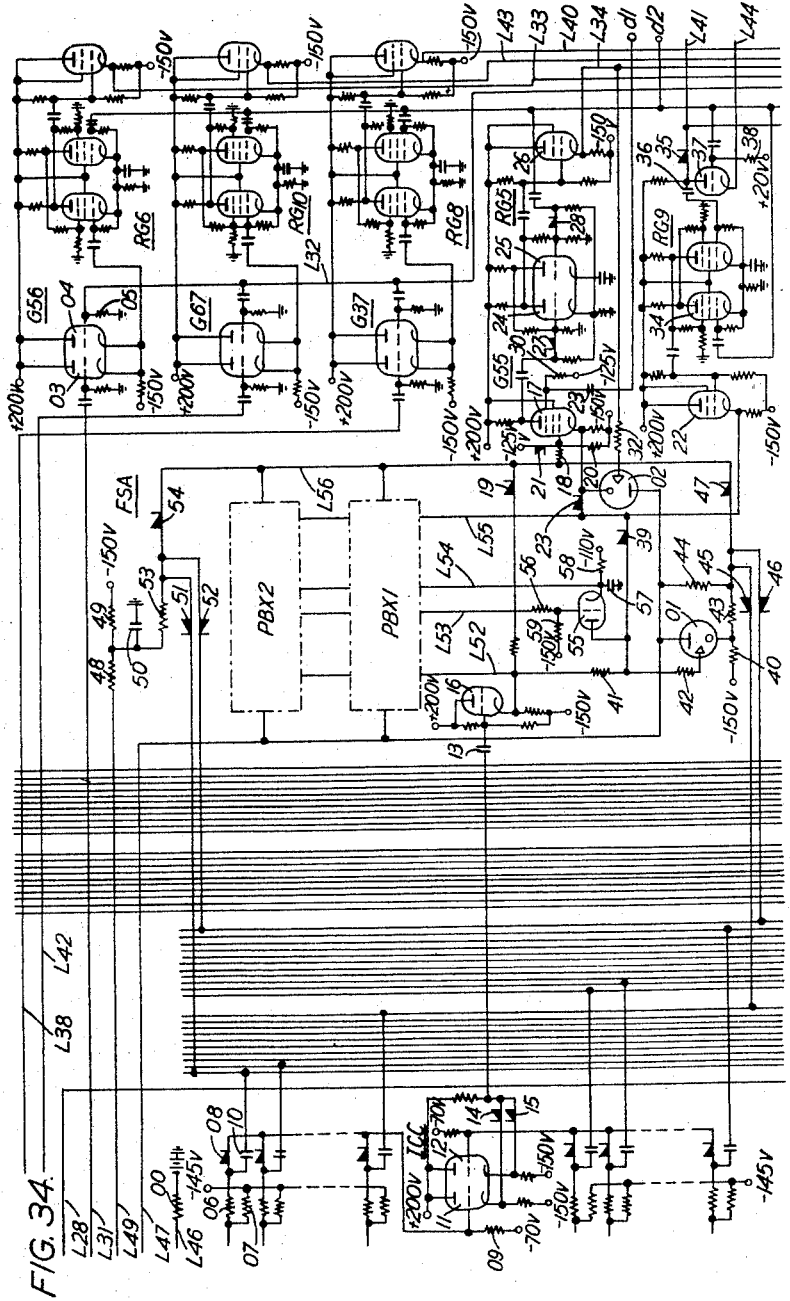
Figure 35:
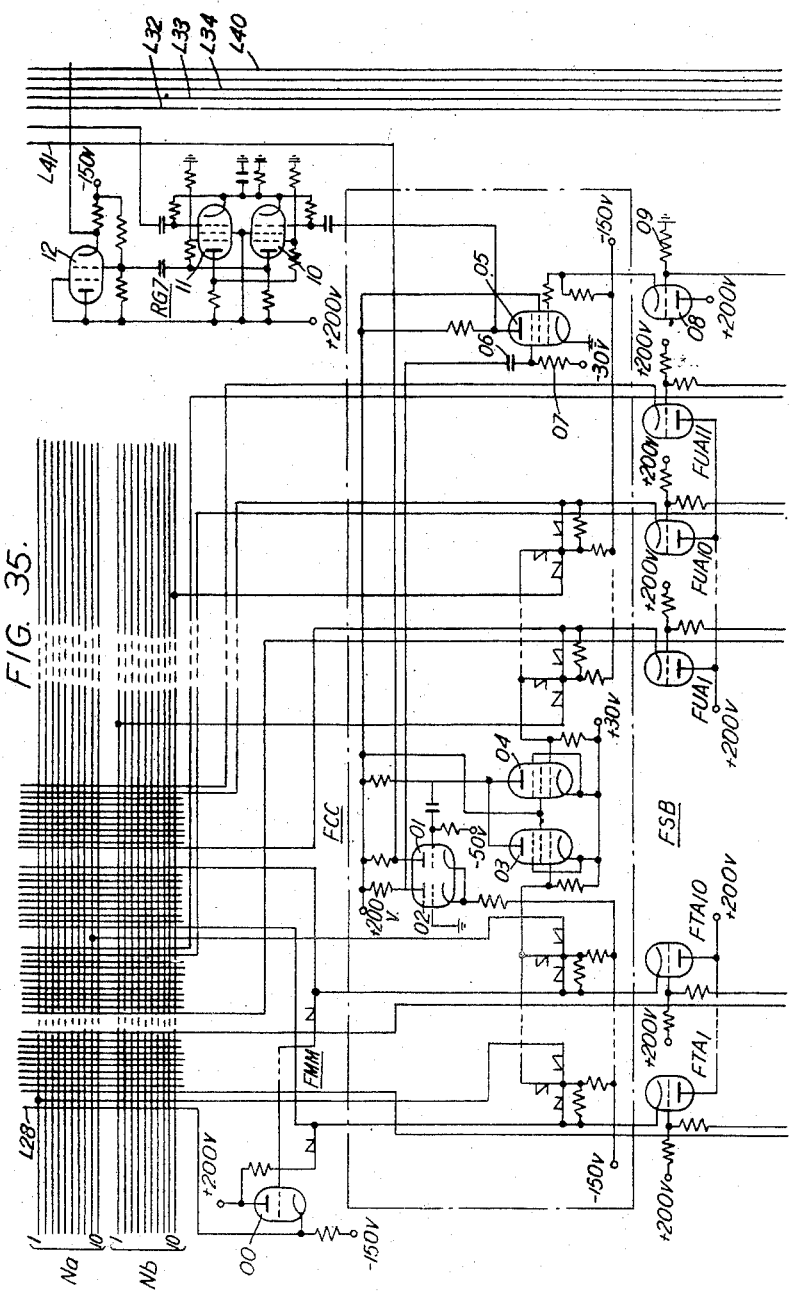

Figs. 16 to 40 represent the various parts of the system which are shown in Figs. 6 to 15 only in the form of block diagrams. More particularly:

Fig. 16 represents a substation together with its line circuit;

Fig. 17 represents a line selector;

Fig. 18 represents a call detecting switch and associated equipment;

Fig. 19 represents a line selector code comparator and associated equipment;

Fig. 20 represents the first line selector memory case;

Fig. 21 represents the last line selector memory case;

Fig. 22 represents the primary link circuit and associated equipment;

Fig. 23 represents a part of a primary register circuit;

Fig. 24 represents the remaining part of the primary register circuit;

Fig. 25 represents a group selector;

Fig. 26 represents the equipment associated with the group selector;

Fig. 27 represents some auxiliary equipment associated with the group selector stage;

Fig. 28 represents the first group selector memory case;

Fig. 29 represents the last group selector memory case;

Fig. 30 represents the secondary link circuit together with associated equipment;

Fig. 31 represents a part of the secondary register which is identical to that part of the primary register shown in Fig. 23;

Figure 32:
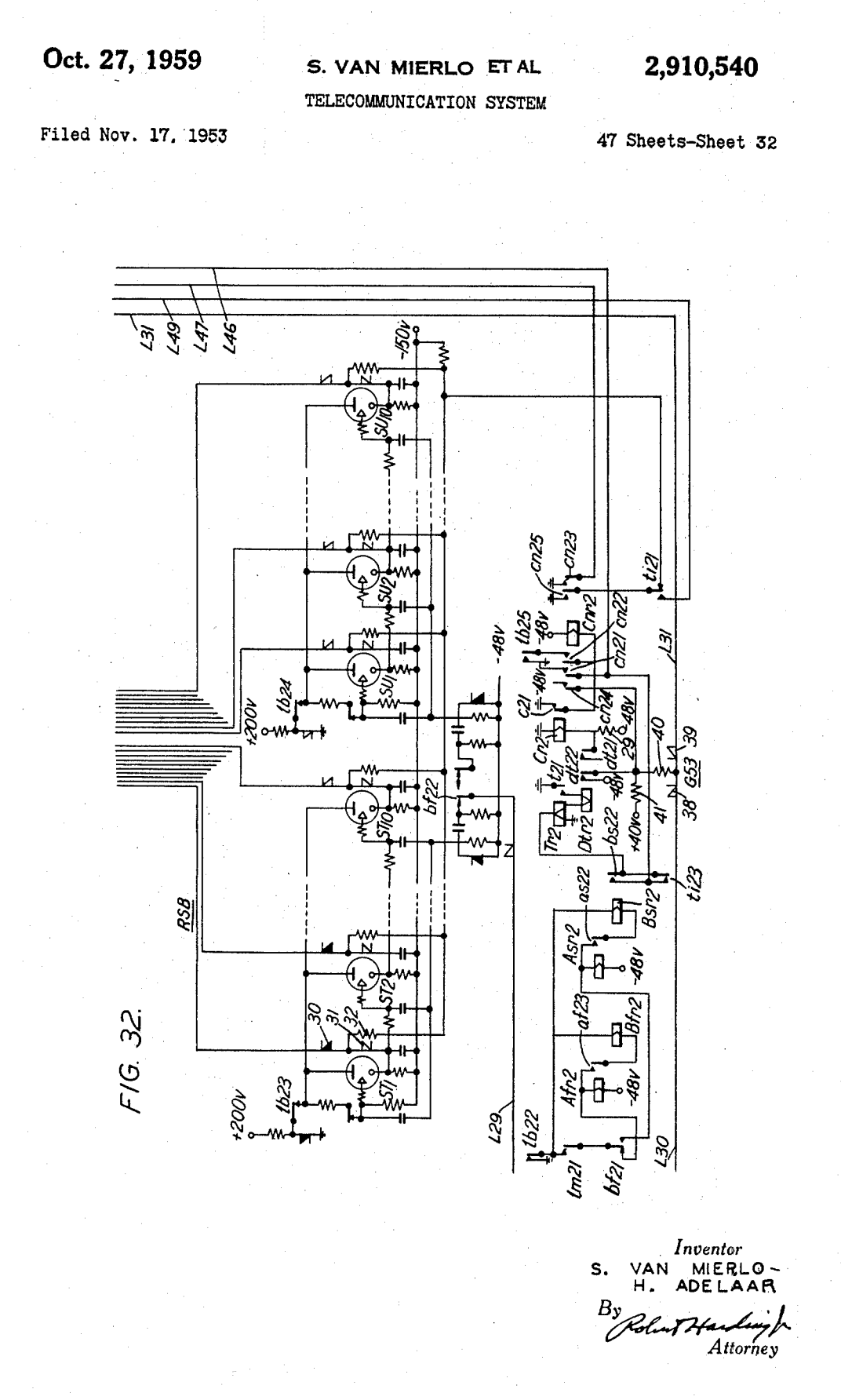

Fig. 32 represents the remaining part of the secondary register;

Fig. 33 represents a final selector;

Fig. 34 represents the equipment associated with the final selector;

Fig. 35 represents the final selector code comparator and associated equipment;

Fig. 36 represents the first final selector memory case;

Figure 37:
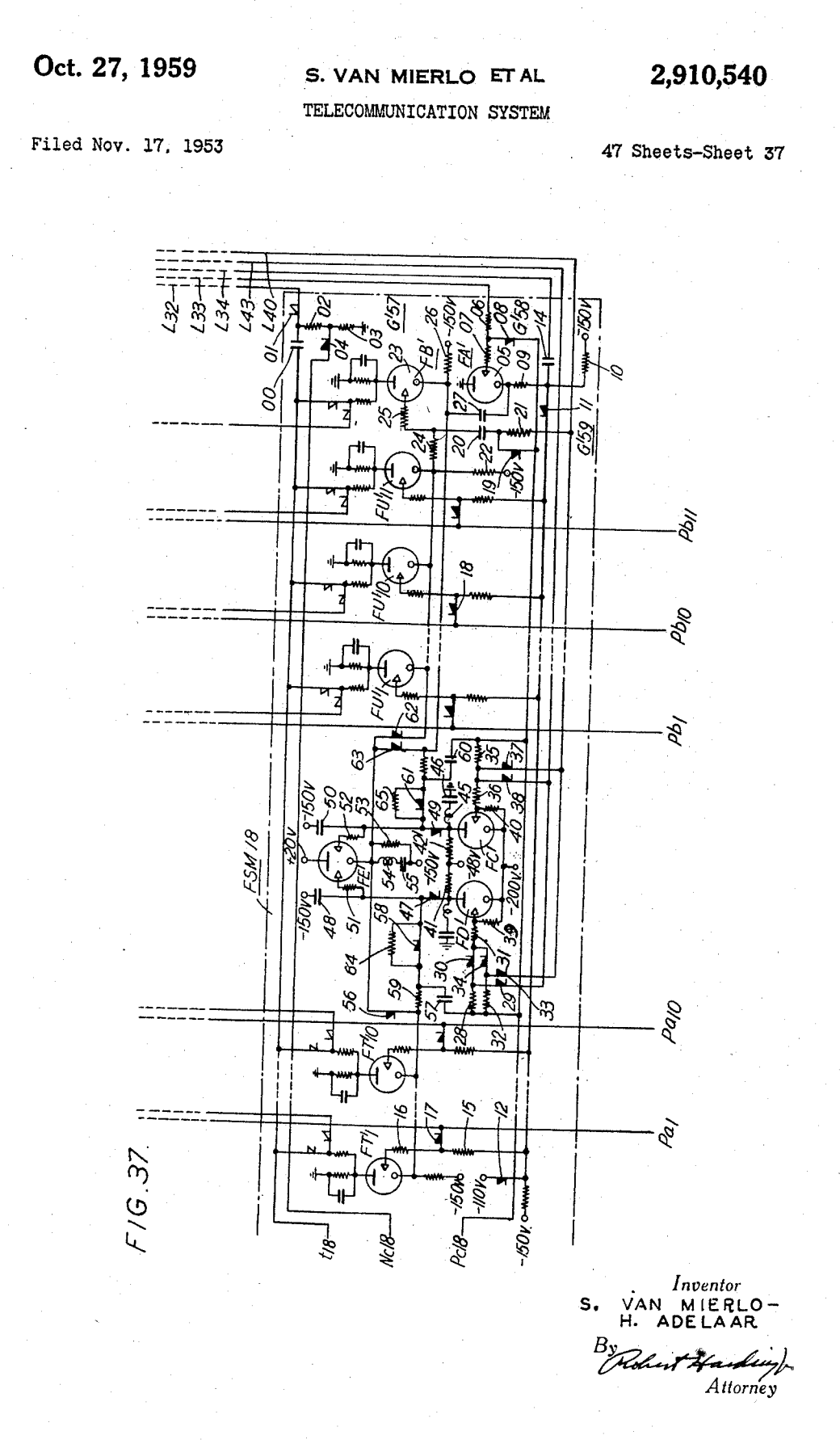

Fig. 37 represents the last final selector memory case;

Fig. 38 represents the equipment for one P.B.X group such as shown in block diagram in Fig. 34;

Fig. 39 represents a link circuit leading to an operator's position;

Fig. 40 represents the equipment at the operator's position.

The manner in which Figs. 16 to 40 should be assembled and/or read, will be apparent from Figs. 6 to 15.

Figure 43:
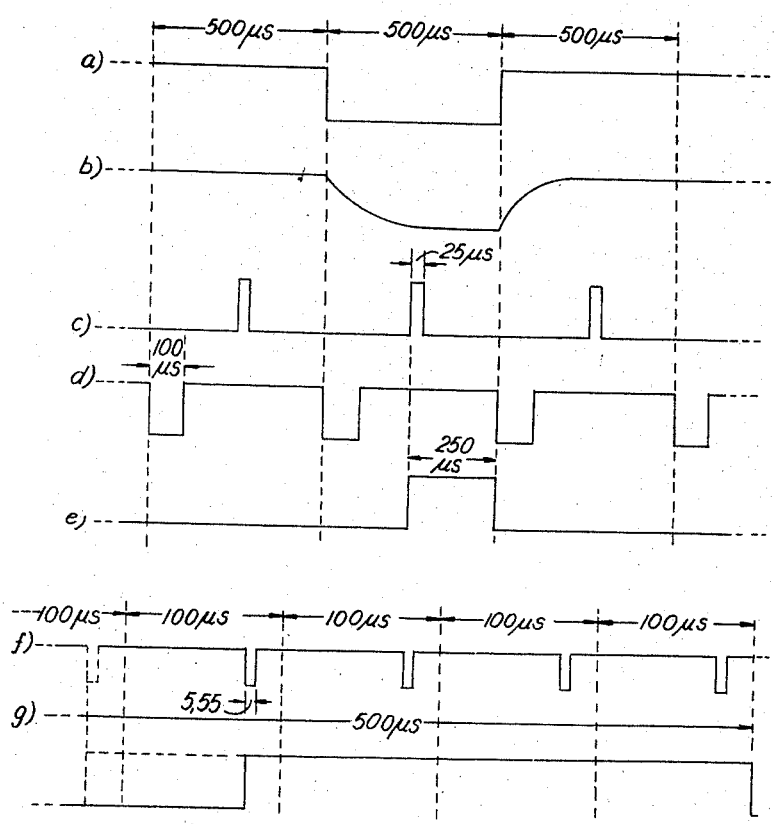
Figure 44:
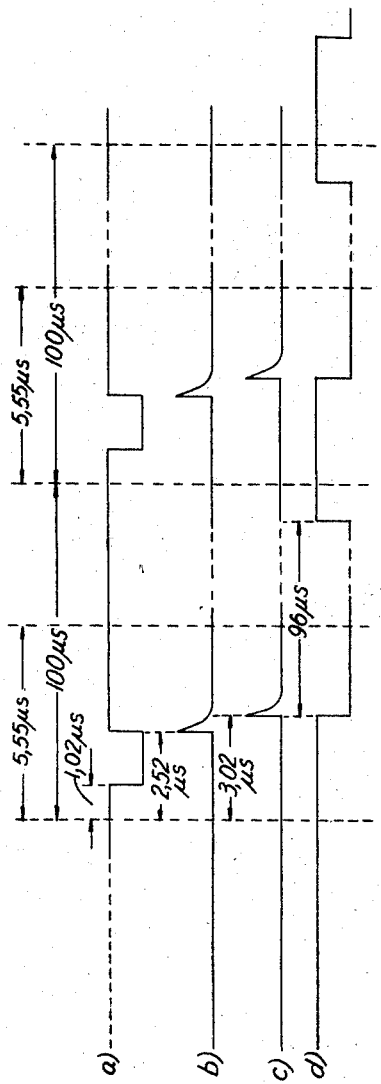
Figure 45:
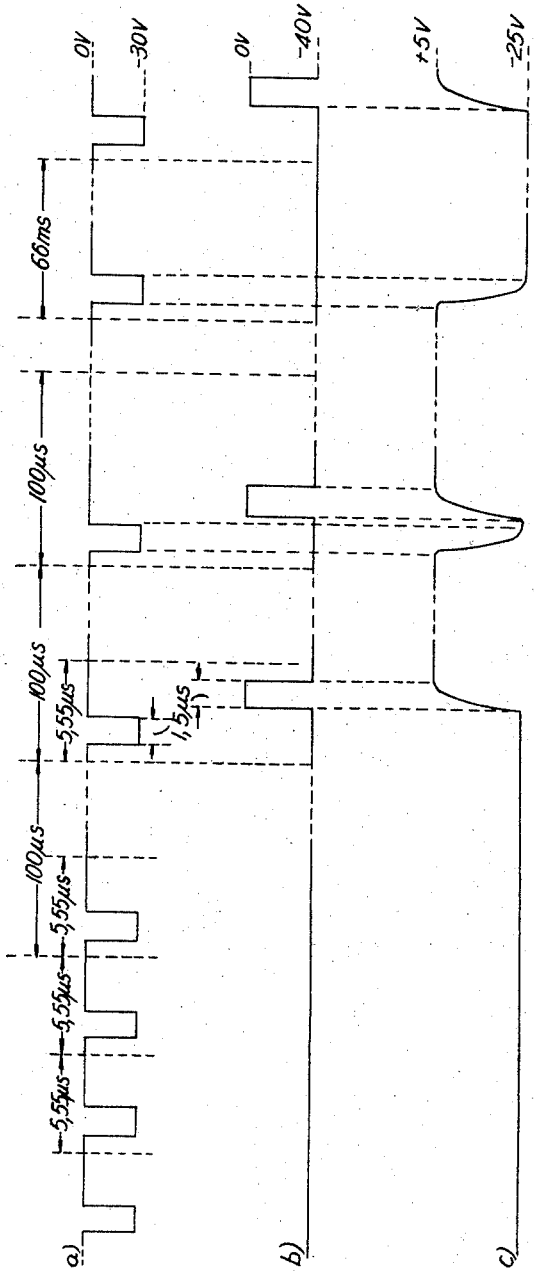

The remaining Figs. 41 to 48 constitute explanatory diagrams. More particularly, Fig. 41 represents pulse wave forms used for call detecting and other purposes;

Fig. 42 represents pulse wave forms used for defining the time channels on the multiplex links;

Fig. 43 represents other pulse wave forms used to explain call detecting operations;

Fig. 44 represents pulse wave forms appearing in the registers;

Fig. 45 represents other pulse wave forms appearing in the registers, more particularly in connection with dialling;

Fig. 46 constitutes an explanatory table in relation to the seizure of a free time channel;

Fig. 47 represents pulse wave forms used to explain the release of a memory case;

Fig. 48 represents wave forms used to explain the ringing operation.

Figure 1:
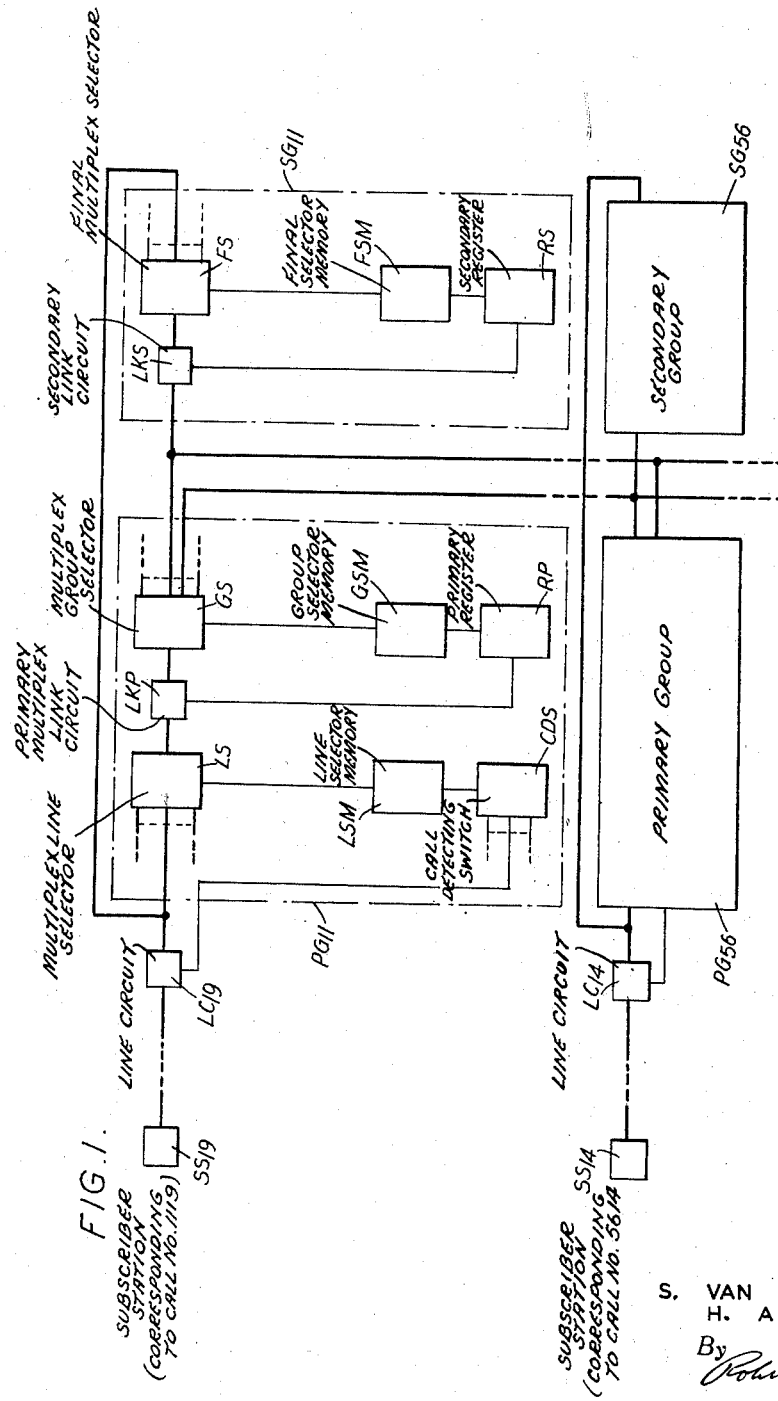

Before considering the system diagrammatically represented in Fig. 1, it is appropriate to briefly recall the principles of time division multiplex systems and pulse amplitude modulation systems. In time division multiplex systems, the voice frequency signals present on different voice frequency circuits are analyzed by a scanning arrangement which corresponds essentially to a fast "rotating" switch whereby pulses corresponding to the instantaneous amplitudes of the different voice frequency signals, are mixed on a single link which is called the multiplex link. When extracting samples of a voice frequency signal at regular intervals, the resulting series of pulses show a frequency spectrum composed of the original signal together with a plurality of side bands having a width corresponding to the voice frequency signal and which appear on each harmonic of the frequency at which the sampling is made. If it is desired to recuperate the original voice frequency signal, the lower side band on the fundamental must not overlap with the voice frequency band and in that case, by means of a filter, such recuperation can be performed. For example, if, in accordance with current telephone practice, the maximum voice frequency is 3400 c./s., it is necessary that this frequency should not be higher than the lowest frequency contained in the lower side band on the fundamental sampling frequency. Hence, the latter must be at least twice the maximum voice frequency and in this description it will be assumed that it is fixed at 10 kc./s. whereby V.F. signals can be recuperated by demodulating the amplitude modulated pulses having a recurrence frequency of 10 kc./s., by means of a simple low pass filter having a pass band from 0–3400 c./s., and producing sufficient attenuation above a frequency of $10{,}000 - 3400 = 6600$ c./s. Then, a relatively simple filter can be used.

While the repetition of the pulses is conditioned by the maximum voice frequency to be transmitted, the width of these pulses is conditioned by the number of time channels which can be accommodated on a multiplex link. As we have assumed that the recurrence frequency is 10 kc./s., 100 microseconds are available for sharing between the various channels. Assuming further that 18 channels are necessary on one multiplex link, particular recurrent intervals of 5.55 microseconds will be allotted to each particular channel, during which pulses can flow in either direction between the calling and the called substation. Henceforth, these channels will be called time channels.

Although time channels can be specifically allotted to each substation, suitable delay means being interposed to permit the pulses from one substation to reach another substation, allotting a time channel to a conversation has also been used.

The system of Fig. 1 operates in accordance with this latter principle.

In this figure, a 10,000 line exchange is assumed in which the substations are divided into 100 groups of 100 stations and two such groups are diagrammatically represented, only the first of these groups being detailed to some extent. As can be seen, each group, such as group No. 11, which serves the substations numbered from No. 1100 to No. 1199, comprises a primary group $PG_{11}$ linked to a secondary group $SG_{11}$ solely through a single multiplex speech connection which is indicated by a thicker line. The primary group such as $PG_{11}$ comprises a multiplex line selector LS which can obtain access to any calling substation, and a multiplex group selector GS which can obtain access to any of the 100 secondary groups such as $SG_{11}$. The line selector LS is connected to the group selector GS via the primary multiplex link circuit LKP which comprises amplifying means, and which is in essence analogous to a group of the well known "cord circuits" of conventional electro-mechanical telephone systems. Both the line selector LS and the group selector GS are selectors which can be successively positioned on any set of desired outlets for a very short interval of time for each desired outlet and this repeatedly at a high recurrence frequency. Hence, such a selector should be of the electronic type and comprises for example a plurality of gates.

The secondary groups such as $SG_{11}$ comprise a final multiplex selector FS which may be of the same type as the line selector and group selector included in the primary groups, and to which a group selector GS in any of the primary groups has access via the secondary link circuit LKS. This secondary link circuit LKS is also used in multiplex fashion and will generally comprise amplifying means. Just as for the line selector LS, the final selector FS has access to all the 100 substations of its group and can thus obtain a connection to any called line of this group.

Assuming it is desired to establish a communication between substation No. 1119, i.e. $SS_{19}$ in group No. 11, and substation No. 5614, i.e. $SS_{14}$ in group No. 56, the origination of a call at substation $SS_{19}$ will produce an electrical change in the corresponding line circuit $LC_{19}$ which will induce, as will be described later, the line selector LS in the primary group $PG_{11}$ to position itself every 100 microseconds for a duration of 5.55 microseconds on the voice frequency speech conductor(s) leading to substation $SS_{19}$. Similarly, by means to be later described and after having received from substation $SS_{19}$ the information as to the number of the wanted substation, i.e. No. 5614, the group selector GS in the primary group $PG_{11}$ will position itself during exactly the same intervals of 5.55 microseconds on the multiplex speech conductor leading to the secondary group $SG_{56}$ which, together with the primary group $PG_{56}$ has not been shown in any detail since they are respectively identical to the secondary and primary groups $SG_{11}$ and $PG_{11}$.

During these same intervals of 5.55 microseconds which recur every 100 microseconds, the final selector FS in the wanted secondary group $SG_{56}$ will be positioned on the voice frequency speech conductor leading to the substation $SS_{14}$ via its line circuit $LC_{14}$, this as a result of the information supplied by the calling substation. If this is achieved, it is seen that the pulses travelling on the primary link LKP of the calling substation are allowed to flow uninterruptedly on the secondary link LKS of the called substation.

Otherwise, adequate equipment would have to be provided in order to permit the amplitude modulated pulses appearing on a primary link in a particular time channel, to be transferred onto a different time channel in a secondary link.

When considering the method which has been described, one realizes that if any available time channel out of the 18 is picked up in the primary link to which a calling substation has access, it will be a matter of chance that the corresponding time chanel in the secondary link of the wanted station is free at that moment. Hence, since the number of channels available on each link is calculated in function of the traffic flowing through said link, it seems quite likely that there will be an appreciable increase in the probability of a call being lost, since this will happen not only when all the time channels in the primary link of the calling substation are already engaged, or when all the time channels in the secondary link of the wanted substation are unavailable, or when they are not available in both, but also, when the time channel in the secondary link of the wanted substation and corresponding to the time channel successfully seized in the primary link of the calling substation is not available.

A considerable improvement is brought about by selecting a time channel, either on the primary link of the calling substation or on the secondary link of the called substation, to which corresponds a free time channel in the secondary link of the called substation or in the primary link of the calling substation.

This will be better shown by means of an example and it will be assumed that substation $SS_{19}$ in group No. 11 wishes to call substation $SS_{14}$ in group No. 56. As soon as substation $SS_{19}$ originates a call, an electrical signal will appear in the line circuit $LC_{19}$ of this substation to indicate the calling condition. This signal is applied to a conductor leading to the "arc" of a call detecting switch CDS in the primary group $PG_{11}$. This call detecting switch is also analogous to a fast "rotating" switch and hence of the electronic type, but instead of being positioned during a particular interval of 5.55 microseconds on an outlet, in order to pass pulses to or from that outlet, it scans its outlets continuously in order to be able to detect a new call within a very short period of time after it has been originated, and which period is determined by the time during which a complete scanning of all the outlets is made. It will be assumed that the call detecting switch CDS makes a complete scanning of the 100 outlets leading to the different line circuits, in a cycle of 55 milliseconds and that the switch provides a through connection successively to each outlet during 500 microseconds. It will be observed that this leaves 5 milliseconds during which the call detecting switch CDS does not provide access to one of the outlets, but this will be explained later.

A signal which is in the form of a pulse, will therefore be transmitted through the call detecting switch CDS during the particular time interval of 500 microseconds in which the call detecting switch CDS provides access to the line circuit $LC_{19}$. This pulse will be offered to the line selector memory. This is an arrangement capable of recording the number of several calling stations within a group of 100 lines. Obviously, if 18 channels are to be provided on the multiplex link LKP of any primary group such as $PG_{11}$, there can only be a maximum of 18 calling substations which can be simultaneously catered with. Hence, the line selector memory LSM is provided with 18 compartments which will hereafter be termed memory cases, each of which is capable of registering the last two digits of a calling substation's number.

The pulse of 500 microseconds which is offered to the line selector memory LSM every 55 milliseconds, will be offered in very rapid succession as will be explained in the general description, to the various line selector memory cases and it will be recorded in the first line selector memory case which is found free and from that moment it will no longer be offered to the remaining free line selector memory cases. The manner in which the 500 microseconds pulses having a characteristic time position within a cycle of 55 milliseconds, is permanently recorded in a line selector memory case will be explained later. For the present explanation it is sufficient to note that such a recording takes place and that, in accordance with the particular line selector memory case in which the recording has been inscribed, the line selector LS will be set on the calling substation $SS_{19}$ during characteristic intervals of 5.55 microseconds, repeated regularly with a recurrence period of 100 microseconds, corresponding to the engaged line selector memory case. Hence, a time channel is now seized.

Merely as a result of the regularly repeated switching through, which occurs between the line circuit $LC_{19}$ and the primary link circuit LKP, it can be arranged that pulses will appear on the primary link circuit LKP within the time channel which has now been assigned to the calling substation $SS_{19}$. These pulses can be directed to the primary register circuit RP in the primary group $PG_{11}$ and can be modulated by the dial impulses. Hence, through the channel selected on the primary link, it is possible to send information as to the wanted substation. This will be recorded in the primary register RP and, in fact, only the first two digits sent from the calling substation $SS_{19}$ need be recorded. They constitute the group number, i.e. 56, of the wanted substation No. 5614.

When the group number of the wanted substation is recorded in the primary register RP, by means to be explained later, it is determined whether there is a free channel in the secondary link of the wanted substation, i.e. in the secondary group $SG_{56}$, corresponding to a free channel on the primary link circuit LKP.

If at least one channel can be found which is free in both groups, the group number registered in the primary register RP will also be recorded in the group selector memory GSM which performs a function similar to the line selector memory LSM, but this time with respect to the group selector GS. Further, this group number will be recorded in the group selector memory case which corresponds to the channel having been found free on both the secondary link of the wanted substation and on the primary link of the calling substation.

Means are also provided to seize the time channel which has already been engaged on the primary link by the substation $SS_{19}$, if the corresponding channel in the secondary group $SG_{56}$ happens to be free at that moment. This should, however, be considered as a special case and, in general, as will become apparent from a later part of the description, the probability will be that a new channel will be selected. In this case, the number of the calling substation $SS_{19}$ within its group will be recorded also in the line selector memory case corresponding to the newly selected channel, whereafter the previous recording in the line selector memory case corresponding to the channel originally seized, can be erased.

From that moment, during the time intervals of 5.55 microseconds characterizing the newly selected channel, the line selector LS will be positioned on the calling substation $SS_{19}$ while simultaneously the group selector GS will be positioned on the secondary link of the group of substations to which the wanted station belongs, i.e. $SG_{56}$, in response to the control effected by the line selector memory case and the group selector memory case in which the number of the calling substation and the number of the wanted group have respectively been recorded.

Via the secondary link circuit LKS in the secondary group $SG_{56}$, pulses are therefore able to flow to the secondary register RS in said secondary group and these pulses can be modulated by the further dial impulses characterizing the number of the called substation within its group, i.e. No. 14. From these dial modulated pulses, a recording of the number of the called substation can take place in the secondary register RS and said number will then be inscribed in the final selector memory FSM which performs a similar control to that effected by the line selector memory LSM and the group selector memory GSM, but this time with respect to the final selector FS. Care will be taken that the number of the called substation within its group is inscribed in the final selector memory case which corresponds to the time channel free in both groups. As soon as recording has taken place in that final selector memory case, and during the time channel seized, the final selector FS in the secondary group $SG_{56}$, will be set onto the wanted substation $SS_{14}$ and communication can take place between substations $SS_{19}$ and $SS_{14}$.

Some consideration will now be given to the grade of service which a system following the outline given above can provide.

From Erlang's theory it is known that the probability to find M channels busy out of a total number of N channels is given by:

$$P_M = \frac{A^M}{M! F_N(A)} \quad (1)$$

where $F_N(A)$ is a function of the total number of channels which is provided and also of the traffic A in Erlangs. As well known, $F_N(A)$ is given by $$F_N(A) = \sum_{x=0}^{N} \frac{A^x}{x!} \quad (2)$$

Therefore, if one considers a group of N channels permitting a maximum number N of communications between calling and called substations, the probability that an originating call will be lost due to congestion is simply given by:

$$P_N = \frac{A^N}{N! F_N(A)} \quad (3)$$

replacing M by N in Equation 1. For a traffic of 6.7 Erlangs, the probability of a call being lost due to congestion will be given by $P_N = 0.001$ for $N = 16$. This grade of service is, however, strictly the one corresponding to a system wherein only a single channel need be used for communication between the calling and the called substation.

Assuming that communication between two substations has to be established via two channels in series, just as in the case of the system shown in Fig. 1, but in which said communication between two substations can be achieved via any channel out of the primary group in series with any channel of the secondary group, the probability that a call will be lost due to congestion will be given by $$P_N(2 - P_N) \simeq 2 P_N \quad (4)$$

i.e. approximately twice the probability of loss when communications are established through a single channel only since $P_N$ is small with respect to unity.

In the case of a system in accordance with Fig. 1, where a call can also be lost, not only because there are no longer any free channels in either the calling primary group or the called secondary group or both, but also because there is no pair of corresponding channels free in the calling primary group and in the called secondary group, the probability of loss P will then be given by:

$$P = \sum_{M_1} \sum_{M_2} P_1 P_{12} P_2 \quad (5)$$

In this equation, $P_1$ represents the probability that $M_1$ channels are busy in the primary group of the called substation, $P_{12}$ represents the probability that all the free channels in the wanted secondary group correspond to busy channels in the calling primary group and $P_2$ the probability that $M_2$ channels are busy in the called secondary group. Therefore, $P_1$, $P_{12}$ and $P_2$ are respectively given by:

$$P_1 = \frac{A^{M_1}}{M_1! F_N(A)} \quad (6)$$

$$P_{12} = \frac{C_{N-M_2}^{M_1}}{C_{N-M_2}^{N}} = \frac{M_1! M_2!}{N! (M_1 + M_2 - N)!} \quad (7)$$

$$P_2 = \frac{A^{M_2}}{M_2! F_N(A)} \quad (8)$$

Equation 7, of course, implies that the number of busy channels in the calling primary group, i.e. $M_1$, must be equal to the number of free channels in the called secondary group, i.e. $N - M_2$. Therefore, the condition $$M_1 + M_2 \geq N \quad (9)$$

must be satisfied when performing the double summation required by Equation 5.

Replacing $P_1$, $P_{12}$, $P_2$ by their values as given by Equations 7, 8, 9, and making use of Equation 3, Equation 5 becomes $$P = \frac{P_N}{F_N(A)} \sum_{M_1} \sum_{M_2} \frac{A^{M_1 + M_2 - N}}{(M_1 + M_2 - N)!} \quad (10)$$

Performing the double summation, this leads to $$\sum_{M_1} \sum_{M_2} \frac{A^{M_1 + M_2 - N}}{(M_1 + M_2 - N)!}$$

$$= (N+1) + N \frac{A}{1!} + (N-1) \frac{A^2}{2!} \cdots + \frac{A^N}{N!}$$

$$= \sum_{x=0}^{N} (N + 1 - x) \frac{A^x}{x!}$$

$$= (N+1) F_N(A) - A F_N(A) + \frac{A^{N+1}}{N!}$$

$$= (N + 1 - A + A P_N) F_N(A) \quad (11)$$

where the various steps are easily followed. Replacing into Equation 10, one obtains:

$$P = P_N(N+1-A+AP_N)$$
$$\simeq P_N(N+1-A) \quad (12)$$

This result is quite remarkable, since the probability of loss, despite the additional condition imposed in finding corresponding channels free in both the calling and the called groups, is only greater than the probability given by Equation 4 by a factor equal to $$\frac{N+1-A}{2}$$

which in the case of an incoming traffic of 6.7 Erlangs and 16 channels in all primary and secondary groups, is equal to 5.15.

The following table indicates, for $A=6.7$, the probability P in function of the number of channels N as compared to $P_N$ and more particularly $2P_N$:

| N | P | $P_N$ | $2P_N$ |
|---|---|---|---|
| 16 | 0.0100 | 0.0010 | 0.0020 |
| 17 | 0.0043 | 0.0004 | 0.0008 |
| 18 | 0.0018 | 0.0001 | 0.0002 |
| 19 | 0.0007 | | |

In the case of $N=19$, $P_N$ and $2P_N$ are not given as they are below 0.0001.

From the table one sees that by using 18 channels, the probability of loss P is less than 0.002 which is the probability of loss, i.e. $2P_N$, obtained by using 16 channels in two successive stages of connections when the extra condition is not imposed. The extra condition thus only imposes an increase of about 10% in the number of channels which are necessary.

Moreover, it should be noted that the probability of loss in the proposed system applies to the complete selection of the wanted substation. In the known switching systems wherein any free channel in the wanted direction can be used, a two-stage selection is not sufficient and three or more stages are necessary as generally, only the final selectors have access to as many as 100 outlets. Therefore, a comparison between P and a value greater than $2P_N$ seems justified whereby the proposed system appears to compare even more favourably with the former.

The above is even more remarkable, when it is compared to the probability of loss in the case where the channel in the called secondary group corresponding with the channel originally seized on the primary group must be free, since in that case the probability of loss will still be given by Equation 5, but in that equation, $P_{12}$ is now given by $$P_{12} = \frac{M_2}{N} \quad (13)$$

i.e. it now represents the probability of finding a busy channel in the secondary link corresponding to the arbitrarily selected channel in the primary link. Replacing $P_{12}$ in Equation 5 by using Equation 13, one finally obtains:

$$P \simeq \frac{A}{N} \quad (14)$$

which shows that the probability of loss has become practically independent of the probability of loss within a single primary or secondary group and that the number of channels required becomes so enormous, as to make any telecommunication system with a high grade of service quite impossible, unless several secondary links are used for each primary link.

It should also be noted in considering the system described in connection with Fig. 1, that there is practically no additional loading due to the temporary seizure of a time channel in the primary group of the calling substation as it is automatically released within a very short interval as soon as the proper channel to be used for communication has been determined in case the latter does not correspond to the originally seized one. Further, if say substation $SS_{19}$ is communicating with substation $SS_{14}$ on time channel No. 13, it is still possible for any substation in group No. 56 other than substation $SS_{14}$, to communicate simultaneously with any substation in group No. 11 other than $SS_{19}$ on this same time channel No. 13. Therefore, in a 10,000 exchange a maximum of 1800 communications could be simultaneously established.

Figure 5:
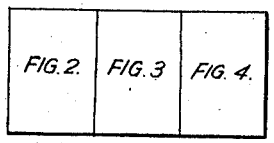
Fig. 5 represents the manner in which Figs. 2, 3 and 4 should be assembled.
Figure 6:
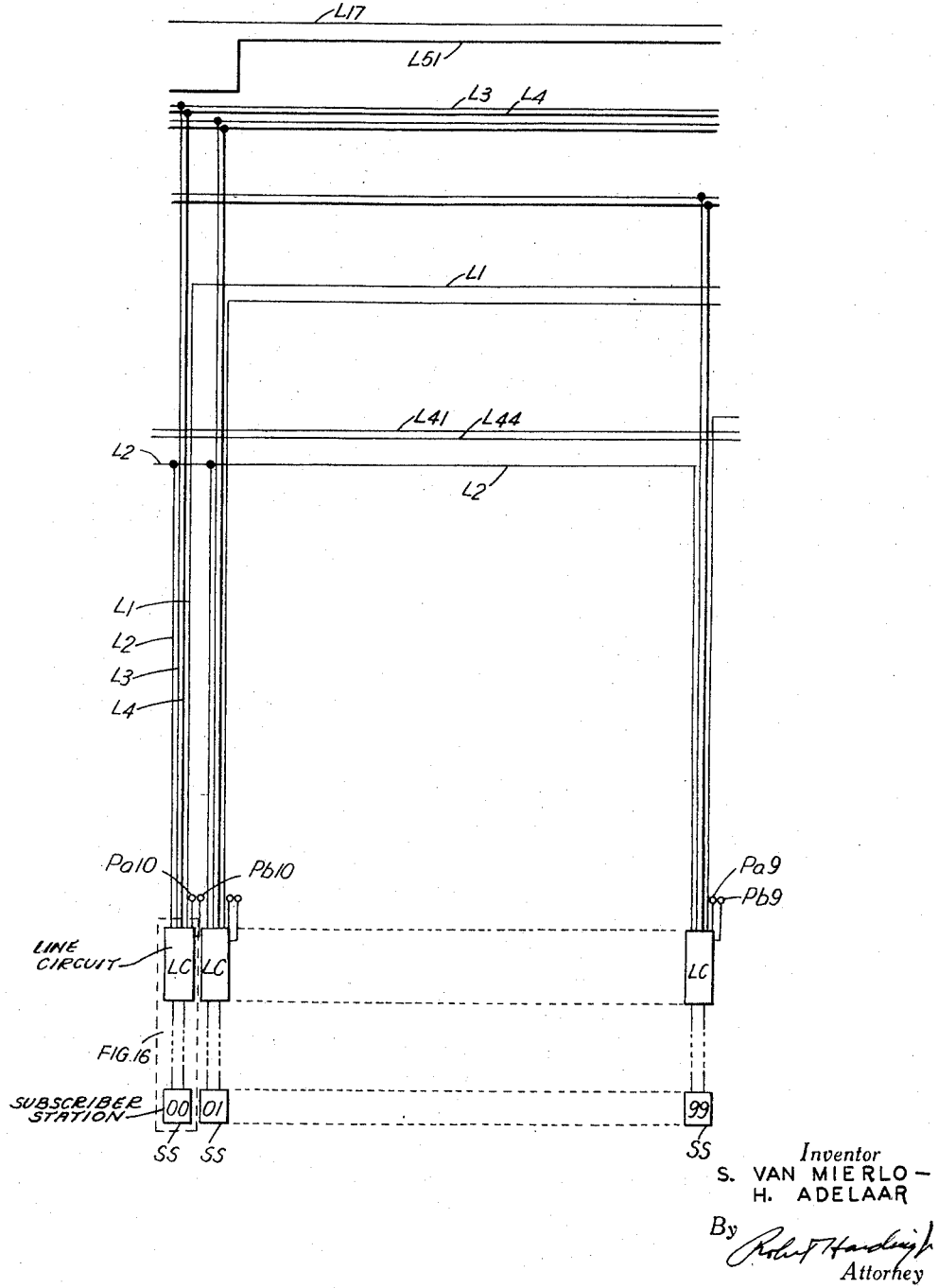
Figure 7:
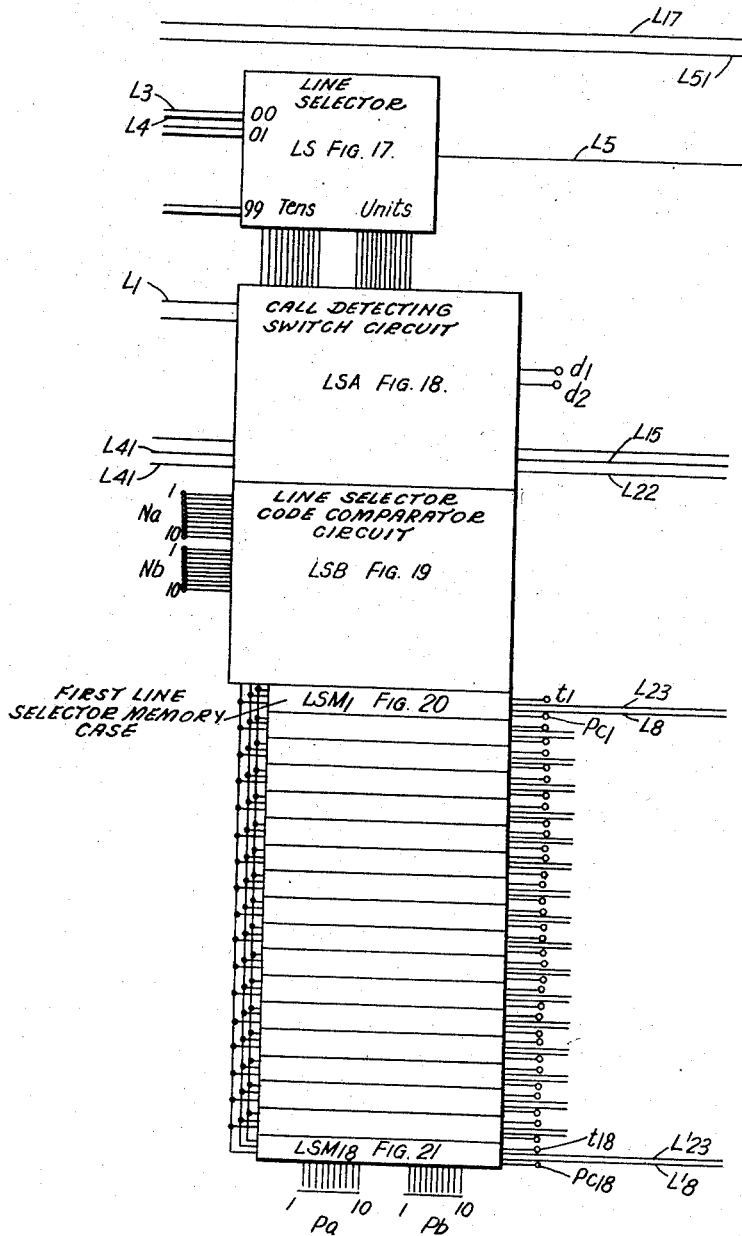
Figure 8:
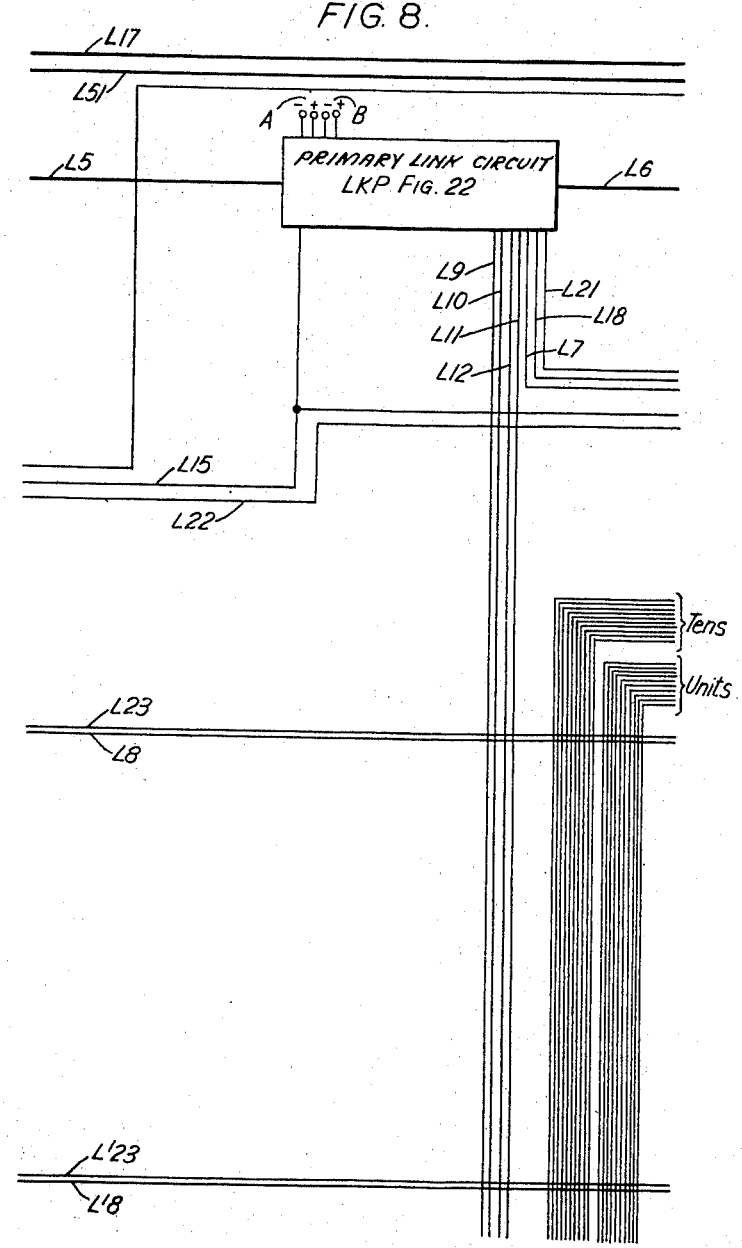

A general description will now be given of the establishment of a call between two substations. This will be made with reference to Figs. 2, 3 and 4 when assembled in accordance with Fig. 5. This description will be general in the sense that block diagrams will still be used but all the essential elements of the system will be distinctly shown and their function explained. It should be noticed, however, that features of the invention will still not be established in relation to these figures but will be found in the detailed description of the complete system which will follow the general description.

Figure 2:
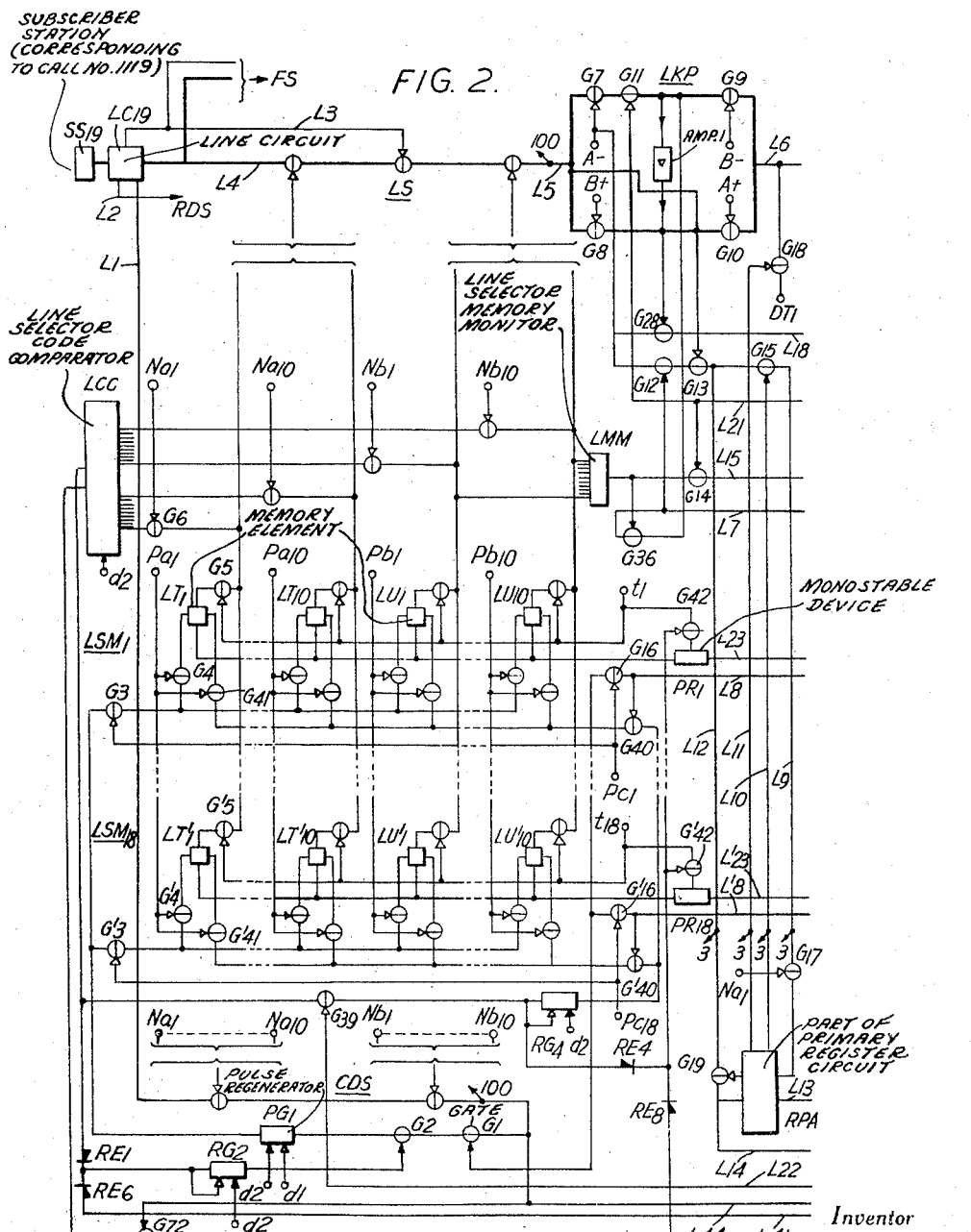
Figure 3:
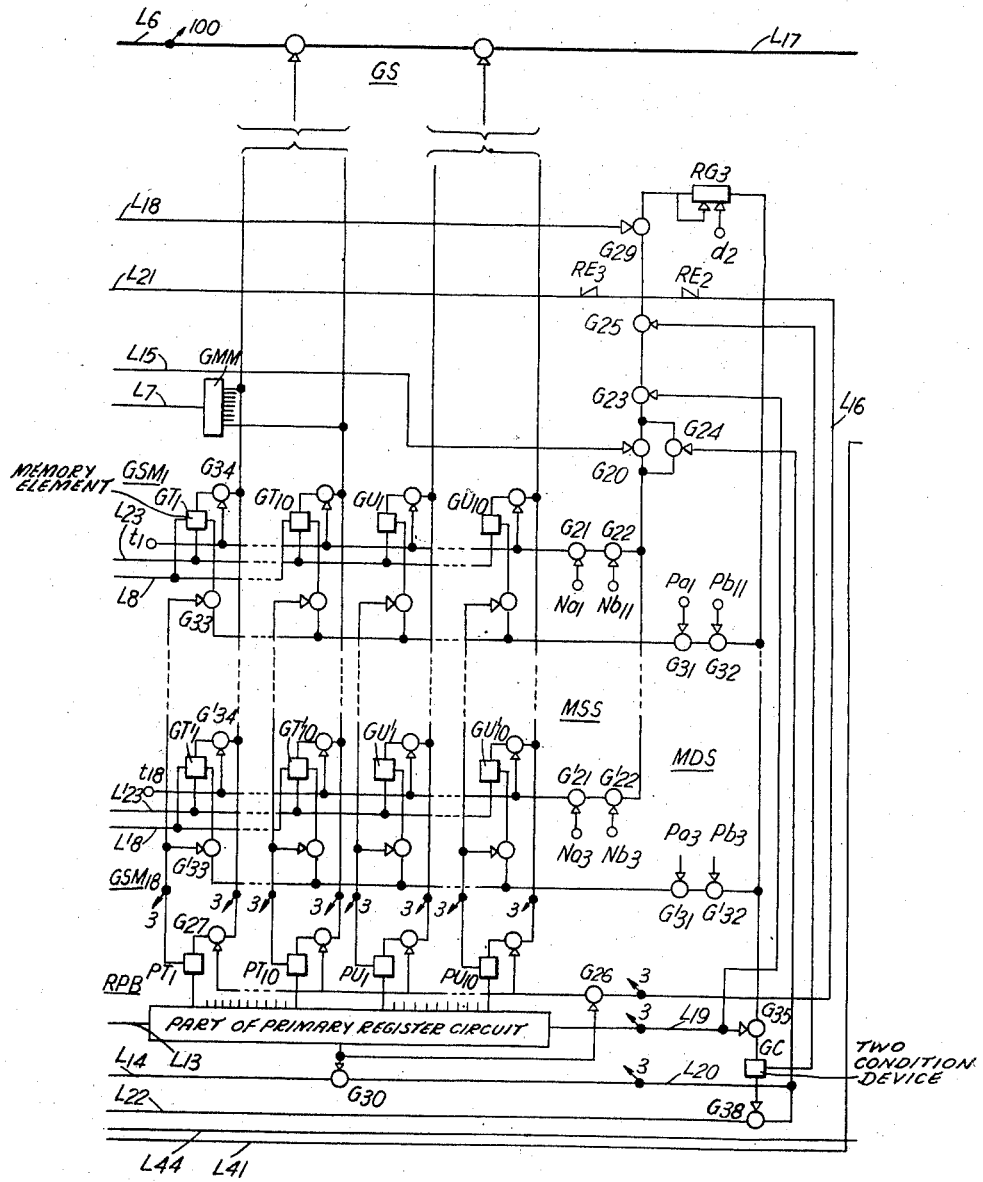
Fig. 3 represents the group selector stage of the system.

Referring to Figs. 2, 3 and 4, a number of symbolic notations which are respectively used in these figures will first of all be defined. In these figures, a circle having two conductors on opposite points of its circumference and a third conductor with an arrow pointing on said circumference between two conductors is used everywhere to indicate a gating arrangement which can pass an electric signal between said oppositely located conductors, in accordance with the electric signal present on the conductor with an arrow. A white arrow and also a crossed diameter is used to indicate that the gating arrangement is normally blocked, but that a change of potential or pulse on the control conductor can unblock it. A black arrow and also a diameter in line with the opposite points is used to indicate the reverse condition, i.e. that the gating arrangement is normally unblocked and can be blocked when the potential on the control conductor departs from its normal value.

A small square is used to indicate any element having two stable electrical conditions. A number of conductors are connected to the sides of said squares and are used either to bring about a change in the electrical condition of the element or to extract information as to the condition of said element. For each particular element, suitable explanations will be given in the rest of the description.

A small rectangle with an input and an output lead oppositely located on the small sides and with a black and white arrow pointing on one of the long sides, is used to indicate a regenerator which in response to a pulse on the input conductor (nearest to the white arrow) produces a pulse on the output conductor from the moment that a pulse is applied on the conductor leading to the white arrow and until the moment a pulse is applied on the conductor leading to the black arrow. Thus, it defines a regenerator with start and stop pulses. If a pulse is applied on the start conductor (white arrow) while there is simultaneously a pulse on the stop conductor (black arrow), the former is ineffective to start an output pulse.

All sources of potential are indicated by one pole only, it being assumed that the other pole is connected to ground. A single speech conductor (thicker line) is shown in Figs. 2, 3 and 4, but it will be evident that this might represent any type of connection including a balanced line, a coaxial conductor, etc.

When a call is initiated at the substation $SS_{19}$ (Fig. 2), this produces a change of the electrical condition present on conductor $L_1$ issuing from the corresponding line circuit $LC_{19}$ to which the substation $SS_{19}$ has access via its line conductors. The conductor $L_1$ is one out of four conductors $L_1$, $L_2$, $L_3$, $L_4$, which lead out from the line circuit of any substation. Conductor $L_2$ is used exclusively when the line is called and will be described later in relation to substation $SS_{10}$ (Fig. 4). Conductor $L_3$ is used to unblock a gate which is provided for each outlet of the line selector LS and there are, therefore, 100 such gates. For each outlet there are two more gates, i.e. a tens and a units gate which, together with the one controlled through conductor $L_3$, are normally blocked, whereby the unblocking of the gate controlled by conductor $L_3$, at the initiation of a call, cannot in itself effect a connection from conductor $L_4$ to conductor $L_5$, but only prepares such a through connection through the line selector LS.

Conductor $L_1$ constitutes one of the inlets of the call detecting switch CDS, which has access to the corresponding $L_1$ conductors issuing from all the substations within the group of a hundred. The switch CDS is constituted by a plurality of gates, two for each inlet and these two gates are connected in series. Normally, all the gates are blocked and for effecting a through connection between conductor $L_1$ and the common outlet of the call detecting switch CDS leading to the gating arrangement $G_1$, it is necessary to unblock the two serially connected gates leading from conductor $L_1$. As indicated, these pairs of gates are controlled by a plurality of pulse sources, i.e. $Na_{1/10}$ and $Nb_{1/10}$. The gate directly connected to conductor $L_1$ is controlled by one of the pulse sources $Na_{1/10}$ in accordance with the tens digit of the calling substation's number, i.e. pulse source $Na_1$ for substation No. 1119 ($SS_{19}$). Similarly, the gate leading to the gating arrangement $G_1$ is connected to one of the pulse sources $Nb_{1/10}$ in accordance with the units digit of the calling substation, i.e. $Nb_9$ for substation No. 1119 ($SS_{19}$).

The corresponding pulse wave forms of these pulse sources are shown in Fig. 41. Each of the pulse sources $Na_{1/10}$, $Na_1$ and $Na_2$ together with $Na_{10}$ only being shown, emits a negative pulse having a duration of 500 microseconds and at a frequency of 200 p.p.s. (pulses per second). Thus the period of recurrence is 5 milliseconds. Further, the pulse positions for each particular Na pulse source are staggered with respect to the pulse positions from the other Na sources whereby each interval of 500 microseconds within a cycle of 5 milliseconds is characterized by the occurrence of a negative pulse from one of the Na sources and none from the remaining Na sources.

Similarly, each of the Nb pulse sources, $Nb_1$, $Nb_2$ and $Nb_{11}$ only being shown, emits a negative pulse having a duration of 500 microseconds, this time with a period of recurrence equal to $11 \times 500$ microseconds=5.5 milliseconds.

This means that the period of recurrence for the Na sources expressed as an integral multiple, i.e. 10, of the pulse duration is a prime number with respect to the period of recurrence of the Nb sources expressed in the same manner, i.e. 11. In this way, it is possible to characterize a pulse duration of 500 microseconds within a cycle of $11 \times 10 \times 0.5 = 55$ milliseconds, by using two series of pulse sources producing pulses of the same duration. This is useful to simplify the design of the pulse generators producing the pulse wave forms shown in Fig. 41. These pulse generators are, however, not the subject of this invention and will not be described herein.

A recurrence period of 5.5 milliseconds for the Nb sources means that 11 such sources can be used, i.e. $Nb_{1/11}$, but for call detecting purposes, i.e. the control of CDS, only the pulse sources $Nb_{1/10}$ will be used.

When substation $SS_{19}$ calls, and at the most 55 milliseconds after the resulting change of electrical condition on conductor $L_1$, there will occur an interval of 500 microseconds during which both the pulse source $Na_1$ and the pulse source $Nb_9$ will simultaneously emit a negative pulse and thereby unblock their corresponding gates. It is easily reckoned from the diagram shown in Fig. 41, that this will occur during the 31st interval of 500 microseconds, taking the one in which pulse sources $Na_1$ and $Nb_1$ simultaneously emit negative pulses as the first. The two gates leading to the conductor $L_1$ will be unblocked in such a manner every 55 milliseconds.

The resulting pulses on the common outlet of the call detecting switch CDS will be applied to the regenerator $RG_1$ through the gating arrangements $G_1$ and $G_2$ in series. These two gating arrangements are normally unblocked and the conditions under which they can become blocked will be more conveniently discussed after describing the manner in which the calling substation's last two digits are inscribed in a free line selector memory case $LSM_{1/18}$, the first and the last of which, $LSM_1$ and $LSM_{18}$, only being shown in Fig. 2. The purpose of the regenerator $RG_1$ is to produce a clean pulse at its output in response to a pulse occupying a characteristic interval of 500 microseconds and which is applied to its input. Such a pulse, which will hereafter be called "calling pulse" is generally distorted as shown in Fig. 43. Fig. 43(a) represents a clean calling pulse having a duration of 500 microseconds, while Fig. 43(b) represents the same pulse when it is applied to the input of the regenerator $RG_1$. The start of the regenerator $RG_1$ is determined by the appearance of a start pulse from pulse source $d_1$, which is connected to the control conductor with the white arrow. These start pulses represented in Fig. 43(c), have a duration of 25 microseconds and a frequency of 2000 p.p.s. Thus, there is one pulse from source $d_1$ for every interval of 500 microseconds, and they are so phased with respect to the pulses of 500 microseconds produced by the pulse sources $Na_{1/10}$ and $Nb_{1/11}$, that they start exactly 250 microseconds after any calling pulse.

When there is coincidence between the distorted calling pulse and the start pulse from source $d_1$, the regenerator $RG_1$ emits an output pulse, the wave form of which is shown in Fig. 43(e). This output pulse will only have a duration of 250 microseconds, as the regenerator $RG_1$ is triggered back to its original condition exactly at the end of every interval of 500 microseconds by means of stop pulses regularly applied from source $d_2$ to the control conductor with a black arrow. These stop pulses are shown in Fig. 43(d) and they have a duration of 100 microseconds at a frequency of 2000 p.p.s.

The pulse of 250 microseconds at the output of the regenerator $RG_1$ is fed to a plurality of gates such as $G_3$, one for each line selector memory case such as $LSM_1$. Thus, the gating arrangement $G_3$ which is normally blocked, controls the entrance to the memory case $LSM_1$. The gating arrangement $G_3$ is controlled by the pulse source $Pc_1$ which is one out of a series of 18 pulse sources $Pc_{1/18}$, all producing pulses of the same duration and at the same frequency.

The corresponding pulse wave forms are also shown in Fig. 41. In fact, the wave forms of pulse sources $Nc_{1/18}$ have been shown but each of these pulse sources $Nc_{1/18}$ corresponds identically with one of the pulse sources $Pc_{1/18}$, the only difference being the polarity and voltage levels of the pulses issued. This is of no consequence for the description in relation to Figs. 2, 3 and 4, as the gating arrangements controlled by these pulse sources are not specified, but the reason for using two types of pulse sources will be appreciated from the detailed description. It may also be noted that to each of the 21 pulse sources $Na_{1/10}$ and $Nb_{1/11}$, also corresponds a pulse source out of the 21 $Pa_{1/10}$ and $Pb_{1/11}$ sources, which differs only in its polarity and voltage levels.

The negative or positive pulses produced by the sources $Nc_{1/18}$ or $Pc_{1/18}$ have also a duration of 500 microseconds, and the pulses from the different sources are also staggered, but, they are repeated every 9.5 milliseconds. This means that the period of recurrence expressed as an integral multiple of the common pulse duration, i.e. 19, is a prime number with 10 and 11, whereby by means of the pulse sources $Na_{1/10}$, $Nb_{1/11}$ and $Pc_{1/18}$, it is possible to define a cycle having a period of 1045 milliseconds in which each interval of 500 microseconds is characterized by a unique combination of simultaneous pulses from one of the Na sources, one of the Nb sources and one of the Pc sources.

Therefore, although the gating arrangement $G_3$ will be unblocked every 9.5 milliseconds by a positive pulse from source $Pc_1$, this pulse source being assigned to memory case $LSM_1$, just as the remaining Pc sources are assigned respectively to one of the remaining line selector memory cases, the regenerated calling pulse at the output of the regenerator $RG_1$, will not necessarily be admitted to the line selector memory case $LSM_1$. It will pass that particular entrance gating arrangement which is controlled by the Pc source which issues a positive pulse during the 500 microseconds interval in the latter half of which the regenerated calling pulse is located. In this manner, one sees that, within a period of 1045 milliseconds, the regenerated calling pulse will be successively offered to each of the line selector memory cases $LSM_{1/18}$ and even if during that time none of these cases is found free, whereby no signal will be given that the pulse has been admitted in one memory case, the pulse can be repeated indefinitely until a free line selector memory case is found.

Assuming that the line selector memory case $LSM_1$ is the first which is found free, the regenerated pulse of 250 microseconds at the output of the regenerator $RG_1$ will pass the gating arrangement $G_3$ when the pulse sources $Na_1$, $Nb_9$ and $Pc_1$ simultaneously issue a pulse.

Each memory case such as $LSM_1$ includes a plurality of memory elements and as the decimal code has been retained for storing the last two digits of a calling substation's number into a line selector memory case, there are two series of ten such memory elements, i.e. $LT_{1/10}$ and $LU_{1/10}$, only the first and the last of each series being shown. Each of these elements is essentially an electrical device with two stable electrical conditions and the main requirement is that it should respond, i.e. pass from one condition to another, with reasonable rapidity. This speed of operation of the memory elements is conditioned by the period of 9.5 milliseconds which defines the rate at which the regenerated calling pulses are offered to a particular memory case. Therefore, the memory elements should respond within 9.5 milliseconds to act on means preventing other regenerated calling pulses of 250 microseconds from being written in this particular memory case which is now engaged. Also, further offering of the successful regenerated calling pulse of 250 microseconds to other line selector memory cases will be prevented within 55 milliseconds. From the above requirements, it appears that the memory elements need not be constituted by fast responding devices. Nevertheless, one can assume that each is constituted by a gas tube with at least one trigger electrode.

It should be noted that the preventive means to avoid, within 9.5 milliseconds of the recording in one particular line selector memory case, a further recording of another number corresponding to another calling substation have not been shown in Fig. 2. It suffices, by means well known in the switching art to have the memory elements constituted and arranged in such a way that the energization of one memory element in each series of ten automatically prevents the energization of a further element in said series. If gas tubes are employed, one can use the drop of potential, in a resistor common to the circuits of a series of ten tubes, caused by the firing of one tube to prevent any other tube in the series to be fired.

The regenerated calling pulse of 250 microseconds obtains access to all the memory elements of the case which it has entered, through individual gating arrangements such as the gate $G_4$ for memory element $LT_1$. Each gating arrangement such as $G_4$ is controlled by a corresponding pulse source out of the series $Pa_{1/10}$ and $Pb_{1/10}$, i.e. source $Pa_1$ controls the gating arrangement $G_4$. In this way, the last two digits of the calling substation are extracted from the time position of the regenerated calling pulse of 250 microseconds and, more particularly, from its position within a cycle of 55 milliseconds. Thus when substation $SS_{19}$ calls, the memory elements $LT_1$ and $LU_9$ (not shown) will be actuated from their normal to their off-normal condition, while the remaining memory elements in the line selector memory case $LSM_1$ remain in their normal condition.

The off-normal condition of the memory elements $LT_1$ and $LU_9$ can then be used to position the line selector LS on the calling substation $SS_{19}$. As this is a multiplex system, this positioning of the line selector LS can only occur within a particular time channel to which the line selector memory case $LSM_1$ is assigned, i.e. time channel No. 1. Thus, the line selector LS must only be positioned on the substation $SS_{19}$ during particular intervals of 5.55 microseconds which recur every 100 microseconds.

This is obtained by means of the pulse sources $t_{1/18}$, the wave forms of which have been represented in Fig. 42. Only the first two and the last wave forms, i.e. $t_1$, $t_2$ and $t_{18}$ are shown, but each of the pulse sources issues negative pulses of 5.55 microseconds duration at a frequency of 10,000 p.p.s. Further, in the same manner as for the pulse sources used to control the call detecting switch CDS, the pulse durations from each $t$ source are staggered with respect to the pulse durations from the remaining $t$ sources and the channel width is determined by the number of channels, e.g. 18, which have to be accommodated within a period of 100 microseconds.

Each memory element of a memory case controls either the tens gates or the units gates of the line selector LS in the same manner as pulse sources $Na_{1/10}$ and $Nb_{1/10}$ control the gates of the call detecting switch CDS, but the control effected by the memory element is performed via gating arrangement such as $G_5$ for memory element $LT_1$. The gating arrangement such as $G_5$ is normally blocked, but can be unblocked, together with the 19 other corresponding gating arrangements in $LSM_1$, during the interval of 5.55 microseconds in which pulse source $t_1$ issues a negative pulse. Therefore, as soon as the number of the calling substation is registered in memory case $LSM_1$, the line selector LS will be positioned on substation $SS_{19}$ during time channel No. 1, the three gates to said substation being simultaneously unblocked.

The pulses of 5.55 microseconds which are permitted to flow on bus bars controlling the line selector LS, during time channel No. 1, will be used to detect the number which has been inscribed in the line selector memory case $LSM_1$. This is done by means of a line selector code comparator LCC which will receive the pulses of 5.55 microseconds within time channel No. 1 and issued on the bus bars as a result of the actuation of the memory elements $LT_1$ and $LU_9$, but only during intervals of 500 microseconds which correspond to the energized memory element. Thus, the bus bar which is being fed from the memory element $LT_1$ is connected to the line selector code comparator LCC via a gating arrangement $G_6$ which is normally blocked and which is unblocked only when source $Na_1$ emits a negative pulse of 500 microseconds. Therefore, for a given channel, five successive pulses of 5.55 microseconds spaced by 100 microseconds will be admitted through the gating arrangement $G_6$ during the 500 microseconds interval characterized by the presence of a pulse from source $Na_1$. Similarly, the pulses in time channel No. 1 which appear on the corresponding bus bar as a result of the energization of memory element $LU_9$, will pass through a gating arrangement similar to $G_6$ but this time controlled by the pulse source $Nb_9$, and five pulses in time channel No. 1 will also be admitted to the line selector code comparator LCC during the 500 microseconds interval characterized by the presence of a pulse from source $Nb_9$.

The line selector code comparator LCC which is only shown as a block diagram in Fig. 2, has thus two series of inputs, one being controlled by the pulse sources $Na_{1/10}$ and the other by the pulse sources $Nb_{1/10}$. It is so arranged that it delivers an output only when there is coincidence between the pulses received as a result of one of the memory elements $LT_{1/10}$ being energized and the pulses received as a result of one of the memory elements $LU_{1/10}$ being energized. Therefore, when the memory elements $LT_1$ and $LU_9$ are energized, it is only during the 500 microseconds interval in which pulse sources $Na_1$ and $Nb_9$ simultaneously issue a pulse, that the line selector code comparator will react and deliver an output. This also means that the pulses must be on the same channel and therefore there is no possibility for confusion between different calling numbers. It is shown that the code comparator delivers two outputs but these differ only in polarities, and both consist of a series of pulses each of 5.55 microseconds duration and spaced at 100 microseconds intervals, as shown in Fig. 43(f) where an example of pulses in the 15th time channel is represented. These pulses are merely those corresponding to the time channel seized and they occur only during the intervals of 500 microseconds which characterize the number (last two digits) of the calling substation. However, only the last four pulses of 5.55 microseconds will be issued at both outputs of the code comparator LCC, since it is prevented from issuing pulses during intervals of 100 microseconds regularly repeated every 500 microseconds and located right at the start of the characteristic intervals of 500 microseconds. This is performed by means of the stop pulses from source $d_2$ (Fig. 43(d)) and for a purpose which will appear later. For this reason, the first pulse in Fig. 43(f) is shown by a dotted line.

The first output of the line selector code comparator LCC is constituted by pulses of negative polarity which are applied to the input of the regenerator $RG_2$ through the decoupling means $RE_1$. As indicated, this regenerator $RG_2$ is not triggered by start pulses from source $d_1$, as for regenerator $RG_1$, but its output pulse starts with the arrival of the first pulse of 5.55 microseconds which is received from the code comparator LCC. For regenerator $RG_2$ as well as for regenerator $RG_1$ and all other regenerators used in the system, the output pulses are terminated by means of the stop pulses from source $d_2$ (Fig. 43(d)).

Therefore, the regenerator $RG_2$ in response to the pulses in time channel No. 1 received from the code comparator LCC, will deliver a pulse of 400 microseconds which will be used to block the normally unblocked gating arrangement $G_2$. A pulse of some 322 microseconds is shown in Fig. 43(g), but there the pulses for the 15th time channel are represented. Consequently, 55 milliseconds after being successfully admitted in the line selector memory case $LSM_1$, the subsequent calling pulse from substation $SS_{19}$, will find the gating arrangement $G_2$ blocked during the last 400 microseconds of the characteristic interval and it cannot therefore cause the unwarranted occupation of other line selector memory cases. If another time channel than No. 1 had been seized for the calling substation $SS_{19}$, the pulse at the output of regenerator $RG_2$ would have started at a later moment within the interval of 500 microseconds characterizing the calling substation, but in any case it would not start more than 200 microseconds after the start of a characteristic interval of 500 microseconds (Fig. 43(g)) and therefore even if the rising front of the distorted calling pulse is allowed to pass the gating arrangement $G_2$, this will have no effect on the regenerator $RG_1$ which starts its output pulse only with the simultaneous occurrence of a start pulse from source $d_1$ (Fig. 43(c)).

There is normally a potential applied to conductor $L_4$ (Fig. 2) from the line circuit $LC_{19}$ which is different from the normal potential present on conductor $L_5$ used in multiplex fashion. These potentials are applied through suitable resistances. (They are not shown in Fig. 2.)

Therefore, merely as a result of the regular unblocking every 100 microseconds of all the gates linking conductor $L_4$ with multiplex conductor $L_5$, pulses of 5.55 microseconds will appear on the multiplex conductor $L_5$ used as a speech conductor. The appearance of these pulses indicates that time channel No. 1 has been seized by the calling substation $SS_{19}$ and that some means should be made available to register the designation of the substation wanted by the calling substation $SS_{19}$. Thus the pulses are as yet unmodulated.

The unmodulated pulse on time channel No. 1 will be used to effect the seizure of a free primary register. The primary link circuit LKP to which the pulses in time channel No. 1 are admitted, comprises two branches, one including the gating arrangement $G_7$ and the other the gating arrangement $G_8$. The first leads to the input of an amplifier $AMP_1$ while the second is connected to the output of this amplifier. The multiplex speech conductor $L_6$ which continues the multiplex speech conductor $L_5$ is also connected to the input and the output of the amplifier $AMP_1$ via two separate branches which respectively include the gating arrangements $G_9$ and $G_{10}$.

The gating arrangement $G_7$ is normally blocked and can be unblocked only during the occurrence of negative pulses from pulse source A—. The corresponding pulse wave form of this source is shown in Fig. 42 and it is seen thereon that the negative pulses have a duration of 1.5 microseconds and recur once in an interval of 5.55 microseconds, thus at a recurrence frequency of 180,000 p.p.s. Therefore, for every pulse of 5.55 microseconds and irrespective of the time channel, there will occur a negative pulse from source A— which starts 1.02 microseconds after the start of any pulse of 5.55 microseconds. This means that it is only during part of time channel No. 1 that the pulses on conductor $L_5$ will be able to go through the gating arrangement $G_7$ and reach the input of the amplifier $AMP_1$ through the gating arrangement $G_{11}$. The latter is normally unblocked and the conditions under which it may become blocked will be explained later. After being amplified, the pulses of 1.5 microsecond in the A interval of time channel No. 1 can reach the multiplex speech conductor $L_6$ through the gating arrangement $G_{10}$ which will also be unblocked during these A intervals of 1.5 microsecond, as it is controlled by the pulse source A+ which issues pulses exactly at the same time as those from pulse source A— but with different polarities. The reasons for using different polarities will be seen in the detailed description. The unmodulated pulses in time channel No. 1 are thus able to flow from the multiplex speech conductor $L_5$ to the multiplex speech conductor $L_6$ through the amplifier $AMP_1$ during the A interval of the time channel. It is evident, however, that when the conversation will have been established, it will also be necessary that pulses modulated in amplitude by the speech waves should be able to travel in a reverse direction. They are allowed to do so and at the same time be amplified by the same amplifier $AMP_1$ by passing through the gating arrangements $G_9$ and $G_8$ which are respectively controlled by the pulse sources B— and B+. The wave form of pulse source B— is represented in Fig. 42 and it can be seen thereon that the pulses have the same polarity as those from the A— source, and that they recur at the same frequency. They are, however, displaced with respect to the A pulses by 2 microseconds. The pulses from source B+ are exactly similar to the pulses from source B—, except that their polarities are different.

In this manner, 1.5 microsecond of each time channel is reserved for communication in one sense while 1.5 microsecond is reserved for communication in the opposite sense. There is, therefore, a total interval of 2.55 microseconds in which pulses are not allowed to flow in one sense or another. This can be used to advantage as it permits to avoid interference between adjacent channels which results in crosstalk. As shown in Fig. 42, most of the dead interval of 2.55 microseconds is used to separate the B pulse of one channel from the A pulse in the succeeding channel, whereas the remaining part, i.e. 0.5 microsecond, is used to separate the A interval of one channel from the B interval of this same channel. This unequal distribution of the dead time is useful, since interference between pulses in the A and in the B positions of the same channel can only produce side tone.

In order to seize the primary register, the pulses from sources A— are also applied to the gating arrangement $G_{12}$ which is normally unblocked and can be blocked only when pulses are issued from the group selector memory monitor through conductor $L_7$.

This group selector memory monitor is used in conjunction with the group selector memory cases $GSM_{1/13}$, the first and the last of which only being shown in Fig. 3. In principle, these group selector memory cases are used in exactly the same way to control the group selector GS as the line selector memory cases are used to control the line selector LS. Therefore, when a group selector memory case has been engaged in a manner which will be described later and the number of a wanted group has been recorded therein, pulses in the time channel corresponding to the engaged group selector memory case will appear on two bus bars out of the two sets of ten which are used to control the gates forming the group selector GS. The input of the group selector memory monitor GMM is constituted by ten conductors directly connected to the ten bus bars forming one set. Since, when a group selector memory case is engaged, there will appear pulses of 5.55 microseconds on one of the bus bars of one set, the group selector memory monitor GMM is used to find out which group selector memory cases are busy and produces at its output, pulses of 5.55 microseconds duration and repeated every 100 microseconds for each of the time channels corresponding to an engaged group selector memory case.

Therefore, for all these busy time channels, the gating arrangement $G_{12}$ will be blocked and pulses from source A— will only be able to reach the gating arrangement $G_{13}$ if they correspond to free time channels, or channels engaged in the setting up process of a connection to a primary register, i.e. to free memory cases. The gating arrangement $G_{13}$ is normally blocked and can only be unblocked when pulses appear on the conductor $L_5$. Therefore since the gating arrangement $G_{12}$ only delivers pulses in the A positions of time channels which correspond to free group selector memory cases, only pulses in the A positions of time channels which have been seized by a calling substation but which are not yet used for a conversation and have not yet reached the group selector stage, will be able to pass both the gating arrangements $G_{12}$ and $G_{13}$ and reach the gating arrangement $G_{15}$.

Hence, if the line selector memory case $LSM_1$ seized for inscribing the number of the calling station $SS_{19}$ should correspond with an already engaged group selector memory case $GSM_1$, the group selector memory monitor GMM would issue pulses on conductor $L_7$ within time channel No. 1 whereby the pulses in the A positions of time channel No. 1 would not be able to reach the gating arrangement $G_{15}$. As the latter leads to the primary registers, there would be no possibility of seizing a free register.

Such an eventuality is prevented by rendering a line selector memory case such as $LSM_1$ artificially busy as soon as the corresponding group selector memory case, i.e. $GSM_1$, has been engaged for another connection. This is performed by providing a permanent signal on a conductor such as $L_8$ from any one of the ten memory elements such as $GT_{1/10}$ in $GSM_1$ which are used for registering the first digit of the group numbers. Therefore, as soon as one of these memory elements has been actuated from its normal condition to its off-normal condition, the resulting signal on conductor $L_8$ will be applied to a gating arrangement $G_{16}$ in the corresponding line selector memory case $LSM_1$. This gating arrangement $G_{16}$ is normally blocked but is unblocked at regular intervals during the occurrence of a pulse from source $Pc_1$ which is assigned to memory case $LSM_1$. Thus the gating arrangement $G_{16}$ functions in the same way as the entrance gating arrangement $G_3$. Consequently, as a result of group selector memory case $GSM_1$ having already been engaged, a pulse of 500 microseconds will be applied through the gating arrangement $G_{16}$ to effect the closure of the gating arrangement $G_1$ which will then prevent a calling pulse coming through the call detecting switch CDS from being regenerated by $RG_1$ and offered to the line selector memory cases. As such a calling pulse can only be described in memory case $LSM_1$ during the 500 microseconds interval in which pulse source $Pc_1$ emits a pulse, it can thus be inscribed in any available line selector memory case, when the gating arrangement $G_1$ is unblocked, i.e. except in the memory case $LSM_1$.

Therefore, the above described arrangement permits in all cases that pulses corresponding to calling substations which have not reached the group selector stage appear at the input of the gating arrangement $G_{15}$. The latter is normally unblocked and the conditions under which it will be blocked will appear in a later part of the description. It will therefore be assumed that pulses in the A positions of the time channel No. 1 used by the calling substation $SS_{19}$ appear on conductor $L_9$. This conductor leads to a plurality of entrance gates, each one leading to a primary register and more particularly to the part RPA thereof.

The number of primary registers which need be used will be calculated in accordance with the dialling time and as it is assumed that conventional dialling means are used in this system, whereas the primary registers perform their functions very rapidly due to the use of electronic means, it is the dialling time which will determine the necessary number of primary registers in accordance with the traffic. This will be assumed to be equal to 3 but it is evident that this number can be decreased or increased in accordance with the traffic. The part RPA of the primary register circuit shown in Fig. 2 is accessible from conductor $L_9$ through an entrance gate $G_{17}$ which is normally blocked and is controlled by the pulses from source $Na_1$. In this way, it is only during the 500 microseconds interval characterized by the appearance of negative pulses from source $Na_1$, that the pulses in the A positions of time channel No. 1 will be allowed to enter circuit RPA.

The entrance to the other register circuits is also controlled by entrance gates such as $G_{17}$, but these are controlled by other pulse sources of the Na series. A pulse entering into RPA through gate $G_{17}$ will start a recirculating arrangement comprising a delay arrangement, which will be explained in the detailed description. For the present it suffices to note that this arrangement will result in a pulse covering the A position of time channel No. 1 being repeated with a frequency of 10,000 p.p.s. This will be applied to conductor $L_{10}$ and will block the gating arrangement $G_{15}$. This will positively prevent further pulses in the A position of time channel No. 1 from being applied to conductor $L_9$. There is no longer any need to apply them to circuit RPA seized since the corresponding recirculating pulse has taken over therein and they should be prevented from being offered to other registers to avoid unnecessary seizure thereof. For example, if the entrance to the next primary register is controlled by pulse source $Na_4$, by the time the entrance gate corresponding to $G_{17}$ is unblocked, the gating arrangement $G_{15}$ is selectively blocked for time channel No. 1 and this second primary register cannot be seized by pulses issued as a result of substation $SS_{19}$ calling. When there are only three registers, an even distribution within the cycle of 5 milliseconds determined by the Na sources is preferable, e.g. entrance to the 2nd and 3rd registers is respectively controlled by $Na_4$ and $Na_7$. Other arrangements are of course possible.

Thus, one of the main functions of the recirculating arrangement is to memorize during the whole time the primary register will be seized, the particular time channel which has caused its seizure. The pulse in the A position of time channel No. 1 which continues to recirculate in circuit RPA is also used to regularly unblock the gating arrangement $G_{19}$ which selectively permits the pulses in the A position of time channel No. 1, at the output of the gating arrangement $G_{13}$ to reach conductor $L_{14}$.

The connection at the output of the normally blocked gate $G_{19}$ is also shown to lead to circuit RPA. This is to indicate that the pulses in the A position of time channel No. 1 selectively allowed through the gate $G_{19}$ will be used to reproduce the condition of the substation's loop. Thus they will convey dial impulses modulated thereon to circuit RPA. The latter includes means to demodulate the low frequency dial impulses which will be repeated to circuit RPB via conductor $L_{13}$.

Finally, pulses arriving through the gates $G_{13}$ and $G_{19}$ are used in circuit RPA to prepare a release circuit for the latter. The release circuit will become effective when the pulses will have ceased for a period substantially longer than the interdigital time.

Circuit RPA also includes a delay device producing a delay of 2 microseconds and to which the recirculating A pulse appearing in time channel No. 1 is fed. The output of this delay device (not shown) is connected to conductor $L_{11}$ which is used to control a gating arrangement $G_{18}$. The input of this gating arrangement is constituted by a dial tone source of low frequency, which will thus be able to impress dial tone on conductor $L_6$ during the B intervals of time channel No. 1. Therefore, dial tone in the form of amplitude modulated pulses in the B interval of time channel No. 1 will reach the line circuit $LC_{19}$ through gating arrangement $G_9$, amplifier $AMP_1$, gating arrangement $G_8$, line selector LS and conductor $L_4$. The line circuit includes a suitable low pass filter whereby the low frequency wave of the dial tone will be recovered and applied to the substation $SS_{19}$.

As soon as the subscriber at the substation $SS_{19}$ starts to dial, the pulses in the A interval of time channel No. 1 will be modulated by the dialling impulses, the loop openings resulting in the gate of LS controlled by $L_3$ being blocked, whereby the dial responding equipment in circuit RPA will follow the openings and closures of the substation's loop.

As it is assumed that conventional dialling means are used at the substation, it can also be assumed that, apart from demodulating means, conventional responding means can be used in the primary register circuit to follow the dial impulses. Through conductor $L_{13}$, circuit RPA will repeat the numerical impulses to circuit RPB which constitutes the remaining part of the primary register circuit and whose main element is a counting chain capable of registering the group number of the wanted substation. Also, at the first opening of the loop, the pulse in the B position of time channel No. 1 which was regularly applied to conductor $L_{11}$ will no longer be able to reach said conductor whereby the gating arrangement $G_{18}$ is again blocked and dial tone is suppressed.

The counting chain in circuit RPB can be designed in any suitable way, but it will be assumed that a decimal arrangement is used whereby two series of ten memory elements, i.e. $PT_{1/10}$ and $PU_{1/10}$, are used to record the two digits of the group number. Any suitable memory elements can be provided they have two stable electrical conditions. To fix ideas, it may be assumed that each element is constituted by a gas tube with three electrodes.

The manner in which a time channel, simultaneously free in the secondary link of the wanted substation and in the primary link of the calling substation, is chosen, will now be described. To this end, a succession of tests are made for each channel in turn until a suitable one is found.

Briefly, these will be made by positioning the group selector of the primary group of the calling substation on the secondary link of the group of the wanted substation during the various time channels. In this way, pulses flowing through other group selectors will be able to appear and be detected in the primary link where the test is made. Further, the group selector will only be positioned on said secondary link during those time channels which are "locally" free by virtue of not being busy in the primary group of the calling substation.

Similarly to the line selector memory cases $LSM_{1/18}$, the group selector memory cases $GSM_{1/18}$ include two series of ten memory elements, i.e. $GT_{1/10}$ and $GU_{1/10}$ for memory case $GSM_1$, which are used for registering the two digits of the wanted group number. As for memory elements $LT_{1/10}$ and $LU_{1/10}$, the memory elements $GT_{1/10}$ and $GU_{1/10}$ are arranged in such a way (not shown in Fig. 3) that the energization of one element of either the series $GT_{1/10}$ or $GU_{1/10}$ prevents the simultaneous energization of another element in the corresponding series. All the sources $t_{1/18}$ which are respectively allocated to the group selector memory cases are connected to the inlets of a memory scanning switch MSS which is an electronic switch of the same type as the call detecting switch CDS, but which has only eighteen inlets. The scanning period for switch MSS is equal to 55 milliseconds and this switch permits a connection between the $t$ source of a particular group selector memory case and the common outlet leading to the gating arrangement $G_{20}$ during an interval of 500 microseconds.

A scanning period which is many times larger than the product of the number of inlets multiplied by the duration of the connection between one inlet and the common outlet permits to establish a temporary through connection to the $t$ source of a particular group selector memory case in a particular primary group, during a time interval in which the same $t$ source is not through connected in any of the remaining 99 primary groups. Since there are 100 groups, it is therefore necessary that the scanning period of the memory scanning switches should at least be equal to hundred times the said interval during which any of said memory scanning switches effects a through connection from the $t$ source allocated to a corresponding group selector memory case.

In this way, since to each group selector memory case corresponds a time channel on the corresponding multiplex primary link, it is ensured that when a particular group selector memory case is given access to the gating arrangement $G_{20}$, it is only the channel in the primary group corresponding to that particular group memory case which will be tested, since testing of the corresponding time channels in the other primary groups can only occur during other time intervals of 500 microseconds. The manner in which this is obtained will be better understood by referring to the table shown in Fig. 46 while the reason therefor will appear from the later description.

In this table, the vertical columns refer to the 18 time channels or 18 group selector memory cases used in each primary group while the 100 horizontal rows refer to the 100 groups into which the 10,000 line exchange is divided. The table is not completely filled in but this can readily be done from the data given, since the scheme is cyclic. The number given at the intersection of any column with any row gives the interval of 500 microseconds within a cycle of 55 milliseconds during which the time channel corresponding to the vertical row will be tested in the primary group corresponding to the horizontal row. Thus, time channel No. 1 in group No. 11 will be tested during the eleventh interval of 500 microseconds, within the cycle of 55 milliseconds. These intervals are allotted by means of the two series of pulse sources $Na_{1/10}$ and $Nb_{1/11}$ which are already used for other purposes. Thus, referring to Fig. 41, the eleventh interval of 500 microseconds means the eleventh interval, counting that in which pulse sources $Na_1$ and $Nb_1$ simultaneously issue a pulse as the first. For the same group No. 11, time channel No. 2 will be tested during the seventeenth interval of 500 microseconds, the channel No. 3 will be tested during the twenty-third interval, time channel No. 4 will be tested during the twenty-ninth interval, etc. By considering the first column, one sees that whereas time channel No. 1 is tested in group No. 11 within the eleventh time duration, it is tested in each of the other 99 groups within different durations of 500 microseconds. During a particular interval of 500 microseconds, however, it is quite permissible to test several channels, provided they are different time channels in different groups. Thus, while time channel No. 1 in group No. 11 is being tested within the eleventh time duration, time channel No. 2 is being tested simultaneously in group No. 5, time channel No. 5 is also simultaneously being tested in group No. 97, etc. Since the two series of pulse sources $Na_{1/10}$ and $Nb_{1/11}$ provide a plurality of 110 characteristic time durations, and since there are 18 time channels in each group, a spacing of $6 \times 0.5$ milliseconds = 3 milliseconds can be assigned between the moment a channel is tested within a particular group and the moment the next channel is tested within that same group. This ensures that if a time channel is desired at any moment, there will only be a maximum of 3 milliseconds before the first possible time channel is tested for availability. The reason for performing the testing of the primary channels in such a manner will appear from the following description.

Just as for the call detecting switch CDS, two gates in series are provided for each outlet of the memory scanning switch MSS, i.e. $G_{21}$ and $G_{22}$ for the group selector memory case $GSM_1$. Since the group selector GS shown in Fig. 3 is that of group No. 11, testing of time channel No. 1 in that group will occur during the eleventh interval of 500 microseconds within the cycle of 55 milliseconds (Fig. 46) and from Fig. 41, it can easily be reckoned that this interval is defined by pulses simultaneously issued from sources $Na_1$ and $Nb_{11}$.

The following table shows the $Na$ and $Nb$ pulse sources which define all the testing time intervals of 500 microseconds for all the 18 time channels in the primary group No. 11:

| Time channel | Characteristic duration | Na | Nb |
| --- | --- | --- | --- |
| 1 | 11 | 1 | 11 |
| 2 | 17 | 7 | 6 |
| 3 | 23 | 3 | 1 |
| 4 | 29 | 9 | 7 |
| 5 | 35 | 5 | 2 |
| 6 | 41 | 1 | 8 |
| 7 | 47 | 7 | 3 |
| 8 | 53 | 3 | 9 |
| 9 | 59 | 9 | 4 |
| 10 | 65 | 5 | 10 |
| 11 | 71 | 1 | 5 |
| 12 | 77 | 7 | 11 |
| 13 | 83 | 3 | 6 |
| 14 | 89 | 9 | 1 |
| 15 | 95 | 5 | 7 |
| 16 | 101 | 1 | 2 |
| 17 | 107 | 7 | 8 |
| 18 | 3 | 3 | 3 |

Consequently, the gates $G_{21}$ and $G_{22}$ which are normally blocked are respectively controlled by the pulse sources $Na_1$ and $Nb_{11}$. During the eleventh interval of 500 microseconds, five pulses of 5.55 microseconds from source $t_1$ will be able to pass the unblocked gates $G_{21}$ and $G_{22}$ and reach the input of the gating arrangement $G_{20}$, since pulse source $t_1$ forms the input of the series gates $G_{21}$ and $G_{22}$ just as pulses from the remaining sources $t_{2/18}$ respectively form the corresponding inputs during the intervals of time specified in the above table. These pulse sources shown in Fig. 3 for controlling MSS are for group No. 11.

The gating arrangement $G_{20}$ is normally unblocked, and can be controlled through conductor $L_{15}$ which is connected to the output of a line selector memory monitor LMM (Fig. 2) which functions in exactly the same way as the group selector memory monitor GMM. Thus, for every time channel which is already occupied in the primary group No. 11, the line selector memory monitor LMM will deliver a pulse of 5.55 microseconds duration which will block the gating arrangement $G_{20}$ and prevent the flow of a $t$ pulse to the succeeding gating arrangement $G_{23}$.

The gating arrangement $G_{23}$ is normally blocked, but when the primary register, in particular circuit RPB, has received the information from the calling substation and is ready to control the hunt for a time channel free in the wanted secondary group as well as in the primary group of the calling substation, it will apply a signal on conductor $L_{19}$ which will unblock the gating arrangement $G_{23}$.

It will be remarked that not only is the output of the gating arrangement $G_{20}$ connected to the input of the gating arrangement $G_{23}$, but the output of the gating arrangement $G_{24}$ is also connected thereto as this last gating arrangement is in shunt with $G_{20}$. The gating arrangement $G_{24}$ which is normally blocked, permits to "recuperate" the time channel No. 1 which was engaged by the calling substation $SS_{19}$ for the purpose of reaching a primary register. This particular time channel is reckoned by the line selector memory monitor LMM as a busy channel and hence eliminated by means of the gating arrangement $G_{20}$. The gating arrangement $G_{24}$ is controlled through conductor $L_{14}$, the gating arrangement $G_{30}$ and conductor $L_{20}$. On conductor $L_{14}$, it will be remembered that only the pulses in the time channel seized by the calling substation $SS_{19}$ are present, i.e. those in time channel No. 1. The gating arrangement $G_{30}$ is normally blocked, but it is unblocked from circuit RPB as soon as the latter is ready to control the hunt for the channel to be used for communication with the secondary group of the wanted substation.

The output of the gating arrangement $G_{23}$ is connected to the input of the gating arrangement $G_{25}$. This gating arrangement is normally unblocked and, therefore, for all the time channels which are not busy on the primary group No. 11, the pulses from the corresponding $t$ sources will be made to flow through the unidirectional means $RE_2$ to the gating arrangements $G_{26}$ of the primary register circuits. This occurs through conductor $L_{16}$.

The multipling of the conductors $L_{16}$, $L_{19}$, $L_{20}$ indicating that these are accessible from all (3) the primary registers, means that several registers might simultaneously want to find a suitable channel. To avoid simultaneous seizure, double test means (not shown in Fig. 3) are used whereby only one register at a time can unblock the gating arrangements $G_{23}$ and $G_{26}$.

When the successful primary register applies a signal to the normally blocked gating arrangement $G_{26}$, the latter is unblocked and from that moment, the pulses of 5.55 microseconds corresponding to time channels free in the primary group of substation $SS_{19}$, can flow through it and be used to control the opening of the gating arrangements such as $G_{27}$ at the output of memory element $PT_1$ of the counting chain. This means that the moment the gating arrangements $G_{23}$ and $G_{26}$ are opened, the two energized memory elements from the series $PT_{1/10}$ and $PU_{1/10}$ are used to control the group selector GS in exactly the same way as the energized memory elements in the line selector memory cases were used to control the setting of the line selector LS.

Thus, assuming substation $SS_{10}$ (No. 1110) also in group No. 11, is wanted by substation $SS_{19}$ (No. 1119), No. 11 has been stored in the counting chain and since the memory elements $PT_1$ and $PU_1$ are consequently energized, the group selector GS will be periodically positioned on the secondary link of the wanted group No. 11 at regular intervals of 100 microseconds for all the durations of 5.55 microseconds corresponding to free channels in the primary group No. 11 as well as to channel No. 1 in said group.

This is made for obtaining access to the wanted secondary link in order to determine the time channels busy therein as a result of calls from substations in other groups than No. 11.

The reason for selecting as an example a called substation in the group of the calling substation lies merely in the ease of reference to the Figs. 2, 3 and 4, but it should be clear from the description of the system that it operates in the same way irrespective of the group of the called substation.

The group selector GS comprises 200 gates, two in series per outlet, and is thus similar in its design to the line selector LS, except that the additional control by a third gate for each outlet (conductor $L_3$) is not necessary. Also, whereas for the line selector LS the potential on conductor $L_4$ is different from that on conductor $L_5$, the potential on conductor $L_6$ is normally equal to the potential on conductor $L_{17}$ which is the outlet of the group selector GS leading to the secondary link of group No. 11. Therefore, contrary to what happens at the unblocking of the gates of the line selector LS, the mere unblocking of the gates of the group selector GS does not automatically send a pulse through.

However, when the gates of the group selector GS are unblocked for particular time channels, if these correspond to channels which are engaged in the secondary link of group No. 11, modulated or not yet modulated pulses are bound to be present on conductor $L_{17}$ and these are thus able to flow back through the group selector GS of group No. 11 to conductor $L_6$. Therefore, during the A positions of the time channels busy on the wanted secondary link of group No. 11, pulses coming from the outputs of amplifiers such as $AMP_1$ but in other primary groups than No. 11 will be able to flow through the gating arrangement $G_{10}$ (Fig. 2) and effect the blocking of the gating arrangement $G_{28}$ which is normally unblocked and normally affords free passage of the pulses from source A— through conductor $L_{18}$ to control the gating arrangement $G_{29}$. Before the unblocking of the gating arrangement $G_{23}$, no pulses are able to reach the input of the gating arrangement $G_{29}$ and it is therefore immaterial that at that time, the latter should be selectively unblocked via conductor $L_{18}$ and by means of the gating arrangement $G_{28}$ during the A positions of all the time channels free in the primary group No. 11. After the unblocking of the gating arrangement $G_{23}$, this selective unblocking of the gating arrangement $G_{28}$ will continue, but the channels busy in the wanted secondary link will also be eliminated.

This means that the pulses at the output of the gating arrangement $G_{25}$ will only be able to pass the gating arrangement $G_{29}$ if they are located within positions of 5.55 microseconds corresponding also to a free time channel in the wanted secondary group No. 11.

Since selection of a time channel only occurs in a characteristic interval of 500 microseconds during which this same time channel cannot possibly be seized from another primary group (Fig. 46), double seizure is therefore prevented.

The unblocking of the gates of the group selector GS on the wanted secondary link of group No. 11 during time channels which may already be occupied in that group, will mean "breaking in" on existing conversations. It is to be remarked, however, that the periods of interference will be very short, i.e. 5.55 microseconds duration, and for a given conversation, there will only be five such pulses, since the testing for free time channels on the wanted secondary link occurs only within a particular interval of 500 microseconds assigned to that channel in accordance with the primary group from which the testing is carried out. Normally, one such test during an interval of 500 microseconds should be sufficient to determine if a particular channel can be used for communication with the wanted substation and in any case a delay arrangement may be provided in the group selector circuit to avoid that the testing cycle should be repeated too many times. After one cycle of 55 milliseconds all the channels have in fact been tested. The interference on an established conversation will consist in a slight reduction of the amplitude of the channel pulses. In this manner, after demodulation, the interference will at the most result in a series of two or three pulses of 500 microseconds spaced by 55 milliseconds, which is negligible interference in the way of speech distortion.

It will be realized that pulses on time channel No. 1, which was seized by substation $SS_{19}$ for getting access to the primary register and has been retained by the gating arrangement $G_{24}$, would reach the output of the amplifier $AMP_1$ (Fig. 2) in the A position of this time channel No. 1 and therefore should also block the gating arrangement $G_{28}$ whereby the gating arrangement $G_{29}$ could not be unblocked, even though time channel No. 1 might be free in the secondary link of group No. 11. To prevent this, the pulses in the time channels free in the primary link of substation $SS_{19}$ together with those in time channel No. 1 already seized by this calling station, are also applied on conductor $L_{21}$ through the unidirectional means $RE_3$. Conductor $L_{21}$ controls the gating arrangement $G_{11}$ which is normally unblocked and which will therefore be selectively blocked for all time channels which are still free in the primary link of substation $SS_{19}$, this including time channel No. 1.

It is to be remarked that if a new call occurs in group No. 11 during the time the newly seized time channel is being tested for substation No. 1119, the time channel preliminarily seized by that new call immediately results in the line selector memory monitor LMM blocking the gating arrangement $G_{20}$ during a channel time position corresponding to the newly seized line selector memory case. This means that the test for this time channel, on behalf of substation No. 1119, will not succeed, it being immediately treated as a busy channel.

By applying pulses in a channel under test to the wires controlling the group selector GS, the group selector memory monitor GMM connected to some of these wires would automatically send pulses in that channel through conductor $L_7$, the gating arrangement $G_{36}$ and the amplifier $AMP_1$ to the control conductor of the gating arrangement $G_{28}$ which would be selectively blocked for a channel under test whereby the gating arrangement $G_{29}$ could not be selectively unblocked even if the channel under test was free on the wanted secondary link. The gating arrangement $G_{14}$ on conductor $L_7$ will prevent this since it will be selectively blocked from conductor $L_{21}$ for all channels under test for which pulses have passed through the gating arrangement $G_{25}$. It would also be possible to control the setting of the group selector GS for channel test purposes in such a way that the pulses from the gating arrangements such as $G_{27}$ would not be picked up by the group selector memory monitor whereby the gating arrangement $G_{14}$ would not longer be required, but on the other hand, this would require additional decoupling means.

The first surviving pulse which reaches the output of the gating arrangement $G_{29}$ will be applied to the regenerator $RG_3$.

Assuming that time channel No. 1 is the first to be tested and if it happens to be free in the secondary group No. 11, since a pulse is this time channel is able to pass the gating arrangement $G_{24}$, it will reach the output of the gating arrangement $G_{29}$ and therefore it will be applied to the regenerator $RG_3$. This regenerator is similar to regenerator $RG_2$ and it would therefore deliver an output pulse starting exactly with the arrival of the first pulse in time channel No. 1 and ending exactly at the termination of the duration of 500 microseconds characterized by simultaneous pulses from sources $Na_1$ and $Nb_{11}$, since it is controlled by the stop pulses from source $d_2$.

If time channel No. 1 is not free in the wanted secondary group No. 11, during the 500 microseconds interval characterized by simultaneous pulses from sources $Na_1$ and $Nb_{11}$, the test will, of course, be unsuccessful but 3 milliseconds afterwards, a new test will be made.

During the seventeenth (Fig. 46) interval of 500 microseconds, the test for time channel No. 2 will be made in exactly the same way, and if time channel No. 2 happened to be free both in the primary group No. 11 and in the secondary group No. 11, the gating arrangements $G_{20}$ and $G_{29}$ would simultaneously be unblocked during this time channel whereby the regenerator $RG_3$ would issue an output pulse.

If the test for time channel No. 2 is not successful, further tests will be made on all the time channels until the eighteenth time channel is tested. Even if the test for the eighteenth time channel also happened to be unsuccessful, thus after a series of eighteen tests over 55 milliseconds, a new cycle of testing could be repeated, in the hope that a time channel would now become simultaneously available in the wanted secondary group No. 11 as well as in the primary group No. 11, and the number of cyclic tests to be made can best be determined by means of a timing arrangement in the group selector circuit. One cyclic test however might be considered sufficient.

For the purpose of giving a suitable explanation, it will be assumed that time channel No. 1 is not found free in the wanted secondary group No. 11 and that another time channel than No. 1 will be found simultaneously free in both groups. For the sake of convenience in referring to the drawings, it will also be assumed that it is only channel No. 18 which is simultaneously free in both groups and that therefore, referring to Fig. 46, it will be only in the third duration of 500 microseconds, characterized by the simultaneous appearance of pulses from sources $Na_3$ and $Nb_3$, that both the gating arrangements $G_{20}$ and $G_{29}$ will be simultaneously unblocked whereby the regenerator $RG_3$ will deliver an output pulse of some 305.55 microseconds duration. The length of this output pulse, of course, depends on the particular time channel found free in both groups, but in all cases the duration will be between 300 and 400 microseconds.

The ouput pulse from the regenerator $RG_3$ is applied to all the group selector memory cases $GSM_{1/18}$ through a memory distributing switch MDS which, instead of extracting $t$ pulses corresponding to the memory cases, as done by the memory scanning switch MSS, distributes the output pulses from the regenerator $RG_3$ to the group selector memory case corresponding to the channel which has resulted in an output pulse being issued by said regenerator. The memory distributing switch MDS is also an 18-point switch which distributes in the same rhythm as the memory scanning switch MSS scans. Therefore, the pulse of 305.55 microseconds delivered at the output of regenerator $RG_3$ during the last part of the interval of 500 microseconds characterized by the simultaneous occurrence of pulses from sources $Na_3$ and $Nb_3$, can only be fed into the group selector memory case $GSM_{18}$, the access to which is controlled by the two normally blocked gates $G'_{31}$ and $G'_{32}$ since these are respectively unblocked by means of pulses from sources $Pa_3$ and $Pb_3$ which have time positions respectively identical to those of the pulses from sources $Na_3$ and $Nb_3$ (Fig. 41).

In memory case $GSM_{18}$, this pulse will be applied to all the twenty memory elements $GT'_{1/10}$ and $GU'_{1/10}$, but through gates individual to those twenty memory elements and which are normally blocked such as gate $G'_{33}$ for memory element $GT'_1$. As these gates can only be opened when the corresponding memory elements forming the counting chain in the primary register circuit are energized, only the memory elements $GT'_1$ and $GU'_1$ will be energized in group selector memory case $GSM_{18}$ since memory elements $PT_1$ and $PU_1$ are energized in the counting chain of the primary register. In a manner exactly similar to that described for the line selector memory case, the energized memory elements in the group selector memory case $GSM_{18}$ will now be used to control the setting of the group selector GS on the desired outlet, i.e. the secondary link in group No. 11. This positioning of the group selector GS will only occur during the intervals of 5.55 microseconds characterizing time channel No. 18, since the memory elements of $GSM_{18}$ can only control the gates of the group selector GS through gates such as $G'_{34}$ for memory element $GT'_1$, which are normally blocked and unblocked only under the control of pulses from source $t_{18}$, thus during time channel No. 18.

The memory elements forming the group selector memory cases should have a faster response than those for the line selector memory cases. This is due to the fact that during the 500 microseconds interval characterized by simultaneous pulses from sources $Pa_3$ and $Pb_3$ there might also be a pulse from source $Pc_{18}$. As the latter source controls access to memory case $LSM_{18}$, there should be a selective blocking signal on conductor $L'_8$ controlling the gating arrangement $G_1$ (Fig. 2) through the gating arrangement $G'_{16}$, within the first half of the interval of 500 microseconds characterized by pulses from sources $Pa_3$ and $Pb_3$. Hence, the memory elements such as $GT'_{1/10}$ and $GU'_{1/10}$ should respond within 50 microseconds.

Apart from being fed into the group selector memory case $GSM_{18}$, the pulse at the output of the regenerator $RG_3$, is applied to the input of the gating arrangement $G_{35}$ which is normally blocked, but which was unblocked from circuit RPB at the same time that the gating arrangement $G_{23}$ was unblocked by a signal applied on conductor $L_{19}$. Therefore, the output pulse from $RG_3$ will be able to reach the element GC which has two stable electrical conditions and which will be put in its off-normal condition in response to said output pulse. This off-normal condition results in the application of an electrical condition to the electrical conductor controlling the gating arrangement $G_{25}$, such that the latter will be automatically blocked and pulses will no longer appear on conductor $L_{21}$ and $L_{16}$. This means that the counting chain formed by $PT_{1/10}$ and $PU_{1/10}$ will no longer control the positioning of the group selector GS on the secondary link of group No. 11 during a plurality of time channels, this being replaced by the control effected by the memory case $GSM_{18}$ which, however, regularly positions the group selector GS on said secondary link only during time channel No. 18 but at a rate of 10 kc/s. Consequently, pulses are redundant on conductor $L_{21}$.

Although time channel No. 18 has now been selected as the channel which will be used for connection between substation No. 1119 and substation No. 1110, there are not yet any pulses, e.g. conversation pulses, on the multiplex speech conductor $L_{17}$ and in accordance with the particular testing method explained above, this means that in other primary groups wherein a substation wants access to a substation in group No. 11, time channel No. 13 could still be selected, provided it were also free in the primary groups of the other calling substations. This is prevented by artificially applying pulses on conductor $I_{17}$ as soon as time channel No. 18 has been selected for substation $SS_{19}$. This is performed by the gating arrangement $G_{36}$ (Fig. 2) which will cause pulses to be applied in the primary link circuit LKP and, more particularly, at the input of the amplifier $AMP_1$ for all the time channels corresponding to an engaged group selector memory case in group No. 11 and to a free line selector memory case in said group. In that event, pulses on conductor $L_7$ will pass through the normally unblocked gating arrangement $G_{36}$, the absence of pulses on conductor $L_{15}$ preventing its blocking, while the blocking of the gating arrangement $G_{14}$ is also prevented due to pulses being no longer present on conductor $L_{21}$, whereby the corresponding pulses will reach the input of the amplifier $AMP_1$. This will happen in time channel No. 18, since the corresponding group selector memory case $GSM_{18}$ has been engaged and since the corresponding line selector memory case $LSM_{18}$ is still free. Through the amplifier $AMP_1$ and the group selector GS, pulses in time channel No. 18 will therefore reach the secondary link of group No. 11.

The fact that the element GC has been moved to its off-normal condition indicates that the test for a free time channel has been successful and is used to initiate the inscription of the number of the calling substation $SS_{19}$, within its group, in the line selector memory case $LSM_{18}$ corresponding to the newly seized time channel No. 18. The element GC when it is in the off-normal condition, unblocks the normally blocked gating arrangement $G_{38}$ whereby pulses of 5.55 microseconds in time channel No. 1, present on conductors $L_{12}$, $L_{14}$ and $L_{20}$, are able to flow on conductor $L_{22}$ to control the selective unblocking in time channel No. 1 of a normally blocked gating arrangement $G_{39}$. To the input of this gating arrangement pulses are applied from the output of the line selector code comparator LCC. These are the same pulses which were applied through the unidirectional means $RE_1$ to the regenerator $RG_2$ and therefore they are a plurality of groups of four successive pulses of 5.55 microseconds, each group occurring in one particular time channel during the last 400 microseconds of an interval of 500 microseconds characterizing the number of a calling substation inscribed in the line selector memory case corresponding to that time channel. Therefore, since No. 19 is inscribed in the line selector memory case $LSM_1$, during the interval of 500 microseconds characterized by the simultaneous occurrence of pulses from sources $Na_1$ and $Nb_9$, four pulses in time channel No. 1 will reach the gating arrangement $G_{39}$ and as soon as the latter is selectively unblocked for time channel No. 1, the first of these will be used to trigger the regenerator $RG_4$ which is similar to regenerator $RG_2$ and which will therefore deliver an output pulse of 400 microseconds characterizing No. 19 by its position within the 55 milliseconds cycle.

This output pulse will be applied to all the line selector memory cases $LSM_{1/18}$, but through individual gating arrangements such as $G'_{40}$ for line selector memory case $LSM_{18}$. This gating arrangement $G'_{40}$ is normally blocked, but as soon as the group selector memory case $GSM_{18}$ is engaged, the signal on conductor $L'_8$ used to prevent the inscription of calling number other than No. 19 in the line selector memory case $LSM_{18}$, is also used to unblock the gating arrangement $G'_{40}$ whereby the output pulse from regenerator $RG_4$ can be selectively offered to the various memory elements $LT'_{1/10}$ and $LU'_{1/10}$ of memory case $LSM_{18}$. Entry to the various memory elements of this memory case is made through gates individual for each of these memory elements, such as gate $G'_{41}$ for memory element $LT'_1$, and as these individual gates are used in exactly the same manner as the individual gates such as $G'_4$ for memory element $LT'_1$, the output pulse from the regenerator $RG_4$ will result in the energization of the memory elements $LT'_1$ and $LU'_9$ (not shown) only in line selector memory case $LSM_{18}$. Thus No. 19 is now registered in memory case $LSM_{18}$ and accordingly the line selector LS will now periodically connect the substation $SS_{19}$ to conductor $L_5$ during the intervals of 5.55 microseconds characterizing the time channel No. 18.

From this moment, the inscription of No. 19 in memory case $LSM_1$ represents redundant information and this memory case should be released. This is accomplished by the pulses in time channel No. 1 which, apart from being offered to the input of the regenerator $RG_4$, also control through the unidirectional means $RE_4$ a plurality of gating arrangements, one for each line selector memory case, such as gating arrangement $G_{42}$ for memory case $LSM_1$. Since pulses from source $t_1$ are applied to the input of the gating arrangement $G_{42}$, it is only at the output of this gating arrangement that pulses will be delivered since there will be no coincidence with the pulses in time channel No. 1, applied through the unidirectional means $RE_4$, for the other similar gating arrangements. The pulses in time channel No. 1 at the output of the gating arrangement $G_{42}$ are used to actuate the primary channel release arrangement $PR_1$ which is used to release both the corresponding line selector memory case $LSM_1$ and the corresponding group selector memory case $GSM_1$. The primary channel release arrangement such as $PR_1$ for memory cases $LSM_1$ and $GSM_1$ is essentially an element with two electrical conditions, one of which only being stable. The first pulse at the output of the gating arrangement $G_{42}$ brings the release arrangement $PR_1$ in its off-normal condition for a short duration and this results in a signal being applied to all the twenty memory elements $LT_{1/10}$ and $LU_{1/10}$ of the memory case $LSM_1$. This causes the release of any of these memory elements which are energized and accordingly, memory elements $LT_1$ and $LU_9$ will be returned to their normal condition whereby the line selector LS will no longer be positioned on the calling substation $SS_{19}$ during the time channel No. 1 and whereby this time channel is now available to any other calling line in group No. 11. A release signal similar to that applied to the line selector memory case $LSM_1$ is also applied on conductor $L_{23}$ to the twenty memory elements of the group selector memory case $GSM_1$. In this case, however, this will be without any material effect, since a condition for the seizure of the line selector memory case $LSM_1$ was that the corresponding group selector memory case $GSM_1$ was free at that time and since then there has been no possibility of engaging group selector memory case $GSM_1$ whereby the latter has remained free. the twin release will, however, be usefully exploited for the release of the connection at the end of a communication.

Pulses in the A position of time channel No. 1 being no longer present on conductor $L_5$, the gating arrangement $G_{13}$ will no longer be unblocked during those positions and accordingly the pulses in time channel No. 1 will disappear from conductor $L_{12}$. These pulses, at the output of the gating arrangement $G_{19}$, are also applied to the primary register circuit RPA. As previously mentioned, the primary register is already in a condition where the maintenance of these pulses prevents its release. When they disappear, circuit RPA will release followed by the release of circuit RPB whereby the primary register is again in its free condition and can be seized by other calling substations.

From the moment No. 19 is recorded in memory case $LSM_{18}$, the gating arrangement $G_{36}$ will be blocked during time channel No. 18 and pulses in this time channel will no longer be artificially applied to conductor $L_6$ since they are now redundant.

Should the originally seized time channel, i.e. No. 1, be found free in the secondary group No. 11, then, the release of $LSM_1$ should be prevented. This occurs by way of the gating arrangement $G_{12}$. As soon as No. 11 is inscribed in memory case $GSM_1$, this gating arrangement is selectively blocked by pulses on conductor $L_7$, since the gating arrangement $G_{14}$ is now unblocked and consequently pulses in time channel No. 1 can no longer reach conductor $L_{12}$. Therefore the release of circuit RPA will immediately be initiated, while the disappearance of pulses in time channel No. 1 on conductors $L_{12}$, $L_{14}$, $L_{20}$ and $L_{22}$ will prevent the selective unblocking of the gating arrangement $G_{39}$. No release of $LSM_1$ will take place and No. 19 will remain recorded therein. Also, no pulses in time channel No. 1 will appear at the output of the gating arrangement $G_{36}$. Such pulses are not necessary in this particular case since pulses in time channel No. 1 already appear on the multiplex speech conductors $L_6$ and $L_{17}$.

The line selector LS now being positioned on the calling substation $SS_{19}$ during time channel No. 18, the pulses produced due to the different potentials normally present on conductors $L_4$ and $L_5$ are now able to travel through the primary link circuit LKP, conductor $L_6$, group selector GS and conductor $L_{17}$ to the secondary multiplex link circuit LKS (Fig. 4) in the wanted group No. 11. The secondary link circuit LKS is essentially similar to the primary link circuit LKP and comprises the gating arrangements $G_{43}$, $G_{44}$, $G_{45}$, $G_{46}$, respectively corresponding with the gating arrangements $G_7$, $G_8$, $G_9$, $G_{10}$ in the primary link circuit LKS. Also, the amplifier $AMP_2$ is used and corresponds to the amplifier $AMP_1$.

Therefore, during the A positions of time channel No. 18, pulses will be delivered at the output of the amplifier $AMP_2$ and applied to control the normally blocked gating arrangement $G_{47}$. This gating arrangement $G_{47}$ receives pulses from the A— source and is directly followed by the normally unblocked gating arrangement $G_{48}$ which leads to conductor $L_{24}$ through the normally unblocked gating arrangement $G_{49}$. This conductor $L_{24}$ provides a path of access to the secondary registers in group No. 11 and corresponds therefore to conductor $L_9$ giving access to the primary registers. It will be easily recognized that the functions of gating arrangements $G_{47}$, $G_{48}$ and $G_{49}$ used to obtain access to the secondary registers are respectively similar to those of the gating arrangements $G_{13}$, $G_{12}$ and $G_{15}$, whereby the pulses in the A positions of time channel No. 18 will be allowed to reach conductor $L_{24}$, whereas pulses in time channels used for already established conversations will not be able to pass the gating arrangement $G_{48}$, since the latter is controlled by the final selector memory monitor FMM in the same manner as the group selector memory monitor GMM controls the gating arrangement $G_{12}$. Access to a free secondary register occurs, as in the case of the primary registers, through a gating arrangement such as $G_{52}$, similar to $G_{17}$, and controlled by one of the Na pulse sources, e.g. $Na_1$. The normally unblocked gating arrangement $G_{49}$ will be blocked by a recurrent signal in time channel No. 18 on the conductor $L_{25}$. This is issued by circuit RSA which is absolutely identical to circuit RPA and which therefore issues such a signal when a pulse in time channel No. 18 has been stored in a recirculating delay arrangement. This conductor $L_{25}$ corresponds to conductor $L_{10}$. Conductor $L_{26}$ corresponds to conductor $L_{11}$ and is used to apply secondary dial tone from source $DT_2$ through the gating arrangement $G_{50}$ similar to the gating arrangement $G_{18}$.

It should be observed, however, that since the operations from the moment that group No. 11 was stored in the primary register to the moment a signal appears on conductor $L_{26}$ to unblock the normally blocked gating arrangement $G_{50}$, are extremely rapid, electronic means being used throughout, the use of a secondary dial tone might be dispensed with and the calling subscribers could dial the last two digits of the called substation immediately after dialling the second digit. Conductor $L_{27}$ corresponds with conductor $L_{12}$ and is thus used to send the pulses in time channel No. 18 from the output of the gating arrangement $G_{48}$ to the gating arrangement $G_{51}$ which corresponds with the gating arrangement $G_{19}$. Conversation pulses are eliminated by the output pulses present on conductor $L_{28}$ issued by the final selector memory monitor FMM.

Reception of the last two digits of the called substation No. 1110 will occur through circuit RSA in the same manner as the digits of the group number were received by circuit RPA and through conductor $L_{29}$, the dial impulses will be stored in circuit RSB the main element of which is a counting chain comprising the twenty memory elements $ST_{1/10}$ and $SU_{1/10}$ which are similar to the counting chain memory elements $PT_{1/10}$ and $PU_{1/10}$. Secondary dial tone from source $DT_2$ will be suppressed in the same way as the primary dial tone from source $DT_1$ (Fig. 2).

The normally blocked gating arrangement $G_{51}$ is controlled in the same manner as the normally blocked gating arrangement $G_{19}$, i.e. from the recirculating pulse circuit RSA corresponding to channel No. 18 used for obtaining access to the secondary register. Therefore, during time channel No. 18, and more particularly the A positions thereof, pulses will appear on conductor $L_{30}$ leading to the normally blocked gating arrangement $G_{53}$ which is controlled from circuit RSB in the same way as the normally blocked gating arrangement $G_{30}$ is controlled from circuit RPB.

As soon as No. 10 has been registered in the counting chain of the secondary register, the memory elements $ST_1$ and $SU_{10}$ will be energized and an identification code comparator ICC will be used to extract the statically stored number and produce a pulse whose time position within a cycle is characteristic of that number, i.e. 10. The identification code comparator LCC is essentially similar to the line selector code comparator ICC and comprises twenty input leads, one corresponding to each of the memory elements $ST_{1/10}$ and $SU_{1/10}$. These leads are connected to said memory elements via individual gates, such as $G_{54}$, which are normally blocked and which are respectively unblocked by the pulse sources $Pa_{1/10}$ and $Pb_{1/10}$. The identification code comparator ICC will only deliver a pulse on its output lead connected to the gating arrangement $G_{55}$, during the interval of 500 microseconds in which a pulse is received on one of the ten leads connected to the memory elements $ST_{1/10}$ simultaneously with a pulse on one of the ten leads connected to the ten memory elements $SU_{1/10}$. Therefore, since memory elements $ST_1$ and $SU_{10}$ are energized for recording No. 10, it is during the twenty-first interval of 500 microseconds, taking the interval in which pulse sources $Pa_1$ and $Pb_1$ simultaneously issue a pulse as the first, that a pulse of 500 microseconds will reach the input of the gating arrangement $G_{55}$. This is normally unblocked, and the pulse will therefore reach the regenerator $RG_5$ which is identical to regenerator $RG_1$ and, therefore, issues an output pulse only during the last 250 microseconds of the 500 microseconds intervals in which the input pulse is located, being controlled by the start pulses from source $d_1$ and the stop pulses from source $d_2$ (Fig. 43).

As soon as circuit RSB has received the last two digits of the number of the called subscriber, it applies a signal to the normally blocked gating arrangement $G_{53}$ whereby the pulses in the A position of time channel No. 18 can pass from conductor $L_{30}$ to conductor $L_{31}$ leading to the normally blocked gating arrangement $G_{56}$. In the same manner as for the primary registers, the unblocking of the gating arrangement $G_{53}$ will only take place when the secondary register has been successful in controlling the final selector stage to the exclusion of the other two secondary registers which might want a similar control. As for the primary registers, a double test arrangement (not shown in Fig. 4) can be used for this purpose. The gating arrangement $G_{56}$ is controlled by the eighteen pulse sources $t_{1/18}$ in such a way that pulse source $t_1$ controls the gate during the 500 microsecond interval characterized by the presence of a pulse from source $Nc_1$, while pulse source $t_2$ effects the control during the interval of 500 microseconds characterized by a pulse from source $Nc_2$, etc. This is performed by means of the gating arrangements such as $G_{57}$ for pulse sources $t_1$ and $Nc_1$, which permits pulses from source $t_1$ to pass through $G_{57}$ to conductor $L_{32}$, while $Nc_1$ produces a pulse of 500 microseconds.

The gating arrangements such as $G_{57}$ therefore constitute a scanning switch which permits to send signals characterizing the various final selector memory cases $FSM_{1/18}$ on conductor $L_{32}$ used in multiplex fashion. Consequently, since the pulses on conductor $L_{31}$ occur during time channel No. 18, when pulse source $Nc_{18}$ issues a pulse of 500 microseconds, the gating arrangement $G'_{57}$ will be unblocked and the pulses from source $t_{18}$ will selectively unblock the gating arrangement $G_{56}$ whereby the regenerator $RG_6$, similar to regenerator $RG_2$, will deliver an output pulse of some 305.55 microseconds on conductor $L_{33}$ also used in multiplex fashion, but this time to distribute information to the various final selector memory cases $FSM_{1/18}$. Conductor $L_{33}$ leads to a plurality of gating arrangements, one in each memory case, such as $G_{258}$ in memory case $FSM_{18}$ and since these gating arrangements are respectively controlled as indicated by the pulse sources $Pc_{1/18}$, it is evident that the pulses at the output of regenerator $RG_6$ can only flow through the gating arrangement $G'_{58}$ in memory case $FSM_{18}$.

This pulse will be used to actuate a so-called priming device which is individual to each final selector memory case, i.e. FA' in memory case $FSM_{18}$. This priming device is essentially an element with two stable electrical conditions and the arrival of a pulse will cause the priming element FA' in memory case $FSM_{18}$ to be energized whereby from that moment, the normally blocked gating arrangement $G'_{59}$ will be unblocked.

This means that the pulse of 250 microseconds at the output of regenerator $RG_5$ and which is impressed on conductor $L_{34}$, is allowed to enter the final selector memory case $FSM_{18}$ and that one only, through the unblocked gating arrangement $G'_{59}$, the remaining gating arrangements such as $G_{59}$ in memory case $FSM_1$ remaining blocked. At the output of the gating arrangement $G'_{59}$, the pulse of 250 microseconds will tend to reach all the twenty memory elements $FT'_{1/10}$ and $FU'_{1/10}$. Since it can only do so through the individual gating arrangements such as $G'_{60}$ for memory element $FT'_1$, and since the time position of the pulse within the cycle of 55 milliseconds is characteristic of the last two digits of the calling substation, it is only the memory elements $FT'_1$ and $FU'_{10}$ which will be energized, the gating arrangements such as $G'_{60}$ being respectively controlled by the pulse sources $Pa_{1/10}$ and $Pb_{1/10}$, i.e. pulse source $Pa_1$ for $G'_{60}$. The final selector memory cases are also arranged, as mentioned previously in relation to the line and group selector memory cases, so that only one of the memory elements $FT_{1/10}$ and one of the memory elements $FU_{1/10}$ can be energized at a time.

As soon as the last two digits of the called substation $SS_{10}$ (No. 1110) have been stored in the final selector memory case $FSM_{18}$, the latter will tend to periodically position the final selector FS on the wanted substation $SS_{10}$, due to the energized memory elements $FT'_1$ and $FU'_{10}$ in $FSM_{18}$ exercising a control during time channel No. 18 through the gating arrangement such as $G'_{61}$ for memory element $FT'_1$ which is controlled by source $t_{18}$. Thus, the control effected by the final selector memory case is analogous to that effected by the line selector memory cases, and the final selector as well as the line selector comprises three gates in series for each outlet. Only two of these gates are unblocked under the control of the engaged final selector memory case $FSM_{18}$ and the third remains blocked as it is under the control of conductor $L'_3$ of the line circuit $LC_{10}$ of substation $SS_{10}$. As already mentioned in connection with conductor $L_3$ for the line circuit of the calling substation $SS_{19}$, the receiver must be taken off its hook before the electrical potential on conductor $L_3$ or $L'_3$ is such that it can unblock its corresponding gate. Therefore, it is only when the called substation $SS_{10}$ answers, that switching through at the final selector FS will take place.

As soon as the last two digits of the wanted substation are recorded in memory case $FSM_{18}$, the final selector memory monitor FMM will start to issue pulses of 5.55 microseconds duration on conductor $L_{28}$ during time channel No. 18. Therefore, during this time channel, the gating arrangement $C_{48}$ will be blocked and accordingly, pulses in time channel No. 18 will disappear at the output of the gating arrangement $G_{51}$, whereby circuit RSA will be released exactly in the same way as circuit RPA was released when pulses in time channel No. 1 disappeared at the output of the gating arrangement $G_{19}$. Also, in a similar manner to that for circuit RPB, circuit RSB will now release and the secondary register will thus become available for another connection.

The final selector stage is provided with a final selector code comparator FCC which operates in the same way as the line selector comparator LCC previously described. Therefore, another result of the inscription of the last two digits of substation $SS_{10}$ in memory case $FSM_{18}$, will be to provide a series of five successive pulses of 5.55 microseconds within time channel No. 18 and located within a duration of 500 microseconds corresponding with No. 10 inscribed in memory case $FSM_{18}$, i.e. with coincident pulses from sources $Na_1$ and $Nb_{10}$. These 5.55 microseconds pulses will be applied through a normally unblocked gating arrangement $G_{62}$ to conductor $L_{35}$ leading to regenerator $RG_7$ which is exactly similar to regenerator $RG_2$. Therefore, the second of these five pulses will trigger the regenerator $RG_7$ which will deliver at its output a pulse of some 305.55 microseconds duration in an interval of 500 microseconds characteristic of the number of the wanted substation $SS_{10}$ within its group, i.e. in which pulses from sources $Na_1$ and $Nb_{10}$ coincide. This pulse will be used to produce ringing tone at the line circuit $LC_{10}$ of substation $SS_{10}$ and in order that the pulse at the output of the regenerator $RG_7$ should reach the wanted called substation, a ringing distributor switch RDS is used which comprises 100 outlets and is essentially similar to the call detecting switch CDS already described. Thus, to each outlet correspond two electronic gates in series, one being controlled by a pulse source of the $Pa$ series and the other being controlled by a pulse source of the $Pb$ series in accordance with the number of the outlet.

Therefore, a pulse will only reach the line circuit $LC_{10}$ via conductor $L'_2$, access to which is controlled by the sources $Pa_1$ and $Pb_{10}$, and as a result, it will control the application of ringing tone to the substation $SS_{10}$ by means not shown in Fig. 4 but to be described in the detailed description.

Upon the subscriber at the called substation $SS_{10}$ being available and answering, the subsequent change of potential on conductor $L'_3$ will unblock the third gate in the final selector FS and as a result, the final selector FS being switched through, communications can now be exchanged between subscriber $SS_{19}$ in group No. 11 and $SS_{10}$ in the same group, using time channel No. 18. The fact that substation $SS_{10}$ answers, can be used, as will be shown in the detailed description, to suppress the application of ringing tone. However, it will be observed that in accordance with the arrangement described, upon subscriber $SS_{10}$ hanging up, the electrical condition which would have caused the interruption of ringing tone would disappear and accordingly substation $SS_{10}$ would again be rung but this time unnecessarily. To prevent this, the gating arrangement $G_{62}$ is used to selectively stop the pulses of 5.55 microseconds in time channel No. 18 and prevent them from triggering the regenerator $RG_7$. The blocking of the gating arrangement $G_{62}$ is performed in the following manner:

As soon as substation $SS_{10}$ answers, a connection is therefore regularly established between the multiplex speech conductor $L_{36}$ and the individual speech conductor $L'_4$ leading to the line circuit $LC_{10}$. As the potentials on conductors $L_{36}$ and $L'_4$ are normally different, in the same manner as for the line selector LS, the mere switching through of the final selector FS every 100 microseconds will produce pulses of 5.55 microseconds during time channel No. 18. Therefore, during the B position of time channel No. 18, pulses will appear at the input of the amplifier $AMP_2$ in the secondary link circuit LKS, having successfully passed the gating arrangement $G_{45}$. Corresponding pulses at the output of the amplifier $AMP_2$ will be used to control the gating arrangement $G_{63}$ which is normally blocked, whereby pulses in the B position of time channel No. 18 will now appear on conductor $L_{38}$ together with pulses in the B positions of other time channels already used for communication with other called substations in group No. 11.

Conductor $L_{38}$ is connected to the input of regenerator $RG_8$, which is similar to regenerator $RG_2$, through the normally blocked gating arrangement $G_{37}$. This gating arrangement is controlled through conductor $L_{32}$ which is used in multiplex fashion to allow pulses from sources $t_{1/18}$ to control it in succession, being gated in through the individual arrangements such as $G_{57}$ for pulse source $t_1$, controlled by the corresponding sources from the series $Nc_{1/18}$. Therefore, during the 500 microseconds interval in which the pulse source $Nc_{18}$ issues a pulse, pulses from source $t_{18}$ will reach conductor $L_{32}$ and they will selectively unblock the gating arrangement $G_{37}$ whereby the regenerator $RG_8$ will deliver an output pulse of some 300 microseconds duration during the last part of the 500 microseconds interval characterized by a pulse from source $Nc_{18}$.

This output pulse will be impressed on conductor $L_{40}$ which is used in multiplex fashion to send it to the final selector memory case corresponding to the $t$ source which caused regenerator $RG_8$ to be triggered. This is performed by gating arrangements individual to the final selector memory cases such as $G'_{64}$ and $G'_{65}$ for memory case $FSM_{18}$. The gating arrangement $G'_{64}$ which is normally blocked is controlled by the ten memory elements $FU'_{1/10}$ and if one of those has been energized, unblocking of $G'_{64}$ results. The pulse can only pass the normally blocked gating arrangement $G'_{65}$ as only the latter is controlled by pulses from source $Pc_{18}$, thus in the same time positions as the pulses from source $Nc_{18}$. Having passed the two gating arrangements $G'_{64}$ and $G'_{65}$, the pulse triggers the answering device FB' in memory case $FSM_{18}$. This device FB' is essentially a device with two stable electrical conditions and when brought to its off-normal condition, it will first cause the release of the priming device FA' in memory case $FSM_{18}$, whose energized condition is no longer necessary, and it will also control the blocking of the gating arrangement $G_{62}$ through the gating arrangement $G'_{66}$. The latter is controlled by pulses from source $t_{18}$ whereby the gating arrangement $G_{62}$ will only be blocked during time channel No. 18, suppressing the application of ringing tone to substation $SS_{10}$ but allowing ringing tone pulses to be distributed by the ringing distributor switch RDS to other called substations within group No. 11.

Also, as soon as the last two digits of substation $SS_{10}$ are stored in a final selector memory case, the pulses on conductor $L_{41}$ are also used through the unidirectional means $RE_6$ (Fig. 2) to trigger the regenerator $RG_2$ and the output pulses from the latter selectively block the gating arrangement $G_2$ in group No. 11 whereby No. 10 can no longer be inscribed in a line selector memory case when subscriber No. 1110 lifts his receiver.

If substation $SS_{10}$ (No. 1110) had been busy, two cases could have occurred. In the first instance, it could have been busy as a result of its number within group No. 11 being already inscribed in some other final selector memory case other than $FSM_{18}$. In that case, the final selector code comparator FCC would have delivered pulses of 5.55 microseconds in some other time channel, say No. 13, but still within the 500 microseconds interval characteristic of the number, i.e. No. 10, of substation $SS_{10}$ within its group. These pulses would also have appeared on conductor $L_{41}$, and through the unidirectional means $RE_5$ would have reached the regenerator $RG_9$ which is similar to regenerator $RG_2$. Therefore, regenerator $RG_9$ would have delivered a pulse of more than 300 microseconds to block the normally unblocked gating arrangement $G_{55}$. As the output of this gating arrangement leads to the input of the regenerator $RG_5$ which is of the same type as regenerator $RG_1$, thus controlled by the start pulses from source $d_1$, regenerator $RG_5$ would thus have been prevented from emitting an output pulse, characterizing No. 10 within the cycle of 55 milliseconds, irrespective of the time channel already used for getting access to the busy substation $SS_{10}$.

In the case that substation $SS_{10}$ is busy by virtue of having called another substation, the calling condition on conductor $L'_1$ will also be used to trigger the regenerator $RG_9$, but this time through conductor $L_{44}$ and the unidirectional means $RE_7$.

The manner in which busy tone is sent to the calling substation $SS_{19}$ has not been shown in Figs. 2, 3 and 4, only the detection of the busy condition having been shown and described. The application of the busy tone will be described in the detailed description.

The release of the connection can occur either under the control of the calling subscriber or under the control of the called subscriber, or under the control of both. For this purpose, the pulses in the A positions of busy or calling time channels, at the output of the gating arrangement $G_{47}$ are applied through conductor $L_{42}$ to the gating arrangement $G_{67}$ controlled from conductor $L_{32}$ in the same way as the gating arrangement $G_{37}$. The output of the gating arrangement $G_{67}$ is fed to regenerator $RG_{10}$ similar to regenerator $RG_8$ and the output thereof is applied on conductor $L_{43}$ used in multiplex manner in the same way as conductor $L_{40}$. Both conductors $L_{40}$ and $L_{43}$ are used to control gating arrangements such as $G'_{68}$, $G'_{69}$, $G'_{70}$ and $G'_{71}$ for the final selector memory case $FSM_{18}$. The gating arrangements $G'_{68}$ and $G'_{70}$ are arranged in series, normally blocked, and fed by pulse source $Pc_{18}$ assigned to memory case $FSM_{18}$. They lead to a release device FC'. This release device is essentially a device with two electrical conditions, but only one of these is stable and device FC' can only remain in its non-stable position during a short period of time which is determined by its time constant. This device is analogous to the primary release devices $PR_{1/18}$ used for the release of the associated line selector and group selector memory cases. As long as there are pulses in the A and B positions of time channel No. 18, both the gating arrangements $G'_{68}$ and $G'_{70}$ will be periodically unblocked every 9.5 milliseconds during a period slightly greater than 300 microseconds. Device FC' is so designed that if pulses from source $Pc_{18}$ are allowed to reach it at this rate, i.e. every 9.5 milliseconds, it will remain in its off-normal condition and the fact that it is in its off-normal condition prevents another release device FE' from being brought to its off-normal condition as indicated by the connection between the two devices. Device FE' is essentially of the same type as FC' and as long as it is in its normal condition, it has no influence on the memory elements $FT'_{1/10}$ and $FU'_{1/10}$ as well as on the answering device FB' in memory case $FSM_{18}$, which it can control. However, when either the A or the B pulses in time channel No. 18 disappear, one of the gating arrangements $G'_{68}$ or $G'_{70}$ will become blocked and accordingly after a certain delay, the release device FC' will be restored to its normal condition whereby this will automatically bring the release device FE' in its off-normal condition for a short period of time during which period of time it will issue a pulse which will release the energized elements in memory case $FSM_{18}$. Thus it would release memory elements $FT'_1$ and $FU'_{10}$ as well as the answering device FB' whereby memory case $FSM_{18}$ would be restored to normal. It should be remarked that since it is the release of device FC' which energises device FE', prior to the energization of device FC' the device FE' would be operated. This is prevented, however, as long as the answering device FB' is in its normal condition. Therefore, when communication is established, as soon as the answering device FB' has reached its off-normal condition, device FE' is ready to react but, since at that moment pulses are also present on both conductors $L_{40}$ and $L_{43}$, device FC' by moving to its off-normal condition prevents an undue release.

The gating arrangements $G'_{69}$ and $G'_{71}$ are also used to permit pulse source $Pc_{18}$ to control a release device, i.e. FD', which is exactly similar to release device FC' and, since the gating arrangements $G'_{69}$ and $G'_{71}$ are arranged in parallel, it will return to its normal condition as soon as the A and B pulses in time channel No. 18 are both missing. When device FC' returns to its normal condition, device FE' will move to its off-normal condition and cause the release of $FT'_1$, $FU'_{10}$ and FB'. To prevent the operation of FE' when no pulses are yet received on conductors $L_{40}$ and $L_{43}$, it is necessary that one of the elements $FT'_{1/10}$ or $FU'_{1/10}$ should be in its off-normal condition before the normal condition of device FD' can cause the operation of device FE'. As there will be a pulse on conductor $L_{43}$ before seizure of $LSM_{18}$, release device FE' is prevented from undue operation.

The time constant of FD' for returning to normal can be chosen much smaller than that of FC', since the release of FD' indicates that both subscribers have released and there is no longer a question of a false release.

This might be the case when FC' returns to normal and it is for this reason that the time constant of this device should be made larger (a few seconds) whereby a temporary and accidental interruption of pulses on conductor $L_{40}$ and more particularly on conductor $L_{43}$ will not immediately release $LSM_{18}$.

As represented in Fig. 4, the two leads between release device FE' and the memory elements $FT'_{1/10}$, $FU'_{1/10}$ on the one hand and the answering device FB' on the other, are used both ways, i.e. to permit a control action from the elements $FT'_{1/10}$, $FU'_{1/10}$ or FB', or to permit the release of those due to release device FE' reaching its off-normal condition.

As soon as the calling substation $SS_{19}$ has released, the calling pulses on conductor $L_{44}$ will disappear, whereby the gating arrangement $G_{72}$ (Fig. 2) will no longer be selectively blocked and output pulses from the line selector code comparator LCC in time channel No. 18 and within the 500 microseconds interval characterizing No. 19 inscribed in memory case $LSM_{18}$, will flow through uni-directional means $RE_8$ to open the gating arrangement $G'_{42}$ whereby the pulses from source $t_{18}$ will flow through the latter and cause the release of the memory cases $LSM_{18}$ and $GSM_{18}$ by actuating the primary release device $PR_{18}$ in a manner previously described for the release of the originally taken line selector memory case $LSM_1$. It will be recalled that the line selector code comparator LCC issues only pulses of 5.55 microseconds within the last 400 microseconds of the interval of 500 microseconds characterizing No. 19, due to the control effected by the pulses from source $d_2$. Therefore, even a distorted calling pulse on conductor $L_{44}$ will always maintain the gating arrangement $G_{72}$ selectively blocked.

Thus, all the elements having served for the establishment of a communication between substation $SS_{19}$ and $SS_{10}$ are now released.

A detailed description of the system will now be given.

For all devices already shown in block diagram in Figs. 2, 3 and 4, the same references will be given. For these elements which have only a numerical designation, four digits are used for all cases but only the last two are shown in the figures, i.e. Figs. 16–40, since the first two correspond always with the designation of the figure, e.g. subset 1601 is shown as 01 in Fig. 13.

A large number of unidirectional impedance elements are used. The "black" rectifiers can be assumed to be of the selenium type or any type which does not require a small capacitance since they are used in relatively low frequency circuits. The "white" rectifiers can be assumed to be of the germanium type as they are used at relatively higher frequencies.

The detailed description will be divided into three main parts:

(1) Establishment of a talking connection between two subscribers.
(2) Release of an established connection.
(3) Miscellaneous features of the system.

1. ESTABLISHMENT OF A TALKING CONNECTION BETWEEN TWO SUBSCRIBERS

For the sake of convenience in referring to the drawings, again the establishment of a talking connection between two subscribers in the same group of 100 lines, will be described in detail but it is evident from the previous general description that there is no difference when the subscribers are in different groups of 100 lines.

1.1. SWITCHING OPERATION FROM THE MOMENT OF INITIATING A CALL UNTIL PRIMARY DIAL TONE IS RECEIVED BY THE CALLER

This will be described more particularly with reference to Figs. 6, 7, 8 and 9 covering the general lay-out, and Figs. 16–23 showing the detailed circuits.

1.1.1. INSCRIPTION OF CALLING LINE'S LAST TWO DIGITS IN A FREE LINE SELECTOR MEMORY CASE (Setting of line selector on caller's line)

Referring to Fig. 16, a subscriber's set SS and the corresponding line circuit LC are shown. The subset SS is of conventional design, the only point worth noting is that the ringer 1600 is at one end connected towards ground. The subscriber line circuit LC will not be entirely described now, but only those parts will be explained which relate to the initiation of a call. Normally, when the handset 1601 is on the hook 1602, the subscriber's loop is open and accordingly a potential of +40 volts is impressed on the "b" conductor via resistance 1603, the primary winding 1604 of the line transformer 1605 and the rectifier 1606. This means that conductor $L_3$ leading to the line selector LS (Fig. 17) is also at +40 volts. Further, the conductor $L_1$ leading to circuit LSA (Fig. 18) is also at +40 volts since the condenser 1607 will have been charged through resistors 1603 and 1608 in series. Conductor "a" is, of course, at −48 volts. As soon as the caller lifts the handset 1601, the loop will be closed in the usual way and current will now flow from +40 volts through resistor 1603, winding 1604, rectifier 1606, the loop circuit and winding 1609 to −48 volts. It is to be remarked that due to the presence of the rectifier 1610, the junction point between the latter and resistor 1603 will be clamped to ground potential, the resistance 1603 being such that it tends to go below ground potential. This potential will therefore be the one now present on conductor $L_3$. Also, due to the aforesaid point being at ground potential condenser 1607 quickly discharges to ground potential through the low impedance path afforded by the rectifier 1611, shunting resistor 1608. Accordingly, conductor $L_1$ will also be at ground potential. While the potentials of conductors $L_1$ and $L_3$ have thus changed, the potential of the speech conductor $L_4$ remains, of course, at +15 volts.

Assuming, for the sake of clarity, that line No. 19, within the group No. 11, is calling, the change of potential at conductor $L_1$ will cause a current to flow in resistor 1800 which is part of a gate 1801 corresponding to the subscriber's line No. 19 (Fig. 18). Several of such gates are shown to illustrate the complete set of 100 gates for all the lines within the group, this set forming the electronic call detecting switch CDS. As shown, the gate 1801, apart from the resistor 1800, comprises two series rectifiers 1802 and 1803 which lead to a gating circuit $G_1$. It will be appreciated that the series rectifier 1803 is common to ten circuits, corresponding to subscribers having the same tens digit, i.e. 1. The junction point of resistor 1800 and rectifier 1802 is connected to the busbar leading to pulse source $Nb_9$ via shunt rectifier 1804. The junction point of rectifiers 1802 and 1803 is connected to the busbar leading to pulse source $Na_1$ via shunt rectifier 1805. It will be seen that this arrangement constitutes an electronic switch, the latter junction point being the apex to which all rectifiers similar to 1802 are led from the various lines having 1 as tens digit. The junction point of rectifier 1803 and resistor 1806 constitutes the main apex of the electronic switch, to which a series of ten rectifiers such as 1803, one for each group of ten lines, converge. All the gates are normally blocked but are periodically unblocked in a repetitive cycle by means of the pulses, issued from the sources $Na_{1/10}$ and $Nb_{1/10}$. Such electronic switch arrangements have been described in our Belgian Patent No. 496,070.

The pulse sources $Na_{1/10}$, $Nb_{1/10}$ have not actually been shown as they do not form part of this invention, but the pulse shapes and time positions are shown in Fig. 41. Considering pulse source $Na_1$, it will be seen that it is normally at +30 volts, but that every 5 milliseconds, the potential drops from +30 volts to +10 volts during 0.5 millisecond. The other pulse sources have the same levels and the position and duration of the pulses have previously been explained and can be seen from Fig. 41.

It is seen that 110 different characteristic combinations are available from the pulse sources $Na_{1/10}$ and $Nb_{1/11}$, each corresponding with a different time position within the cycle of 55 milliseconds. They provide the control of the electronic call detecting switch CDS (Fig. 18) which is essentially a 100-position switch and requires, in fact, only 100 different characteristics which will be provided as time characteristics by the 20 pulse sources $Na_{1/10}$ and $Nb_{1/10}$. These sources are schematically represented on Fig. 19 as being connected to the corresponding busbars appearing on Fig. 18. In view of the relatively slow speed scanning detector which is used, selenium rectifiers are adequate.

While the potential of +40 volts still prevails at the lefthand side of resistor 1800, the potentials on the busbar connected to rectifiers 1804 and 1805 may vary below +40 volts, without affecting the blocked condition of the gate 1801, as no current is permitted to flow from the source of +30 volts through resistor 1806. When, however, the left-hand side of resistor 1800 (conductor $L_1$) is at ground potential, the current flowing in that resistor from right to left will be provided by one or both of the pulse sources $Na_1$ and $Nb_9$ as long as at least one of these is at +30 volt level, no current flowing through resistor 1806. When, both are at the +10 volt level, the current through resistor 1800 will be supplied from the +30 volt source through resistor 1806. This means that, when there is coincidence between a pulse from source $Na_1$ and a pulse from source $Nb_9$, current will flow from the +30 volt terminal to ground via resistor 1806, rectifiers 1803, 1802 and resistor 1800, thus unblocking the gate and opening a connection between conductor $L_1$ of line No. 19 and the gating arrangement $G_1$. Referring again to Fig. 41, the gate 1801 will therefore be opened during 500 microseconds every 55 milliseconds. The position of the time interval of 500 microseconds during which this occurs, may readily be calculated to be the 31st time interval of 500 microseconds, taking the interval of 500 microseconds during which sources $Na_1$ and $Nb_1$ simultaneously issue a pulse as the first.

The above clearly shows that as soon as a subscriber initiates a call, there will appear a negative pulse at the input of the gating circuit $G_1$ during a time interval of 500 microseconds within a period of 55 milliseconds which characterizes the calling subscriber's number in a group of 100 lines. This recurrent negative pulse will be of about 20 volts, if we assume that the value of resistor 1806 is at least twice the value of resistor 1800 and considering the potential levels shown.

Due to the inherent capacities of the rectifiers used for the electronic call detecting switch CDS which is part of circuit LSA, the negative pulse which reaches the input of the gating circuit $G_1$ will have suffered some distortion and it is therefore desirable to regenerate this pulse so as to obtain a fresh pulse more sharply defined. This will be performed by the regenerator $RG_1$ part of circuit LSA and also shown in Fig. 18.

Prior to being fed to the input of regenerator $RG_1$, the distorted pulse will first pass through the gating arrangement $G_1$ which as shown, comprises as main elements two triodes 1807 and 1808, shown here as a double triode whose cathodes are commoned to a negative potential via resistor 1811. The common cathode resistor 1811 is also used in the same way for the double triode 1809—1810 the first half of which, 1809, forms the gating arrangement $G_2$. All triodes therefore operate in cathode follower fashion. Considering triodes 1807 and 1808 whose plates are directly connected to positive potential, it will be seen that as long as none of the gates such as 1801 is unblocked at the moment considered, a potential of +30 volts prevails at the control grid of triode 1807 whereby the latter is conductive. On the other hand, the potential drop across resistor 1811 provides sufficient positive cathode bias for triode 1808 as well as for triodes 1809 and 1810 so that these last three tubes are in a non-conductive state. When as a result of the unblocking of the gate 1801, the potential at the grid of triode 1807 drops to +10 volts, the potential at the common cathode will drop by about 20 volts, which, by suitable design, will permit the triodes 1808, 1809 and 1810 to reach cut-off, triode 1807 remaining conductive. No change would therefore occur in the condition of tube 1810 which can be considered as the input tube of the regenerator circuit $RG_1$, if the negative pulse of 20 volts fed to the gating circuit $G_1$, were not accompanied by a positive start pulse from source $d_1$ which is fed to the control grid of triode 1810 through condenser 1812. The pulses produced by source $d_1$ are represented in Fig. 43, more particularly in Fig. 43(c). It will be seen that these pulses, which are in fact narrow timing pips having a duration of 25 microseconds, have a frequency of 2 kc./s. and are thus repeated every 500 microseconds. Further, they are located in the middle of the 500 microseconds interval, occupied by the negative pulse of 20 volts which may reach the input of the gating circuit $G_1$ when a call is originated. This pulse is shown in an ideal form in Fig. 43(e) and in its distorted form, due to the capacity of the rectifiers of the electronic call detecting switch CDS in Fig. 43(b). By locating the start pips from source $d_1$ in the middle of the 500 microsecond interval, one therefore ensures that despite distortion, the pulse shown in Fig. 43(b) is practically at its maximum, well defined, height.

The coincidence between the distorted pulse fed to the grid of tube 1807 and the start pip from source $d_1$ will cause tube 1810 to become conductive whereby the Eccles-Jordan or flip-flop circuit, formed by the two triodes 1813 and 1814 arranged as a double triode, will change from its original stable condition to its other stable condition. The original and normal stable condition of this circuit corresponds to tube 1813 conductive and tube 1814 non-conductive. This is positively ensured by means of pulses or so-called stop pips coming from source $d_2$ and the location of which is shown in Fig. 43(d). These negative stop pips are regularly applied every 500 microseconds to the control grid of triode 1814 via condenser 1815 and rectifier 1816. The reversal of the state of the Eccles-Jordan circuit will raise the potential at the anode of the tube 1813 and this rise of potential will be transmitted to the control grid of the beam power tube 1817 via a coupling condenser 1818. This beam power tube 1817 is operated in cathode follower fashion and as a result of the positive increase of voltage at its control grid, its cathode potential will be raised and this rise will be transmitted to all the memory cases such as $LSM_1$ (Fig. 20) and $LSM_{18}$ (Fig. 21).

This new condition, i.e. tube 1814 conductive, will persist during the last half of the 500 microseconds interval. At the end of this interval, the stop pips shown in Fig. 43(d) coming from source $d_2$, will so lower the potential at the control grid of tube 1814, that the latter will reverse to its nonconductive state whereby tube 1813 will again be conductive. Only the negative flank of the negative stop pips from source $d_2$ will be effective to bring about the reversal of the Eccles-Jordan circuit to its original stable condition, as the rectifier 1816 will prevent the positive flank of said stop pips to have any effect on the control grid of tube 1814.

We have assumed above that the 500 microseconds negative pulse reaching the control grid of tube 1807 was allowed to go through the gating circuit $G_1$. This gate may be used to prevent inscription of a number in a line selector memory case corresponding to an already engaged group selector memory case, as explained in the general description. No output pulse will issue from the gating circuit $G_1$ if a positive pulse is present at the grid of tube 1808. Irrespective of the resistance of a negative input pulse at the grid of tube 1807, this increase of potential at the control grid of tube 1808 will cause the latter to become conductive and it will prevent the common cathode potential from decreasing, which is, as we have seen, an essential condition for an output pulse to be delivered to the regenerator $RG_1$. At the same time, of course, tube 1807 will no longer be conductive.

Tube 1809 forming the gating arrangement $G_2$ is used in a way similar to tube 1808 and a positive pulse applied to the coupling condenser 1819 would cause the 1809 to become conductive and prevent the issuance of a pulse to the regenerator $RG_1$.

Due to the stop pips from source $d_2$ which restore the regenerator $RG_1$ to normal after the transmission of the pulse characterising the calling line, we have therefore a positive pulse occupying the last 250 microseconds of an interval of 500 microseconds, which is offered to all the memory cases $LSM_{1/18}$. Considering the first memory case $LSM_1$ shown in Fig. 20, it is applied to all the left-hand control electrodes of the twenty cold cathode tubes $LT_{1/10}$ and $LU_{1/10}$ which form the recording or memory elements of a memory case and of which only $LT_1$, $LT_{10}$, $LU_1$ and $LU_{10}$ are shown.

Normally, the potential at the cathode of tube 1817 is $-110$ volts and the positive pulse will bring it to $-50$ volts. However, the left-hand control grid of any of the cold cathode tubes of the memory cases will be unable to acquire this potential, unless the shunt rectifiers such as 2000 and 2001 offer a high impedance with respect to the resistor such as 2002. Rectifier 2000 together with resistor 2002 form the gating arrangement $G_3$.

As seen from Fig. 20, the left-hand side of all the rectifiers such as 2000 for memory case $LSM_1$ is commoned to the pulse source $Pc_1$. The pulse source $Pc_1$ is diagrammatically represented in Fig. 41 and is one of eighteen Pc sources, i.e. $Pc_{1/18}$, which issue positive pulses every 9.5 milliseconds with a duration of 0.5 millisecond. The various pulses are, however, staggered with respect to one another in a manner similar to that described for pulse sources such as Na. Therefore, during a cycle of 9.5 milliseconds, every 500 microseconds period will correspond with the occurrence of a pulse from one of the sources $Pc_{1/18}$ with the exception of the last period of 500 microseconds at the end of the 9.5 milliseconds period during which there will not be a pulse from any of the Pc sources. These Pc sources are used to characterise the memory cases just as the Na sources were used to characterise the tens digits of the subscribers lines, and the Nb sources the units digits of said lines.

The reason for using 19 Pc sources, which is the same as that for using 11 Nb sources, has already been explained in the general description, but although the 11th Nb source will be used to advantage for auxiliary purposes, there is no need for a 19th Pc source in the arrangement presently described and, accordingly, the last Pc source is $Pc_{18}$, whose pulses are separated from those of source $Pc_1$ by a 500 microseconds blank interval.

The potential of any Pc source is normally $-110$ volts and the occurrence of a positive pulse raises it to $-50$ volts.

Referring again to Fig. 20, in each of the circuits connected to the left-hand trigger electrodes of the cold cathode tubes $LT_{1/10}$ a second shunt rectifier such as 2001 is connected towards a corresponding one of a number of pulse sources $Pa_{1/10}$. Together with resistor 2002, rectifier 2001 forms the gating arrangement $G_4$ mentioned in the general description. Likewise, for each of the left-hand trigger electrodes of the cold cathode tubes $LU_{1/10}$ there is a second shunt rectifier connected towards a corresponding one of a number of pulse sources $Pb_{1/10}$. The pulses issued from these sources $Pa_{1/10}$ and $Pb_{1/10}$ correspond one to one with those from the respective sources $Na_{1/10}$ and $Nb_{1/10}$, with respect to frequency, duration and time position. They differ from the latter pulses only with respect to their voltage levels. Whereas the potential of the sources $Na_{1/10}$ or $Nb_{1/10}$ is normally $+30$ volts and drops down to $+10$ volts during each negative pulse, the potential of the sources $Pa_{1/10}$ and $Pb_{1/10}$ is normally at $-110$ volts and this potential rises to $-50$ volts during each positive pulse (Fig. 41).

The anodes of the cold cathode tubes $LT_{1/10}$ and $LU_{1/10}$ are shown to be connected to ground through individual resistors such as 2003 for the tube $LT_1$ which is shunted by a condenser such as 2004. The cathodes of the tubes $LT_{1/10}$ are connected to a voltage source of $-105$ volts through a common load resistor 2005 whereas the cathodes of tubes $LU_{1/10}$ are commoned to the same source through a common load resistor 2006.

Normaly, i.e. as long as no subscriber's number has been inscribed in the memory case, none of the cold cathode tubes is lit. Consequently, the anode of each tube is at ground potential whereas the cathode is at $-150$ volts. The potential difference of 150 volts existing between the anode and cathode of each tube is, however, insufficient to start a discharge between these two electrodes, unless it is initiated by a discharge in the auxiliary gap between the trigger electrode and the cathode. Such an auxiliary discharge may be obtained by a voltage difference across the auxiliary gap of at least 70 volts. While the cathode of tube 1817 is at $-110$ volts, the left-hand trigger electrode of each tube is also at $-110$ volts and the bias of 40 volts is not sufficient to start a discharge in the auxiliary airgap.

Though this will be hereinafter explained in full detail, it may already be observed that the right-hand trigger electrodes are also normally kept at a potential of $-110$ volts. In order that any cold cathode tube e.g. $LT_1$ in Fig. 20 may be lit, it is first of all necessary that the potential at the cathode of tube 1817 be raised above $-80$ volts but as already mentioned, this potential rise will only reach the left-hand trigger electrode of tube $LT_1$ if at the same time the shunt rectifiers 2000 and 2001 offer a high impedance. This means that in order that tube $LT_1$ in Fig. 20 may receive a positive pulse at its left-hand trigger electrode, it is necessary that there are coincident positive pulses of sufficient amplitude at the cathode of tube 1817 from pulse source $Pc_1$ and pulse source $Pa_1$.

In order that tube $LU_1$ may receive a positive pulse at its left-hand trigger electrode, it is necessary that there are coincident positive pulses at the cathode of tube 1817 and from pulse sources $Pc_1$ and $Pb_1$.

Therefore, whenever a pulse is delivered at the output of $RG_1$ it will be received in one particular memory case only, and in that particular memory case only two tubes can react. Exceptionally, it will not be received in a memory case if it corresponds with the blank intervals between pulses from sources $Pc_{18}$ and $Pc_1$, but this merely signifies that 55 milliseconds later the next pulse corresponding to the same calling line will be received in memory case 15.

It will be recalled that as a result of a subscriber initiating a call, the positive pulse at the output of $RG_1$ occurs within a 500 microseconds period corresponding to the coincidence of a pulse from a particular pulse source of the series $Na_{1/10}$ and a pulse from a particular pulse source of the series $Nb_{1/10}$, the combination of these two pulse sources being assigned to the calling subscriber and to him only in the group of 100. In the example chosen, the calling subscriber's numbers last two digits were 19, and sources $Na_1$ and $Nb_9$ are assigned to him. This means that to each subscriber's line is assigned the source of the $Na$ series corresponding to its tens digit and the source from the $Nb$ series corresponding to its units digit. This has been done for the sake of clarity, it being evident that other ways of assignment of pulse sources to subscriber's numbers are quite possible, provided there is one particular combination of one pulse source of each kind corresponding to each number of two digits and one only. For the chosen example it is evident therefore that the pulse transmitted as a result of subscriber No. 1119 calling, will be coincident with a pulse from source $Pa_1$ and one from $Pb_9$. Therefore, irrespective of the particular memory case which will accept this pulse, the latter will only be received by a tube such as $LT_1$ and by a tube such as $LU_9$. Supposing that the particular memory case which accepts the pulse is the case $LSM_1$ shown in Fig. 20 and that this case is available, i.e. that no tubes in it have previously been struck by the occurrence of a pulse at the cathode of tube 1817 while pulse source $Pc_1$ issued a pulse, tubes $LT_1$ and $LU_9$ will strike. The current which then starts to flow in tube $LT_1$ charges condenser 2004 and causes the anode potential to drop to about $-25$ volts, by suitable ratio between the resistance values of resistors 2003 and 2005. This current flows through the common cathode resistor 2005 causing the cathodes of all tubes $LT_{1/10}$ to assume a potential of about $-100$ volts. Likewise, the anode of the tube $LU_9$ (not shown) will drop to about $-25$ volts and the potential at the cathodes of all the tubes $LU_{1/10}$ is changed to $-100$ volts. This means that further pulses arriving at the cathode of tube 1817, even if they are allowed to reach the left-hand electrodes of some of the tubes in memory case $LSM_1$, will not be able to strike these tubes as their cathodes are biased to $-100$ volts, and it would require a rise of at least 80 volts from $-110$ to $-30$ volts at the trigger electrodes to overcome this bias. Therefore this memory case may be said to be no longer available until it will be released for further use by means later to be described.

As already explained before the pulse which is issued by the regenerator $RG_1$ as a result of subscriber No. 1119 calling, is repeated at regular intervals of $110 \times 0.5 = 55$ milliseconds. Therefore, if the first pulse issued as a result of a call should coincide with a pulse from a $Pc$ source corresponding to a memory case not available at that time, a second attempt will be made after 55 milliseconds. The second pulse, however, will be coincident with a pulse from another $Pc$ source and therefore be offered to another memory case. In such a way, successive attempts are made to record the subscriber's number in successive memory cases and these attempts will continue until a free memory case is found.

In the table below, the successive coincidences between pulses issued at the cathode of tube 1817 as a result of subscriber No. 1119 calling, with different pulses from the sources $Pc_{1/18}$ are given, together with the respective time positions in which these coincidences occur. It will be clear that the whole cycle of possible coincidences comprises $19 \times 110 = 2090$ periods of 500 microseconds and therefore has a duration of 1045 milliseconds. The time duration in which $Pa_1$, $Pb_1$ and $Pc_1$ simultaneously emits a pulse, has been taken as the first.

LINE NO. 19

($Na_1$ $Nb_9$)

| Coincidence number | Time period number | Coincident Pc source |
|---|---|---|
| 1 | 31 | 12 |
| 2 | 141 | 8 |
| 3 | 251 | 4 |
| 4 | 361 | (19) |
| 5 | 471 | 15 |
| 6 | 581 | 11 |
| 7 | 691 | 7 |
| 8 | 801 | 3 |
| 9 | 911 | 18 |
| 10 | 1021 | 14 |
| 11 | 1131 | 10 |
| 12 | 1241 | 6 |
| 13 | 1351 | 2 |
| 14 | 1461 | 17 |
| 15 | 1571 | 13 |
| 16 | 1681 | 9 |
| 17 | 1791 | 5 |
| 18 | 1901 | 1 |
| 19 | 2011 | 16 |

As will be seen from the table, the successive pulses issued by regenerator $RG_1$ as a result of subscriber No. 1119 calling, will be offered successively to all the memory cases (including the non-existing 19th memory case).

By means later to be described in detail, the pulses issued as a result of subscriber No. 1119 calling will be suppressed from the moment the pulse is inscribed in a memory case still available. It will be appreciated that the same process applies mutatis mutandis in case any other subscriber initiates a call. Moreover, if two or more subscribers make a call simultaneoulsy in the same group of 100 lines, these calls may be handled simultaneously without mutual interference taking in view that the call detecting switch scans these subscribers in distinct time intervals, while each pulse issued by the regenerator $RG_1$ will contain, by the time position in which it occurs, full and non-ambiguous information about the subscriber originating it. This information is then inscribed in a memory case which happens to be free at the moment, in the form of one tube lit out of 10 tubes corresponding to $LT_{1/10}$ and one tube lit out of 10 tubes corresponding to $LU_{1/10}$.

Assuming that the positive pulse from regenerator $RG_1$ was successfully fed into the memory case $LSM_1$ (Fig. 20), the anode potentials of tubes $LT_1$ and $LU_9$ (not shown), will thus be at $-25$ volts. These potential drops will be used to control the setting of the line selector LS as follows:

Considering tube $LT_1$, its anode is connected to a busbar leading to the control grid of tube $LTA_1$ (Fig. 19) through resistor 2007 and rectifier 2008. Similar connections exist for all remaining tubes of the series $LT_{1/10}$ as well as for those of the series $LU_{1/10}$, amplifying tube $LTA_1$ being the first of a series of 10 tubes $LTA_{1/10}$ and there being a second series of 10 amplifying tubes $LUA_{1/10}$ corresponding to the tubes $LU_{1/10}$ of all the memory cases. The junction point of resistor 2007 and rectifier 2008 is connected through rectifier 2009 to a particular busbar, one for each memory case such as $LSM_1$, to which pulses from the pulse source such as $t_1$ for memory case $LSM_1$ are fed.

This pulse source $t_1$ is one out of 18 pulse sources $t_{1/18}$ which are diagrammatically represented on Fig. 42 in the same way as previous pulse sources. The frequency of all these pulse sources is of 10 kc./s., corresponding to a period of 100 microseconds and the duration of each pulse is equal to $1/18$ of this period, i.e. 5.55 microseconds. The only difference between the various pulse sources is that their pulses occupy a different interval of 5.55 microseconds within the period of 100 microseconds as shown for pulse sources $t_1$, $t_2$ and $t_{18}$ in Fig. 42. The level of the sources $t_{1/18}$ is normally 0 volt and it drops to −25 volts during the pulse of 5.55 microseconds.

As shown, the use of rectifier 2009 prevents the negative pulses from source $t_1$ from affecting the potential at the junction point of rectifiers 2008 and 2009 as long as tube $LT_1$ is not lit. As soon as tube $LT_1$ is fired, the potential at the junction point of rectifiers 2008 and 2009 will be controlled by the pulse source $t_1$, since a current will flow from ground during the interval between the $t_1$ pulses through rectifier 2009 and resistor 2007 whereby the potential at the junction point of rectifiers 2008 and 2009 will remain at ground level between pulses, but on the other hand will drop to −25 volts during the 5.55 microseconds interval in which pulse source $t_1$ is at −25 volts. Thus, the rectifier-resistance arrangement in the anode circuit corresponds to the gating arrangement $G_5$ (Fig. 2). This change of potential at the junction point will be transmitted to the control grid of tube $LTA_1$ (Fig. 19) through the potentiometer arrangement comprising resistors 1900 and 1901, whereby the potential at said control grid which is normally of the order of +25 volts will be lowered to around +7 volts during the 5.55 microseconds interval corresponding to pulse source $t_1$ and this every 100 microseconds. This of course, considering memory case $LSM_1$ only, since negative pulses due to the anode drop might also be issued from other memory cases during other time periods of 5.55 microseconds, each such period corresponding to a particular memory case. Considering the busbar leading to resistor 1901, the rectifiers such as 2008 which are connected to that busbar, i.e. 18 in all, are used to decouple the corresponding circuits in different memory cases.

The power amplifying tubes such as $LTA_1$ (Fig. 19) are operated as cathode followers and while their anodes are directly connected to positive potential, their cathodes lead to busbars from which the line selector LS (Fig. 17) is controlled. For example, line No. 1119 and more particularly its speech conductor $L_4$ leads to a gate formed of two series rectifiers 1700 and 1701 oppositely poled as shown, and biassed at their midpoint through resistor 1702, the other end of which is connected to the line circuit of line No. 1119 through conductor $L_3$. The junction point of rectifiers 1700 and 1701 is further connected to one out of a first series of 10 busbars respectively leading to the cathodes of the tubes $LTA_{1/10}$. The connection to said busbar is made through the shunt rectifier 1703. A similar connection is made through rectifier 1704 to one of the bus-bars leading to one of the cathodes from the tubes $LUA_{1/10}$. These two bus-bars to which the shunt rectifiers 1703 and 1704 are connected are of course in correspondence with the number of the line i.e. for line No. 1119 rectifier 1703 leads to the cathode of tube $LTA_1$ while rectifier 1704 leads to the cathode of tube $LUA_9$ (not shown).

The gating arrangement 1700/1704 is triple-controlled and corresponds therefore to the three elementary series gates shown in Fig. 2 to represent line selector LS.

Normally, considering tube $LTA_1$, its cathode potential is +30 volts and the output impedance of the cathode follower is sufficiently low so as not to be influenced by variation of the load impedance formed by the gates which form the line selector. As soon as the control grid of tube $LTA_1$ is driven down to +7 volts, during an interval of 5.55 microseconds whose position within a cycle of 100 microseconds characterizes the energized memory case, i.e. $LSM_1$, the potential at the cathode will suffer a drop of some 20 volts and will thus reach +10 volts.

Considering the gate formed by the elements 1700/1704, when subscriber No. 19 called, the potential at conductor $L_3$ dropped from +40 volts to ground but this however did not permit the gate to be unblocked since the potential at the cathodes of tubes $LTA_1$ and $LUA_9$ (not shown) were still +30 volts whereby the series rectifiers 1400 and 1401 were still non-conductive. These two series rectifiers will only become conductive thus unblocking the gate, when both the cathode of tubes $LTA_1$ and $LUA_9$ will be at a potential of +10 volts at the same moment, i.e. during the same period of 5.55 microseconds within the cycle of a 100 microseconds. In such a case, the gate will be unblocked and the potential at the left-hand side of the common resistor 1705 which was previously +25 volts will drop to +15 volts, since there is not yet any speech modulation on the speech conductor $L_4$.

The manner in which the gate of the line selector LS has been controlled, means that the calling line No. 1119 will establish a path to the speech conductor $L_5$ leading to the primary link circuit LKP (Fig. 22) during the period of 5.55 microseconds (out of the cycle of 100 microseconds) which characterizes the memory case $LSM_1$ in which the designation of the last two digits of the calling line has been stored, and during this period only. For example, should lines No. 1117 and No. 1139 be already in a calling condition with their numbers (last two digits) inscribed in two other memory cases, one would have at a particular moment the cathode of tube $LTA_1$ down to +10 volts and the cathode of tube $LUA_9$ (not shown) would also be down to +10 volts at a particular moment within the 100 microseconds cycles, but these two moments cannot coincide and accordingly the fact that lines No. 1117 and No. 1139 are calling, cannot cause the gate in the line selector LS corresponding to line No. 1119 to be unblocked.

As described above, since it has been assumed that the last two digits 19 of the calling line No. 1119 were inscribed in the memory case $LSM_1$, during the first interval of 5.55 microseconds out of each period of 100 microseconds communication will be effected between the speech conductor $L_4$ of line No. 1119 and the multiplex speech conductor $L_5$ and this will be repeated at a frequency of 10 kc. per second.

To prevent further registration of the calling line's number as soon as it has been registered in one free memory case, use is made of the line selector code comparator LCC which is part of circuit LSB in Fig. 19.

Considering the cathode of tube $LTA_1$, it is connected to the control grid of tube 1902 through rectifiers 1903 and 1904 in series. The junction point of these two rectifiers which are oppositely poled is connected to one of the pulse sources $Na_{1/10}$ and more precisely to that one i.e. $Na_1$ corresponding to the tens digit No. 1 and hence to amplifying tube $LTA_1$. This connection to the pulse source $Na_1$ is made through rectifier 1905 which is poled in such a way that all three rectifiers 1903, 1904 and 1905 offer the same polarity at their star point. The cathode of tube $LTA_1$ is connected to −150 volts through resistors 1906 and 1907, the latter in shunt across rectifier 1903. As long as the cathode of tube $LTA_1$ and pulse source $Na_1$ are not simultaneously down to +10 volts, but at least one of them is at +30 volts, the star point of the rectifiers 1903/1905 remains at +30 volts, potential to which the control grid of tube 1902 is biased. Considering the 500 microseconds period during which the potential of pulse source $Na_1$ drops to +10 volts, then every time the cathode potential of tube $LTA_1$ drops from +30 volts to +10 volts during a period of 5.55 microseconds as a result of any memory case LSM being energized by a calling line whose tens digit is one, the junction point of rectifiers 1903 and 1904 will be allowed to drop to +10 volts and accordingly the control grid potential of tube 1902 will go down by some 20 volts. Rectifier 1905 is therefore the main element of the gating arrangement such as $G_6$ shown in Fig. 2. Normally, the tube 1902 whose cathode is biased to +30 volts is in a conductive state since its grid is also clamped to around +30 volts. The same applies for tube 1908 and there is accordingly a fairly large drop of potential in the anode resistor 1909 which is common to the tubes 1902 and 1908. When the control grid of tube 1902 is driven down to +10 volts via one of the decoupling rectifiers such as 1904, it will cease to conduct but the resulting change of voltage drop across resistor 1909 will not be sufficient to have any significance on the rest of the circuit. It is only when tubes 1902 and 1908 are cut-off simultaneously that a significant change in the voltage drop across resistor 1909 will be obtained. This is due to the fact that a large value of resistance is used for 1909 and that both the pentodes 1902 and 1908 are operated in the steep part of their characteristic.

In this manner, one will only obtain a significant change of potential at the anode of tubes 1902 and 1908 when their respective control grids are simultaneously, i.e. in the same period of 5.55 microseconds, driven down to +10 volts. It will be observed that the control grid of tube 1908 is connected to the various cathode circuits of tubes $LUA_{1/10}$ exactly in the same manner as the control grid of tube 1902 is connected to the cathode circuits of tubes $LTA_{1/10}$. Just as the gate circuits connected to the cathodes of tubes $LTA_{1/10}$ were respectively controlled by the pulse sources $NA_{1/10}$, the gate circuits connected to the cathodes of tubes $LUA_{1/10}$ are respectively controlled by the pulse sources $Nb_{1/10}$.

Hence, considering the example of line No. 1119 calling and number 19 stored in the first memory case $LSM_1$, the control grids of tubes 1902 and 1908 will be simultaneously driven down to +10 volts five times during the period of 500 microseconds which is characterized by the simultaneous occurrence of a 500 microsecond pulse from sources $Na_1$ and $Nb_9$. This is shown on Fig. 43(f), for time channel No. 15 but it will be appreciated that in the present example both tubes 1902 and 1908 are cut-off during a period of 5.55 microseconds which is the first period out of the cycle of a 100 microseconds in correspondence with the engagement of memory case $LSM_1$ assumed for this example. This will occur 5 times during the 500 microseconds period characteristic of the calling line No. 1119 and in this 500 microseconds period only.

During such period of 5.55 microseconds, the resulting positive pulse at the anodes of tubes 1902 and 1908 will be fed to the control grid of tube 1910 which is normally in a non-conducting state whereas tube 1911 is conducting. Both tubes have their cathodes at ground potential but as the control grid of tube 1911 is biassed to ground whereas that of tube 1910 is biased to −50 volts, the former tube is normally conducting. The tube 1910 which, like tube 1911 is a pentode, has its suppressor grid biased to ground, but also capacitively connected to the pulse source $d_2$, the so called negative stop pulses of which are represented on Fig. 43(d). These stop pulses, as previously described, are repeated every 500 microseconds and have a duration of 100 microseconds which starts right at the beginning of each period of 500 microseconds characteristic of a particular line. Hence, when the first out of the five short pulses of 5.55 microseconds is received at the control grid of tube 1910 in the form of a large positive impulse, the simultaneous occurrence of the stop pulse from $d_2$ which is a negative pulse of sufficient magnitude, will prevent tube 1910 from becoming conductive. However, the second of the control pulses of 5.55 microseconds, Fig. 43(f), will occur when the stop pulse from pulse source $d_2$ has disappeared and accordingly it will cause tube 1910 to become conductive during that short interval of time. Due to the capacitive coupling between the anode of tube 1910 and the grid of tube 1911, the latter will now become non-conductive. This will be repeated another three times during the 500 microseconds period characteristic of line No. 1119.

When tube 1910 becomes conductive, there will be a resulting negative pulse at its anode while at the same time as a result of tube 1911 being cut-off there will be a positive pulse at the anode of that tube. This positive pulse will for the present be disregarded, as its effects, already explained in the general description in relation to the release of the connection, will be more fully explained in a later part of this description. The negative pulse at the anode of tube 1910 will produce a change of electrical condition at the regenerator $RG_2$ which is part of circuit ISA shown in Fig. 18. This regenerator $RG_2$ comprises a flip-flop circuit of conventional design using two pentodes 1820 and 1821. The anode of tube 1910 leads to the control grid of tube 1820 through decoupling rectifier 1822 ($RE_1$ in Fig. 2) and coupling condenser 1823. Normally, the pentode 1820 is conductive whereas the pentode 1821 is not, due to the fact that the control grid of the latter is connected to the pulse source $d_2$ which emits negative stop pulses at regular intervals of 500 microseconds. As a result of the negative pulse transmitted from the plate of tube 1910 to the control grid of tube 1820, the flip-flop circuit moves to its other stable condition in which tube 1821 is now conducting whereas tube 1820 is cut-off. This change-over will therefore occur as soon as the second out of the five short pulses of 5.55 microseconds Fig. 43(f), is emitted and will persist during the remaining part of the characteristic interval of 500 microseconds, that is to say during a period from 300 to 400 microseconds in accordance with the location of the 5.55 microseconds pulse within the cycle of 100 microseconds i.e. the particular memory case or time channel chosen Fig. 43(g). At the end of the characteristic interval (for line No. 1119) of 500 microseconds, the negative stop pulse from pulse source $d_2$ will again make tube 1821 non-conductive and correspondingly tube 1820 conductive whereby the regenerator $RG_2$ is restored to its normal condition. During the interval from 300 to 400 microseconds during which the condition of $RG_2$ has been reversed, there will be a positive pulse issued at the plate of the tube 1820 which as preciously mentioned, is applied through coupling condenser 1819 to the control grid of tube 1809 in the gating circuit $G_2$. It will be noted that this pulse of variable duration in accordance with the time channel used will in any case be applied to the control grid of tube 1809 at least 5.55 microseconds before the start pip of 25 microseconds from pulse source $d_1$ located in the middle of the 500 microseconds time interval as shown in Fig. 43(c), is applied to trigger the regenerator $RG_1$.

The pulse of variable duration is therefore a negative means to selectively prevent an output pulse to pass through the gating circuit $G_2$ which means that the purpose of avoiding further registration of the calling number as soon as it is recorded in a first free memory case, i.e. $LSM_1$, has been fulfilled. The rectifier 1824 is connected between ground and the control grid of tube 1809 in order to avoid that the potential of this control grid should decrease below ground, and thus restore the D.C. component of successive pulses having a duration from 300 to 400 microseconds and which might occur in adjacent intervals of 500 microseconds.

1.1.2. SEIZURE OF A FREE PRIMARY REGISTER (PRIMARY DIAL TONE)

When, as a result of a call, the line selector LS (Fig. 17) is unblocked periodically to give access to the calling line, negative pulses will appear on the multiplex speech conductor $L_5$. These pulses will be fed to the primary link circuit LKP (Fig. 22). A clamping arrangement is located at the input of this circuit and comprises rectifiers 2200 and 2201, the latter being shunted by resistor 2202. Rectifier 2201 is biased to +25 volts which is the normal potential on conductor $L_5$ when there are no pulses. Rectifier 2200 is biased by means of the arrangement comprising the triode 2203 whose cathode is connected to said rectifier 2200 whereas its anode is connected to a suitable positive potential. The control grid of this triode is controlled by the pulse sources A− and B− which together with pulse sources A+ and B+ are represented on Fig. 42. Both the pulse sources A— and B— have a pulse repetition rate of 180,000 p.p.s. and a pulse duration of 1.5 microseconds. They are therefore repeated once for every channel time interval of 5.55 microseconds but whereas the pulses from source A— start approximately 1.02 microseconds after the beginning of each channel time interval, the pulses from the B— source end approximately 1.02 microseconds before the end of the channel time interval and therefore occupy a symmetrical position with respect to the pulses from the A— source. The levels of the A— and B— sources are normally +25 volts and this potential drops to ground for the duration of the negative pulses. The pulses from the sources A+ and B+ have exactly the same frequency, duration and phase as those from the A— and B— sources, but are complementary to the latter as far as the levels are concerned, i.e. their normal level is 0 volt which is increased to +25 volts during a pulse.

Referring again to Fig. 22, the control grid of tube 2203 is biased to +25 volts through resistor 2204 and is also controlled by the A— and B— sources through the rectifiers 2205 and 2206, polarized as shown. Therefore, during the time intervals in which there are no pulses from either the A or B sources, the rectifiers 2205 and 2206 are blocked and the control grid of tube 2203 is at +25 volts, whereby the cathode of this tube is substantially at the same potential. This means that the potential on conductor $L_5$ is clamped at +25 volts since it cannot go higher than this value in view of rectifier 2201 nor can it go lower in any significant way in view of the rectifier 2200. During a pulse from either of the A— or B— sources, the corresponding rectifier will become conductive and the control grid of the triode 1903 will reach ground potential whereby the corresponding drop of voltage at the cathode will now permit the potential on the speech conductor $L_5$ to decrease below +25 volts.

Hence, for a busy channel, one on which negative pulses occur, during the A part of the corresponding 5.55 microseconds period, the negative pulse will be able to reach the control electrode of the triode 2207 which together with triode 2208 forms a double triode with a common cathode connected to ground through resistor 2209 and whose common anode is connected to positive potential. The common cathode is also connected to a fixed source of +20 volts through the rectifier 2210 and resistor 2211. It is also connected to the A— source through rectifier 2212. When the A— source is at +25 volts, the common cathode will also be at that potential, but when it is at ground potential, the potential of the common cathode is able to follow that of the control grid of triode 2207 since rectifier 2212 will now be non-conductive. Hence, when the potential on the multiplex speech conductor $L_5$ drops from +25 volts to +15 volts, e.g. as a result of line No. 1119 calling, the potential at the common cathode will also drop to this value and rectifier 2210 becoming conductive, this potential drop is transmitted to the input of the amplifier $AMP_1$ schematically represented on Fig. 19. It will be recognised that the above described arrangement forms the gate $G_7$ (Fig. 2). Previously, rectifier 2210 had, of course, been blocked and this is also the normal condition for rectifier 2213. Rectifiers 2210 and 2213 together with resistor 2211 form a decoupling arrangement between the triode 2207 and the triode 2214, the latter fulfilling a purpose similar to the former but for pulses flowing from the multiplex speech conductor $L_6$ towards conductor $L_5$ under the control of the B source. It corresponds therefore to the gate $G_9$ (Fig. 2).

Due to the rectifiers 2210 and 2215 being biased to +20 volts through resistor 2211, the negative pulse reaching the input of the amplifier $AMP_1$ will be sliced whereby any modulation present will be relatively enhanced. The output stage of this amplifier, not shown in detail, is shown to be formed by a cathode follower comprising a beam power tube 2215 whose cathode, biased to negative potential through resistor 2216, is normally at +25 volts but as a result of an amplified negative pulse, will drop to +15 volts, assuming it is an unmodulated pulse from a calling line.

This pulse on conductor $L_5$ is also fed to the triode 2217 which together with triode 2218 forms a double triode which constitutes the gate $G_{13}$. The triodes 2219 and 2220, also arranged as a double triode constitute the gating circuit $G_{12}$. This gating circuit $G_{12}$ will help to discriminate between those pulses impressed on the speech channel $L_5$ and which correspond to time channels on which conversations are already established or occupied for connections which have at least passed the group selecting stage, from those pulses which correspond to time channels occupied for a connection which has not yet passed the group selecting stage. It is in the latter case only that a free primary register must be seized.

Seizure of a free primary register in the case of established conversations or connections having passed at least the group selecting stage, will be avoided due to a negative pulse of some 20 volts reaching the control electrode of the triode 2219, via conductor $L_7$, during the corresponding busy time channel of 5.55 microseconds. This will prevent the triode 2219 from becoming conductive even when the negative pulse of 25 volts coming from the A— pulse source is applied to the control electrode of the normally conductive triode 2220 through the coupling condenser 2221. This triode 2220 is normally conductive due to the favorable grid bias of +50 volts which is impressed on its control electrode through resistor 2222. On the other hand, triode 2219 is normally non-conductive since the potential at its control electrode is normally at around +30 volts only. The cathodes of the two tubes are commoned to negative potential through the resistor 2223. It is only when the potential at the control electrode of tube 2219 is at +30 volts, that it will be possible during the occurrence of a negative pulse from the A— source, to render tube 2219 conductive whereby its anode potential will drop and transmit a negative pulse coupling condenser 2224 to the control electrode of triode 2218.

The potential of +30 volts which is normally present at the control electrode of tube 2219 is impressed from conductor $L_7$ which comes from circuit GSB (Fig. 27) in the group selector stage and more particularly the group selector memory monitor GMM. When a memory case in the group selector stage i.e. $GSM_{1/18}$ is engaged, corresponding with an engaged time channel of 5.55 microseconds, a negative pulse of 20 volts and of 5.55 microseconds duration will be delivered on conductor $L_7$ and thereby prevent the opening of tube 2219.

For the example which we are now considering, i.e. line No. 1119 calling, the memory case $GSM_1$ corresponding to the time channel seized by this calling line and hence to the memory case $LSM_1$, is obviously free and during this time channel, i.e. the first (Fig. 42), the potential on the conductor $L_7$ will therefore remain at +30 volts and as soon as the potential of the A— source drops by 25 volts, the triode 2219 will become conductive and the negative pulse of 1.5 microseconds applied to the grid of the triode 2218 simultaneously with the negative pulse applied at the grid of the triode 2217 through coupling condenser 2225 will so decrease the potential drop across the common cathode resistor 2226 that a negative pulse will be transmitted to the gating arrangement $G_{15}$. Otherwise, the sole occurrence of a negative pulse at the control grid of tube 2217, e.g. for an established conversation, will not permit a significant variation of the cathode potential.

The gating arrangement $G_{15}$ comprises two triodes 2227 and 2228 arranged as a double triode. The cathodes of these two triodes are commoned to negative battery potential through resistor 2230 and normally the bias at the grid of tube 2227 is favorable with respect to the −20 volts bias on the grid of tube 2228 and so that the triode 2227 is conductive and the other is not. When the negative pulse is received at the grid of tube 2227, it produces a drop of potential at the common cathode which is impressed on the control grid of the beam power tube 2231 operated in cathode follower fashion. The cathode of this tube is biased to negative battery potential through resistor 2232 and the negative pulse appearing across this resistor during the A interval of the first time channel will be fed to all three primary registers in parallel via conductor $L_9$.

Figure 9:
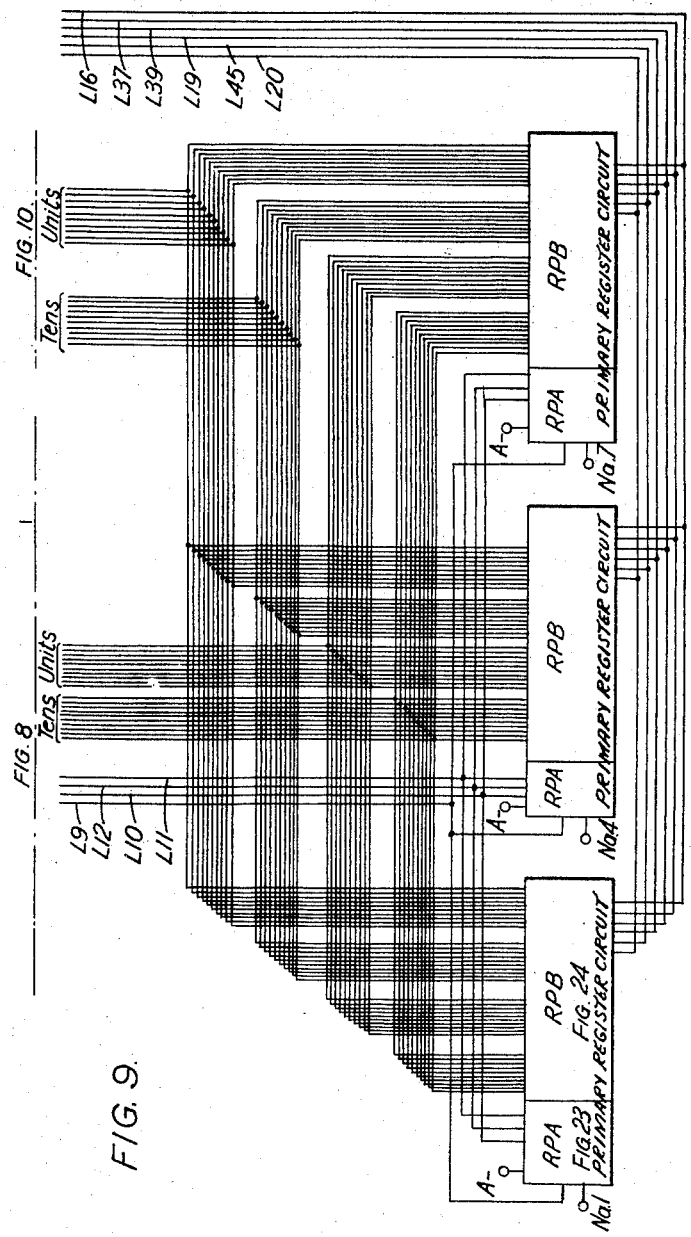
Figure 10:
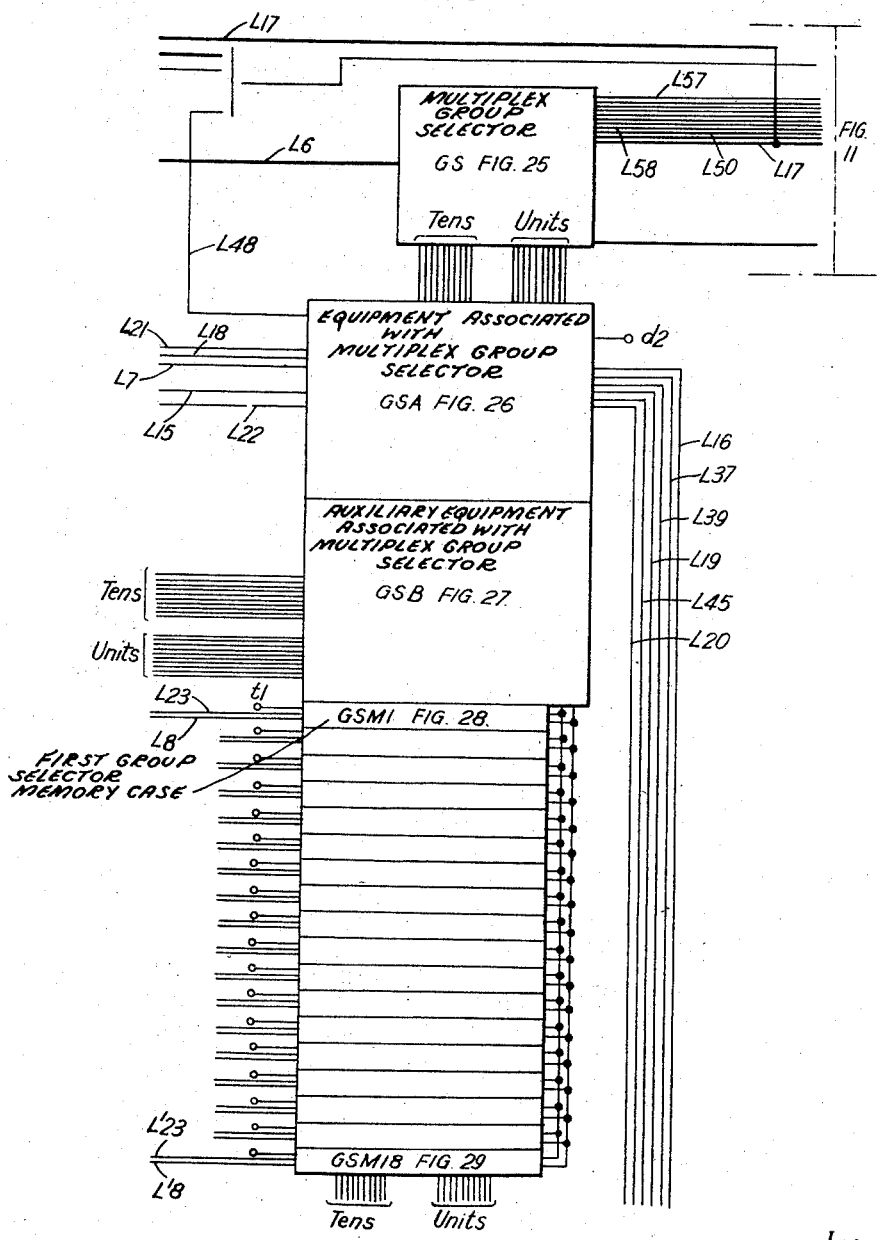
Figure 12:
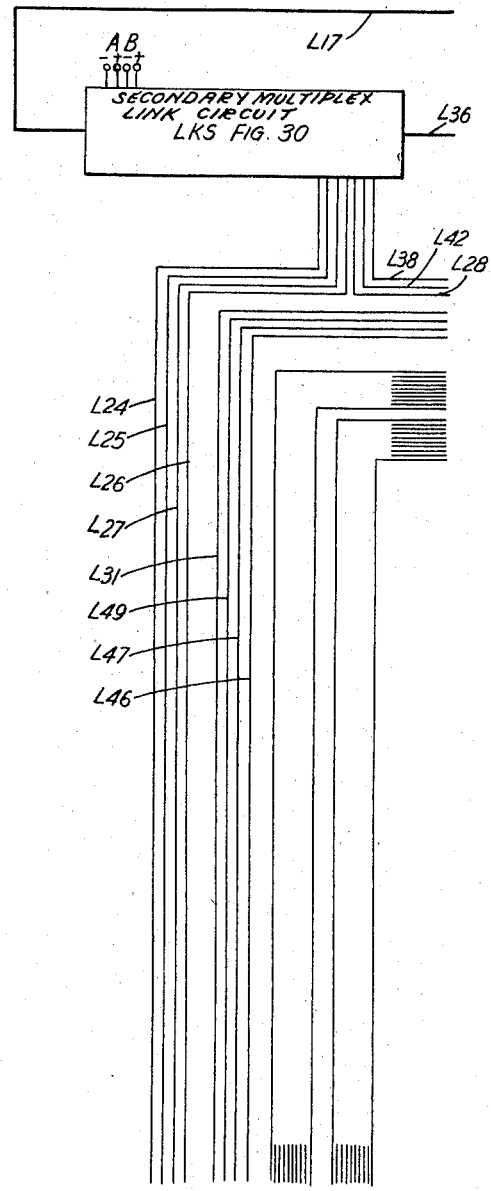
Figure 13:
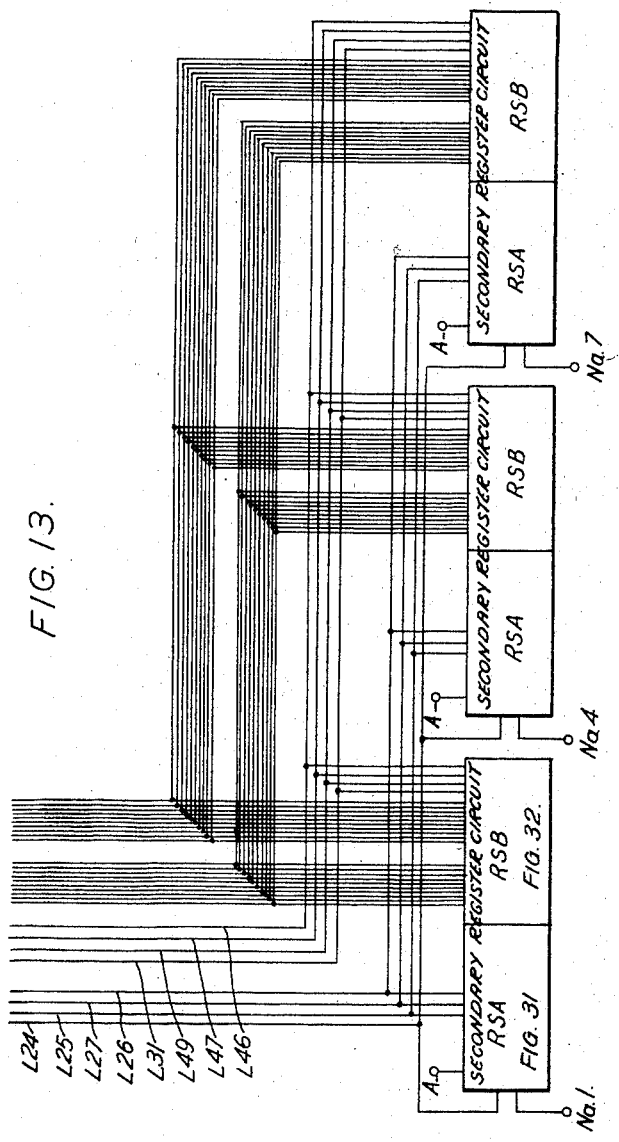
Figure 14:
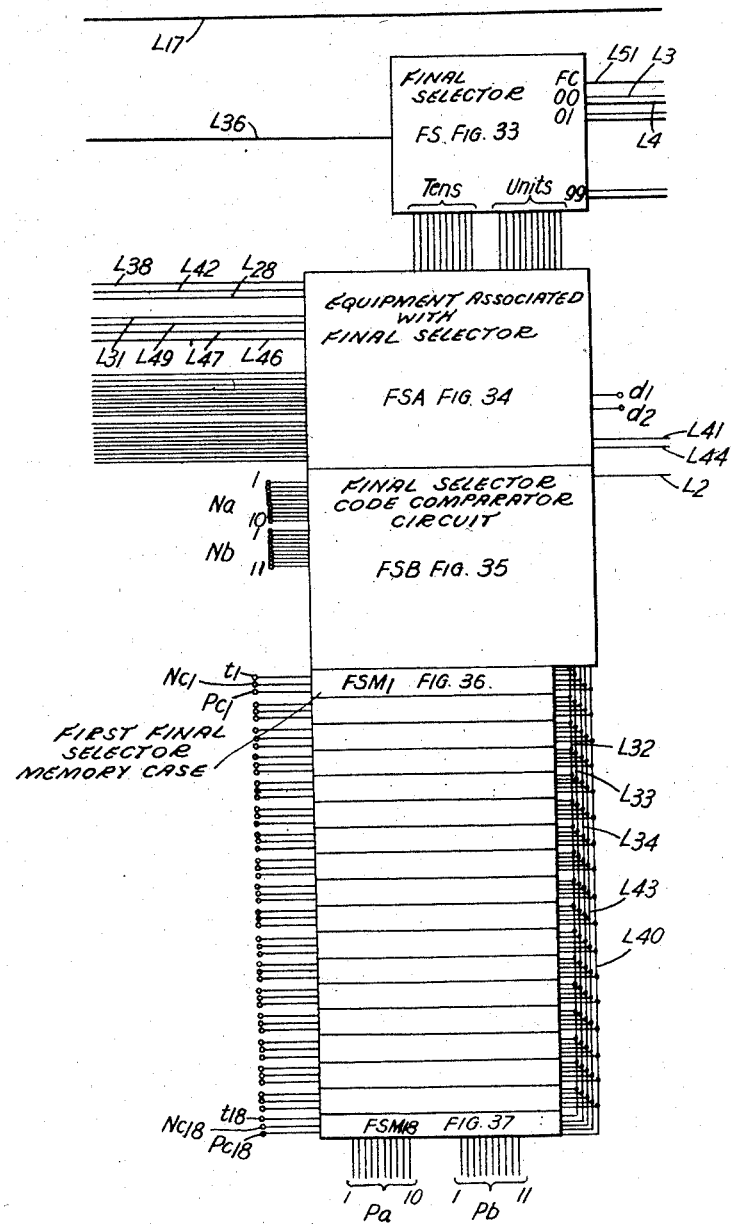
Figure 15:
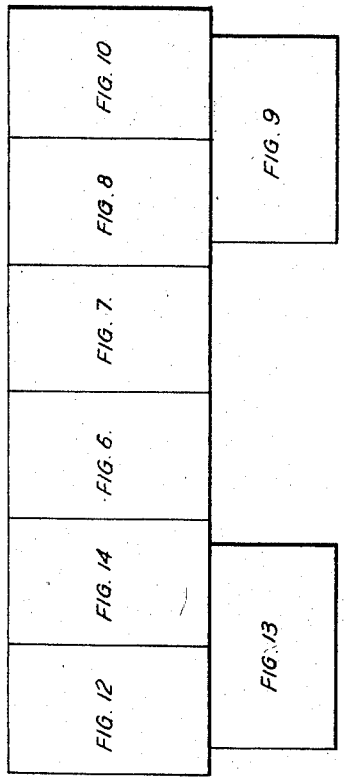

One of the primary registers is represented on Figs. 23 and 24 and is shown to comprise circuits RPA and RPB. The negative pulse from the cathode of tube 2231 will reach the control electrode of the triode 2300 in the circuit RPA (Fig. 23). The triode 2300 together with triode 2301 forms a double triode with a common cathode biased to −150 volts whereas their anodes are commoned to ground. The grids of both tubes are biased to −120 volts and the arrangement is therefore symmetrical. The grid of tube 2301 is connected to a particular one out of the Na sources whereas the corresponding grids in the other two registers (shown in Fig. 9) are connected to other particular Na sources. For example in Fig. 23, the grid of tube 2301 has been shown to be connected to source $Na_1$ and as shown in Fig. 9, the second register is fed from source $Na_4$ whereas the third is fed from source $Na_7$. This is in effect a distributing switch arrangement which permits to render the negative pulse on conductor $L_9$ effective at each register in succession. Thus, during a particular 500 microseconds interval every 5 milliseconds, the negative pulse on conductor $L_9$ will be permitted to effectively enter the register. The distributing arrangement is of course flexible since more registers can be used if required by traffic conditions. When the number of registers is appreciably less than the number of Na sources (eventually the sources Nb could also be used), an alternative arrangement would be to connect the control grid of the tube 2301 in each register to several Na sources so that no time would be lost in distributing the incoming pulse on conductor $L_9$ to a free register. For example, in Fig. 23, the control grid of tube 2301 could be connected to the three pulse sources $Na_1$, $Na_4$ and $Na_7$ whereas the corresponding control grid in the second register would be connected to the three pulse sources $Na_2$, $Na_5$ and $Na_8$ and the corresponding conductor in the third register to the pulse sources $Na_3$, $Na_6$ and $Na_9$. In that case there would be only one interval of 0.5 millisecond which would not be effectively used in distributing the pulse whereas otherwise there is a waste interval of 3.5 milliseconds per cycle of 5 milliseconds.

Assuming that the first negative pulse of 1.5 microseconds (A interval) is applied on conductor $L_9$ while the potential of source $Na_1$ is down to +10 volts, it is the first register detailed in Fig. 23 which will effectively receive the negative pulse on conductor $L_9$ and when both the grids of tubes 2300 and 2301 receive their negative pulse, the potential of the common cathode will drop and then only. The common cathode of tubes 2300 and 2301 is biased to −150 volts through resistor 2302 and the cathode of the triode 2303 is also biased to −150 volts through the same resistor. The double triode arrangement is recognized to constitute the gate $G_{17}$ (Fig. 2). As the control grid of tube 2303 is normally at −130 volts due to the resistor 2304 and the rectifier 2305, and in view of the normal potential drop across resistor 2302 caused by the currents in tubes 2300 and 2301, the triode 2303 is normally cut-off. When the potential at the common cathode drops, this is sufficient to render tube 2303 conductive whereby a negative pulse will appear at its anode and will be fed into the condenser 2306 connected to ground through rectifier 2307 polarized as shown. The anode of tube 2303 is connected to ground through resistor 2308 and during the leading flank of the negative pulse, the condenser 2306 is charged in a circuit extending from ground, rectifier 2307, condenser 2306, anode-cathode space of triode 2303, resistor 2302 to −150 volts. At the trailing flank, the triode 2303 is cut-off and due to the polarity of the rectifier 2307, condenser 2306 is made to discharge into the delay line 2309 in a circuit extending from ground through resistor 2308, condenser 2306, rectifier 2310, delay line 2309 and resistor 2311 to ground.

This delay line 2309 is arranged to produce a delay of 0.5 microsecond whereby a positive pulse will reach the supercontrol grid of the pentagrid 2312 through coupling condenser 2313. The pentagrid 2312 forms an essential part of a phantastron delay arrangement which is in itself well known. For a detailed description of the operation of such a phantastron, reference may be had to "Principles of Radar" by the members of the staff of the Radar School, Massachusetts Institute of Technology (2nd edition, chapter II, article 16). It suffices to note that as a result of this positive pulse at the supercontrol grid of tube 2312, the cathode potential, which is normally at around −100 volts, will suffer a sharp drop down to about −147 volts. The phantastron arrangement feeds into a second and similar delay device comprising the pentagrid 2314 and coupling to this second phantastron arrangement is obtained through the differentiating network comprising condenser 2315 and resistor 2316.

Referring to Fig. 44(a) the negative A pulse of 1.5 microseconds which occurs at the cathode of the triode 2303 has been represented and it is seen that one such pulse may occur during each channel time interval of 5.55 microseconds if these time channels are occupied by calling lines which are trying to seize a free register. For the example which we are considering, line No. 1119 calling, irrespective of the occurrence of such a pulse during the other time channels, there will be such a pulse during the first time channel which was assigned to line No. 1119 and this will evidently be repeated every 100 microseconds. It has been shown that only the trailing flank of this negative pulse is effectively fed into the delay line 2309 and this positive trigger pulse is shown in Fig. 44(b). Fig. 44(c) represents the positive trigger pulse at the output of the delay line 2309.

Referring to Fig. 23, the control grid of the triode 2317 which is arranged as a cathode follower and feeds into a second triode, also arranged as a cathode follower 2318 which together with the first forms a double triode, is normally biased to −110 volts due to the presence of rectifiers 2319 and 2320 which allow a flow of current from ground through resistor 2321. Since the cathodes of both the pentagrid tubes 2312 and 2314 are normally at −100 volts, the rectifiers 2322 and 2323 are normally blocked. As soon as the cathode potential of tube 2312 drops to −147 volts, rectifier 2322 will become unblocked and accordingly, the potential at the control grid of triode 2317 will drop to about −147 volts. At the end of the delay produced by the phantastron arrangement comprising tube 2312, the cathode of this tube will again rise to −100 volts and the potential at the control grid of triode 2317 would therefore go back to −110 volts. This is prevented however by unblocking the rectifier 2323 as soon as the rectifier 2322 is blocked by the restoring of the cathode potential of tube 2312 to −100 volts. This is performed by the second phantastron which receives a trigger impulse through the differentiating network 2315, 2316. The negative pulse produced across resistor 2316 when the cathode potential of tube 2312 drops, will be blocked by the rectifier 2324 whereas at the end of the delay produced by the first phantastron arrangement, the positive trigger pulse produced will be transmitted through rectifier 2324 and coupling condenser 2325 to the second phantastron arrangement comprising the tube 2314. Thus, as soon as rectifier 2322 is again blocked, rectifier 2323 takes over the control and the potential at the control grid of tube 2317 is kept down to −147 volts for a period which is equal to the sum of the delays produced by the two phantastron arrangements.

The negative pulse thus produced at the control grid of tube 2317 is represented in Fig. 44(d) and the normal delay produced by each phantastron arrangement has been chosen to be 48 microseconds whereby the total length of the negative pulse is of 96 microseconds. The reasons for using such a delay will be explained below.

The first effect of this negative pulse which is produced at the cathode of tube 2317 will be to lower the potential of the grid of triode 2303 to about −145 volts due to the current flowing from ground through resistor 2304 and rectifier 2326 to the cathode of tube 2317. Previously, the potential at the control grid of triode 2303 had been obtained from the −130 volts source through rectifier 2305, but now, this rectifier is blocked. As a result of the potential drop at the grid, it will no longer be possible to make the triode 2303 conductive when a negative A pulse arrives on conductor $L_9$ coincidently with source $Na_1$ delivering a pulse.

This action will occur within 2 microseconds after the negative A pulse of 1.5 microseconds had been allowed to enter into the delay line 2309. This was assumed to be a pulse on time channel No. 1 corresponding with the call originating by line No. 1119. During the second time channel, there might of course also be a negative A pulse which would be allowed to reach the triode 2300, while source $Na_1$ is still at +10 volts and delivers a pulse, assuming that the second time channel would be occupied by a calling line trying, as line No. 1119, to find a free register. As line No. 1119 has already seized the register shown in Fig. 23 by feeding its negative A pulse into the delay arrangement, the negative A pulse on the second channel and all other negative pulses which might follow in the other channels, should be prevented from entering the register and as this is achieved by the drop of potential at the control grid of tube 2303 two microseconds after the leading flank of the A pulse in the first channel, the blocking is thus performed more than 3 microseconds before the eventual negative pulse on the next channel might arrive. These eventual pulses will of course be directed to the remaining registers.

The triode 2318 is used in order to obtain sufficient power at the cathode, this being required in view of the relatively heavy load presented by the condenser 2327, and to separate this load from the rest of the circuit. At the leading flank of the 96 microseconds negative pulse which occurs at the cathode of tube 2318, the condenser 2327 will be charged and the junction point of rectifiers 2328 and 2329 will remain at −48 volts which is the potential biasing the first rectifier. It is seen that the arrangement comprising the condenser 2327 and the rectifiers 2328, 2329 is similar to that comprising the condenser 2306 and the 2307 and 2310 previously described. Hence, at the trailing flank of the 96 microseconds negative pulse, a positive pulse will reach the control grid of the triode 2330 which is arranged as a cathode follower. Therefore, across the resistor 2331 a positive pulse will appear at the end of the 96 microseconds negative pulse shown in Fig. 44(d).

This positive pulse will thus appear on conductor $L_{10}$ and through the coupling condenser 2233 will be applied to the control grid of the triode 2228. This will prevent the potential across the cathode resistor 2230 to go down when the negative A pulse corresponding to a calling line such as No. 1119 is impressed on the control grid of tube 2227. This means that the next negative A pulse on the first time channel seized by line No. 1119 will no longer be able to reach conductor $L_9$ and be fed to other registers, which would otherwise be seized unnecessarily as soon as their $Na$ source permits entrance of the negative A pulses from conductor $L_9$. Since this is prevented 98 microseconds after the first negative A pulse reached the register shown in Fig. 23, complete safety is ensured. This positive pulse at the end of the 96 microseconds interval has a duration of 100−96=4 microseconds since, as will be described, the cycle repeats itself periodically with a period of 100 microseconds.

This positive pulse of 4 microseconds is also applied to the control grid of the triode 2332 which together with the triode 2333 forms a double triode. Both cathodes of these triodes are commoned to −150 volts through the cathode resistor 2334 and negative pulses from the A− source (Fig. 42) are regularly applied every time channel interval, i.e. 5.55 microseconds, to the control grid of triode 2333. Due to the fact that the control grid of triode 2333 is biased at +20 volts through resistor 2335, whereas the potential normally developed across the cathode resistor 2331 is around 110 volts, the triode 2333 normally conducts whereas the triode 2332 does not, since its control grid is at −150+110=−40 volts. The pulses from the A− source alone are not effective to change the condition of tube 2332, but when the 4 microseconds positive pulse is delivered at its control grid, this together with the negative pulse from source A− applied to the grid of tube 2333 will permit the triode 2332 to become conductive.

As a result, the potential drop produced across the plate resistor 2336 will now be impressed, as a negative pulse having a duration of 1.5 microseconds, on the delay line 2309 through the arrangement comprising the condenser 2337 and the rectifiers 2338 and 2339. This arrangement of condenser and rectifiers is identical to the arrangement of condenser 2306 and rectifiers 2307, 2310. Positive trigger pulses will be fed into the delay line 2309 from tube 2332 instead of from tube 2303 which is no longer able to deliver pulses. Thus, 100 microseconds after the first negative A pulse was fed into the delay arrangement comprising tubes 2312 and 2314, a similar negative A pulse will be fed to this delay arrangement from a local source and still in the first time channel occupied by the calling line No. 1119. Accordingly, the delay arrangement comprising the phantastron tubes functions in an autonomous manner. The purpose of injecting the pulses from the A− source which are effective every 100 microseconds is to synchronize the delay arrangement and avoid that small delay errors in the phantastron should be cumulative.

The positive pulse of 4 microseconds, apart from being fed on conductor $L_{10}$ to the link circuit LKP and to the triode 2332 is also fed to the control grid of the triode 2340 which together with triode 2341 forms a double triode which functions exactly in the same manner as the double triode arrangement 2332, 2333, thus as a coincidence gate. The negative A pulse which was forwarded to the control grid of triode 2227 (for a calling line) was also sent to the control grid of the beam power tube 2234 which is used to deliver sufficient energy through conductor $L_{12}$ from the cathode resistor 2235, to the control grid of the triode 2341. The negative impulse on conductor $L_{12}$ is not of its own sufficient to effect a change of condition for the triode 2340, but when this negative A pulse is accompanied by the positive pulse of 4 microseconds at the control grid of tube 2340, this tube will start to conduct and a negative pulse will be impressed at the grid of the triode 2342.

Referring to Fig. 44, the reason for each of the phantastron delay arrangements producing a delay of 48 microseconds, will now be clearly appreciated. With a total phantastron delay of 96 microseconds, the 4 microseconds positive pulse shown in Fig. 44(d) starts exactly 98 microseconds after the leading flank of the negative A pulse in time channel No. 1 which has been chosen by the line No. 1119. Hence, considering the coincidence gates formed by the double triode arrangement 2340/2341 or 2332/2333, the 4 microseconds positive pulse can only meet with a negative A pulse of 1.5 microseconds in the time channel No. 1 assigned to the calling line No. 1119, and it can never coincide with a similar A pulse of 1.5 microseconds in another time channel. Comparison between Figs. 44(a) and 44(d) also shows that there is a tolerance of ±2 microseconds for the 96 microseconds nominal delay provided by the phantastron arrangements.

It will be recognized that the double triode 2340/2341 corresponds to the gate $G_{19}$ already shown in Fig. 2.

As a result of the negative pulse of 1.5 microseconds delivered to the grid of the triode 2342 in the A interval of time channel No. 1, a corresponding negative pulse will appear across the cathode resistor 2343 and will be applied through the delay line 2344 to the primary winding of a transformer 2345 whose secondary winding is biassed to —40 volts. The delay line 2344 produces a delay of 2 microseconds which, as shown in Fig. 42, permits to transfer the negative pulse of 1.5 microseconds in the A position of time channel No. 1, into a pulse of equal duration, also in time channel No. 1, but in the B position. Further, the windings of the transformer 2345 are so arranged that a positive pulse is produced across the secondary winding and this is fed through condenser 2346 to the control grid of a pentode 2347 whose cathode is connected to —150 volts while its control grid is biassed to —170 volts through grid resistor 2348. The suppressor grid of this pentode is normally biassed to —150 volts, current flowing from ground through resistor 2349 and rectifier 2350. The screen grid is biassed to —48 volts. The anode of the pentode 2347 is connected through conductor $L_{11}$ to the primary link circuit LKP and in particular to a source of +40 volts through the plate resistor 2236. In view of the potential at its grid, the pentode 2347 is normally non-conductive in the absence of positive pulses.

Referring to Fig. 22 and considering the rectifiers 2237 and 2238, one sees that those are normally non-conductive since on the one hand the potential on the speech conductor $L_6$ can never go higher than 25 volts which is lower than the +40 volts potential impressed through the resistor 2236, while the rectifier 2238 is biassed to +15 volts through the secondary winding of the transformer 2239 to the primary winding of which the source of dialling tone $DT_1$ is connected.

As soon as the positive pulse in the B position of time channel No. 1 reaches the control grid of the pentode 2347, the latter starts to draw current during 1.5 microseconds every 100 microseconds and accordingly the potential drop across resistor 2236 is sufficient to unblock the rectifiers 2237/2238 whereby the potential of the speech conductor $L_6$ will be lowered to +15 volts being clamped to that potential by the action of rectifier 2238. As this is happening in the B position of a time channel, the action of the double sided clamping arrangement formed by the rectifiers 2240 and 2241 shunted by the resistor 2242, and which corresponds identically to the combination 2200, 2201 and 2202, is ineffective to clamp the potential on the speech conductor $L_6$ to +25 volts. The potential at the speech conductor $L_6$ cannot of course go below 15 volts since even when it is conductive the pentode 2347 still offers a high impedance with respect to that of the secondary winding of the transformer 2239. The above described arrangement corresponds to the gate $G_{18}$ already shown in Fig. 2.

Negative pulses will regularly appear every 100 microseconds in the B position of time channel No. 1 assigned to calling line No. 1119. These will be modulated by the dialling tone source $DT_1$. The negative pulses in the B position will be allowed to pass the gating arrangement formed by the triode 2214 which is identical to the gating arrangement provided by the triode 2207 and previously explained. For the triode 2214, the gate will of course be unblocked by means of the B— pulse source. The pulses will reach the input of the amplifier $AMP_1$, no passage being afforded by the triode 2207 in the B position, and will be reproduced at the output of the amplifier wherefrom they will be sent through the gate formed by the two oppositely poled rectifiers 2243, 2244 to the speech conductor $L_5$. The junction point of the rectifiers 2243 and 2244 is controlled by the B+ pulse source through rectifier 2245 and it is only during the B interval that the gate will be opened thus allowing the passage of the modulated pulses in the B position to speech conductor $L_5$. This arrangement is recognized to correspond to the gate $G_8$ shown in Fig. 2.

The double sided clamping arrangement 2200, 2201 and 2202 is of course ineffective during the B position and the dialling tone pulses will thus be directed to the line circuit LC (Fig. 16) of line No. 1119, through conductor $L_4$. In the line circuit, these pulses will be demodulated by the low pass filter formed by the condenser 1612 and the transformer 1605. The resulting low frequency dialling tone will thus appear on the line conductors $a$ and $b$. This subscriber can now start dialling.

1.2. SWITCHING OPERATIONS FROM PRIMARY DIAL TONE TO SECONDARY DIAL TONE

Referring to Fig. 23, the negative pulse which was produced by the phantastron arrangement comprising the pentagrid tubes 2312 and 2314 produced a negative pulse at the cathode of the triode 2317 and this pulse is also applied to the control grid of triode 2351 which together with triode 2352 forms a double triode arranged as an anti-coincidence gate. Both cathodes are connected to —150 volts through resistor 2353 and the grid of triode 2352 is biassed to —90 volts through grid resistor 2354. Triode 2352 is normally conductive as it has a more favourable bias than triode 2351. At the end of the 96 microsecond negative pulse produced by the phantastron negative delay arrangements, the potential at the control grid of triode 2351 will rise but it is only when a negative pulse from the A— source reaches the grid of triode 2352 through coupling conductor 2355, that the combined action will result in making tube 2351 conductive. Prior to the 96 microsecond pulse, i.e. before the seizure of the primary register, tube 2351 was of course rendered conductive every 5.55 microseconds, for a period of 1.5 microseconds in the A interval.

Therefore, when the primary register has been seized there will appear at the anode of tube 2351 a negative pulse only in the A position of time channel No. 1 and this will reach the control grid of the triode 2356 which, with triode 2357, forms a double triode. The cathode of tube 2356 is connected to —150 volts through resistor 2358 while the cathode of the triode 2357 is connected to ground through condenser 2359. Both cathodes are joined by the rectifier 2360 poled as shown. If no pulses reach the grid of triode 2356, the cathode potential of this tube is somewhat above ground, and condenser 2359 is not charged. On the other hand, tube 2357 is not conductive, its control grid being normally biassed to —40 volts through the secondary winding of transformer 2345. Rectifier 2360 is blocked as the cathode potential of tube 2356 is of +5 volts. Every time negative pulses are emitted by the A— source, when the primary register is still free, the rectifier 2360 becomes conductive due to the cathode potential of tube 2356 dropping from 5 volts to —25 volts. Hence, relay $Isr_1$ included in the plate circuit of tube 2361 cannot operate at that stage, the grid of tube 2361 being driven beyond cut-off due to condenser 2059 being charged to —25 volts.

Considering now the state of affairs as a result of the application of negative pulses in the A position of time channel No. 1 only, i.e. every 100 microseconds (as a result of the seizure of the register), at the grid of triode 2356 and of positive pulses in the B position of time channel No. 1 at the control grid of triode 2357 and referring to Fig. 45, the negative pulses in the A position are shown at (a) and have an amplitude of 30 volts while the positive pulses in the B position are shown at (b) and have an amplitude of 40 volts.

When the negative pulse in the A position ceases to occur every 5.55 microseconds at the grid of tube 2356, there will be an interval of 100 microseconds between the last A pulse part of the series at 180,000 p.p.s. and the next A pulse first of the series of 10,000 p.p.s. and located in the first time channel. Although the cathode potential of tube 2356 will go up to +5 volts during that interval of 100 microseconds, condenser 2359 remains charged to —25 volts as rectifier 2360 is now blocked.

Two microseconds after the first A pulse in the first time channel, part of the series at 10,000 p.p.s., the positive pulse in the B position will cause the potential at the cathode of the triode 2357 to rise since the tube 2357 becomes conductive as a result of this positive pulse of 40 volts being applied to its grid. By now of course the potential at the cathode of tube 2356 is back at +5 volts and the potential at the cathode of tube 2357 during the pulse in the B position will thus be clamped to +5 volts due to the action of rectifier 2360. When the positive pulse in the B position also disappears, the control grid of tube 2361 remains at +5 volts, condenser 2360 remaining charged to that value.

Thus, as the first pulse in the P position of time channel No. 1 is received, the control grid of tube 2361 reaches +5 volts and relay $Isr_1$ starts to operate. 98 microseconds later, the negative pulse in the A position of time channel No. 1 will decrease the grid potential of triode 2061 to around —25 volts but if this negative pulse in the A position of time channel No. 1 is immediately followed two microseconds afterwards by a positive pulse in the B position of this time channel, the current in the winding of relay $Isr_1$ is not interrupted for a sufficient time to interrupt the energization process of relay $Isr_1$. The potential changes at the grid of tube 2361 are indicated in Fig. 45(c). The operation of relay $Isr_1$ causes relay $Lbr_1$ to be operated through make contact $is_{11}$.

1.2.1. DIALLING INTO PRIMARY REGISTER

As the calling subscriber starts to dial, the opening of the loop at the inpulse contacts 1613 will cause the potential at conductor $L_3$ to return to +40 volts and accordingly the gate of line No. 1119 in the line selector LS will be temporarily blocked during the break periods, whereby the negative pulses which were transmitted on the speech conductor $L_5$ will disappear. Hence, as there is no longer a negative pulse applied in the A position of time channel No. 1 at the control grid of tube 2217, there will no longer appear a negative pulse at the grid of the beam power tube 2234 and hence on conductor $L_{12}$. Accordingly, the positive pulses of 4 microseconds at the grid of tube 2340 will not find a coincident A pulse and a negative pulse in the A position of time channel No. 1 will no longer reach the control grid of triode 2342. This will result in the disappearance of the corresponding pulses in the B position of time channel No. 1, whereby the negative pulse in the A position of time channel No. 1 which is of course still supplied in the register from the plate of tube 2351 will be successful in de-energizing relay $Isr_1$ as it lowers the voltage at the control grid of tube 2361, to about —25 volts and as there is no succeeding pulse in the B position, condenser 2359 retains its charge of —25 volts and cuts off tube 2361 (see Fig. 45(c)). Accordingly, at the first opening of the loop for the first pulse of the first digit dialled by the calling subscriber, relay $Isr_1$ releases and thereby establishes an operating circuit for the slow release relay $Lmr_1$ through break contact $is_{11}$ and make contact $lb_{11}$. Relay $Lbr_1$ is sufficiently slow releasing to remain attracted during the openings of the loop effected by dialling. The operation of relay $Lmr_1$ together with that of relay $Lbr_1$ causes an operating circuit to be established for relay $Afr_1$ in circuit RPB (Fig. 24) through break contact $bf_{11}$ and make contacts $lm_{11}$ and $lb_{12}$. As a result of the energization of this last relay a negative potential of 200 volts is now impressed on the suppressor grid of the pentode 2347, through make contact $af_{11}$ and rectifier 2350 becomes non-conductive. As a result, the pentode 2347 will cease to supply current pulses in time channel No. 1 to resistor 2236 whereby dial tone modulated pulses will no longer be sent towards subscriber No. 1119.

Before relay $Isr_1$ had been operated, the right-hand electrode of condenser 2400 was kept at ground potential through break contact $is_{11}$, the rectifier 2401 and contact $bf_{12}$, whereas the left-hand electrode is biassed at —48 volts through resistor 2402. Any rapid change of the left-hand electrode potential will be transmitted through the various condensers such as 2403 to the various trigger electrodes of the tubes such as $PT_1$ of the series $PT_{1/10}$.

When relay $Isr_1$ energizes, the condenser 2400 is able to discharge through resistor 2404 and the low impedance afforded by the rectifier 2405 in shunt across resistor 2402. The purpose of this last resistor is to maintain a definite bias on the common lead leading to the various trigger electrodes, so as to avoid that this lead should pick up spurious potentials since it is at high impedance level.

At the first break produced by the dial, relay $Isr_1$ releases and the flow of current from ground to —48 volts through rectifier 2401, break contact $bf_{12}$ and resistor 2404 instantaneously raises the potential at the right-hand side of condenser 2400 by 48 volts. This 48 volts positive pulse reaches the trigger electrodes of all the tubes of the series $PT_{1/10}$, through condenser 2400 and the condenser such as 2403 and the resistors such as 2406. However, only the first tube $PT_1$ will fire, as that particular tube only has been given an artificial bias of some 50 volts between its trigger electrode and its cathode so that when the 48 volts pulse arrives, the trigger gap will fire. This artificial bias of 50 volts is provided by means of the potentiometer arrangement formed by resistors 2407 and 2408 which are joined over break contact $af_{12}$. Resistor 2407 is at its other end connected to +200 volts through make contact $lb_{13}$ and resistor 2409, while resistor 2408 is at its other end connected to —150 v. The cathode of each tube of the series $PT_{1/10}$ as well as of the series $PU_{1/10}$ is connected to —150 volts through a parallel combination of a resistor and a condenser such as 2410 and 2411 for tube $PT_1$. As shown, rectifier 2412 clamps the potential at the $lb_{13}$ contact to a value not higher than ground. The anodes of all the tubes such as $PT_1$ of the series $PT_{1/10}$ are connected to the source of +200 volts through the common resistor 2409, make contact $lb_{13}$, and the individual parallel resistance and capacitance combination such as 2413 and 2414 for tube $PT_1$. Successive tubes are coupled from cathode to trigger electrode by a resistor such as resistor 2415 coupling tubes $PT_1$ and $PT_2$.

By means of this coupling resistor 2415, as soon as a cold cathode tube has been fired, the bias developed across its cathode resistor will be used as priming potential for the succeeding tube. Hence, if we assume, for example, that the first digit sent by the calling subscriber is 2, when relay $Isr$ relates for the second time, the impulse of 48 volts transmitted to condenser 2416 will, together with a priming potential of 40 volts across resistor 2410, succeed in firing tube $PT_2$. As soon as this tube fires, there will be a surge of current through resistor 2409, condenser 2417 decoupling resistor 2418, the main gap of tube $PT_2$ and condenser 2419 decoupling resistor 2420, a circuit being established from +200 to —150 volts. Due to the decoupling action of both the condensers 2419 and 2417, the initial surge of current will be sufficient to lower the potential at make contact $lb_{13}$ in such a way that tube $PT_1$ will be extinguished. The action of the anode condenser is in fact twofold, as it (2417) not only permits a large initial current when tube $PT_2$ fires, so that the potential at make contact $lb_{13}$ is sufficiently lowered, but it (2414) also permits to transmit this lowering of potential directly to the anode of tube $PT_1$.

It is to be remarked that as soon as relay $Lmr_1$ is operated, during the first break; this causes the energization of relay $Afr_1$ which at its make contact $af_{12}$ breaks the connection between the potentiometer resistances 2407 and 2408 whereby the artificial priming potential on the first tube of the series $PT_{1/10}$, i.e. $PT_1$, is withdrawn. This is necessary because otherwise, if three or more impulses are received, when the third one appears across resistor 2402, and since at that moment tube $PT_1$ is extinguished, both the tubes $PT_1$ and $PT_3$ (not shown) are primed, the first artificially and the second by tube $PT_2$ and there would therefore be uncertainty as to which tube would fire.

As it had been assumed that the particular group of 100 subscribers in which the calling subscriber No. 19 is located, is group No. 11, the full number of the calling subscriber is No. 1119. Since, as previously mentioned, an example is chosen in which the called subscriber is in the same group as the calling subscriber, solely for the sake of clarity in referring to the drawings, the calling subscriber will thus dial No. 11.

Accordingly, for the first digit, the 1000's digit, there will be only one impulse which will cause tube $PT_1$ to fire, whereafter relay $Isr_1$ will return to its attracted position for a time (interdigital time) sufficient to cause the release of the slow release relay $Lmr_1$.

The release of relay $Lmr_1$ after reception of the 1000's digit, will cause the operation of relay $Bfr_1$ which was previously short-circuited at make contact $lm_{11}$ and it is now able to operate in series with relay $Afr_1$ through make contact $af_{13}$ and make contact $lb_{12}$, the holding circuit for relay $Afr_1$ having been established as soon as it operated, through the winding of relay $Bfr_1$.

At make contact $bf_{11}$, an operating circuit is prepared for relay $Asr_1$ which performs similar functions to relay $Afr_1$ but for the 100's digit. As soon as at the first break of the second series of dial pulses $Lmr_1$ is again operated, $Asr_1$ will operate. Also, at make contact $bf_{12}$, the impulse lead through rectifier 2401 will be transferred to a circuit 2421—2422—2423—2424; identically similar to the already described circuit 2400—2402—2404—2405, through break contact $bs_{11}$ of relay $Bsr_1$ which is associated with relay $Asr_1$ in the same manner as relay $Bfr_1$ is associated with relay $Afr_1$.

The second series of impulses, i.e. the 100's digit will be received on the series of cold cathode tubes $PU_{1/10}$ which are arranged in exactly the same way as the series $PT_{1/10}$. This time, of course, the artificial priming for the first tube $PU_1$ will be interrupted, after the first impulse has been received, by means of make contact $as_{11}$.

Since the calling subscriber is dialling No. 11, only one impulse will be received for the second series and tube $PU_1$ will thus fire. This will be followed by the return of relay $Isr_1$ to its attracted condition and by the renewed release of relay $Lmr_1$. Relay $Asr_1$ holds over make contact $as_{12}$, the winding of relay $Bsr_1$ and make contact $lb_{12}$, and when relay $Lmr_1$ releases for the second time, the winding of relay $Bsr_1$ is no longer short-circuited and this relay operates in series with relay $Asr_1$ The number of the wanted group has now been stored in the counting chain of the primary register and this information is available in the form of a 25 volt potential drop across resistor 2413 for tube $PT_1$ and a similar drop across resistor 2425 for tube $PU_1$. This means that the anodes of both the tubes $PT_1$ and $PU_1$ are at about —25 volts, but these new potentials cannot be impressed on the grid circuits of the corresponding amplifying tubes $GTA_1$ and $GUA_1$ in circuit GSB (Fig. 27) through the corresponding decoupling rectifiers 2426 and 2427, since through the rectifiers 2428 and 2429, ground potential is still impressed through break contact $cn_{11}$.

Hence, there is yet no change of potential at the junction point of rectifiers 2426 and 2428, nor that of rectifiers 2427 and 2429, resistors 2430 and 2450 absorbing the current produced by the potential difference of 25 volts.

1.2.2. HUNTING FOR A TIME CHANNEL FREE ON BOTH THE PRIMARY LINK AND THE WANTED SECONDARY LINK

As soon as relay $Bsr_1$ operates after the 100's digit has been recorded, this establishes a circuit for test relay $Tr_1$ from ground, left-hand winding of relay $Tr_1$, make contact $bs_{12}$, conductor $L_{37}$, resistor 2600 in circuit GSA (Fig. 26) to —48 volts. This circuit will be established and causes the operation of relay $Tr_1$ if circuit GSA is free which is indicated by the non-operation of relay $Er$ which otherwise would apply a ground through its make contact $e_1$ and prevent $Tr_1$ from operating. Relay $Tr_1$ thus operates through its left-hand winding which is a high impedance one and it establishes a shunt circuit to ground through make contact $t_{11}$ and its lower impedance right-hand winding in series with the low impedance winding of relay $Dtr_1$. This is a usual double test arrangement well known in conventional switching circuits and $Dtr_1$ will succeed in operating if there are no other primary registers simultaneously testing on the resistor 2600 in circuit GSA which is, of course, accessible from all three primary registers. As soon as the register is successful, the test potential is raised due to the voltage drop in resistor 2600 so that the other registers can no longer operate their $Tr_1$ relays through their high resistance windings.

It might be remarked that just as make contact $bf_{12}$ in connecting the impulse lead towards the chain of tubes $PU_{1/10}$, broke the connection between the impulse lead and the tubes $PT_{1/10}$, relay $Bsr_1$ in operating, at its break contact $bs_{11}$ interrupts the connection between the impulse lead and the tubes $PU_{1/10}$ whereby spurious voltage surges on this impulse lead can have no influence on the stored number.

The operation of relay $Dtr_1$ will now permit priming of two cold cathode tubes used as memory elements in each of the group selector memory cases $GSM_{1/18}$. One tube corresponds to the tube $PT_1$ which is fired in the counting chain and the other to tube $PU_1$ also lit in said chain (Fig. 24), thus in accordance with group No. 11 which has been dialled by the calling subscriber. This step is therefore preliminary to the inscription of No. 11 into a suitable group selector memory case.

This priming will be effected by opening two gates, one corresponding to tube $PT_1$ and the other to tube $PU_1$. As shown in Fig. 24, and considering tube $PT_1$, the gate consists of two oppositely poled rectifiers 2431 and 2432. The junction point of these two rectifiers is connected to a common point through resistor 2433, to which common point all junction points of the sets of rectifiers forming the gates for the other tubes of the series $PT_{1/10}$ and $PU_{1/10}$ are similarly connected. Normally, these junction points are biassed to —150 volts through the common resistor 2434.

Since the slow release relay $Bur$ (Fig. 26) is normally operated in the circuit GSA through break contact $e_1$, make contact $bu_1$ is normally closed and when relay $Dtr_1$ (Fig. 24) operates a ground is applied through make contact $dt_{12}$ and break contact $ti_{11}$ to the junction point of resistors 2433 and 2434. For the tubes of the series $PT_{1/10}$ and $PU_{1/10}$ which are non-conductive, their respective cathodes are at —150 volts and accordingly, the rectifiers such as 2432 clamp the potential at the junction point of the rectifiers such as 2431 and 2432 to —150 volts when ground is applied through make contact $dt_{12}$ as the value of resistor 2433 is much higher than those of the resistors such as 2410. Therefore, for all non-conductive tubes which for the above mentioned example are $PT_{2/10}$ and $PU_{2/10}$, the potentials on the various conductors leading from the gates such as 2431—2432 in RPB to the group selector memory cases $GSM_{1/18}$, remain at —150 volts, as they are biased to the —150 volts source through individual resistors such as resistor 2900 (Fig. 29) whereby the corresponding rectifier in the counting chain, e.g. 2431 is blocked.

However, if group No. 11 has been dialled, the cathodes of tubes $PT_1$ and $PU_1$ will have been brought to —110 volts, which potential will now be impressed on the trigger electrodes of all the corresponding pairs of tubes in all the group selector memory cases $GSM_{1/18}$. For example, for tube $PT_1$, the potential of —110 volts at its cathode will pass through rectifiers 2431 and 2432 which are both conductive.

Considering, for example, the memory case $GSM_{18}$ (Fig. 29), a potential of —110 volts is therefore impressed on the trigger electrode of tube $GT'_1$ through resistors 2901 and 2902 in series. Similarly, the trigger electrode of tube $GU'_1$ is also raised to —110 volts. As the cathodes of these tubes are normally biassed to —150 volts through resistor 2903 common for the tubes $GT'_{1/10}$, and through resistor 2904 common for the tubes $GU'_{1/10}$, this means that tubes $GT'_1$ and $GU'_1$ receive a priming voltage of 40 volts for their auxiliary discharge gaps. The same evidently applies for the corresponding tubes in memory cases $GSM_{1/17}$, unless said memory cases are already busy in which case the cathode potentials of all the tubes are raised to —110 volts whereby there is no priming in the auxiliary discharge gap.

Considering the anode circuit of the tube such as $GT'_1$ (Fig. 29), one notes that it is entirely similar to the anode circuit of the cold cathode tubes used in the line selector memory cases $LSM_{1/18}$. When tube $GT'_1$ is lit, the anode potential drops from ground to —25 volts and the potential drop across resistor 2905 will be transmitted through resistor 2906 to the grid circuit of tube $GTA_1$ (Fig. 27) during the pulse of 5.55 microseconds from the pulse source $t_{18}$ which controls the potential at the junction point of resistor 2906 and rectifier 2907 (decoupling rectifier) through rectifier 2908. This arrangement therefore constitutes the gate $G'_{34}$ shown in Fig. 3.

However, the pulses from the sources such as $t_{18}$ for memory case $GSM_{18}$ are also applied through condenser 2909 to the junction point of decoupling rectifier 2910 and resistor 2911, the bottom end of which is biassed to ground through resistor 2912. The decoupling rectifiers such as 2910 lead to a common conductor which is connected to +10 volts through resistor 2601 in circuit GSA (Fig. 26).

The junction point of the resistors such as 2911 and 2912 for memory case $GSM_{18}$ is controlled from two particular busbars, one leading to one of the $Na$ sources and one leading to one of the $Nb$ sources, this respectively through rectifiers such as 2913 and 2914. Accordingly, unless the potentials on the two particular busbars are simultaneously brought down to +10 volts, the potential at the junction point of resistors 2911 and 2912 remains at +30 volts, which is the normal level of the sources $Na_{1/10}$ and $Nb_{1/11}$, which means that the rectifier such as 2910 is blocked.

As previously described, the seizure of a free time channel on the wanted secondary link has to be made during an interval of time which is different in accordance with the group of 100 lines in which the call has originated. Otherwise, the same time channel on a particular secondary link would be liable to simultaneous seizure from two or more calling subscribers in different groups.

Therefore, when a particular time channel is tested to ascertain whether it is free or not, this occurs within a time interval during which the said time channel cannot be tested from any of the other 99 groups of 100 subscribers. The time intervals, as previously mentioned, are conveniently defined by means of the pulse sources $Na_{1/10}$ and $Nb_{1/11}$ shown in Fig. 41. With the help of these two sets of pulse sources, one obtains a cycle of 55 milliseconds in which each duration of 500 microseconds is characterised by a unique combination of a pulse from one of the $Na$ sources and one of the $Nb$ sources. Reference to Fig. 46 and to the table shown in column 23 will make the scheme clear.

The arrangement constitutes the switch MSS shown in Fig. 3 and the rectifiers 2913 and 2914 are part of the gates $G'_{21}$ and $G'_{22}$ shown on said figure.

From this table it will be appreciated why only five busbars from the $Na$ pulse sources are shown in Figs. 28 and 29, since only sources $Na_1$, $Na_3$, $Na_5$, $Na_7$ and $Na_9$ are necessary for the odd groups of 100 subscribers such as group No. 11. For the even group numbers, it is of course the even $Na$ pulse sources which are necessary. On the other hand, all the $Nb$ pulse sources are necessary in all groups.

Hence, since a call from group No. 11 has been assumed, rectifiers 2913 and 2914 are respectively connected to sources $Na_3$ and $Nb_3$, thus during the third interval of 500 microseconds during which simultaneous pulses are received from these sources. During that time interval, the negative pulses of 25 v. from source $t_{18}$ will be allowed to pass through the rectifier 2910 since the latter will now be unblocked and accordingly, a negative pulse of 25 volts will be impressed on the common conductor leading to circuit GSA (Fig. 26) five times during said interval of 500 microseconds.

As far as calling group No. 11 is concerned, there are only two cases to consider: the line selector memory case corresponding to the time channel under test is free or busy. The condition of the corresponding group selector memory is immaterial since there is a double test arrangement whereby the hunt for a suitable time channel is made for one call at a time. This means that one cannot have the possibility of a busy group selector memory case corresponding to a free line selector memory case during the hunt for a suitable channel for a particular calling line. A group selector memory case may indeed be busy before the corresponding line selector memory case is occupied, but before a time channel is tested for another call, the latter memory case will also be busy.

The test for a free time channel can start at any moment and it will be supposed that time channel No. 2 is the first to be tested.

Assuming first, that during the test for time channel No. 2 LSM is busy, although five pulses from source $t_2$ will reach the gating arrangement $G_{20}$ in Fig. 26 (diagrammatically shown in Fig. 3) during the time pulse sources $Na_7$ and $Nb_8$ issue pulses, they will not succeed in going through this gating arrangement. It comprises two triodes 2602 and 2603 which are arranged as a double triode and function in a manner similar to the gating circuit $G_{12}$ comprising triodes 2219 and 2220. Thus, the gating arrangement $G_{20}$ is an anti-coincidence circuit. This means that the pulses from source $t_2$ reaching the control grid of tube 2602, will cause negative pulses to be issued at the anode of the triode 2603 unless there is also a similar negative pulse impressed at the control grid of this last tube.

If $LSM_2$ is busy, the amplifying tubes $LUA_{1/10}$ in circuit LSB (Fig. 19), which deliver negative pulses for periodically setting the line selector LS (Fig. 17) on the calling lines, will also send these pulses on conductor $L_{15}$ leading to the control grid of tube 2603. This occurs through the line selector memory monitor LMM which comprises the rectifiers such as 1913 and 1914 respectively connecting the cathodes of the first and the last tubes of the $LUA_{1/10}$ series with the control grid of the triode 1915 arranged as a cathode follower and accordingly, said cathode follower will deliver pulses of 5.55 microseconds duration in time channel No. 2, on conductor $L_{15}$. Therefore, the coincident negative pulses at the grid of the triode 2603 prevent this triode from becoming conductive and from forwarding a negative pulse to the grid of the pentode 2604. Hence, during the seventeenth interval of 500 microseconds, the test for a free channel will be unsuccessful.

The next test, for time channel No. 3, will occur during the twenty-third time interval of 500 microseconds during which negative pulses are simultaneously issued from pulse sources $Na_3$ and $Nb_1$. Assuming this time that the corresponding line selector memory case, i.e. $LSM_3$ (not shown) is free, the pulses from source $t_3$ at the control grid of 2602 will succeed in delivering similarly located negative pulses to the control grid of the pentode 2604. The resulting positive pulse at the anode of said tube, which is connected to positive potential through plate resistor 2605, will reach the grid of the pentode 2606 through the decoupling rectifier 2607 and the coupling condenser 2608.

As soon as relay $Dtr_1$ (Fig. 24) operates, as a result of the call from substation No. 1119, it applies a ground through make contact $dt_{11}$ which will cause the release of relay $Cr_1$ due to the short-circuit of its winding. This relay had previously been operated through resistor 2435. The release of relay $Cr_1$ causes the energisation of relay $Cnr_1$, through break contacts $ti_{12}$ and $c_{11}$. Relay $Cnr_1$ locks to ground through make contacts $cn_{12}$ and $lb_{15}$.

At is make contact $cn_{13}$, relay $Cnr$ applies a ground to conductor $L_{19}$, thereby operating relay $Er$. As the control grid of the pentode 2606 is biassed to $-150$ volts through grid resistor 2613, whereas the cathode of said pentode is biassed to $-48$ volts through resistor 2614, the pentode is normally beyond cut off and cannot transmit pulses. However, subsequent to the operation of relay $Er$, a potential of $-150$ volts is applied to the cathode of said pentode through resistor 2615 and make contacts $e_2$ and $bu_2$. The values of the resistances 2614 and 2615 are so chosen that the cathode assumes a potential near to $-150$ volts, whereby the pentode 2606 can then conduct the pulses which reach its grid. Corresponding pulses in time channel No. 2 will therefore appear at the plate of tube 2606.

These negative pulses will be sent through conductor $L_{16}$, from circuit GSA, to all primary register circuits and in particular to circuit RPB shown in Fig. 24. These negative pulses at the control grid of the triode 2436 will be effective in lowering the cathode potential of this tube arranged as a cathode follower, since its cathode connected to $-150$ volts through resistor 2437 is unclamped from ground at contact $cn_{11}$ as soon as relay $Cnr_1$ is energised.

Also, the resulting negative pulses at the plate of tube 2606 will reach the phase inverter circuit PI in Fig. 22 through conductor $L_{21}$. This phase inverter PI which need not be further detailed, as it is of conventional design, will therefore deliver a positive pulse at its cathode follower output. Said pulse is fed on the control grid of triode 2208 and is of such a magnitude that the resulting flow of plate current through tube 2208 produces a bias on the cathode resistor 2209 which is sufficient to block the triode 2207, whereby coincident pulses are no longer admitted to the amplifier $AMP_1$. The triode 2208 is recognized to be the main part of the gate $G_{11}$ (Fig. 2). This blocking action is of course effective for each free time channel during the testing interval, in which this channel is being tested.

Apart from being sent on conductors $L_{16}$ and $L_{21}$, the negative pulses issuing from the plate of tube 2606 are also fed to the control grid of the triode 2610 which, together with triode 2611, constitutes a double triode arranged as a gating circuit $G_{29}$. This gating circuit $G_{29}$ is designed in a similar way to the gating circuit $G_{13}$ (Fig. 22) and constitutes a coincidence gate. Hence, it is only when similar negative pulses in time channel No. 3 will be present on conductor $L_{18}$, that negative pulses will be issued across the common cathode resistor 2612.

Conductor $L_{18}$ is connected to the plate of the triode 2246, which together with the triode 2247 constitutes a double triode which is the essential part of the gate $G_{28}$. The gating arrangement $G_{28}$ is similar to the gating arrangement $G_{12}$ and operates as an anti-coincidence gate. On the one hand, the control grid of the triode 2247 is fed by the negative pulses issued by pulse source A—, thus a pulse of 1.5 microseconds duration in the A position of all the time channels, and during time channel No. 2, there will therefore be a negative pulse at this control grid.

Negative pulses in A positions, occurring on conductor $L_6$ and thence at the grid of triode 2246 are normally delivered from the output of amplifier $AMP_1$, but since the gating arrangement $G_{11}$ (2208) is blocked during time channel No. 3, such pulses can only arrive from the secondary link being tested and through the group selector. It is to be noted that the blocking of $G_{11}$ is incidental as far as time channel No. 3 is concerned, since the latter is now assumed free in the primary group No. 11 and there could not be pulses in time channel No. 3 on multiplex conductor $L_5$. The blocking of $G_{11}$ as already explained in relation to Fig. 2 is effective only for the originally seized time channel, i.e. No. 1.

Assuming there is such a negative pulse on conductor $L_6$ in time channel No. 3, then it means that it has been originated in another group than No. 11 and that it has appeared on conductor $L_6$ from the group selector of that other group through the group selector GS of group No. 11 (Fig. 25). Hence, for such an occurrence one must admit that the two group selectors are set on the same secondary link simultaneously.

$GSM_3$ is of course free since it is assumed $LSM_3$ is, therefore GS can only be set on the multiplex conductor $L_6$ due to the action of the tubes $PT_1$ and $PU_1$ (Fig. 24) energized by dialling No. 1. The cathode of tube 2436 being unclamped it can be assumed that the pulses thereat, in time channel No. 3, will bring the cathode down to $-25$ volts.

The 25 volts potential drop at said cathode will permit the junction points of rectifiers 2426, 2428, and 2427, 2429 to drop by 25 volts, since tubes $PT_1$ and $PU_1$ are lit. Since the anode circuits of the tubes $PT_{1/10}$ are connected to the respective grid circuits of the amplifying tubes $GTA_{1/10}$ and the anode circuits of tubes $PU_{1/10}$ are similarly connected to the corresponding amplifying tubes $GUA_{1/10}$ in circuit GSB (Fig. 27), the counting chain of circuit RPB can now be used in the same manner as a memory case. Hence, through the rectifiers 2426 and 2427, the grids of tubes $GTA_1$ and $GUA_1$ respectively, will receive negative pulses which will appear as negative pulses of some 20 volts at the respective cathodes of these tubes.

Busbars are led from all the cathodes of the tubes $GTA_{1/10}$ and $GUA_{1/10}$ (Fig. 27) to the group selector GS (Fig. 25) and the control of the gates of said group selector is made in the same manner as previously explained for the line selector LS. Since the pulses will appear on the two busbars connected to the cathodes of the amplifying tubes $GTA_1$ and $GUA_1$, it is the gate 2500 between conductor $L_6$ and $L_{17}$ which will be opened during time channel No. 3, and in fact during all time channels which are locally free, thus giving access to conductor $L_{17}$ leading to the secondary link of group No. 11. It is to be remarked, however, that contrary to the line selector gating arrangement where the potentials on both sides of the gates are different, i.e. 15 volts and 25 volts, for the group selector gates, the potentials on conductors $L_6$ and $L_{17}$ are normally at $+25$ volts and accordingly, the mere opening of the gate does not produce any change of potential at either side, but it will permit pulses to go through said gate. Also, the midpoint of the rectifiers such as 2501 and 2502, is permanently biassed to ground through the resistor 2503, since an additional control as needed for the line selector gate is not necessary.

Therefore, in the twenty-third interval of 500 microseconds during which time channel No. 3 is tested in group No. 11, and since it is assumed that the memory case $LSM_3$ is free, the gate between conductors $L_6$ and $L_{17}$ will be opened five times in time channel No. 3.

Assuming that pulses are present on conductor $L_{17}$ which is multiplied to corresponding gates in the other group selectors, e.g. conversation pulses in time channel No. 3, then these pulses can be detected on conductor $L_6$ and the result will be that the control grid of triode 2246 being driven negative in time channel No. 3 due to a conversation between a calling subscriber in another group that No. 11 and a called subscriber in group No. 11, will prevent the appearance of a negative pulse at the anode of said triode when the grid of the triode 2247 receives a negative pulse during the A position of time channel No. 3.

No pulses appearing on conductor $L_{18}$, there will be no coincidence between pulses at the grids of tubes 2610 and 2611 whereby negative pulses will not be delivered across the common cathode resistor 2612 of these two triodes and the regenerator $RG_3$ cannot be actuated.

Assuming now that the following tests, i.e. in the twenty-ninth, thirty-fifth, etc. intervals of 500 microseconds, for time channels No. 4, No. 5, etc., are also unsuccessful due to the reasons which prevent the seizure of time channels No. 2 and No. 3, i.e. secondary link of group No. 11 being free but the primary link of group No. 11 being busy, or the secondary link of group No. 11 being engaged from the primary link of another group, these time channels will not be seized.

Assuming, for the sake of convenience in referring to the drawings, that during time interval No. 3 of 500 microseconds, time channel No. 18 is tested and found free on the secondary link No. 11 and the corresponding time channel on the primary link of group No. 11 is also free, this means that the gating arrangement $G_{28}$ (Fig. 22) will react when a negative pulse is received from the A— source and the corresponding negative pulse on conductor $L_{18}$ will arrive at the control grid of tube 2611. It will therefore coincide with the negative pulse from the plate of the pentode 2606 and a negative pulse will appear during the A position of time channel No. 18, across resistor 2612.

The negative pulse across the cathode resistor 2612 is applied to the control grid circuit of the pentode 2616 which together with the pentode 2617 forms a flip-flop circuit of conventional design which is the essential part of the regenerator $RG_3$. This connection is performed through the coupling condenser 2618 and the decoupling rectifier 2621. Through this rectifier the leading flank of the negative pulse will be effective to trigger the flip-flop circuit. Normally, the pentode 2616, which is coupled to the pentode 2617 across the common cathode resistor 2622, shunted by condenser 2623, is conductive, this being due to the negative stop pulses from source $d_2$ which are regularly applied at the beginning of each interval of 500 microseconds at the control grid of the pentode 2617.

Hence, during the interval No. 3 of 500 microseconds, the second negative pulse issued at the cathode of tube 2611 in the A position of time channel No. 18, will trigger the regenerator $RG_3$ whereby the pentode 2617 will now be conductive whereas the pentode 2616 will be cut off, this causing a positive pulse to be delivered from the plate of the latter pentode to the control grid of the beam power tube 2624 via coupling condenser 2625. This last tube has its cathode connected to —150 volts through cathode resistor 2626 and there will, therefore, appear across said cathode resistor, a positive pulse which will raise the cathode potential from a normal value of —110 volts to —60 volts.

It should be remarked that in the gating arrangement $G_{20}$ (2602/2603), one eliminates all those time channels for which the line selector memory cases are busy. These time channels for which the line selector memory cases are busy correspond to the calling lines in group No. 11, but in so doing one automatically eliminates the time channel which was originally selected by calling line No. 1119, i.e. time channel No. 1. This time channel No. 1 is, however, artificially reintroduced by the gating arrangement $G_{30}$ comprising the oppositely poled rectifiers 2438 and 2439. These rectifiers are normally blocked, as their junction point is biased to +40 volts through resistors 2440 and 2441 in series, whereas the anode of rectifier 2438 is connected to the cathode of the triode 2342 via conductor $L_{14}$, said cathode being at a potential lower than +40 volts, and the anode of rectifier 2439 is connected to ground through conductor $L_{20}$ and resistor 2627. However, as soon as relay $Cr_1$ is released, break contact $c_{12}$ puts the junction point of resistors 2440 and 2441 to —48 volts, which is lower than ground potential and the potential at the cathode of tube 2342, whereby the rectifiers become unblocked. Since the cathode of tube 2342 continuously delivers negative pulses of 30 volts amplitude during the A position of time channel No. 1 seized by the calling line No. 1119, these pulses flow through conductors $L_{14}$ and $L_{20}$, and reach the control grid of tube 2628 which together with the triode 2629 forms a double triode constituting the gating arrangement $G_{24}$ which is a coincidence gate.

Hence, during the testing interval No. 11 of 500 microseconds in which time channel No. 1 was tested in group No. 11, the negative pulses impressed on the control grid of tube 2629 would cause, together with the negative pulses on conductor $L_{20}$, the transmission of a negative pulse to the control grid of the pentode 2630, the gating arrangement $G_{24}$ operating in the same way as the gating arrangement $G_{13}$ (Fig. 22). The resulting positive pulse at the anode of the pentode 2630 which is normally conductive, is impressed on the control grid of the normally blocked pentode 2606 through decoupling rectifier 2631. The gating arrangement $G_{24}$, therefore, operates in parallel to the gating arrangement $G_{20}$.

If time channel No. 1 were also free in the secondary link of group No. 11, i.e. from calls originating in other groups, then the gating arrangement $G_{29}$ will allow the passage of pulses during time interval No. 11 of 500 microseconds and in the first time channel, whereby a positive 50 volt pulse would be delivered across resistor 2626. As it has been assumed, however, that the test started with time channel No. 2, and that time channel No. 18 was found free, the latter has to be used for communication with the called substation No. 1110.

1.2.3. INSCRIPTION OF THE CALLED LINES' FIRST TWO DIGITS INTO THE GROUP SELECTOR MEMORY CASE CORRESPONDING TO THE TIME CHANNEL SEIZED

During the interval of 500 microseconds characterized by coincident pulses from sources $Na_3$ and $Nb_3$ a positive pulse of 50 volts will be impressed on a conductor which leads to all the group selector memory cases $GSM_{1/18}$. However, the pulse will only be effective with regard to memory case $GSM_{18}$. It is only in that memory case that the pulse from the cathode of tube 2624 will find the rectifiers such as 2915 and 2916 blocked. Therefore, the pulse will pass through resistor 2917, to the various coupling condensers leading to the trigger electrodes of the tubes $GT'_{1/10}$ and $GU'_{1/10}$ such as 2918 connected to the trigger electrode of tube $G'_1$ through the individual resistor such as 2902.

This is due to the fact that, just as two sources of pulses of 500 microseconds durations, one from the Na group and one from the Nb group, were used to modulate the pulses from the t sources on the conductor leading to resistor 2601 and used in multiplex fashion, corresponding sources, but this time from the Pa and Pb groups, are used to control the seizure pulse received from the regenerator $RG_3$, so that this pulse is fed to the proper group selector memory case and to that one only.

Thus, in the third interval of 500 microseconds when both sources $Pa$ and $Pb$ issue a positive pulse of 60 volts, both rectifiers 2915 and 2916 will be blocked and the potential rise of the pulse will be superimposed through condensers 2918 and 2919 on the priming potential of 40 volts which has already been applied to tubes $GT'_1$ and $GU'_1$. Both the tubes $GT'_1$ and $GU'_1$ will fire, thus inscribing the code of the wanted group No. 11 in memory case $GSM_{18}$. The remaining tubes of said memory case $GSM_{18}$ are not able to fire, since, although they also receive the seizure pulse flowing through resistor 2917, these tubes have not been previously primed and the potential of the pulse is insufficient to fire them.

From that moment case $GSM_{18}$ will now control the unblocking of the gate 2500 between the multiplex speech conductors $L_6$ and $L_{17}$. This occurs through the amplifying tubes $GTA_1$ and $GUA_1$ (Fig. 27) during time channel No. 18.

The seizure pulse fed to $GSM_{18}$, also reaches the trigger electrode of the cold cathode tube GC (Fig. 26), and as the cathode of this tube is biased to nearly −150 volts due to the potentiometer arrangement 2614, 2615, whereas the trigger electrode is normally at −110 volts, the positive pulse of 50 volts is sufficient to fire GC, the main gap discharge circuit being closed through the winding of relay $Sbr$ and make contact $e_3$. As the impedance of relay $Sbr_1$ in series with the energised main gap is small with respect to the resistance values of the potentiometer arrangement, immediately tube GC fires, the potential at the cathode of the pentode 2606 is so raised that the pentode ceases to conduct whereby pulses are no longer offered on conductors $L_{16}$, $L_{21}$ and to the gating arrangement $G_{29}$. At the same time, relay $Sbr$ operates. This action corresponds to that of the gate $G_{25}$ in Fig. 3.

The disappearance of the locally free pulses on conductor $L_{21}$ will stop the blocking action performed by the triode 2208.

The operation of relay $Sbr$ results in the application of −48 volts potential to condenser 2632 through resistor 2633 and make contact $sb_1$. This condenser is normally kept at ground potential by resistor 2634 and will now charge relatively slowly to a negative potential. It is connected to the cathode of triode 2635 which is used as a cathode follower and feeds into the triode 2636 through coupling condenser 2637. The cathode of tube 2635 is normally at ground level since it is connected to earth through resistors 2638 and 2634, in series.

Hence, since the grid of tube 2635 is connected to −10 volts through resistor 2639, the pulses in time channel No. 1 which are impressed on conductor $L_{20}$ when the gate 2438, 2439 ($G_{30}$) is unblocked, cannot immediately be reproduced at the cathode of triode 2635 since the latter is non-conducting. After the condenser 2632 has charged to a sufficiently negative potential, the triode 2635 conducts and the negative pulses fed from conductor $L_{20}$ through coupling condenser 2640, are amplified through said triode, further amplified through the triode 2636 and delivered across the cathode resistor 2641 of the latter to conductor $L_{22}$. It will be remarked that the arrangement corresponds to the gate $G_{38}$ in Fig. 3. It should be noted that the disappearance of the pulses corresponding to locally free time channels, on conductor $L_{21}$, subsequent to the firing of cold cathode tube GC, apart from interrupting the blocking action performed by tube 2208, also interrupts the blocking action by tube 2229.

The action of tube 2229 is similar to that of tube 2228. It will be recalled that the latter operates as soon as a register has been seized by a calling pulse train, to prevent further seizures of primary registers on behalf of the same call. In the case of tube 2229, the reason is to avoid that the pulses corresponding to a channel under test and which are detected by the group selector memory monitor (tube 2701), since the same amplifying tubes such as GTA (Fig. 27), are used for controlling the group selector either from the memory cases or from the primary register tubes, should pass through the tube 2252, be amplified by $AMP_1$ (Fig. 22), and selectively block the gate formed by tubes 2246 and 2247 during the time channel under test. Tubes 2228, and 2229 correspond to the gates $G_{15}$ and $G_{14}$ in Fig. 2.

When the pulses disappear on conductor $L_{21}$, they also disappear on conductor $L_{16}$, and the counting chain in the primary register (Fig. 24) no longer controls the setting of the group selector GS.

When relay $Er$ operated, it interrupted the operating circuit for relay $Bur$ at make contact $e_1$, but as this relay is slow to release and if the hunt for a free time channel on the secondary link is successful, the operation of relay $Sbr$ closes the operating circuit of relay $Bur$ at make contact $sb_2$, before this last relay has time to release. Also, at make contact $e_1$, a direct ground is applied on conductor $L_{37}$ whereby both the relays $Tr_1$ and $Dtr_1$ release. The circuit GSA is, of course, still inaccessible to other primary registers, ground being present on conductor $L_{37}$ instead of the test potential of −48 volts. The release of relay $Dtr_1$ causes the operation of relay $Cr_1$ which, however, remains without effect since relay $Cnr$ is held independently of relay $Cr_1$.

As soon as memory case $GSM_{18}$ is seized, pulses in time channel No. 18 will appear across the cathode resistor 2700 of tube 2701, part of the group selector memory monitor GMM, which corresponds to tube 1915 used in conjunction with the line selector memory cases. The grid of the triode 2701 is fed from the cathodes of the tubes $GTA_{1/10}$ through decoupling rectifiers such as 2702. Hence, pulses of 5.55 microseconds duration in time channel No. 18 will now appear on conductor $L_7$, since negative pulses in time channel No. 18 are no longer present on conductor $L_{21}$ and consequently positive pulses are no longer present at the grid and at the cathode of tube 2229 which would suppress the negative pulses on conductor $L_7$ since the cathode of tube 2229 is connected to this conductor and therefore to the cathode of tube 2701.

We will first investigate what happens in the case that the original time channel, i.e. No. 1, had been retained, supposing it were the first free one tested, group selector memory case $GSM_1$, would have been seized and therefore similar pulses would have appeared on conductor $L_7$ but in time channel No. 1. Therefore, on reaching the gating arrangement $G_{12}$ (Fig. 22) which is an anti-coincidence gate, this negative pulse in time channel No. 1 would have prevented a negative pulse in the A position of time channel No. 1 from being issued at the plate of triode 2219. Therefore, the gating circuit $G_{13}$ would no longer have issued a pulse of 1.5 microseconds duration in time channel No. 1 and the disappearance of this pulse on conductor $L_{12}$, would have meant also the absence of the pulse, on conductor $L_{14}$, due to the triode 2342 no longer delivering a pulse at its cathode.

Moreover, the pulses in the B position of time channel No. 1 would no longer have been applied to the grid of tube 2357 and as previously described in relation to dialling (Fig. 45), the discharge of condenser 2359 would cause the release of relay $Isr_1$. This time, however, it would not be temporary and it would result in the release of slow release relay $Lbr_1$ followed by the release of relays $Afr_1$, $Asr_1$ and $Bfr_1$, $Bsr_1$ at contact $lb_{12}$ and of relay $Cnr$ at contact $lb_{15}$.

At make contacts $lb_{13}$ and $lb_{14}$ anode voltage is taken away from the cold cathode tubes in the counting chains, which interrupts the discharge in any tubes which are alight.

At break contact $lb_{16}$, −48 volts would now be applied to the junction point of condenser 2362 and resistor 2363. Therefore, a kick of −48 volts is instantaneously transmitted through 2362 and applied to rectifier 2319 whereby this rectifier is unblocked. This clamps the grid of triode 2317 to the potential prevailing at the cathode of the rectifier 2319. If the time constant of the circuit comprising condenser 2362 is sufficiently long, when the cathodes of tubes 2312 and 2314 are restored to $-100$ volts, the junction point of rectifiers 2319 and 2320 is still below $-147$ volts and the passage of a pulse through the triode 2317 is thus prevented. This means that the recirculation of the pulse of 4 microseconds in the circuit RPA is stopped since there is no longer coincidence between a positive pulse at the grid of 2332 with a negative A pulse at the grid of 2333.

Also, the disappearance of the positive pulse on conductor $L_{10}$ would mean the unblocking of the gating arrangement $G_{15}$ (Fig. 22).

The release of relay $Cnr_1$, following the opening of contact $lb_{15}$ would be followed by the release of relay $Er$ due to the suppression of ground on conductor $L_{19}$ whereby relay $Sbr$ would also be released and the cold cathode tube GC be extinguished. This means that circuit GSA is again available to primary registers since the $-48$ volt test potential would again be present on conductor $L_{37}$.

The release of relay $Cnr_1$ would therefore mean that the primary register, seized on behalf of the calling line No. 1119 is completely released. It is to be noted that no pulses in time channel No. 1 will reach conductor $L_{22}$, as these pulses are already suppressed at gate $G_{12}$ before gate $G_{33}$ is unblocked; the pulses on conductor $L_{22}$ in time channel No. 1 would be undesirable since inscription of the calling line No. 19 in a new line selector memory case is not required.

The above refers to the particular case in which the originally seized channel is retained. As it is assumed that a new channel, No. 18, is seized, transfer of No. 19 from $LSM_1$ to $LSM_{18}$ has to take place. In this case pulses in time channel No. 1 are not suppressed at gate $G_{12}$ and they will reach conductor $L_{22}$ as soon as gate $G_{33}$ is unblocked.

1.2.4. TRANSFER OF THE CALLING LINES' LAST TWO DIGITS TO THE LINE SELECTOR MEMORY CASE CORRESPONDING TO THE TIME CHANNEL SEIZED ON THE WANTED SECONDARY LINK

Before examing the effect of the pulses in time channel No. 1 on conductor $L_{22}$, it should first of all be remarked that, the negative pulses on conductor $L_7$ indicating the busy group selector memory cases apart from being fed to the control grid of the triode 2219, also reach the cathode of the pentode 2252. The plate of this pentode is connected to $+200$ volts potential through resistor 2253 and is also connected to the input of the amplifier $AMP_1$ through coupling condenser 2254. The control grid of this pentode is connected to conductor $L_{15}$ through resistor 2255 and is also connected to $-150$ volts through resistor 2256. As conductor $L_{15}$ is connected to the cathode of tube 1915, the control grid of the pentode 2252 is therefore controlled by the busy line selector memory cases, whereas the cathode of said pentode is controlled by the busy group selector memory cases. Normally, the potential at the cathode of tube 2701 is $+35$ volts and when it delivers a pulse for a busy time channel corresponding to a busy group selector memory case, its potential drops to $+15$ volts. These potential variations are directly impressed on the cathode of tube 2252. Similar variations of potential occur at the cathode of tube 1915, but these are changed in level after being supplied through conductor $L_{15}$ to the grid of the pentode 2252, by means of the potenticmeter formed by resistor 2255 and 2256. Normally, the potential at the grid of tube 2252 is $+15$ volts and it drops to $-5$ volts during the channel time intervals corresponding to busy line selector memory cases. The arrangement therefore corresponds to the gate $G_{36}$ shown in Fig. 2.

It is only when a group selector memory case is busy, whereas the corresponding line selector memory case is free, that the pentode 2252 will become conductive and it will therefore deliver a pulse in the corresponding time channel, to the amplifier $AMP_1$. This is the case when time channel No. 18 is seized on the secondary link and the purpose is to avoid that the same time channel No. 18 should be seized in other groups, for connections wanting access to the same secondary link. Thus, pulses in time channel No. 18 are artificially impressed on the speech conductor $L_6$ as soon as the corresponding group selector memory case has been engaged. These pulses reach the speech conductor $L_{17}$ through the group selector GS and can be detected in the primary link circuits of other groups. These artificial seizure pulses will automatically cease as soon as the corresponding line selector memory case $LSM_{18}$ has been engaged to store the calling subscriber's last two digits and to set the line selector for communication in time channel No. 18. From that moment these artificial pulses are, of course, no longer required.

The pulses delivered on conductor $L_{22}$ in time channel No. 1 reach the control grid of tube 1825 which, together with the triode 1826, constitutes the gating arrangement $G_{39}$ already shown in Fig. 2. Both triodes are arranged as a double triode and operate as a coincidence gate in the same manner as the gating arrangement $G_{13}$ (Fig. 22). The control grid of tube 1826 is connected to the plate of the pentode 1919 in the code comparator LCC. At the plate of tube 1910, negative pulses of 5.55 microseconds duration are being delivered in the time channels corresponding to busy line selector memory cases. Each busy channel is represented by 5.55 microseconds pulses which occur only during the last 400 microseconds of the 500 microseconds interval which is characteristic of the number of the subscriber's line employing this channel. These pulses are present only four times within the 500 microseconds interval, due to the action of the pulses from source $d_2$ at the suppressor grid of tube 1910 (Fig. 43).

Therefore, since line selector memory case $LSM_1$ is busy, negative pulses at the grid of 1826 will be coincident with the negative pulses on conductor $L_{22}$, since both occur in time channel No. 1 and at the common cathode of tubes 1825/1826, a negative pulse will be delivered during time channel No. 1 to the regenerator $RG_4$ through coupling condenser 1827.

However, since the pulses in time channel No. 1 are only delivered from the code comparator LCC during the interval of 500 microseconds, which is characteristic of the No. 1119 of the calling line and therefore corresponds to the simultaneous occurrence of pulses from sources $Na_1$ and $Nb_9$, it is only then that regenerator $RG_4$ will be triggered. Therefore, the identity of the calling line is obtained, this being necessary to inscribe it in the memory case $LSM_{18}$.

The regenerator $RG_4$ operates in exactly the same way as regenerator $RG_3$ (Fig. 26) and is similarly constructed. Regenerator $RG_4$ will therefore deliver a pulse of 300 to 400 microseconds on a conductor which is used in multiplex fashion to obtain access to all the line selector memory cases $LSM_{1/18}$. The beginning of this pulse depends on the identity of the time channel and occurs from 100 to 200 microseconds after the start of the interval of 500 microseconds, whereas the end of the pulse is always sharp at the end of said interval of 500 microseconds, being determined by the stop pulses from source $d_2$.

As soon as group selector memory case $GSM_{18}$ (Fig. 29) was seized, both the tubes $GT'_1$ and $GU'_1$ fired in response to the inscription of No. 11, and as a result of the firing of the tube $GT'_1$, there is now a drop of potential of 50 volts across resistor 2903 which means that the potential on conductor $L'_8$ leading to $LSM_{18}$ (Fig. 21) is raised from $-150$ v. to $-100$ volts.

Normally, the right-hand trigger electrodes of all the tubes LT'$_{1/10}$ and LU'$_{1/10}$ are at —110 volts which is provided through the rectifier 2110 and through the individual resistors such as 2111 and 2112. Therefore, there is a positive bias of 40 volts between the right-hand electrode and the cathode, and this for all tubes in the line selector memory cases. This is, however, quite insufficient to trigger these tubes. The rectifier such as 2113 leading to the pulse source such as Pa$_1$ is blocked at this stage and the sources Pa$_{1/10}$ and Pb$_{1/10}$ can have no control on the tubes. When the corresponding group selector memory case GSM$_{18}$ has not yet been seized, rectifier 2114 which is connected between resistors 2111 and 2113, the latter being connected to conductor L'$_8$, is also blocked.

As soon as the potential on conductor L'$_8$ is raised to —100 volts rectifier 2114 is unblocked but the potential at the right-hand trigger electrode can only reach —100 volts when the potential corresponding to the Pa or Pb source is raised to —50 volts, bringing the rectifier such as 2113 to its blocked condition. The 50 volts potential difference across the priming gap is however still insufficient to fire the cold cathode tube.

100 microseconds after the start of the 500 microseconds interval characterising the calling line No. 1119, the 50 volts pulse at the output of the regenerator RG$_4$ (Fig. 18) will be applied to the condensers such as 2016 and 2116. However, as it is only rectifier 2114 which is unblocked, the pulse can only penetrate into LSM$_{18}$. As this 500 microseconds interval is characterised by pulses from sources Na$_1$ and Nb$_9$, the 50 volts positive pulse will be able to reach the right-hand trigger electrodes of tubes LT'$_1$ and LU'$_9$ (not shown) since, it is only for these two tubes that the corresponding sources Pa$_1$ and Pb$_9$ will allow the pulse to go through and fire these tubes, the remaining tubes in memory case LSM$_{18}$ remaining unlit.

The increase of potential on conductor L'$_8$ will also tend to reach resistor 1828 through the decoupling rectifier 2117, but cannot do so when the potential at the junction point of rectifier 2118 and resistor 2119 is at —150 volts, due to rectifier 2118 being biassed to that potential whereas resistor 2119 is biassed to —200 volts. Then the rectifier 2120 is conductive which means that the potential at its anode is at —150 volts.

When pulse source Pc$_{18}$ emits a 60 volts pulse, this is transmitted via the coupling condenser 2121 to the junction point of rectifiers 2118 and 2120 whereby this point reaches —90 volts causing the potential of —100 volts on conductor L'$_8$ to be transmitted to resistor 1828, rectifier 2120 being blocked during the 500 microseconds interval in which Pc$_{18}$ emits a positive pulse.

This means that a positive pulse of 50 volts reaches the grid of tube 1808 and prevents a negative calling pulse from being issued across resistor 1811, whereby the gating arrangement G$_1$ (Fig. 18) is blocked and cannot deliver a calling pulse to the regenerator RG$_1$ during that particular interval. This is to avoid that another calling line than No. 1119 should seize memory case LSM$_{18}$ before the regenerator RG$_4$ has made it busy by inscribing No. 19 therein. Since another calling pulse could only seize this memory case during the occurrence of a pulse from source Pc$_{18}$, as previously explained, it is fully ensured that as soon as memory case GSM$_{18}$ is seized, the corresponding free line selector memory case LSM$_{18}$ is automatically reserved and cannot be seized by another calling party. The blocking action performed by tube 1808 will be fully effective before the triggering action of the start pulses from source d$_1$ on the grid of tube 1810 can take place, since these pulses are located in the middle of each 500 microseconds period (Fig. 43).

No. 19 is now inscribed in memory case LSM$_{18}$ and it is now necessary to release memory case LSM$_1$, which is no longer useful and should be made available to other callers.

If time channel No. 1 had been retained in the secondary link, resulting in the seizure of memory case GSM$_1$, this would have had no further effect on memory case LSM$_1$ which already contained the identity of the calling line.

1.2.5. RELEASE OF THE LINE SELECTOR MEMORY CASE ORIGINALLY CHOSEN

The negative pulses which are delivered at the output of the gating arrangement G$_{39}$, i.e. cathode of tube 1825, in the A position of time channel No. 1 during the last 400 microseconds of the 500 microseconds interval characterising the calling line No. 1119, apart from going to the regenerator RG$_4$, are also fed through coupling condenser 1829 and decoupling rectifier 1830, (corresponding to RE$_4$ in Fig. 2), to the control grid of the beam power tube 1831 which reproduces at its cathode, negative pulses of some 20 v. bringing down the cathode potential from ground level to —20 v. These negative pulses will be applied to all resistors such as 2022 and 2122 in the line selector memory cases.

The essential part of the release arrangement such as PR$_1$ in LSM$_2$, which is used in common for one line selector memory case and the corresponding group selector memory case, consists of a thyratron tube, such as 2023, in line selector memory case LSM$_1$. Its anode is connected to a source of +200 v. through the inductance 2024 in series with condenser 2025. A shunt path is provided by resistor 2026. The cathode of tube 2023 is biassed to —48 v., while its grid is biassed through the secondary winding of transformer 2027 to —60 v. One end of the primary winding of transformer 2027 is connected to ground while the other end is connected to the cathode of tube 1831 through resistor 2022 and to pulse source t$_1$ through rectifier 2028. For the other thyratron tubes, in the other line selector memory cases, the corresponding t$_{2/18}$ pulse sources are used.

As long as the potential at the cathode of 1831 is at ground level, the junction point of rectifier 2028 and resistor 2022 also remains at ground level. This applies also when the potential on the said cathode drops to —20 v., unless this is accompanied by a coincident drop of the level of the corresponding t source. Since, for the example considered, the potential at said cathode drops to —20 v. during the A position of time channel No. 1, this will correspond with a negative pulse of 25 v. from source t$_1$ and, accordingly, it is rectifier 2028 which will become blocked whereby a negative impulse is able to flow through the primary of transformer 2027, whereas the other release arrangements PR$_{2/18}$ cannot be influenced.

A positive pulse is induced in the secondary winding of transformer 2027 and the grid of the thyratron 2025 becomes positive with respect to the cathode whereby the tube is fired.

As a result, the potential at its anode will suddenly drop from +200 v. to —38 v., 10 v. being left across the anode-cathode space of the tube. Initially, the condenser 2025 is not charged and, accordingly, the potential at the junction point of this condenser and inductance 2024 is at +200 v. Due to the presence of the inductance, the potential at this junction point will decrease in the manner shown in Fig. 47(a) where it can be seen that the curve is nearly sinusoidal. The curve passes through an inflection point when the voltage across the inductance 2024 reaches zero, and beyond this it further descends by an amount which is approximately equal to the potential difference between +200 v. and the anode which is still at —38 v. The current variation is shown in Fig. 47(b) and it can be seen that when the junction point of the inductance and the condenser reaches the anode potential, the current is at its maximum value. Afterwards it decreases, and upon reaching zero value, since it cannot reverse, the thyratron 2023 is automatically extinguished resulting in the discharge of the condenser 2025 through the resistor 2026 as indicated in Fig. 47(a). When the current is interrupted, the anode potential is instantaneously brought to that of the junction point of 2024 and 2025, i.e. —276 v., and thereafter it returns to its original value of +200 v. in an exponential manner.

The pulse thus produced at the anode of tube 2023 is fed to the auto-transformer 2029 through coupling condenser 2030 and it will therefore appear on conductor $L_{23}$ linking memory cases $LSM_1$ and $GSM_1$. The auto-transformer 2029 will, however, reverse the polarity of the pulse on conductor $L_{23}$ which will therefore have a shape opposite to that of the thick line in Fig. 47(a). It is applied to the junction point of the oppositely poled rectifiers 2031 and 2032 with an amplitude of e.g. 100 v. whereby both rectifiers become conductive. As the tapping on the auto-transformer 2029 is biassed to —150 v., the rectifiers 2031 and 2032 were previously blocked. The potential at the common cathode of both the LT and LU tubes will be raised to such an extent that the tubes $LT_1$ and $LU_9$ (not shown) which were lit are extinguished. When the thyratron 2023 restores, the cathodes of all the tubes in $LSM_1$ again assume a potential of —150 v. and the memory case is again free for use for a new call.

The purpose of applying the release pulse also to memory case $GSM_1$, is for the general release. In the present case, however, it has no effect since memory case $GSM_1$ has not been engaged and therefore contains no lit tubes.

As a result of the release of $LSM_1$, the line selector LS will no longer afford a through-connection between conductors $L_5$ and $L_6$ and consequently, pulses in the A position of time channel No. 1 are no longer impressed from the output of amplifier $AMP_1$ to tube 2217 part of the gating arrangement $G_{13}$. Therefore, the corresponding pulses on conductor $L_{12}$ leading to circuit RPA (Fig. 23) will be stopped thereby causing the release of the primary register in the same manner as has been previously explained for the case that time channel No. 1 had been retained on the secondary link.

1.2.6. SEIZURE OF A FREE SECONDARY REGISTER (SECONDARY DIAL TONE)

At the moment memory case $GSM_{18}$ is seized, pulses in time channel No. 18 will appear on conductor $L_7$ and as pulses in this same channel do not yet appear on conductor $L_{15}$, the pentode 2252 delivers pulses in time channel No. 18 which are passed to the multiplex speech conductor $L_6$ in the A position of time channel No. 18. Therefore, without waiting for the seizure of the corresponding line selector memory case $LSM_{18}$, which in this case will occur 14 milliseconds later, pulses in time channel No. 18 will already appear on conductor $L_{17}$ (Fig. 30). When $LSM_{18}$ is seized, pulses in the same time channel will start to appear on conductor $L_5$ (Fig. 22), and the artificial pulses from pentode 2252 will no longer be required.

These pulses are passed through a clamping arrangement 3000, 3001, 3002, 3003, 3004, 3005, 3006, which correspond identically to the clamping arrangement 2200, 2201, 2202, 2203, 2204, 2205, 2206. Further, these pulses are gated through the arrangement $G_{43}$ comprising the triode 3007 which functions in the same manner as the gating arrangement comprising triode 2207. After being amplified through the amplifier $AMP_2$, similar to $AMP_1$ (Fig. 22), the pulses are delivered to the gating arrangement $G_{47}$ comprising the triodes 3008 and 3009 arranged as a double triode. This gating arrangement $G_{47}$ functions in the same manner as the gating arrangement $G_{13}$ (Fig. 22) but whereas gating arrangement $G_{13}$ delivered negative pulses across cathode resistor 2226 for all time channels which were busy on the primary link LKP, provided they corresponded to a free group selector memory case, the gating arrangement $G_{47}$ simply delivers negative pulses across the cathode resistor 3010 for all time channels which are busy on the secondary link circuit LKS. These pulses, occur in the A position of the corresponding time channels.

They are delivered to a gating arrangement $G_{48}$ comprising the triodes 3011 and 3012 arranged as a double triode. This gating arrangement $G_{48}$ functions in the same way as the gating arrangement $G_{12}$ (Fig. 22), and will deliver negative pulses at the plate of tube 3012 only in those time channels corresponding to free final selector memory cases. To this effect, conductor $L_{28}$ leading from the cathode of the triode 3500 part of the final selector memory monitor FMM in circuit FSB, is connected to the control grid of tube 3012 and thus causes the suppression of those time channels which are busy in the final selector memory cases $FSM_{1/18}$, since the tube 3500 will deliver at its cathode negative pulses of sufficient amplitude for all time channels corresponding with busy final selector memory cases.

The negative pulses at the anode of tube 3012 are delivered to the control grid of a beam power tube 3013 operating as a cathode follower. Negative pulses, therefore, appear across the cathode resistor 3014 in the time channels which are occupied on the secondary link circuit LKS and free in the final selector memory cases $FSM_{1/18}$. These negative pulses are fed through conductor $L_{27}$ to the control grid of tube 3141 in circuit RSA, in the same way as the pulses from the cathode of tube 2234 are fed to the control grid of tube 2341 in circuit RPA through conductor $L_{12}$.

From the moment that the group number of the wanted party has been inscribed in memory case $GSM_{18}$, negative pulses will therefore regularly appear every 100 microseconds interval at the control grid of a triode 3141 during the A interval of time channel No. 18.

The negative pulses delivered at the anode of the triode 3012 are also fed through coupling condenser 3015 to the gating arrangement $G_{49}$ and more particularly to the grid of the triode 3016 which is coupled via its cathode to the cathode of the triode 3017. This arrangement is recognized to be identical to the gating arrangement $G_{15}$ detailed in Fig. 22, and permits the seizure of the secondary registers, one of which is detailed in Figs. 31 and 32.

The negative pulses appearing at the control grid of the triode 3016 will therefore be reproduced across the common cathode resistor 3018 and also across the cathode resistor 3019 of the beam power tube 3020, provided, that for the time channel concerned a positive pulse is not applied at the control grid of the triode 3017 via conductor $L_{25}$. The negative pulses across cathode resistor 3019 are delivered, through conductor $L_{24}$, to the control grid of the triode 3100 in the secondary register circuits such as RSA (Fig. 31).

As mentioned in the general description, part RSA of the secondary register circuit is absolutely identical to the RPA circuit (Fig. 23) which formed the corresponding part of the primary register circuit and which has already been described in detail.

Consequently, it suffices to say that the successful entrance of the negative pulses in time channel No. 18, appearing on conductor $L_{24}$, in a secondary register circuit will result in the autonomous recirculation of a pulse of some 4 microseconds in time channel No. 18 in the seized register circuit RSA.

1.3. SWITCHING OPERATIONS FROM SECONDARY DIAL TONE UNTIL ESTABLISHMENT OF THE CONNECTION

The remaining operations in circuit RSA (Fig. 31) will be identical to those previously described for circuit RPA (Fig. 23) and secondary dial tone will be supplied to the calling subscriber No. 1119, as soon as a free register circuit has been seized.

The calling subscriber, upon receiving this secondary dial tone, proceeds to dial the tens and units digit of the subscriber wanted by him.

The dial impulses will be received by the impulse relay $Isr_2$ corresponding identically to the impulse relay $Isr_1$ (Fig. 23) and will be delivered through conductor $L_{29}$ to an arrangement comprising one counting chain for the tens digit and one for the units digit, in circuit RSB (Fig. 32) which forms the other part of a secondary register circuit. These counting chains comprising respectively the cold cathode tubes $ST_{1/10}$ and $SU_{1/10}$ are similar to the counting chains comprising the cold cathode tubes $PT_{1/10}$ and $PU_{1/10}$ which were described for the primary register (Fig. 24). The counting chains in the circuit RSB operate therefore in exactly the same way as those in circuit RPB, but the anodes of all the tubes $ST_{1/10}$ and $SU_{1/10}$ are respectively commoned to make contacts $lb_{23}$ and $lb_{24}$ of relay $Lbr_2$ (Fig. 31) without the interposition of anode resistors. These are not required, since the counting chains in the secondary register circuit need not be used to control the opening of the group selector as was necessary in the case of the counting chains included in the primary register circuits.

1.3.1. SECONDARY DIALLING INTO THE SECONDARY REGISTER

In the same manner as dialling into the primary register, dialling into the secondary register will result in the inscription of the tens and units digits of the called number in the counting chains $ST_{1/10}$ and $SU_{1/10}$. Assuming that the full number of the called subscriber is No. 1110, cold cathode tubes $ST_1$ and $SU_{10}$ will be successively fired.

After the units impulses have been delivered, relay $Isr_2$ (Fig. 31) returns to its energised condition and slow release relay $Lmr_2$ releases thereby interrupting at break contact $lm_{21}$ the short-circuit over the winding of relay $Bsr_2$ which therefore operates in series with relay $Asr_2$ through make contact $lb_{22}$. The relays $Afr_2$, $Bfr_2$, $Asr_2$ and $Bsr_2$ are controlled in exactly the same way and their operating and holding circuits correspond identically to those of the relays $Afr_1$, $Bfr_1$, $Asr_1$ and $Bsr_1$ in circuit RPB (Fig. 24).

It may be remarked that contact $af_{21}$ is used in exactly the same way as contact $af_{11}$ to suppress dial tone.

The exact circuit arrangements for the relays $Tr_2$, $Dtr_2$, $Cr_2$ and $Cnr_2$ (Fig. 32) are slightly different from those of relay $Tr_1$, $Dtr_1$, $Cr_1$ and $Cnr_1$ (Fig. 24) but essentially, these relays perform similar functions.

The ground through $Cn_{21}$ is also applied via conductor $L_{46}$ to resistor 3400 in circuit FSA. This circuit is thereby definitely engaged, as it will be impossible for any other register such as to RSB, to make a successful test, as long as $Cnr_2$ remains operated.

As soon as relay $Bsr_2$ operates, at make contact $bs_{22}$, the left hand high impedance winding of test relay $Tr_2$ is connected to conductor $L_{46}$ leading to negative battery through resistor 3400 in circuit FSA (Fig. 34). If the full negative battery voltage of —48 v. is available on conductor $L_{46}$ which is multipled to the other secondary registers, test relay $Tr_2$ will operate and connect its right-hand low impedance winding in series with the low impedance winding of double test relay $Dtr_2$ through make contact $t_{21}$. If the double test is successful the double test relay $Dtr_2$ operates in this circuit and at make contact $dt_{21}$ short-circuits the winding of relay $Cr_2$ which had previously been operated through resistor 3229. At make contact $dt_{22}$, —48 v. is applied to the junction point of resistors 3240 and 3241 which correspond identically to resistors 2440 and 2441 in circuit RPB. Therefore, the gate $G_{53}$ including the oppositely poled rectifiers 3238 and 3239 will be unblocked by the operation of relay $Dtr_2$ since the potentials on conductors $L_{30}$ and $L_{31}$ are higher than —48 v. The release of relay $Cr_2$ will close an operating circuit for relay $Cnr_2$ at break contact $c_{21}$. Relay $Cnr_2$ operates and locks through make contacts $cn_{22}$ and $lb_{25}$. At make contact $cn_{24}$, —48 v. is also applied to maintain the unblocking of the gate $G_{53}$ independently of relay $Dtr_2$. This is necessary, since at make contact $cn_{21}$, a short circuit is now applied to the double test arrangement comprising relays $Tr_2$ and $Dtr_2$ and both these relays release thereby causing the re-energisation of relay $Cr_2$.

The operation of relay $Cnr_2$ also causes the unblocking of the gates such as that comprising rectifiers 3230 and 3231 for cold cathode tube $ST_1$. This occurs by the application of a direct ground through make contact $cn_{25}$ and break contact $ti_{21}$ to the common conductor leading to all the junction points of the oppositely poled rectifiers such as 3230 and 3231 through individual resistors such as 3232.

The closure of make contact $cn_{23}$ also applies a ground to conductor $L_{47}$ which leads to the P.B.X circuits $P.B.X_1$ and $P.B.X_2$ shown in block schematic form in Fig. 34, and also to the anodes of the two cold cathode tubes 3401 and 3402.

As soon as the gate comprising the oppositely poled rectifiers 3238 and 3239 is unblocked, negative pulses in the A position of time channel No. 18 will be able to flow from the cathode of tube 3142 through conductor $L_{30}$, the gate 3238 and 3239 and conductor $L_{31}$ to the gating arrangement $G_{56}$ which functions in the same way as the gating arrangement such as $G_{13}$ (Fig. 22) and thus operates as a coincidence gate.

It comprises the two triodes 3403 and 3404. The negative pulses on conductor $L_{31}$ are fed to the control grid of tube 3403, while the control grid of tube 3404 may receive negative pulses through conductor $L_{32}$ which is used in relation with gate circuits such as $G_{57}$ to scan the final selector memory cases $FSM_{1/18}$ (see Figs. 36 and 37) in succession and to extract from each memory case as it is scanned, a number of (5) channel pulses corresponding to said memory case. The scanning is performed by means of pulse controlled gates such as $G_{57}$ in much the same way as has been explained in relation to the group selector memory scanning switch MSS comprising gates such as $G_{21}$ and $G_{22}$ in Fig. 3. Only in the present case the gates are controlled by the sources $Nc_{1-18}$ instead of combinations of sources $Na_{1-10}$ and $Nb_{1-11}$, each of the sources $Nc_{1-18}$ being assigned to the corresponding memory case. This means that a complete scanning cycle in the present case takes only 9.5 milliseconds instead of 55 milliseconds as in the case of the group selector memory scanning switch.

Considering the circuit of memory case $FSM_{18}$ (Fig. 37), pulse source $t_{18}$ is connected to conductor $L_{32}$ through condenser 3700 and rectifier 3701 in series. Since, in circuit FSA, conductor $L_{32}$ is connected to ground through resistor 3405, the junction point of rectifier 3701 and the condenser 3700 should be below ground potential in order to unblock rectifier 3701. This junction point is connected to ground through resistors 3702 and 3703 connected in series and the junction point of these resistors is connected to pulse source $Nc_{18}$ (Fig. 41), via rectifier 3704. The latter corresponds to pulse source $Pc_{18}$, except that the normal level of the sources $Nc_{1/18}$ is +30 v. and their pulse level is +10 v., which means that they deliver negative pulses of 20 v. amplitude.

Therefore, when pulse source $Nc_{18}$ is at +30 v., this is also the potential at the junction point of resistors 3702 and 3703, rectifier 3704 being conductive and rectifier 3701 is blocked as far as the negative pulses from source $t_{18}$ are concerned.

However, in the particular 500 microseconds interval during which pulse source $Nc_{18}$ emits a negative pulse, the junction point of resistors 3702 and 3703 goes down to +10 v. and the negative pulses of 5.55 microseconds duration from source $t_{18}$ are then able to overcome the bias on the rectifier 3701 which, therefore, permits the passage of a negative pulse of 25—10=15 v. to conductor $L_{32}$.

This negative pulse is in time channel No. 18 and will therefore coincide with the one at the control grid of tube 3403 whereby a negative A pulse in time channel No. 18 will be issued at the common cathode of the double triode 3403 3404. This pulse is sent to the regenerator $RG_6$ which is designed in exactly the same way as regenerator $RG_3$ (Fig. 26). Regenerator $RG_6$ will be able to deliver a pulse starting 195.47 microseconds after the beginning of the 500 microseconds interval characterised by the appearance of a pulse from source $Nc_{18}$. This pulse at the output of the regenerator $RG_6$ will be terminated by means of a stop pulse from source $d_2$ which restores the flip-flop circuit to its original condition. Therefore, a positive pulse of some 300 microseconds length and of 60 v. amplitude, based on a quiescent level of —110 v., will be delivered on conductor $L_{33}$ leading to all the final selector memory cases $FSM_{1/18}$, and more particularly to the so-called priming tubes in each of these final selector memory cases. The positive pulse will however only be able to reach the trigger electrode of the priming tube 3705 which is a cold cathode tube in $FSM_{18}$ through the resistors 3706 and 3707 in series, as the rectifier 3708 connected between the junction point of these resistors and the pulse source $Pc_{18}$ is blocked by the simultaneous occurence of a positive pulse from source $Pc_{18}$, which brings the rectifier cathode up to —50 v. In the other memory cases $FSM_{1/17}$ the corresponding rectifiers are unblocked and the trigger electrodes of the corresponding cold cathode tubes stay at —110 v. Consequently, only tubes 3705 will fire, the cathodes of tubes such as 3705 being biassed to —150 v. through two resistors in series such as 3710.

The firing of the tube 3705 which is the essential part of the priming device FA' causes the potential at the cathode to be raised from —150 v. to about —75 v. the remaining 75 v. constituting the sustaining voltage for tube 3705. Due to a suitable ratio between the values of resistors 3709 and 3710, which together constitute the cathode load resistance of tube 3705, the junction point of these resistors will be raised about 40 v., by which the negative bias which is normally present across rectifier 3711 is reduced to zero. Therefore, rectifier 3711 will now be unblocked and this will henceforth permit the passage of a positive pulse from conductor $L_{34}$ to the trigger electrodes of all the tubes $FT'_{1/10}$ and $FU'_{1/11}$ constituting the memory elements for $FSM_{18}$.

Memory case $FSM_{18}$ has now been prepared to receive the last two digits of the number of the called subscriber, i.e. No. 10.

1.3.2. INSCRIPTION OF THE LAST TWO DIGITS OF THE CALLED LINE IN THE FINAL SELECTOR MEMORY CASE CORRESPONDING TO THE SEIZED TIME CHANNEL

The gate comprising rectifiers 3231 and 3230 is unblocked as soon as ground is applied through make contact $cn_{25}$. Hence, the potential at the cathode of tube $ST_1$ which is lit, is able to penetrate to the corresponding conductor out of the series of ten conductors leading to the identification code comparator ICC in circuit FSA (Fig. 34). Circuit ICC is an identification code comparator which is used to extract the static digital information recorded in the chains of the secondary register and from it to derive a pulse, whose time location is characteristic of said digital information and hence of the called subscribers last two digits.

The potential at the cathode of tube $ST_1$ is —75 v., 75 v. remaining between the anode and the cathode of said tube as sustaining voltage. This potential is applied to the junction point of resistors 3406 and 3407, the latter of which is biassed to —145 v., and therefore the potential at the anode of rectifier 3408 will pass from —145 v. to —75 v.

Therefore, as the cathode of rectifier 3408 is biassed to —70 v. through resistor 3409, this rectifier will still be blocked.

The arrangement 3406, 3407, 3408, constitutes a gating device which is part of circuit ICC and there are ten similar devices corresponding to cold cathode tubes of the series $ST_{1/10}$ (Fig. 32). Each of these gating arrangements is controlled by a corresponding Pa source, $Pa_1$ controlling the first gating arrangement through condenser 3410. During the particular 500 microseconds interval in which source $Pa_1$ issues a positive pulse of 60 v., this will be passed by condenser 3410 and a pulse of 60—10=50 v. will thus reach the control grid of the triode 3411 which, together with the triode 3412 has been arranged as a double triode.

The control grid of the triode 3412 is controlled in the same way as that of triode 3411, i.e. from tubes $SU_{1/10}$ (Fig. 32), and since tube $SU_{10}$ is lit in circuit RSB, the potential of —75 v. applied from the cathode of this tube, will also result in the production of a positive pulse of 50 v. during an interval of 500 microseconds, this time corresponding to a particular pulse source of the Pb series, in our case $Pb_{10}$. It will be understood that no pulses are produced through the gating devices which correspond to unlit tubes in the register counting chains.

Since the cathodes of the triodes 3411 and 3412 are connected to coupling condenser 3413 through individual rectifiers 3414 and 3415 which clamp the potential at their junction point to the lowest cathode potential, it is only when positive pulses are simultaneously applied to the grids of the tubes 3411 and 3412 that a positive pulse can be impressed on the control grid of the triode 3416 through coupling condenser 3413.

Tube 3416 which is arranged as a cathode follower, will deliver a positive pulse of 50 v. bringing its cathode potential from —100 v. to —50 v., only during the 500 microseconds interval in which both sources $Pa_1$ and source $Pb_{10}$ emit a positive pulse. This particular time interval is characteristic of the last two digits of the called subscriber's number.

The cathode of tube 3416 is connected to the control grid of the pentode 3417 through resistor 3418 and rectifier 3419 in series. Since said control grid is further connected to —150 v. through register 3420, this last resistor together with resistor 3418 constitute a potentiometer which, when the cathode potential of tube 3416 is raised to —50 v., causes the control grid of the pentode 3417 to be raised to —110 v. only.

Normally, when the cathode of 3416 is at —100 v., the potential at the control grid of the pentode 3417 is clamped to —125 v. due to the action of rectifier 3421 biassed to —125 v. If the called line is free, the potential at the cathode of the pentode 3417 is —110 v. and normally, the pentode is therefore not able to conduct. This potential of —110 v. is obtained from the cathode of the beam power tube 3422, connected to the cathode of the pentode 3417 through rectifier 3423. The pentode arrangement is easily recognized to constitute the gate $G_{55}$ already shown in Fig. 4.

Assuming line No. 1110 is free, when the potential at the control grid of the pentode 3417 is raised to —110 v., and since the cathode of said tube is at the same potential, it is ready to conduct. However, since its suppressor grid is biassed to —125 v. through resistor 3430, it is only when a positive pulse issued from source $d_1$ at the middle of each interval of 500 microseconds, and having a duration of 25 microseconds, is sent to said suppressor grid through condenser 3423, that the pentode 3417 will be able to deliver a negative pulse at its plate to the regenerator $RG_5$.

The regenerator $RG_5$ is of similar design to the regenerator $RG_1$ (Fig. 18) and comprises the triodes 3424, normally conductive, and 3425, normally non-conductive, arranged as a double triode, as well as the beam power tube 3426.

Rectifiers 3427 and 3428 are however added to suppress the action of the positive flanks of negative pulses applied through them to the respective controls grids of the triodes 3424 and 3425. Exactly 250 microseconds after the start of the 500 microseconds interval characterising the called line, the regenerator $RG_5$ will issue a positive pulse at the cathode of tube 3426, which through conductor $L_{34}$ will tend to reach all the final selector memory cases $FSM_{1/18}$. This positive pulse will raise the normal potential at the cathode of tube 3426 from −60 v. to −10 v. and will only last 250 microseconds since it will be stopped by the action of the next stop pulse from source $d_2$ on triode 3425.

Since it is only memory case $FSM_{18}$ which is primed, i.e. which has tube 3705 lit, it is only in that memory case (Fig. 37) that the 50 v. positive pulse on conductor $L_{34}$ will be effective, rectifier 3711 being unblocked to admit said positive pulse which passes through coupling condenser 3714 and rectifier towards the trigger electrodes of tubes $FT'_{1-10}$ and $FU'_{1-11}$ through the series resistors such as 3715 and 3716 for tube $FT'_1$. However, the positive pulse will only be able to reach the trigger electrodes of tubes $FT'_1$ and $FU'_{10}$ thanks to the action of pulse sources $Pa_1$ and $Pb_{10}$ which are those covering the time position of the pulse on conductor $L_{34}$. Therefore the rectifier 3717 and 3718 are the only ones to be blocked, and they permit tubes $FT'_1$ and $FU'_{10}$ to be fired by the incoming pulse.

From the moment tubes $FT'_1$ and $FU'_{10}$ are lit, the final selector FS (Fig. 33) tends to establish a connection between the multiplex speech conductor $L_{36}$ (Figs. 30 and 33) and the speech conductor $L'_4$ corresponding to line No. 10 in group No. 11. This occurs in a manner similar to that previously described for the control of the line selector and it may be sufficient to say that the potential drops at the anodes of the tubes $FT'_1$ and $FU'_{10}$ acting in the grid circuits of the corresponding amplifying tubes $FTA_1$ and $FUA_{10}$ respectively in circuits FSB (Fig. 35) are responsible for negative pulses to be issued on two of the busbars leading to the final selector FS. However, the gate leading from multiplex conductor $L_{36}$ to subscriber line No. 1110 will still be blocked due to the potential of +40 v. prevailing on conductor $L'_3$ as long as the called subscriber's handset is still on the hook.

In order to induce the called subscriber to lift his handset, ringing current must now be applied to the called line.

It should be remarked that the pulse of 250 microseconds sent on conductor $L_{34}$ from the cathode of tube 3426, is also applied to the trigger electrode of the so called blocking tube 3402 which is a cold cathode tube through resistor 3432. Since the cathode of tube 3402 is at −110 v., the pulse potential of −10 v. at the cathode of tube 3426 is sufficient to cause tube 3402 to fire and the main discharge is established from ground at make contact $cn_{23}$ (Fig. 32) through conductor $L_{47}$. Therefore, since the substaining voltage of this cold cathode tube is 75 v., its cathode will be brought to −75 v. which means that even in the presence of positive start pulses at the suppressor grid at the pentode 3417, the latter will no longer be able to conduct. The result of the firing of the blocking tube 3402 will be discussed later, but it can already be observed that, as soon as said tube has been lit, the rectifier 3423 is now blocked.

As soon as the tens and units digit of the called subscriber have been registered in memory case $FSM_{18}$ (Fig. 37), the triode 3500 will deliver negative pulses at its cathode in time channel No. 18. These pulses on conductor $L_{28}$ reach circuit LKS (Fig. 30) and being impressed at the control grid of the triode 3012, will prevent this tube from becoming conductive during time channel No. 18 whereby negative pulses in this channel will no longer be delivered at the cathode of the beam power tube 3013. The absence of these negative pulses on conductor $L_{27}$ leading to the control grid of tube 3141, will result in the disappearance of the negative pulses at the anode of the triode 3140 during time channel No. 18. This means that the secondary register no longer sends pulses in time channel No. 18 on conductor $L_{30}$, and also the absence of positive pulses at the control grid of the triode 3157 during the B position of time channel No. 18. Relay $Lsr_2$ will therefore release causing the release of all the relays in the secondary register circuit, in the same manner as explained for the primary register circuit. In particular, relay $Cnr_2$ will release and this means that at make contact $cn_{23}$ the ground applied through conductor $L_{47}$ to the anode of the blocking tube 3402 is withdrawn, whereby the blocking tube 3402 is extinguished. Also, at make contact $cn_{21}$, ground on conductor $L_{46}$ is interrupted, whereby the battery potential of −48 v., provided in circuit FSA on the test conductor $L_{46}$, is again available to the secondary registers.

1.3.3. RINGING

Circuit FSB (Fig. 35) includes a code comparator FCC which functions in the same manner as the code comparator LCC (Fig. 19) and the arrangement including the two pentodes 3503 and 3504 delivers positive pulses at the common anode, for each time channel interval of 5.55 microseconds corresponding to an engaged final selector memory case, and this five times during the 500 microseconds interval which is characteristic of the called subscribers number inscribed in said engaged final selector memory case. At the occurrence of such pulses, the triode 3501 which is normally non-conductive will deliver a negative pulse at its anode, which will be applied to conductor $L_{41}$ while the triode 3502 which is normally conductive, will deliver a positive pulse at its anode which will be applied to the suppressor grid of the pentode 3505 through coupling condenser 3506.

The application of a negative pulse to conductor $L_{41}$ will trigger the regenerator $RG_9$ (Fig. 34) which is designed in the same way as regenerator $RG_6$. The first negative pulse of 5.55 microseconds duration out of the five in the characteristic interval of 500 microseconds will, however, be ineffective to trigger the said regenerator as the pentode 3434 is prevented from conducting by the pulse from source $d_2$ (Fig. 43) applied at its control grid. The second pulse in time channel No. 18 passing via the rectifier 3435 and the condenser 3436 will be successful in triggering the regenerator $RG_9$ whereby the potential at the cathode of tube 3422 will be so raised that the pentode 3417 can no longer conduct during the intervals of 500 microseconds characterising No. 10. Thus, regenerator $RG_9$ will effect a selective blocking of the gating arrangement $G_{55}$ comprising the pentode 3417, when blocking tube 3402 is not lit. The latter effects a permanent and non-selective blocking of the same gating arrangement as long as it is lit.

Conductor $L_{41}$ also leads to circuit LSA (Fig. 18) and the negative pulses in time channel No. 18 and in a 500 microseconds interval characterising subscriber No. 1110 will be applied through decoupling rectifier 1832 to the regenerator $RG_2$ (Fig. 18) which will selectively suppress the admittance of pulses corresponding to subscriber No. 1110 to the regenerator $RG_1$ by acting on the gating arrangement $G_1$ in the manner previously described in relation to the origination of a call. This will enable the called subscriber to lift his receiver from the hook without originating a new call.

The positive pulses in time channel No. 18 will unblock the pentode 3505 whose suppressor grid is normally at −30 v. being biassed through resistor 3507 but will now be raised to a suitable value. The cathode of the triode 3508 is normally slightly above ground potential, as its grid is biassed to ground through resistors 3509. This permits pentode 3505 to conduct upon the receipt of a positive pulse at its suppressor grid. The resulting negative pulses at the plate of the pentode are applied to regenerator $RG_7$ which is of the same design as regenerator $RG_6$ (Fig. 34), and which comprises pentodes 3510 and 3511, as well as the beam power output tube 3512.

Therefore, at the cathode of the output tube 3512, a positive pulse of some 305.55 microseconds is applied to conductors leading to the line circuits LC (Fig. 16) of all the lines in group No. 11 and more precisely to the conductors such as $L_2$ and $L'_2$. As described in the general description, the pulse from regenerator $RG_7$ is distributed by the ringing distribution switch RDS under the control of pulse sources $Pa_{1/10}$ and $Pb_{1/10}$. In the line circuit LC of line No. 10, it will reach the trigger electrode of the cold cathode tube 1614, through resistor 1615, condenser 1616 and resistor 1617 in series, and it will reach this tube only. This because it is only in this particular line circuit that the assigned combination of pulses from one of the sources $Pa_{1/10}$ and one of the sources $Pb_{1/10}$, i.e. $Pa_1$ and $Pb_{10}$, will permit the simultaneous blocking of the rectifiers 1618 and 1619, coincidently with the arrival of the pulse from regenerator $RG_7$. In line circuit 1110 this pulse will be super-imposed on the 40 v. potential already present on condenser 1607 and applied to the trigger electrode of tube 1614 through resistors 1620. This will be sufficient to ionize the auxiliary gap between the trigger electrode and the cathode of tube 1614.

The cathode of tube 1614 is biassed to $-10$ v. by means of the potentiometer arrangement comprising resistors 1621 and 1622 in series between $-48$ v. and ground. Therefore, rectifier 1623 is normally blocked since the potential on the $b$ conductor of the line of subscriber No. 1110 is at 40 v. Even when this subscriber will lift his receiver, the potential on conductor $b$ cannot go below ground in view of the clamping action of rectifier 1610. The anode of tube 1614 is connected to a source of $+40$ v. through a source of ringing circuit of $16\frac{2}{3}$ cycles/sec., preferably having square wave form as shown in Fig. 48. The amplitude delivered by this source is 120 v. but this, in addition to the $40+10=50$ bias for the main gap is nevertheless insufficient to ionize the tube unless the auxiliary gap is fired first. If the firing of the auxiliary gap happens first during the negative half wave of the A.C. voltage, the anode is at $-80$ v. i.e. 70 v. negative with respect to the cathode, so that a discharge across the main gap cannot be initiated. However, since negative half waves occur at the anode at a rate of $16\frac{2}{3}$ per second, i.e. with a period of 60 milliseconds, while the trigger pulses are repeated at intervals of 55 milliseconds, the phase angle of occurrence of these pulses will recede each time by an amount of 30°. After a few pulses have arrived, the number of which depends on the phase angle of the first trigger pulse, a pulse will occur during the positive half wave and this will fire the main gap. The latter will remain ionized until at the end of the positive half wave, the anode potential drops again to $+40-120=-80$ v. During the next positive half wave the main gap is fired 5 milliseconds earlier, so that the duration of the main discharge will be 5 milliseconds longer than the first time. This process repeats itself until the phase angle goes again negative, i.e. when the trigger pulses occur again at a moment at which the anode voltage is still negative. From this moment the tube remains deionised until the phase angle has again shifted through 180°, after which the cycle repeats itself. During each main gap discharge the cathode potential is raised to $+40+120-75=+85$ v., 75 v. being required across the tube to maintain the discharge. Rectifier 1623 will thus be unblocked and pulses of ringing current will flow through rectifier 1623, the $b$ conductor, ringer 1600 and condenser 1625 to ground, and the called subscriber will now answer if he is available.

1.3.4. ANSWERING

When subscriber No. 1110 answers, the closure of his loop circuit brings the potential at the junction of rectifier 1610 and resistor 1603 to ground, resulting in the discharge of condenser 1607 to that potential through the low impedance path afforded by rectifier 1611. From this moment, ringing is stopped since the pulses impressed through condenser 1616 are not sufficient to fire the auxiliarly gap of tube 1614 if there is no priming. Also, the decrease of potential on conductor $L'_3$ from $+40$ v. to 0 v., will permit the gate between multiplex speech conductor $L_{36}$ and speech conductor $L'_4$ of the line No. 1110 to be unblocked in the final selector FS (Fig. 33) whereby conversation can now take place.

This will result in the operation of the answering tube, such as 3723 for $FSM_{18}$, included in each final selector memory case, in the following manner.

Since the final selector FS is arranged exactly in the same way as the line selector LS, the unblocking of the gate comprising rectifiers 3300, 3301, 3303, 3304 and resistor 3302, between the multiplex speech conductor $L_{36}$ and the speech conductor $L'_4$ of line No. 1110, will result in a lowering of the potential on said multiplex speech conductor, from $+25$ v. to $+15$ v., the difference being absorbed through resistor 3305 corresponding to resistor 1705 in the line selector. The resulting pulse on the multiplex speech conductor $L_{36}$ in time channel No. 18 will be gated into the secondary link circuit LKS during the B position, through the gating arrangement $G_{45}$ comprising the triode 3021 and the rectifier 3022. After having having been amplified through amplifier $AMP_2$, the pulses in the B position of time channel No. 18 will therefore be applied to the control grid of the triode 3033 which, together with the triode 3034, forms a double triode constituting the gating arrangement $G_{63}$. The latter operates in the same way as the gating arrangement $G_{13}$. It produces negative pulses at the common cathode of tubes 3033 and 3034 which are in the B position of the time channels which are engaged in established connections on the secondary link circuit LKS. The control grid of the triode 3034 is controlled by negative pulses from the B-source.

Negative pulses in the B position of time channel No. 18 are therefore applied through conductor $L_{38}$ to the gating arrangement $G_{37}$ as soon as the called subscriber No. 1110 answers. The gating arrangement $G_{37}$ (Fig. 34) is identical to the gating arrangement $G_{56}$ previously described, and it detects coincidence of pulses in the B position of engaged time channels on conductor $L_{38}$, with similar negative pulses multiplexed on conductor $L_{32}$ by the pulse sources $Nc_{1/18}$. Only during the 500 microseconds interval characterised by the appearance of a negative pulses from source $Nc_{18}$ (Fig. 41), will negative pulses in time channel No. 18 appear on conductor $L_{32}$. During that period since these negative pulses are issued by source $t_{18}$ and are of 5.55 microseconds duration, covering the B position of time channel No. 18, the coincidence gate $G_{37}$ will react and deliver a pulse to the regenerator $RG_8$ which is identical to regenerator $RG_6$ already described.

At its output, the regenerator $RG_8$ will therefore deliver positive pulses having a duration of 300–400 microseconds and which will be applied to conductor $L_{40}$ leading to all the final selector memory cases. Therefore, for time channel No. 18, there will appear a pulse starting 197.48 microseconds after the beginning of the 500 microseconds interval characterised by the appearance of a pulse from source $Nc_{18}$, and this pulse will last until the end of said interval.

This pulse will be allowed into the proper final selector memory case, i.e. $FSM_{18}$, due to its coincidence with a positive pulse from source $Pc_{18}$ which will block the rectifier 3719, whereby the positive pulses on conductor $L_{40}$ will be applied to condenser 3720 through resistor 3721. Since the memory case $FSM_{18}$ is busy, one of the cold cathode tubes registering the units of the called number, in this case $FU'_{10}$, is lit whereby the potential across the common cathode resistor 3722 is raised, and the cathodes of tubes $FU'_{1/11}$ are now at $-100$ v. instead of $-150$ v. Since this potential of $-100$ v. penetrates to the trigger electrode of the cold cathode tube 3723, part of the answering device FB′, through resistors 3724 and 3725 in series, there is already a priming of 50 v. across the auxiliarly gap of this tube, the cathode being biased to $-150$ v. through resistor 3726. Hence, the additional pulse of 50 v. transmitted through condenser 3720, which is connected to the junction point of resistors 3724 and 3725, will cause tube 3723 to be lit. The first result of the firing of the answering tube 3723, will be the release of the priming tube 3705, which no longer needs to remain lit as it has performed its function. This release is due to the fact that condenser 3727 was charged to $-150-75$ v. $=75$ v. when tube 3705 was lit, consequently the increase of potential at the cathode of the answering tube 3723, will raise the potential at the cathode of the tube 3705 to $-25$ v., whereby there is no longer a sufficient voltage across the main gap to sustain the ionization in said tube.

The main purpose of the operation of the answering tube 3723 is, however, to interrupt the sending of ringing pulses to the line circuit LC of substation No. 1110. This is necessary, since although the ringing has ceased when the called subscriber removed his handset from its hook, it would restart upon the called subscriber hanging up, if ringing pulses were still allowed to reach the line circuit of substation No. 1110 in a time position characteristic of No. 10.

In firing, tube 3723 brings down its anode potential from ground to $-25$ v., its anode circuit being arranged in exactly the same way as the anode circuits of the other recording tubes, which have already been described in detail in the case of the line selector memory cases (Fig. 20). Hence, during time channel No. 18, negative pulses will be applied to the grid circuit of the triode 3508 in circuit FSB. This will result in negative pulses being applied from the cathode of the triode 3508 to the control grid of the pentode 3505, whereby, when a positive pulse in time channel No. 18 is received through coupling condenser 3506 at the suppressor grid of the pentode 3505, this will coincide with such a lowering of the control grid potential, that the tube will not conduct to trigger regenerator $RG_7$. The pulses at the cathode of tube 3511 during the 500 microseconds interval characterising line circuit No. 10 will therefore no longer occur; consequently trigger pulses will no longer be sent to the control electrode of tube 1614 in this line circuit.

The answering tube 3723 in memory case $FSM_{18}$ will remain lit during the whole conversation, and six other cold cathode tubes characterising respectively the last two digits of the calling subscriber ($LSM_{18}$), the first two digits of the called subscriber ($GSM_{18}$) and the last two digits of the called subscriber ($FSM_{18}$) will also remain lit during that time.

2. REL OF AN ESTABLISHED CONNECTION

As long as the conversation between the subscribers No. 1119 and No. 1110 is in course, the connection is supervised by the condition of both subscribers loops. As long as the calling subscriber maintains his loop closed, pulses in the 500 microseconds interval characterising this subscriber will continue to appear at the apex of the call detecting switch CDS (Fig. 18) and this will maintain the record of the calling subscriber's last two digits in the line selector memory case $LSM_{18}$ as well as the record of the called line's first two digits in the group selector memory case $GSM_{18}$.

These negative pulses at the apex of the call detecting switch, which are distorted by the passage through the rectifier network, are used to control the control grid of pentode 1834 which constitutes the main element of gate $G_{72}$ (Fig. 18). This pentode has its cathode biassed to $+30$ v. and as its suppressor grid is normally at ground potential, no current is admitted to the plate circuit except for positive pulses arriving at the suppressor grid through condenser 1837 from the plate of pentode 1911 in the code comparator LCC (Fig. 19). As will be remembered these positive 5.55 microseconds pulses arrive four times during the last 400 microseconds of the 500 microseconds interval characterising any calling line inscribed in one of the line selector memory cases, and they occur each time in the time channel employed by said calling line. Thus for subscriber No. 1119 pulses in time channel 18 appear at the suppressor grid of pentode 1834 four times during the last 400 microseconds of the 500 microseconds interval characterising subscriber No. 1119. These pulses tend to admit current to the plate circuit of pentode 1834, but as they are accompanied by the appearance of a negative pulse at the control grid, this is prevented as long as the calling subscriber keeps his handset off the hook.

As soon as the calling party releases, either before or after the called party, negative pulses in time channel No. 18 will appear at the plate of the pentode 1834 and will be transmitted through condenser 1835 and rectifier 1836 which is similar to the arrangement 1829, 1830 and which corresponds to $RE_8$ in Fig. 2. Trigger pulses will therefore reach the control grid of the tube 1831 and in the manner previously described under paragraph 1.2.5 the tube 1831 will deliver at its cathode negative pulses in time channel No. 18 which will appear on a conductor multipled to all memory cases $LSM_{1/18}$. Hence, as explained previously, the release arrangement $PR_{18}$ comprising the thyratron tube 2123 will function and memory cases $LSM_{18}$ and $GSM_{18}$ will be released due to the potential peak as shown in Fig. 47, appearing on conductor $L'_{23}$.

As we have seen, as soon as the called number's first two digits are inscribed in the group selector memory case $GSM_{18}$, negative pulses in the A position of time channel No. 18 are transmitted through the group selector towards the input of the secondary link circuit LKS (Fig. 30) in group No. 11, and this condition is maintained during the whole conversation until the group selector memory case $GSM_{18}$ is again released. These pulses appear also at the output of the gating arrangement $G_{47}$ and therefore on conductor $L_{42}$. This conductor leads to the input of the gating arrangement $G_{67}$ (Fig. 34) which is a coincidence gate operating exactly in the same way as the gating arrangement $G_{56}$ and controlled in the same manner by pulses on conductor $L_{32}$. This gating arrangement $G_{67}$ feeds into the regenerator $RG_{10}$ which operates in exactly the same way as regenerator $RG_6$.

Therefore, a positive pulse is issued during the last 400 microseconds of each 500 microseconds interval characterised by the appearance of a negative pulse from source $Nc_{18}$, at the output of regenerator $RG_{10}$ and on conductor $L_{43}$ leading to all the memory cases $FSM_{1/18}$.

As has already been explained, as soon as the called subscriber had answered the call, negative pulses in the B position of time channel No. 18 appeared at the output of the gating arrangement $G_{63}$ and therefore on conductor $L_{38}$, and as a result of this a positive pulse is issued at the output of regenerator $RG_8$ in each 500 microseconds interval characterised by the occurrence of a negative pulse from source $Nc_{18}$. This condition is maintained as long as the called subscriber's handset is off the hook.

Therefore, during the conversation, pulses of 300–400 microseconds duration and coincident with the pulses from $Pc_{18}$ are present on conductors $L_{43}$ and $L_{40}$. The first are the result of the pulses in the A position of time channel No. 18 appearing on conductor $L_{42}$ depending on the loop of the calling subscriber remaining closed, and the second are the result of pulses in the B position of time channel No. 18 appearing on conductor $L_{38}$ (Fig. 27) dependent on the loop of the called subscriber being closed.

In memory case $FSM_{18}$ (Fig. 34) the pulses on conductors $L_{40}$ and $L_{43}$ are used to control two gates. The first comprises resistor 3728, rectifier 3729 and rectifier 3730 arranged as a T network, resistor 3728 being connected to pulse source $Pc_{18}$, rectifier 3730 being connected through resistor 3731 to the trigger electrode of the cold cathode tube FD', and rectifier 3729 being connected to the multiple conductor $L_{43}$. This first gate also comprises a similar T network arranged in parallel with the first and comprising resistor 3732, rectifier 3733 and rectifier 3734, rectifier 3733 being connected to the multiple conductor $L_{40}$.

The second gate comprises the resistors 3735 and 3736 connected in series between pulse source $Pc_{18}$ and the trigger electrode of cold cathode tube FC'. The junction point of the two resistors is connected to the multiple conductors $L_{40}$ and $L_{43}$, respectively through rectifier 3737 and 3738.

The trigger electrodes of the two cold cathode tubes FD' and FC' are also connected to −200 v. respectively through resistor 3739 and 3740. Both the cathodes of these two tubes are directly connected to −200 v. Their anodes are connected to a source of −48 v. respectively through resistors 3741 and 3742. These anodes are also connected to ground respectively via inductance 3743 in series with condenser 3744 and via inductance 3745 in series with condenser 3746. These anodes are further connected to a source of −150 v. respectively through rectifier 3747 in series with condenser 3748 and through rectifier 3749 in series with condenser 3750. The respective junction points of condenser 3748 with rectifier 3747 and condenser 3750 with rectifier 3749, are respectively connected to the left-hand and to the right-hand trigger electrode of the cold cathode tube FE', respectively through the resistors 3751 and 3752. The anode of the tube FE' is directly connected to +20 v., while its cathode is connected to −150 v. through resistor 3753 which is shunted by the series combination of inductance 3754 and condenser 3755.

The anode circuits of the tubes FD' and FC' are thus seen to be similar to that of the thyratron 2023 (Fig. 20) and these cold cathode tubes function in subtsantially the same manner. When they are triggered, the anode potential goes down sharply and stays level for a time predetermined by the values of the resonant circuits 3743, 3744 resp. 3745, 3746 after which said anode potential further goes down, sharply, and is then restored to its original value in an exponential manner, while the tube extinguishes.

Tube FE' functions in a similar manner, but this time the resonant circuit 3754, 3755 is included in its cathode circuit.

The pulses from sources $Pc_{18}$, which are positive pulses of 60 v. regularly applied every 9.5 milliseconds, will tend to charge condenser 3748 through condenser 3757 and rectifier 3758, the junction point of these last two elements being connected to the cathodes of the tubes $FT'_{1/10}$ through resistors 3759.

As long as none of the tubes $FT'_{1/10}$ is lit the cathodes of these tubes are biassed at −150 v. The 60 v. pulses from source $Pc_{18}$ are superimposed on this potential, and it will be clear that the highest potential to which condenser 3748 can be charged is below −150+60=−90 v., and this is insufficient to fire the left-hand control gap of tube FE'.

As soon as the number of the called party has been inscribed in memory case $FSM_{18}$, the potential at the common cathodes of the tubes $FT'_{1/10}$ is raised to −100 v., and the pulses from $Pc_{18}$ now tend to charge condenser 3748 to −100+60=−40 v. However, as long as positive pulses are received either on conductor $L_{40}$ or on conductor $L_{43}$, during at least part of the 500 microseconds interval during which source $Pc_{18}$ emits a pulse, this positive pulse from source $Pc_{18}$ will be admitted through one of the parallel T networks, to ionize the auxiliary gap of tube FD' causing the anode potential of this tube to drop instantaneously from −48 v. to −125 v. Thereby rectifier 3747 will be unblocked and condenser 3748 is discharged to a sufficiently low value whereby tube FE' is prevented from ionizing through its left-hand auxiliary gap. Thus the action of every pulse arriving through condenser 3757 and tending to charge condenser 3748 positively is undone by the simultaneous ionisation of tube FD'. If however at the end of the conversation the pulses on conductors $L_{40}$ and $L_{43}$ which coincide with $Pc_{18}$ cease to appear, tube FD' will no longer be fired to undo the charging of condenser 3748, and the pulses through condenser 3757 will now succeed in charging condenser 3748 sufficiently to fire tube FE' through its left-hand control gap.

Since the capacity of condenser 3757 is much smaller than that of condenser 3748, it will be understood that the charging of the latter happens tricklewise and it will take some time before sufficient charge is accumulated in condenser 3748 to initiate a discharge in tube FE'. This provides for a desirable delay between breaking off the conversation and the release of the final selector memory case, and the duration of this delay may be adjusted by a suitable choice of condenser 3748.

Condenser 3750 tends to charge in exactly the same manner as condenser 3748, by means of pulses from source $Pc_{18}$ applied through condenser 3760 and rectifier 3761, superimposed on the cathode potential of the answering tube FB'. However, condenser 3750 is prevented from accumulating a charge sufficient to cause the ionization of the right-hand priming gap of tube FE', as long as positive pulses are simultaneously present on conductor $L_{40}$ as well as on conductor $L_{43}$.

Before the answering tube FB' has been fired, condenser 3750 cannot be charged sufficiently positively to ionize tube FE' and after tube FB' has been fired, pulses will be present on conductor $L_{40}$ as well as on $L_{43}$ to cause the periodic firing of tube FC' by which the firing of tube FE' is still prevented.

When either the calling or the called party hangs up, the corresponding loop circuit is opened and pulses disappear either in the A position of time channel No. 18 or in the B position. Irrespective of this, tube FC' will no longer be triggered and after a certain delay, e.g. 10 seconds, the potential at the right-hand control electrode of tube FE' will be raised to a value which is sufficient to fire tube FE' through its right-hand priming gap. The delay of 10 seconds means that, if the release by the called party is accidental, reclosing of the corresponding loop within the interval of ten seconds will permit the connection to be resumed, since tube FC' is again fired to discharge condenser 3750. During that interval of ten seconds, the called party which has hung up, while the other party has not, remains busy and cannot be selected by any other subscriber. On the other hand, if the calling subscriber hangs up first, the Line Selector and Group Selector Memory Cases are released after a short delay, but the called subscriber's last two digits remain stored in the Final Selector Memory Case for 10 more seconds, providing ample time for the called party to put down his receiver, before a new Line Selector Memory Case is engaged on his behalf. If both parties release within 10 seconds one after the other, pulses coincident with $Pc_{18}$ will cease to occur at both conductors $L_{40}$ and $L_{43}$, and this will prevent tube FD' from firing. Condenser 3748 will start to charge positively and this will lead to the firing of tube FE' through its left-hand control gap within a short delay, e.g. 0.5 second, as condenser 3748 has much smaller capacity than condenser 3750.

As soon as tube FE' is fired, either through its left-hand or its right-hand control gap, its cathode potential rises to 20−75=−55 v. which potential is then transmitted through rectifier 3756 to the common cathode of tubes $FT'_{1/10}$, through rectifier 3762 to the common cathode of tubes $FU'_{1/10}$ and through rectifier 3763 to the cathode of the answering tube FA'. This means that the answering tube and the digits tubes which were previously lit, are extinguished. The cathode potential of tube FE' may be represented by a curve similar to the one shown in Fig. 47 for the anode potential of tube 2023, but having opposite polarity, hence the peak potential will stop the flow of current through the main gap of tube FE' which is therefore the last tube to deionise in memory case $FSM_{18}$. The resistances 3764 and 3765 shunting rectifiers 3758 and 3761 respectively have sufficiently low values to permit the discharge of condensers 3748 and 3750 when tube FE' ionizes, to avoid refiring of tube FE'.

3. MISCELLANEOUS FEATURES
3.1. BUSY TONE

Busy tone can either be delivered when the wanted subscriber is found busy, i.e. secondary busy tone, or when a free time channel cannot be found on the wanted secondary link, i.e. primary busy tone.

3.1.1. PRIMARY BUSY TONE

Referring to Fig. 26, when the hunt for a free time channel on the wanted secondary link is successful, a positive pulse is issued at the cathode of tube 2624 to cause the inscription of the proper code in the corresponding group selector memory case. This pulse also causes the firing of cold cathode tube GC and the operation of relay S$br$ which takes over the operating circuit for the busy relay B$ur$, at make contact $sb_2$.

If the hunt is unsuccessful and after a time determined by relay B$ur$ which is slow to release (the delay can cover one or several complete scannings), this relay releases and at break contact $bu_1$, the ground applied through conductor $L_{39}$ and via make contact $cn_{15}$ and break contact $ti_{11}$ to the counting chains in the primary register (Fig. 24) disappears. This means that the counting chains, i.e. tubes $PT_{1/10}$ and $PU_{1/10}$ can no longer prime the group selector memory case $GSM_{1/18}$ through the bunch of conductors leading from the gates such as 2431—2432 in RPB to the group selector memory cases.

On the other hand, through make contact $bu_1$ ground is now applied to resistor 2703 and resistor 2706 which are connected in series between make contact $bu_1$ and the —150 v. source. This raises the potential at the junction point of these resistors, and this voltage rise is transmitted via rectifiers 2705 and 2704 towards the trigger electrodes of the tubes such as $GT'_{10}$ and $GU'_{10}$. Thus No. 00 is ready to be inscribed in one of the memory cases $GSM_{1/18}$, the tubes such as $GT'_{10}$ and $GU'_{10}$ in all of these cases being primed.

The primary register is, of course, not released since no inscription has yet taken place in the group selector memory case, and relay E$r$ therefore remains energised, circuit GSA remaining busy to the other primary registers.

At the release of relay B$ur$, the ground potential previously applied to the cathode of the pentode 2642 through make contact $bu_3$, break contact $fc_1$ and rectifier 2643 shunted by resistor 2644, is now interrupted and replaced by a potential of —48 v. Since the control grid of the pentode 2642 is biassed to —48 v. through grid leak resistor 2645, the pentode had previously been unable to conduct and the positive pulses at the plate of the pentode 2630 transmitted to its grid through coupling condenser 2646 had hitherto been ineffective. Condenser 2647, connected between the cathode of tube 2642 and ground, which is shunted by resistor 2648, will be charged to —48 v., but the time constant of the circuit is chosen sufficiently long, i.e. resistor 2644 sufficiently high, to be sure that the pentode 2642 is only made able to conduct after the priming in the group selector memory cases $GSM_{1/18}$ has been transferred from those tubes indicating the wanted group No. 11 to the tubes indicating group No. 00. It may be noted, that all the groups the first digit of which is zero, are reserved for special purposes.

On the other hand the opening of make contact $bu_2$ disconnects the —150 v. source from the cathode of pentode 2606. This causes this tube to be blocked and no pulses can be issued at its anode.

The pentode 2630 can only deliver positive pulses during time channel No. 1 which had been seized by the calling subscriber No. 1119, therefore it is only during the 500 microseconds interval, in which both pulse sources $Na_1$ and $Nb_{11}$ emit a pulse ($GSM_1$, cf. the table in column 23), that five positive pulses in time channel No. 1 will be amplified through pentode 2642 and delivered through coupling condenser 2649 to the control grid of the pentode 2616, part of the regenerator $RG_3$. These pulses are transmitted through the decoupling rectifier 2650 similar to 2621.

Therefore, the regenerator $RG_3$ will deliver a positive pulse of nearly 500 microseconds duration which is conveyed to all GS memory cases but will be admitted only in memory case $GSM_1$, in which the primed tubes $GT_{10}$ and $GU_{10}$ will be fired.

Code No. 00 is now inscribed in memory case $GSM_1$, whereby in the group selector GS (Fig. 25), the gate between multiplex speaking conductor $L_6$ and a source of busy tone is periodically unblocked and busy tone is sent to the caller.

The primary register will be released in the ordinary way, since as soon as No. 00 is inscribed in memory case $GSM_1$, the triode 2701 will deliver negative pulses in time channel No. 1, every 100 microseconds, on conductor $L_7$ leading to the gating arrangement $G_{12}$ (Fig. 22) whereby the latter can no longer deliver a negative pulse in the A interval of time channel No. 1 to the gating arrangement $G_{13}$. Hence, negative pulses in the A position of time channel No. 1 are no longer delivered by tube 2234 on conductor $L_{12}$ and this causes the release of the primary register circuit (RPA and RPB) in the manner previously described.

The positive pulses at the output of the regenerator $RG_3$ (Fig. 26) causing the inscription of code No. 00, cannot fire the cold cathode tube GC, since the cathode of this tube is now disconnected from the source of —150 v. at break contact $bu_2$. Consequently relay S$br$ cannot operate in this case.

After the release of the primary register, relay E$r$ is equally released and this will reestablish the operating circuit for B$ur$. As soon as the calling subscriber after receiving busy tone hangs up, the memory cases $LSM_1$ and $GSM_1$ will be released in the same way as explained before.

3.1.2. SECONDARY BUSY TONE

The wanted subscriber is considered busy, if he has originated a call, if he is in conversation or if his number has been inscribed in a final selector memory case, e.g. as a result of another subscriber calling him. In all cases, this will result in a positive pulse of 60 v. being issued at the output of regenerator $RG_9$ (Fig. 34), thus at the cathode of tube 3422 raising its normal potential of —110 v. to —50 v. In the first case, if the wanted subscriber has originated a call or is in conversation as a result therefrom, negative pulses appear at the control grid of tube 1833 (Fig. 18) during the 500 microseconds interval characterising his number within its group. The resulting negative pulses, which may be distorted, appear at the cathode of tube 1838 and through conductor $L_{44}$, reach the cathode of the triode 3437. These pulses, by lowering the cathode potential of tube 3437, will tend to make the tube conductive, but this is prevented during the first 100 microseconds due to the appearance of a negative pulse from source $d_2$ at the control grid. However, after 100 microseconds the voltage level at the control grid of tube 3437 is back at +20 v. which is the bias applied through resistor 3438, the negative pulse from source $d_2$ having disappeared. Hence, a negative pulse of 400 microseconds duration will appear at the plate of tube 3437 and being fed to regenerator $RG_9$ through coupling condenser 3436, it will cause a pulse of 400 microseconds duration to appear at the cathode of the output tube 3422 during the 500 microseconds interval characterising the wanted line.

If, on the other hand, the wanted subscriber is busy as a result of being called by a third part, or is still busy as a result of the 10 seconds delay after having ended a conversation his number is recorded in a final selector memory case; this means that negative pulses in some particular time channel will appear at the plate of tube 3501, during the 500 microseconds interval characterising the wanted line. These pulses will be directly applied to the coupling condenser 3436 through conductor $L_{41}$ and the decoupling rectifier 3435.

The second negative pulse coming from the plate of the triode 3501 will trigger the regenerator $RG_9$ and a pulse having a duration of 300–400 microseconds will be issued at the cathode of the output tube 3422.

A positive pulse of 60 v. will thus raise the potential at the cathode of the pentode 3417 to −50 v. and this will prevent said pentode from becoming conductive and transmitting a trigger pulse to regenerator $RG_5$ during the 500 microseconds interval characterising the wanted line. This means that the number of the wanted subscriber which is busy will not be inscribed in any final selector memory case.

The raise of potential at the cathode of tube 3422 blocks the rectifier 3439 and the cold cathode tube 3401 is now fired.

Its anode has been connected to ground through conductor $L_{47}$ and make contact $cn_{23}$ (Fig. 32), while its cathode is connected to −150 v. through resistor 3440. The trigger electrode of tube 3401 is connected to the cathode of the triode 3416 through resistors 3441 and 3442 in series, but since rectifier 3439 is connected to the junction point of these two resistors, the increase of potential at the cathode of tube 3416 from −100 v. to −50 v., is not felt at the trigger electrode of tube 3401, as long as rectifier 3439 conducts.

When tube 3401 fires, during the 500 microseconds interval characterising the wanted line, the potential at its cathode is raised to −75 v. Resistors 3443 and 3444 are connected in series between the anode and the cathode, and as the value of the former is about half that of the latter, a potential of −50 v. now tends to appear at the junction point of these two resistors, which is controlled by the pulse sources $Pa_{10}$ and $Pb_{11}$ through the respective rectifiers 3445 and 3446.

Therefore, at the moment pulse sources $Pa_{10}$ and $Pb_{11}$ simultaneously emit positive pulses, raising their levels from −110 v. to −50 v., the potential rise at the cathode of tube 3401 will now result in a rise of potential at the control grid of the pentode 3417 through decoupling rectifier 3447 and resistor 3418, which brings this control grid to −110 v.

This causes a positive pulse of 250 microseconds duration to be issued at the output of the regenerator $RG_5$ and this pulse will be applied to conductor $L_{34}$ causing in a manner previously explained, an inscription in the primed final selector memory case $FSM_{18}$.

This time, however, tubes $FT'_{10}$ and $FU'_{11}$ (Fig. 34) will be lit, as the pulse is issued in the 500 microseconds interval characterised by the simultaneous occurrence of positive pulses from sources $Pa_{10}$ and $Pb_{11}$.

This same positive pulse will cause the blocking tube 3402 to be fired in a manner already explained.

It is to be remarked that, although there is a tube such as $FU'_{11}$ in all the final selector memory cases and also a corresponding amplifying tube $FUA_{11}$ in circuit FSB (Fig. 35), the cathode circuit of this last amplifying tube is not connected to the code comparator FCC as is the case with the tubes of the series $FUA_{1/10}$. This means that the code comparator FCC will not deliver pulses inside the intervals of 500 microseconds characterised by pulse source $Pb_{11}$, whereby negative pulses cannot appear in these intervals on conductor $L_{41}$ and the regenerator $RG_9$ cannot be triggered to cause an increase of potential at the cathode of the output tube 3422.

Therefore, the pentode 3417 is always able to function and cause the inscription of No. 0,11 in the primed memory case, irrespective of whether such a number has already been stored in one or more other final selector memory cases.

As soon as the number 0.11 is inscribed in memory case $FSM_{18}$ negative pulses in time channel No. 18 will appear at the cathode of the triode 3500 whose grid is controlled by negative pulses from the cathode of the amplifying tube $FTA_{10}$. These pulses via conductor $L_{28}$, will prevent negative pulses from being issued at the plate of the triode 3012 during the A interval of time channel No. 18. This means that corresponding negative pulses will disappear on conductor $L_{27}$ connected between the cathode of tube 3013 and the control grid of tube 3141, causing the release of the secondary register in the ordinary way.

As a result of the inscription of No. 0,11 in memory case $FSM_{18}$, the gate in the final selector FS (Fig. 33) between multiplex speaking conductor $L_{36}$ and the busy tone source is periodically unblocked during time channel No. 18.

Busy tone is transmitted to the calling subscriber in the same way as in the case of primary busy tone.

3.2. INCOMPLETE DIALLING

There are two cases, and the first which will be called "incomplete primary dialling" occurs when even the first two series of digital impulses have not been sent.

3.2.1. INCOMPLETE PRIMARY DIALLING

In this case, relay $Bsr_1$ (Fig. 24) will not operate. This is replaced by the action of the timing relay $Tir_1$ (Fig. 23) which will connect the double test relay arrangement $Tr_1$, $Dtr_1$ through make contact $ti_{13}$ instead of make contact $bs_{12}$ being used.

Relay $Tir_1$ operates after a fixed delay which is determined by the time constant circuit comprising resistor 2364 and condenser 2365. This condenser begins to charge as soon as relay $Lbr_1$ is operated and a charging circuit is established through make contact $lb_{17}$. After a certain time, e.g. 30 seconds, the junction point of condenser 2365 and resistor 2364 reaches a potential which is sufficiently positive with respect to the −150 v. potential which prevails at the cathode of tube 2365, to cause the firing of this cold cathode tube, whereby relay $Tir_1$ is energised.

Although the double test will be made in circuit RPB (Fig. 24) in the normal manner, relays $Tr_1$ and $Dtr_1$ operating and relay $Cr_1$ releasing as soon as the test is successful, relay $Cnr_1$ cannot operate as its operating circuit is interrupted at break contact $ti_{12}$. The operation of relay $Cr_1$ unblocks the gate 2438, 2439 via its break contact $c_{12}$. At make contact $ti_{11}$, the ground which is applied through make contact $bu_1$ (Fig. 26) to conductor $L_{39}$, is transferred to conductor $L_{45}$ causing the operation of the false call relay $Fcr$ (Fig. 26) through the make contacts $dt_{12}$ and $ti_{11}$. This ground is, therefore, no longer used to effect the priming of the group selector memory cases through the counting chain gates such as 2431, 2432.

This time, the pentode 2642 is unblocked due to −48 v. being applied through make contact $fc_1$ and resistor 2643 to its cathode. At make contact $fc_2$, relay $Fcr$ connects a ground to conductor $L_{48}$ leading to the false call desk FCD in Fig. 11, and also to circuit GSB (Fig. 27) where it is applied through resistor 2707 and rectifiers 2709 and 2710 respectively to the trigger electrodes of the tubes such as $GT_{10}$ and $GU_9$ (Fig. 28). In the same way as resistor 2706, biassed to −150 v., was connected to resistor 2703 to provide a suitable priming potential, resistor 2708 is used in a similar fashion together with resistor 2707.

Since time channel No. 1 has been seized by the calling party No. 1119, as assumed in the example discussed, pulses in time channel No. 1 will be present on conductor $L_{20}$ due to the unblocking of the gate 2438, 2439 and the gating arrangement $G_{24}$ (Fig. 26) will react in the already described manner. Since the pentode 2642 is able to conduct, negative pulses in time channel No. 1 will be issued at its plate during the 500 microseconds time interval characterised by pulses from sources $Na_1$ and $Nb_{11}$, and this will trigger the regenerator $RG_3$ which produces a positive pulse of 300–400 microseconds at the output of tube 2624.

Hence, No. 09 will be recorded in memory case $GSM_1$. The primary register will then be released in the normal manner and this will extinguish tube 2366, since ground is removed from the anode at make contact $lb_{17}$. Condenser 2365 is discharged through resistor 2368 and break contact $lb_{18}$.

The inscription of the number 09 in the group selector memory case $GSM_1$ will cause the periodic unblocking of the gate between the multiplex conductor $L_6$ and the conductor $L_{50}$ in the group selector GS (Fig. 25).

This conductor $L_{50}$ leads to the false call desk FCD (Fig. 11). A connection is established between the calling subscriber and an operator at the false call desk in a way later to be explained, and the operator may now try to alert the negligent subscriber by sending a howling tone to the subscriber's line, and induce him to lay down his handset, after which memory cases $LSM_1$ and $GSM_1$ are released.

3.2.2. INCOMPLETE SECONDARY DIALLING

In this case a timing relay $Tir_2$ in the secondary register (Fig. 31) operates in the same way as relay $Tir_1$ in the primary register. Relay $Tir_2$ will close the double test circuit at make contact $ti_{23}$ and the operation of relay $Dtr_2$ will unblock the gate 3238, 3239, as already described. In the case of the secondary register, relay $Cnr_2$ is permitted to operate since it is not controlled by a break contact on relay $Tir_2$ and therefore ground will be applied to conductor $L_{49}$ through make contacts $cn_{25}$ and $ti_{21}$. This leads to resistor 3448 connected in series with resistor 3449 between conductor $L_{49}$ and $-150$ v.

The value of resistor 3449 is about twice that of resistor 3448, and condenser 3450 which is connected between the junction point of said resistors and ground, and which was previously charged to $-150$ v. will now be charged to $-50$ v. This potential rise will be able to influence the control grid of the pentode 3417 only when pulse sources $Pa_1$ and $Pb_{11}$ simultaneously issue a positive pulse raising their voltage levels from $-110$ v. to $-50$ v. These two sources control the respective rectifiers 3451 and 3452, and the potential at the junction point of resistor 3453 and rectifier 3454 cannot rise beyond $-110$ v. unless both rectifiers 3451 and 3452 are blocked simultaneously.

This will evidently result in the inscription of No. 1,11 in memory case $FSM_{18}$, and just as in the case of the inscription of No. 0,11 (busy circuit), the arrangement comprising regenerator $RG_9$ and pentode 3422 cannot react in the 500 microseconds intervals characterised by pulses from source $Pb_{11}$, since the cathode circuit of tube $FUA_{11}$ (Fig. 35) is not connected to the code comparator FCC. Therefore, No. 1,11 can be recorded in more than one final selector memory case in one group. The inscription of number 1,11 in final selector memory case $FSM_{18}$ causes the periodic unblocking of the gate between multiplex conductor $L_{36}$ and conductor $L_{51}$, which leads to the false call desk FCD (Fig. 11).

3.3. P.B.X LINES

Circuit P.B.X1 shown in Fig. 34 is used for one particular group of P.B.X lines and, as indicated in Fig. 34, several similar circuits can be used within a group of 100 lines.

The equpiment contained in circuit P.B.X1 is represented in Fig. 38. By way of example, it is assumed that this P.B.X group comprises four lines but it can, of course, contain any number of lines as long as the total number of P.B.X lines does not exceed 100. Also by way of example, the pilot number is assumed to be 1125, thus No. 25 in group No. 11, the other P.B.X numbers being 1128, 1138 and 1147.

Each circuit such as P.B.X1 contains a cold cathode tube such as 3800, the anode of which is connected to ground through conductor $L_{47}$ and make contact $cn_{23}$ in circuit RSB (Fig. 32), while the cathode is connected to $-150$ v. through a resistor such as 3804. The trigger potential of this tube is simultaneously controlled by the cathode potential of triode 3416 through conductor $L_{52}$ and resistor 3801, by the cathode potential of pentode 3422 through conductor $L_{55}$ and rectifier 3817, and by the pulse sources $Pa_2$ and $Pb_5$ (corresponding with the pilot number 1125) through rectifiers 3802 and 3803 respectively. This means that the trigger electrode of tube 3800 is normally at $-110$ v. and that it is raised to about $-50$ v. only if positive pulses are emitted simultaneously by triode 3416, pentode 3422 and sources $Pa_2$, $Pb_5$. This will only be the case if the number dialled by the calling subscriber into the secondary register is 25, and if this number happens to be busy. In this case only the P.B.X circuit is made effective and P.B.X hunting is started by the firing of tube 3800.

On the other hand, the 60 v. pulse arriving at the trigger electrode of tube 3800 is also transmitted through rectifier 3816 and conductor $L_{53}$ to the potential divider 3856, 3859 connected between conductor $L_{53}$ and $-150$ v. The junction point of resistors 3856 and 3859 which is normally at a potential of about $-130$ v. is connected to the grid of triode 3455 and as the cathode of this triode is normally biassed to $-110$ v. through resistor 3458, this tube will be normally cut-off, but it will be made conductive by the arrival of a positive pulse on conductor $L_{53}$. This triode at its anode controls the potential at the junction point between resistors 3441 and 3442 and as long as the tube is conductive this junction point is substantially clamped to the $-110$ v. cathode potential, by which the firing of busy tube 3401 is prevented. Thus when the coincidence of positive pulses which leads to the firing of tube 3800 occurs, the firing of the busy tube is prevented.

As soon as tube 3800 is fired, its cathode potential is raised to $-75$ v. This voltage rise is divided by the potential divider 3805, 3806 connected between said cathode and the $+200$ v. source. The voltage rise at the junction point of resistors 3805, 3806 being applied to the control grid of a beam power tube 3807, the cathode of this tube will follow and while it is normally at the potential of $-110$ v., it will now rise above $-50$ v.

This potential which prevails at the cathode of tube 3807 as long as tube 3800 is ionized, causes $-50$ v. to be impressed on conductor $L_{56}$ through resistor 3808 and decoupling rectifier 3809 during the time interval characterised by simultaneous pulses from sources $Pa_2$ and $Pb_8$ which control the potential at the junction point of resistor 3808 and rectifier 3809 through rectifiers 3810 and 3811. This potential of $-50$ v. will also reach conductor $L_{56}$ through a similar arrangement 3812, 3813 during the interval in which sources $Pa_3$ and $Pb_8$ simultaneously emit pulses, and through a third similar arrangement 3814 and 3815 during the interval in which sources $Pa_4$ and $Pb_7$ simultaneously emit pulses. This rise of potential on conductor $L_{56}$ will reach the grid of pentode 3417 through resistor 3418.

In the manner already described this will result in the inscription of the number corresponding to the interval in which the rise of potential occurs, into the memory case which has been primed before, unless the said potential rise is accompanied by the emission of a positive pulse at the cathode of tube 3422 indicating that the corresponding line is busy.

The potential at the cathode of tube 3807 is also directed to the cathode of tube 3455 through resistor 3818, rectifier 3819 and conductor $L_{54}$. Since the cathode resistor 3458 is shunted by a relatively large condenser 3457, the cathode bias will be made to increase slowly and in an exponential manner from the moment the tube 3800 had fired. In fact, the rise of potential at the cathode of tube 3455 is so slow, that it does not affect the normal operation of tube 3455 as explained above, during the interval of 500 microseconds in which the pulse corresponding to the pilot No. 1125 arrives at the cathode of tube 3416 for the first time, but by the time this pulse arrives again after a complete cycle of 55 milliseconds duration, tube 3455 will be unable to prevent the firing of the busy tube 3401.

During this period of 55 milliseconds all the P.B.X lines of group P.B.X1 will have been scanned successively. If, during the scanning one line is found free, then its number will be inscribed into the primed final selector memory case, and at the same time the blocking tube 3402 will be fired in the way already described. This will effectively block tube 3417 and the risk of superimposing a second inscription upon the one already achieved in the primed memory case, due to a further P.B.X line being scanned, is avoided.

If during the scanning cycle of 55 milliseconds none of the P.B.X lines is found free, the second occurrence of the pulse corresponding to No. 1125 at the cathode of tube 3416 will be effective in firing the busy tube 3401. This will cause as already described the busy code 10, 11 to be inscribed in the primed final selector memory case. Busy tone will then be transmitted to the caller.

As soon as any inscription has been made into the primed final selector memory case, the secondary register will be released in the way already described and the opening of make contact $cn_{23}$ in circuit RSB will permit the cold cathode tube such as 3800 to extinguish. If the inscription made corresponds to a free P.B.X line, ringing current will be applied to said line in the way already described.

3.4. SPECIAL SERVICES

As already stated the groups in the group selector having "0" as their first digit are reserved for special purposes. We have seen that "00" was used for connecting a calling subscriber to a busy circuit, in the case that a free time position on the wanted secondary link was not available. Likewise group 09 has been reserved for false calls. The remaining groups 01 . . . 08 may be used for special services such as toll board, complaints, information, etc.

If, for instance, a calling subscriber dials 01, this is registered in the primary register counting chains, and a hunt is made for a free time channel on conductor $L_{57}$ in the same way as already described in relation to an ordinary call. If a free time channel is available the code 01 is inscribed in the corresponding group selector memory case, and negative pulses in the A position of the seized time channel now appear on conductor $L_{57}$ and at the input of the link circuit LK0 (Fig. 39) which is provided in common for all or a large number of primary groups. By way of example, it will be assumed that it is time channel No. 3 which has been seized.

The link circuit LK0 is essentially a gated two-way amplifier, similar to the one incorporated in the primary link circuit LKB (Fig. 22), and it comprises a clamping arrangement, an amplifier circuit AMPs and four gates $G_{75}$, $G_{76}$, $G_{77}$, $G_{78}$, operating in the same way as the clamping arrangement, amplifier $AMP_1$ and gates $G_7$, $G_8$, $G_9$ and $G_{10}$ respectively in Fig. 22.

The pulses appearing on conductor $L_{57}$ after being amplified in link circuit LK0 are transmitted through conductor $L_{60}$ and amplified to the input of the special service distributor switch SSD, shown in Fig. 40. This distributor switch comprises 18 gates such as $G_{79}$, one for each time channel, each one being controlled by negative pulses from the corresponding $t$-source. Gate $G_{79}$ comprises resistor 4002 and rectifiers 4000, 4001, 4003, operating in the same way as the corresponding elements of the gates in the line selector circuit LS (Fig. 17) except for resistor 4002 being connected to ground. However, while in the case of the line selector gate it requires the simultaneous occurrence of negative pulses at both rectifiers 1703, 1704 to unblock the gate, in the present case the application of a negative pulse at rectifier 4003 is sufficient. Moreover, the pulses controlling the gates in the line selector are themselves controlled by the line selector memory cases, while in the special service distributor switch the pulses are directly applied from the sources such as $t_3$ through a condenser such as 4006 for gate $G_{79}$.

The potential at the junction point between condenser 4006 and rectifier 4003 is normally kept at +25 v. by the clamping rectifier 4004 which receives current from the +200 v. source through resistor 4005. The said +25 v. potential also reaches the junction point between rectifier 4000 and 4001 through rectifier 4003 being conductive. When a pulse arrives from source $t_3$ the potential at the junction point between rectifiers 4003 and 4004 drops about 25 v., whereby these rectifiers are blocked permitting rectifiers 4000 and 4001 to become conductive.

In this way a connection is established from conductor $L_{60}$ through the successive gates, each in its turn opening the way towards 18 individual conductors leading to the rings of jacks such as 4013. Thus the circuit SSD functions to distribute the incoming calls on conductor $L_{60}$ towards 18 jacks on one or more operator's desks, according to the 18 time channels employed by said calls. Each jack is provided with an amplifier valve 4010 and a small neon filled indicator tube 4012 which glows whenever a call is directed towards said jack. Normally, the ring conductor is kept at a potential of +25 v. through resistor 4007 whereby condenser 4008 is kept charged and tube 4010 has zero grid bias, as its grid and cathode are both at +25 v. As long as tube 4010 is thus fully conductive the anode voltage is below the maintaining voltage required for a discharge in the neon tube 4012, which is therefore not ionized.

As soon as negative pulses in time channel No. 3 arrive through gate $G_{79}$, condenser 4008 loses part of its charge and the average potential at the ring conductor decreases. This decrease of potential is imparted to the grid of tube 4010 through resistor 4009, causing the anode voltage to rise sufficiently for neon tube 4012 to strike. The operator thus warned, may connect her headphone 4016 by inserting a plug 4014 into jack 4013. This closes a circuit from the ring conductor through the primary winding of transformer 4015, the tip of plug 4014 towards a source of +15 v. and thus establishes a speech circuit for the operator, similar to the line circuit of the calling subscriber. Therefore, the operator is now able to communicate with the calling subscriber. By the insertion of the plug 4014 into jack 4013 ground is applied to the sleeve of plug 4013 which is connected to the anode of tube 4010, and this causes the neon tube to be extinguished.

It is to be noted that similar equipment as described above is included in the false call desk enabling an operator to try to communicate with the subscriber responsible for the false call.

While the principles of the invention have been described above in connection with specific apparatus, it is to be clearly understood that this description is made only by way of example and not as a limitation on the scope of the invention.

We claim:

1. Pulse multiplex telecommunication system characterized in this that it comprises a first set of connecting channels divided into groups, a second set of connecting channels divided into groups, the channels of each group comprising recurring time positioned pulses in a recurring cycle of time positions forming identical multiplex systems, group selectors interconnecting said two sets of connecting channels, each individual channel in the groups of said first set being available to said group selectors for connection exclusively to a single coresponding channel in every group in said second set, and control means for controlling the operation of the group selectors to interconnect a channel of said first set to a channel of said second set having identical time position characteristics, whereby direct transmission through channels of both sets is always accomplished.

2. A telecommunication system comprising substations, line selectors, group selectors, final selectors, a first set of connecting channels divided into groups, a second set of connecting channels divided into groups, the channels of each group comprising recurring time positioned pulses in a recurring cycle of time positions forming identical multiplex systems, group selectors interconnecting said two sets of connecting channels, each individual channel in the groups of said first set being available to said group selectors for connection exclusively to a single corresponding channel in every group in said second set, control means for controlling the operation of the group selectors to interconnect a channel of said first set to a channel of said second set having identical time position characteristics, whereby direct transmission through channels of both sets is always accomplished, means for recording the identity of a calling substation and of a wanted substation in a wanted group, respectively, primary multiplex links interconnecting each line selector to a corresponding group selector, secondary multiplex links between group and final selectors which are individual to each final selector and are each connected in multiple to corresponding outlets of said group selectors, said recording means including means to interconnect said primary and secondary links in such a way as to set up simultaneous connections each via directly-connected like primary and secondary channels between arbitrarily-occurring pairs of substations.

3. Telecommunication system comprising a plurality of substations arranged in groups, a time multiplex line selector, a time multiplex final selector and a time multiplex group selector for each group, a single primary time multiplex link in each group interconnecting the corresponding line and group selectors, a single secondary time multiplex link in each group interconnecting the corresponding final selector with corresponding multipled outlets of all the group selectors, a set of primary registers for each primary link, a set of secondary registers for each secondary link, a set of memory cases for each selector equal in number to the channels equally provided on each link, each case being for the purpose of registering the identity of the outlet on which the corresponding selector must be set during the corresponding time channel, call detecting means per group for the purpose of providing a signal identifying a calling substation within the corresponding group, means to store the identity of a calling substation within its group in a line selector memory case provided the latter is free and as a result of said signal from the call detecting means, means to transmit dialling pulses characterising the identity of the group of a called substation through the line selector of the calling substation during a time channel corresponding to the engaged line selector memory case and through the corresponding primary link to a corresponding primary register, means for controlling the group selector to select the outgoing multiplex link individual to the wanted substation group, means for selecting a multiplex time position which is free both in the primary link of the calling substation, and in the secondary link of the wanted substation group, means to store the identity of the group of the called substation under the control of the identity registered in the primary register in a group selector memory case corresponding to the selected time channel, means to store the identity of the calling substation within its group in the line selector memory case corresponding to the engaged group selector memory case, means to transmit further dialling pulses characterising the identity of the called substation within its group through the line selector of the calling substation set on the latter during a time channel corresponding to the engaged group selector memory case and through the corresponding group selector set on the secondary link of the called substation during said same time channel to a corresponding secondary register, and means to store the identity of the called substation within its group in the final selector memory case for that group corresponding to the engaged group selector memory case under the control of said identity stored in the engaged secondary register, whereby a connection is established between the calling and the called substations through the primary link of the calling substation and the secondary link of the called substation and on the same time channel for both links.

4. Telecommunication system comprising a plurality of substations arranged in groups, a time multiplex line selector, a time multiplex final selector and a time multiplex group selector for each group, a single primary time multiplex link in each group interconnecting the corresponding line and group selectors, a single secondary time multiplex link in each group interconnecting the corresponding final selector with corresponding multipled outlets of all the group selectors, a set of primary registers for each primary link, a set of secondary registers for each secondary link, a set of memory cases for each selector equal in number to the time channels equally provided on each link each case for the purpose of registering the identity of the outlet on which the corresponding selector must be set during the corresponding time channel, a memory monitoring device operatively connected with each selector for the purpose of distinguishing between corresponding free and engaged memory cases, call detecting means per group for the purpose of providing a signal identifying a calling substation within the corresponding group, means to store the identity of a calling substation within its group in a free line selector memory case provided the latter is free and as a result of said signal from the call detecting means, means to transmit dialing pulses characterising the identity of the group of a called substation through the line selector of the calling substation during a time channel corresponding to the engaged line selector memory case and through the corresponding primary link to a corresponding primary register, means to successively set the corresponding group selector under the joint control of the memory monitoring device for the line selector and of the identity of the group of the called substation registered in the engaged primary register on the secondary link of the called substation for successive time channels free on the primary link of the calling substation, means to prevent other group selectors to be similarly set on the same secondary link for the same time channels at the same time, means for detecting the free condition of the time channel under test in the secondary link of the called substation, means to store the identity of the group of the called substation under the control of the identity registered in the primary register in a group selector memory case corresponding to a time channel simultaneously free on the primary link of the calling substation, as detected by the corresponding memory monitoring device and also on the secondary link of the called substation, means to store the identity of the calling substation within its group in the line selector memory case corresponding to the engaged group selector memory case, means to release the line selector memory case originally engaged, means to transmit further dialing pulses characterising the identity of the called substation within its group through the line selector of the calling substation set on the latter during a time channel corresponding to the engaged group selector memory case and through the corresponding group selector set on the secondary link of the called substation during said same time channel to a corresponding secondary register, and means to store the identity of the called substation within its group in the final selector memory case for that group corresponding to the engaged group selector memory case under the control of said identity stored in the engaged secondary register, whereby a connection is established between the calling and the called substations through the primary link of the calling substation and the secondary link of the called substation and on the same time channel for both links.

5. Telecommunication system, as claimed in claim 3, characterised in this, that means is provided for automatically busying a line selector memory case corresponding to an engaged group selector memory case in the same group as soon as said group selector memory case is engaged.

6. Telecommunication system, as claimed in claim 3, characterised in this, that means are also provided to set the group selector under the control of the identity of the group of the called substation for the purpose of determining whenever the time channel on the secondary link of the called substation corresponding to the time channel already engaged on the primary link of the calling substation is free.

7. Telecommunication system, as claimed in claim 2, wherein said recording means consist of a group of memory cases for each selector, characterised in this, that means are provided for continuously producing signals for an engaged memory case which characterise said memory case and its corresponding time channel.

8. Telecommunication system, as claimed in claim 2, wherein said recording means consist of a group of memory cases for each selector, characterised in this, that means are provided for continuously producing signals for an engaged memory case which characterise said memory case, its corresponding time channel and also the identity recorded therein.

9. A telecommunication system comprising a first set of connecting channels divided into groups, a second set of connecting channels divided into groups, the channels of each group comprising recurring time positioned pulses in a recurring cycle of time positions forming identical multiplex systems, group selectors interconnecting said two sets of connecting channels, each individual channel in the groups of said first set being available to said group selectors for connection exclusively to a single corresponding channel in every group in said second set, control means for controlling the operation of the group selectors to interconnect a channel of said first set to a channel of said second set having identical time position characteristics, whereby direct transmission through channels of both sets is always accomplished, at least one stage of selection for automatically interconnecting substations under control of the designation of a wanted substation, a number of conversational paths including switching means for interconnecting a calling substation to said first selection stage, registers for controlling the setting of said selection stages, said conversational paths including means for setting up a temporary connection to a register when a connection is initiated, means for automatically replacing such connections by actual conversational connections via said same conversational paths, said register including means for recording the identities of wanted substations and means for recording the identity of the channel of a multiplex link to which channel said register is connected, whereby information can be steered to a memory case associated with said channel for controlling any desired operation.

10. Telecommunication system, as claimed in claim 5, characterised by the provision of outlets of selectors used in directing connections towards a wanted line provided with signalling equipment, and means responsive to the occurrence of conditions requiring signals from said signalling equipment to cause the identity of such an outlet to be inserted in said memory case under control of said channel identity recording means.

11. Telecommunication system, as claimed in claim 3, characterised in this that the system further comprises means for transmitting pulses on a transmission channel seized by a calling line, means for transmitting pulses on a transmission channel in conversational use, gating means controlled from each memory case, a pulse path from a transmission channel to the corresponding gating means, control means for opening said gating means only when said memory case is empty, detecting means for responding to pulses received via said gating means, and dial tone sending means which operates under control of said detecting means.

12. Telecommunication system, as claimed in claim 2 wherein said recording means comprises a group of memory cases for each selector, characterised by further comprising means for determining whether a wanted direction is busy by checking whether the identity of the wanted direction is already recorded in a related memory case.

13. Telecommunication system, as claimed in claim 2, wherein said recording means comprises a group of memory cases for each selector, characterised in this that the system further comprises means for determining whether a wanted substation is busy by checking whether a calling signal characteristic of said substation is being transmitted.

14. Telecommunication system, as claimed in claim 8, wherein said system further comprises means for continuously producing first signals characterizing the identities of called substations registered in final selector memory cases, means for continuously producing second signals characterizing the identity of a called substation registered in a register, means for comparing said first signals with a second signal characterizing the identity of a called substation in the same group registered in a register, and means for registering the identity corresponding to said second signal in a final selector memory case if none of the first signals correspond to this identity and for registering a busy tone identity if one of these first signals corresponds to this identity.

15. Telecommunication system, as claimed in claim 2, characterised in this, that the system further comprises means for continuously producing signals characterizing the identity of a called substation registered in a register, means for comparing the signals characterising the identities of calling substations provided by the call detecting means with the signal characterising the identity of a called substation in the same group registered in a register and for registering the corresponding identity in a final selector memory case if none of the first signals correspond to this identity and for registering a busy tone identity if one of these first signals corresponds to this identity.

16. Telecommunication system, as claimed in claim 8, characterised in this, that the system further comprises means for comparing the first signals characterising the identities of called substations registered in final selector memory cases with second signals characterising the identities of calling substations in the same group for registering the corresponding identities in line selector memory cases only if none of the first signals correspond to those identities.

17. Telecommunication system, as claimed in claim 2, wherein said recording means comprises a group of memory cases for each selector, further comprising means operative in response to the call of a substation for checking whether the substation number is recorded in a final selector memory case for an incoming call to said substation, and means for giving preference to one of said calls.

18. Telecommunication system, as claimed in claim 17 further comprising means for directly completing said incoming call to said substation when said checking means determines that the calling substation number is recorded in a final selector memory case, and means for preventing seizure of any equipment on account of the call originated by said substation.

19. Telecommunication system, as claimed in claim 18, in which said checking means is arranged to detect the simultaneous occurrence of a calling condition on the wanted substation line and of a signal characteristic of said substation line from said final selector memory case.

20. Telecommunication system, as claimed in claim 8, further comprising means for generating time position signals characteristic of calling substations throughout the corresponding connections, means for initially offering said time position signals to line selector memory cases until a free memory case is found and records the identity of the corresponding calling substation, means for generating blocking signals characteristic of substation identities stored in line selector memory cases, and blocking means under control of said blocking signals for preventing calling signals characteristic of substation identities already stored from being offered to said memory cases.

21. Telecommunication system, as claimed in claim 20, in which the time position signals have recurrent time pulse cycles characterising respectively the substations of a group and the line selector memory cases of the group and have numbers of pulses per cycle which are prime with respect to each other, and the blocking means comprises a single blocking gating means for controlling the offering of substation pulses to memory cases.

22. Telecommunication system, as claimed in claim 21, further comprising a second common blocking gating means controlled by pulses characteristic of line-selector memory cases but sent from the corresponding engaged group selector memory cases whereby seizure of an idle line-selector memory case is prevented if its corresponding group selector memory case is engaged.

23. Pulse multiplex telecommunication system comprising a first set of connecting channels divided into groups, a second set of connecting channels divided into groups, the channels of each group comprising recurring time positioned pulses in a recurring cycle of time positions, forming identical multiplex systems, group selectors interconnecting said two sets of connecting channels, each individual channel in the groups of said first set being available to said group selectors for connection exclusively to a single corresponding channel in every group in said second set, control means for controlling the operation of the group selectors to interconnect a channel of said first set to a channel of said second set having identical time position characteristics, whereby direct transmission through channels of both sets is always accomplished, means for applying pulses to a connection during the channel time allocated thereto, and release means rendered operative by non-receipt of said pulses for a predetermined period.

24. Telecommunication system, as claimed in claim 7, further comprising blocking means in the path of said pulses generated in the communication channels between the channel and the seizure-signal responsive means, and connections between said signal-producing means associated with the memory cases of the succeeding selector and said blocking means whereby passage of said pulses from said channels to said seizure-signal responsive means is prevented while the corresponding memory cases are in use.

25. Telecommunication system, as claimed in claim 9, in which each register comprises a dynamic memory having a periodicity equal to that of the multiplex cycle and acting as said recording means for the identity of a channel with which said register is connected, and further comprising a common seizure channel for said registers comprising a blocking device controlled by said registers by means of pulses extracted from said dynamic memories in the hunt position of the corresponding channel whereby a seizure signal from a channel is blocked once a register has been connected thereto, a common signal channel between said communication channels and said registers comprising gating means also controlled by the information stored in said dynamic memories to pass signals from the respective communication channels to, and only to, the registers associated therewith.

26. Telecommunication system, as claimed in claim 22, further comprising means for comparing the condition of the time-position channels of primary and secondary links required in setting up a connection, means for selecting a time-position which is free in both the primary and secondary links, and means for preventing seizure of the same time-position channel in a particular link for more than one connection.

27. Telecommunication system, as claimed in claim 26, in which a single time position comparison means is provided for each primary link, and sequence-control means is provided for ensuring that not more than one secondary link can be tested as regards the same time position at the same moment.

28. Telecommunication system, as claimed in claim 26, further comprising means for selecting the group selector memory case corresponding to the channel found free on both the primary link of the calling substation and on the secondary link of the called substation under the control of said channel identity and for registering therein the identity of the group of the called substation stored in the register.

29. Telecommunication system as claimed in claim 28, further comprising means for continuously comparing signals characterising engaged group selector memory cases with signals characterising engaged line selector memory cases in the same group, and means operative upon a group selector memory case being engaged while the corresponding line selector memory case is not, for automatically and instantaneously impressing pulses located in the corresponding time position on the primary link of the group whereby these pulses appear on the secondary link of the group the identity of which is registered in the group selector memory case thereby preventing the selection of said time positions for setting up connections to other called substations in this last group.

30. Telecommunication system, as claimed in claim 8, further comprising gating means for each line selector memory case arranged to connect to the corresponding memory case the dual-purpose pulses identifying both the primary link channel already in use for connection and identifying the number of the calling substation under control of the primary link channel pulses passing down the signal channel to the registers and said single time-position comparison means of the primary link whereby the calling substation number is recorded in the line selector memory case of the time channel which has been selected under control of said comparison means for use for communication between substations under control of the record in the line selector memory case of the time channel used initially in setting up the connection.

31. Telecommunication system, as claimed in claim 30, further comprising a common lead carrying said dual-purpose pulses from all busy line selector memory cases in a group, a release lead leading to all line-selector memory cases of said group, gating means between said common lead and said release lead controlled by pulses from said register signal channel and said single comparison means so as to pass only those pulses characterising the line selector memory case whose contents have been re-recorded in another line selector memory case, and a gating means per line selector memory case on said release lead whereby pulses selectively passed to said release lead are directed solely to the memory case to which they relate to cause release thereof.

32. Telecommunication system, as claimed in claim 3, further comprising register means for the called substation identity in its group, means for translating said registered identity into a recurring pulse in a time cycle having positions for identifying every substation in a group, means for comparing the time position of said recurring pulse with the time positions of pulses identifying substations in said group concerned in any other indicated or established connection, and means for recording said registered identity in the final selector memory case of the selected time position for the connection if said comparison gives a negative result.

33. Telecommunication system, as claimed in claim 32, further comprising a busy tone source, means for inserting a busy code in said final selector memory case of the selected time position for the connection if said comparison gives a positive result, and means for connecting said final selector memory case to said busy tone source via the primary and secondary links and the final selector.

34. Telecommunication system, as claimed in claim 32, further comprising connections to said comparison means from a pulse channel carrying identification pulses controlled by the busy final selector memory cases of the substation group, and a pulse channel carrying identification pulses consisting of the calling condition pulses corresponding to calling substations in said group whereby further establishment of a connection is prevented if the wanted party has been called or has originated a call.

35. Telecommunication system, as claimed in claim 3, wherein said recording means comprises a group of memory cases for each selector, further comprising means individual to each final selector memory case for recording that the wanted substation has answered, discriminating means individual to each final selector memory case which is operative when a final selector memory case contains a wanted substation number and when said answer-recording means is not operative, ringing-signal means common to a group of substations, connections from said ringing-signal means to the individual circuits of all substations of a group, and means for effectively connecting said ringing-signal means to a substation circuit only when the corresponding discriminating means is operative.

36. Telecommunication system, as claimed in claim 35, further comprising pulse generating means in each final selector time channel controlled by response of a wanted substation to which said channel is connected, means for directing pulses from said pulse-generating means to the corresponding final selector memory case to operate said answer-recording means, means responsive to said answer recording means for rendering the corresponding discriminating means inoperative, and means responsive to said last-mentioned means for disconnecting the ringing current source from the wanted substation.

37. Telecommunication system, as claimed in claim 23, further comprising means in the primary links and in the secondary links for creating separate go and return channels within a time position between said primary and secondary means in interconnected primary and secondary channels, means in the primary and secondary links respectively for creating pulse trains throughout a connection in the go and return channels under control of the calling and called substations respectively, and discriminating means for checking whether the go pulse train alone continues for a predetermined time whereby release by the called party alone can be detected.

38. Telecommunication system, as claimed in claim 15, further comprising means for producing permanently available pulse trains each identifying a private branch exchange number, means for comparing a wanted number within its group with all said pulse trains to determine whether a private branch exchange is being called, means for producing permanently available secondary pulse trains, each identifying the individual substations of a private branch exchange, means for modifying said secondary pulse trains according to the idle or busy condition of the substations of the private branch exchange, test means for examining said secondary pulse trains to find an idle substation, switching means individual to each private branch exchange for connecting its secondary pulse train to said test means, means for recording the number of a selected and free private branch exchange substation in the final selector memory case, and means for recording a busy code in said final selector memory case only when none of the substations of the private branch exchange called is free.

References Cited in the file of this patent

UNITED STATES PATENTS

| | | |
|---|---|---|
| 2,490,833 | Ransom | Dec. 13, 1949 |
| 2,506,613 | Ransom | May 9, 1950 |
| 2,619,548 | Lesti | Nov. 25, 1952 |
| 2,773,934 | Trousdale et al. | Dec. 11, 1956 |